(12) United States Patent
Ohkubo et al.

(10) Patent No.: US 7,661,132 B2
(45) Date of Patent: Feb. 9, 2010

(54) TAG PRIVACY PROTECTION METHOD, TAG DEVICE, BACKEND APPARATUS, UPDATER, UPDATE SOLICITOR AND RECORD MEDIUM CARRYING SUCH PROGRAMS IN STORAGE

(75) Inventors: Miyako Ohkubo, Kanagawa (JP);
Koutarou Suzuki, Kanagawa (JP);
Shingo Kinoshita, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 966 days.

(21) Appl. No.: 10/537,915

(22) PCT Filed: Sep. 27, 2004

(86) PCT No.: PCT/JP2004/014113

§ 371 (c)(1),
(2), (4) Date: Jun. 8, 2005

(87) PCT Pub. No.: WO2005/014113

PCT Pub. Date: Feb. 17, 2005

(65) Prior Publication Data

US 2006/0080732 A1 Apr. 13, 2006

(30) Foreign Application Priority Data

| Sep. 26, 2003 | (JP) | ............................ 2003-334891 |
| Oct. 20, 2003 | (JP) | ............................ 2003-359157 |
| Nov. 13, 2003 | (JP) | ............................ 2003-383760 |
| Apr. 20, 2004 | (JP) | ............................ 2004-124610 |
| May 14, 2004 | (JP) | ............................ 2004-145366 |

(51) Int. Cl.
*G06F 21/00* (2006.01)
*H04L 9/32* (2006.01)

(52) U.S. Cl. ............................ 726/18; 726/6; 713/179
(58) Field of Classification Search ....................... None
See application file for complete search history.

(56) References Cited

U.S. PATENT DOCUMENTS 5,657,388 A 8/1997 Weiss (Continued)

FOREIGN PATENT DOCUMENTS

CN 2439076 Y 7/2001

(Continued)

OTHER PUBLICATIONS

Juels, Ari; Pappu, Ravikanth: "Squealing Euros: Privacy Protection in RFID-Enabled Banknotes", In R. Wright, ed., Financial Cryptography 03, Springer-Verlag, LNCS No. 2742, pp. 103 to 121, [Retrieved on Dec. 28, 2004], Retrieved from the Internet: <URL: http://www.rsasecurity.com/rsalabs/staff/bios/ajuels/publications/euro/Euro.pdf>, Jan. 2003.

(Continued)

*Primary Examiner*—Christopher A Revak
(74) *Attorney, Agent, or Firm*—Oblon, Spivak, McClelland, Maier & Neustadt, L.L.P.

(57) ABSTRACT

A tag device causes a second calculator to read a confidential value from a confidential value memory and to apply a second function F2 which disturbs a relationship between elements of a definition domain and a mapping thereof to generate tag output information. The tag device delivers the tag output information to a backend apparatus. Subsequently, a first calculator reads out at least part of elements of the confidential value from the confidential value memory, and applies a first function F1, an inverse image of which is difficult to obtain, and a result of such calculation is used to update a confidential value in the confidential value memory by overwriting.

65 Claims, 58 Drawing Sheets

U.S. PATENT DOCUMENTS

| | | | |
|---|---|---|---|
| 5,751,812 A * | 5/1998 | Anderson | 713/155 |
| 5,768,382 A * | 6/1998 | Schneier et al. | 380/251 |
| 5,970,143 A * | 10/1999 | Schneier et al. | 713/181 |
| 6,012,636 A | 1/2000 | Smith | |
| 6,629,198 B2 * | 9/2003 | Howard et al. | 711/112 |
| 7,100,008 B2 * | 8/2006 | Yagawa | 711/162 |
| 7,188,230 B2 * | 3/2007 | Osaki | 711/216 |
| 7,348,886 B2 * | 3/2008 | Himberger et al. | 340/572.1 |
| 7,362,862 B2 * | 4/2008 | Schneier et al. | 380/251 |
| 7,474,217 B2 * | 1/2009 | Himberger et al. | 340/572.1 |
| 7,492,258 B1 * | 2/2009 | Shoarinejad et al. | 340/572.1 |
| 2002/0116274 A1 | 8/2002 | Hind | |
| 2003/0188171 A1 | 10/2003 | DeCenzo et al. | |
| 2006/0124737 A1 * | 6/2006 | Oh et al. | 235/385 |
| 2007/0046467 A1 * | 3/2007 | Chakraborty et al. | 340/572.1 |
| 2007/0198838 A1 * | 8/2007 | Nonaka et al. | 713/176 |
| 2008/0001746 A1 * | 1/2008 | Childress et al. | 340/572.1 |
| 2008/0001748 A1 * | 1/2008 | Childress et al. | 340/572.1 |
| 2008/0001752 A1 * | 1/2008 | Bruns et al. | 340/572.1 |
| 2008/0088455 A1 * | 4/2008 | Lu et al. | 340/572.4 |
| 2008/0211673 A1 * | 9/2008 | Himberger et al. | 340/572.1 |

FOREIGN PATENT DOCUMENTS

| | | |
|---|---|---|
| JP | 10-111835 | 4/1998 |
| JP | 10-162085 | 6/1998 |
| JP | 2001-243430 | 9/2001 |
| JP | 2002-126332 | 5/2002 |
| JP | 2002-183682 | 6/2002 |
| JP | 2002-319001 | 10/2002 |
| JP | 2004-192645 | 7/2004 |
| JP | 2004-318478 | 11/2004 |
| JP | 2004-318645 | 11/2004 |

OTHER PUBLICATIONS

Weis, Stephen August "Security and Privacy in Radio-Frequency Identification Devices", Masters Thesis, MIT, pp. 1-79 [Retrieved on Dec. 28, 2004], Retrieved from the Internet: <URL: http://theory.lcs.mit.edu/-sweis/masters.pdf>, May 2003.

Welcome to EPCglobal Inc™, http://www.epcglobalinc.org.

Weis, Stephen A., Security and Privacy Aspects of Low-Cost Radio Frequency Identification Systems, LNCS 2802, pp. 201-212, 2004.

Sarma, Sanjay E., "CryptoBytes" RSA Laboratories, vol. 6, No. 1, Spring 2003.

Juels, Ari: "The Blocker Tag: Selective Blocking of RFID Tags for Consumer Privacy" CCS'03, Oct. 27-30, 2003.

Miyako Ohkubo, et al., "Cryptographic Approach to "Privacy-Friendly" Tags", NTT Laboratories, Nippon Telegraph and Telephone Corporation, Nov. 2003, 9 pages.

* cited by examiner

| | $\gamma_k$ |
|---|---|
| $(e_{1,0}, e_{2,0})$ | |
| $(b_{1,2,0}, b_{2,2,0})$ | $\gamma_5$ |

911a  911b

B

| | $id_n$ | $data_n$ | $\gamma_k$ |
|---|---|---|---|
| $(f_{1,0}, f_{2,0})$ | | | |
| $(b_{1,1,0}, b_{2,1,0})$ | $id_1$ | $data_1$ | $\gamma_1$ |
| $(b_{1,1,0}, b_{2,2,0})$ | $id_2$ | $data_2$ | $\gamma_2$ |
| $(b_{1,1,0}, b_{2,3,0})$ | $id_3$ | $data_3$ | $\gamma_3$ |
| $(b_{1,2,0}, b_{2,1,0})$ | $id_4$ | $data_4$ | $\gamma_4$ |
| $(b_{1,2,0}, b_{2,2,0})$ | $id_5$ | $data_5$ | $\gamma_5$ |
| $(b_{1,2,0}, b_{2,3,0})$ | $id_6$ | $data_6$ | $\gamma_6$ |
| $(b_{1,3,0}, b_{2,1,0})$ | $id_7$ | $data_7$ | $\gamma_7$ |
| $(b_{1,3,0}, b_{2,2,0})$ | $id_8$ | $data_8$ | $\gamma_8$ |
| $(b_{1,3,0}, b_{2,3,0})$ | $id_9$ | $data_9$ | $\gamma_9$ |

931aa  931ab  931ac  931ad $f_{1,0} \in \{b_{1,1,0}, b_{1,2,0}, b_{1,3,0}\}$
$f_{2,0} \in \{b_{2,1,0}, b_{2,2,0}, b_{2,3,0}\}$

INITIAL VALUE OF $x_u=1$
($u \in \{1,...,d\}$), $u'=1, u''=1$
UPON END, x VALUE
MAINTAINED

FIG.52

| HEADER (h) | ... | VERSION CODE (vc) | MANUFACTURER CODE (mc) | PRODUCTS CODE (pc) | SERIAL CODE (sc) |
|---|---|---|---|---|---|
| 3201 | | 3202 | 3203 | 3204 | 3205 |

3200

US 7,661,132 B2

TAG PRIVACY PROTECTION METHOD, TAG DEVICE, BACKEND APPARATUS, UPDATER, UPDATE SOLICITOR AND RECORD MEDIUM CARRYING SUCH PROGRAMS IN STORAGE

TECHNICAL FIELD

The present invention relates to a tag technology incorporating information security technology, in particular, to a method of protecting tag privacy against acquisition of a user privacy information from information delivered from a tag device, a tag device, a backend apparatus, an updater, an update solicitor, programs therefor and a record medium carrying such programs in storage.

BACKGROUND ART

Recently an automatic tag identification system such as RFID (Radio Frequency Identification) is increasingly introduced. The system comprises an information record medium of a small size referred to as "tag device", a reading machine referred to as "reader" and a database server referred to as "backend apparatus", and is utilized in controlling the distribution of articles. A summary of this technology will be given below.

[Processing by Tag Device]

In a basic automatic tag identification system, each tag device has a tag ID information which is inherent thereto (for example, a tag ID as prescribed by Auto-ID center of MIT comprises a manufacturer code, a goods code indicating the variety of goods and a serial number indicating the number of a particular one of goods) in storage therein. The tag device is applied to articles or the like, and the tag ID information which is inherent to each tag device is transmitted by radio communication to a reader installed in a store or the like.

[Processing by Reader]

A reader reads tag ID information from a tag device through radio communication, and sends the tag ID information to a backend apparatus to solicit an acquisition of products distribution information.

[Processing by Backend Apparatus]

A backend apparatus controls a database for ID's from each tag device and for products distribution information or the like. And the backend apparatus retrieves products distribution information or the like in the database using tag ID information transmitted from the reader as a key and transmits a result of retrieval to the reader.

[Issues in basic automatic tag identification system]

However, in the basic automatic tag identification system, anyone who is in possession of a reader can read tag ID information, and accordingly, there has been a risk that information of articles under control may leak through eavesdropped tag ID information.

As regards this, non-patent literature 2 (Stephen A. Weis, Sanjay E. Sarma, Ronald L. Rivest, Daniel W. Engels, "Security and Privacy Aspects of Low-Cost Radio Frequency Identification Systems," First International Conference on Security in Pervasive Computing.) discloses a method in which a tag device delivers a hash value to a reader.

According to this method, the tag device initially transmits a hash value H(id |r) for a bit combination of ID information id and a random number r to the reader, which sends them to the backend apparatus. The backend apparatus forms a bit combination of the received random number r and each id' stored in the database, and determines its hash value H(id' |r). Then it verifies whether or not the determined hash value H(id' |r) matches with the received hash value H(id |r), and transmits products distribution information or the like which corresponds to the matched id' to the reader. In this manner, a leakage of the tag ID information to a third party can be prevented. It is to be noted that H(*) means a processing which applies a hash function H to *.

In a method disclosed in Japanese Patent Applications No. 2003-111342 and No. 2003-113798 which are not yet made open, a privileged ID which makes tag ID information confidential is employed to prevent a leakage of tag ID information to a third party. Specifically, in these techniques, a privileged ID is stored in a tag device, and a client apparatus which has read the privileged ID solicits a security server apparatus on a network to decrypt the privileged ID. In response to the solicitation, the security server apparatus responds with a plain text tag ID information which is a decrypted result for the privileged ID after it has confirmed that the client is a regular client apparatus. In this manner, a leakage of tag ID information to a third party can be prevented.

non-patent literature 1: EPC global, Inc., "EPC global", [online], [retrieved Sep. 9, 2004]

non-patent literature 2: Stephen A. Weis, Sanjay E. Sarma, Ronald L. Rivest, Daniel W. Engels, Security and Privacy Aspects of Low-Cost Radio Frequency Identification Systems, First International Conference on Security in Pervasive Computing.

DISCLOSURE OF THE INVENTION

Issues to be Solved by the Invention

However, with a conventional method, it is possible that a distribution process may be traced utilizing information which is delivered from a tag device.

Specifically, with the method disclosed in non-patent literature 2, for example, a hash value H(id|r) which is transmitted from a tag device to a reader is simply a random number to a third party who does not know id. A random number r is generated each time a communication occurs between the tag device and the reader, and accordingly, the hash value H(id|r) changes from communication to communication. Accordingly, an attacker normally cannot gain a knowledge of an association between the hash value H(id|r) which is eavesdropped from the tag device and a hash value H(id|$r_i$) in a history of past communications. However, if an attacker could acquire ID information id as by tampering with the tag device, he could then calculate a hash value H(id|$r_i$) from the random number $r_i$ in the history of past communications (if he knows a hash function H). By verifying whether or not the calculated value coincides with the hash value (corresponding to the random number $r_i$) in the history of past communications, the attacker can know whether or not the history of the communications is one which corresponds to the acquired ID, and thus can trace a distribution process of the tag device by collecting the history of communications corresponding to this ID.

Also in the method disclosed in Japanese Patent Application No. 2003-111342 or the like, for example, because the radio tag device always returns a same privileged ID, the attacker can trace the distribution process of the tag device by tracing the privileged ID if he cannot decrypt ID in plain text.

The present invention has been made in view of such aspect, and has for its object the provision of a technology which is capable of preventing a tracing of the distribution process of tag device by a third party.

Means To Solve Issues

To overcome above issues, a tag device is arranged to have privileged information for tag ID information in storage, and it is updated by overwriting at a given opportunity. This makes it difficult for an attacker to realize an association between information delivered in the past from a tag device and an updated privileged information, leading to a difficulty to trace the distribution process of the tag device.

By way of example, according to a first invention, a confidential value which corresponds to respective tag ID information is stored in a confidential value memory of respective tag devices. In response to an access from a reader, an output section of the tag device delivers a tag output information which corresponds to the confidential value in the confidential value memory. The tag device includes a first calculator, which reads out at least part of elements of the confidential value in the confidential value memory, and which applies a first function, the inverse image of which is difficult to obtain, and the confidential value in the confidential value memory is updated by overwriting with a result of such calculation. Since the confidential value in the confidential value memory is updated by overwriting, if an attacker acquires a confidential value stored in the confidential value memory as by tampering, the updated confidential value does not correspond to information which is transmitted from the tag device before the update. Since the update is achieved by applying the first function F1, the inverse image of which is difficult to obtain, it is difficult to obtain the confidential value before the update from a confidential value which prevails at a certain point in time. Accordingly, the attacker cannot know a correspondence between the tag device and the history of communications, According to a second invention, for example, in an updater which is provided externally of a tag device, privileged ID information stored in the tag device is updated at a given opportunity into a new privileged ID information, an association of which with the original privileged ID information is difficult to follow. When the privileged ID information is updated in this manner, an attacker cannot know a correspondence between a privileged ID information which is delivered from the tag device to backend apparatus before the update and new privileged ID information after the update. Accordingly, the attacker cannot know the correspondence between the tag device and the history of communications.

EFFECTS OF THE INVENTION

As mentioned above, according to the present invention, a third party cannot know the correspondence between a tag device and a history of communications, and accordingly, a tracing of a distribution process of the tag device by a third party can be prevented.

BRIEF DESCRIPTION OF THE DRAWINGS

[FIG. 20] A is an illustration of data stored in the confidential value memory of a tag device, and B is an illustration of data stored in a database memory of a backend apparatus;

[FIG. 52] is an illustration of a format used in the embodiment 24;

Figure 1:
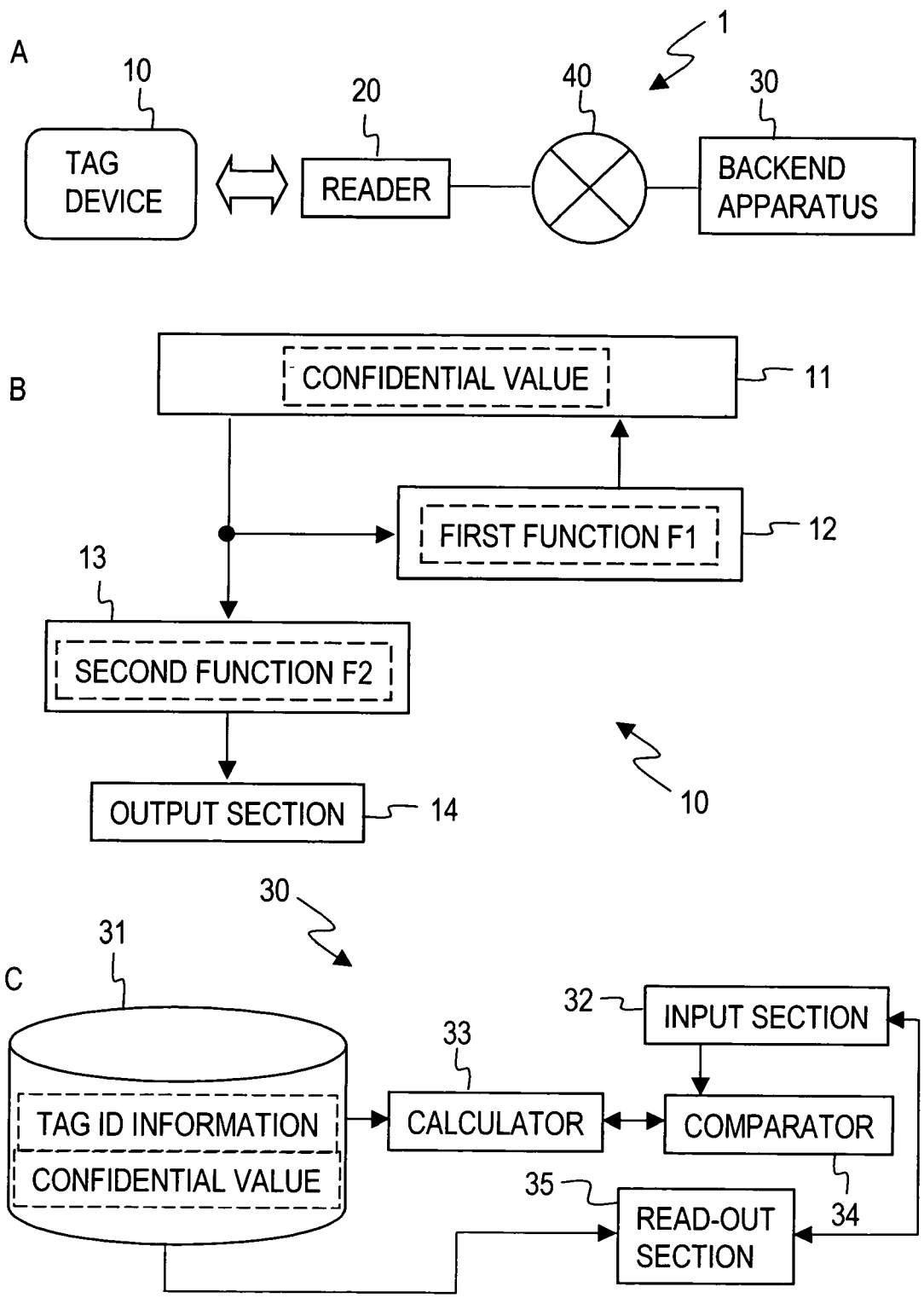
[FIG. 1] A is a block diagram illustrating an entire automatic tag identification system according to a first mode of carrying out the invention; B and C are block diagrams illustrating schematic arrangements of a tag device and a backend apparatus, respectively.

DESCRIPTION OF CHARACTERS 1 automatic tag identification system
10 tag device
11 confidential value memory
12 first calculator
13 second calculator
14 output section
20 reader
30 backend apparatus
31 database memory
32 input section
33 calculator
34 comparator
35 read-out section
40 network
1500 updater system
1510 tag device
1511 confidential value memory
1512 read/write section
1513 output section
1514 input section
1560 security server apparatus
1561 input section
1562 updater
1563 output section

BEST MODES FOR CARRYING OUT THE INVENTION

Several modes for carrying out the present invention will be described below with reference to the drawings.

[First Mode]

<Arrangement>

FIG. 1A is a block diagram illustrating an entire automatic tag identification system 1 according to a first mode. B and C are block diagrams illustrating schematic arrangements of a tag device 10 and a backend apparatus 30, respectively.

As illustrated in FIG. 1A, an automatic tag identification system 1 of the present mode comprises a tag device 10, a reader 20, and a backend apparatus 30 which is connected to the reader 20 through a network 40.

As illustrated in FIG. 1B, the tag device 10 of the present mode comprises a confidential value memory 11 in which a confidential value corresponding to each tag ID information is stored, a first calculator 12 for applying a first function F1, the inverse image of which is difficult to obtain, a second calculator 13 for applying a second function F2 which disturbs a relationship between elements of a domain of definition and its mapping and an output section 14 for delivering tag output information which corresponds to a confidential value in the confidential value memory 11 to the backend apparatus 30.

As illustrated in FIG. 1C, the backend apparatus 30 of the present mode comprises a database memory 31 containing respective tag ID information and corresponding confidential values in a manner relating to each other, an input section 32 for accepting an input of tag output information, a calculator 33 for applying the first function F1 and the second function F2, a comparator 34 for comparing a result of calculation in the calculator 33 against the tag output information, and a read-out section 35 for extracting information from the database memory 31.

<Processing by the Tag Device 10>

When the tag device 10 receives a read-out demand from the reader 20, the second calculator 13 of the tag device 10 initially reads out a confidential value from of the confidential value memory 11, and generates the tag output information which is obtained by applying the second function F2 thereto. This tag output information is delivered to the output section 14 where it is delivered (by either radio or wire communication) to the backend apparatus 30. Subsequently, the first calculator 12 reads out at least part of the elements of the confidential value from the confidential value memory 11, applies the first function F1 thereto, and updates the confidential value in the confidential value memory 11 by overwriting with a result of such calculation. While the confidential value in the confidential value memory 11 is updated by overwriting after the tag output information has been generated, an arrangement may be such that the tag output information is generated after the confidential value in the confidential value memory 11 is updated by the overwriting.

<Processing by the Reader 20>

The reader 20 accepts an input of the tag output information which is delivered from the tag device 10 to the backend apparatus 30, and transmits it to the backend apparatus 30 through the network 40.

<Processing by the Backend Apparatus 30>

The input section 32 of the backend apparatus 30 accepts an input of the tag output information which is transmitted from the reader 20. This triggers the calculator 33 to apply the first function F1 used in the tag device 10 some number of times to elements which represent at least part of the confidential value in the database memory 31 and also to apply the second function F2 used in the tag device 10. Result of calculation in the calculator 33 are successively compared against the tag output information in the comparator 34, and when a matching therebetween is found, the read-out section 35 extracts the tag ID information which is related to the confidential value which corresponds to the matched result of calculation from the database memory 31.

Embodiment 1

Figure 2:
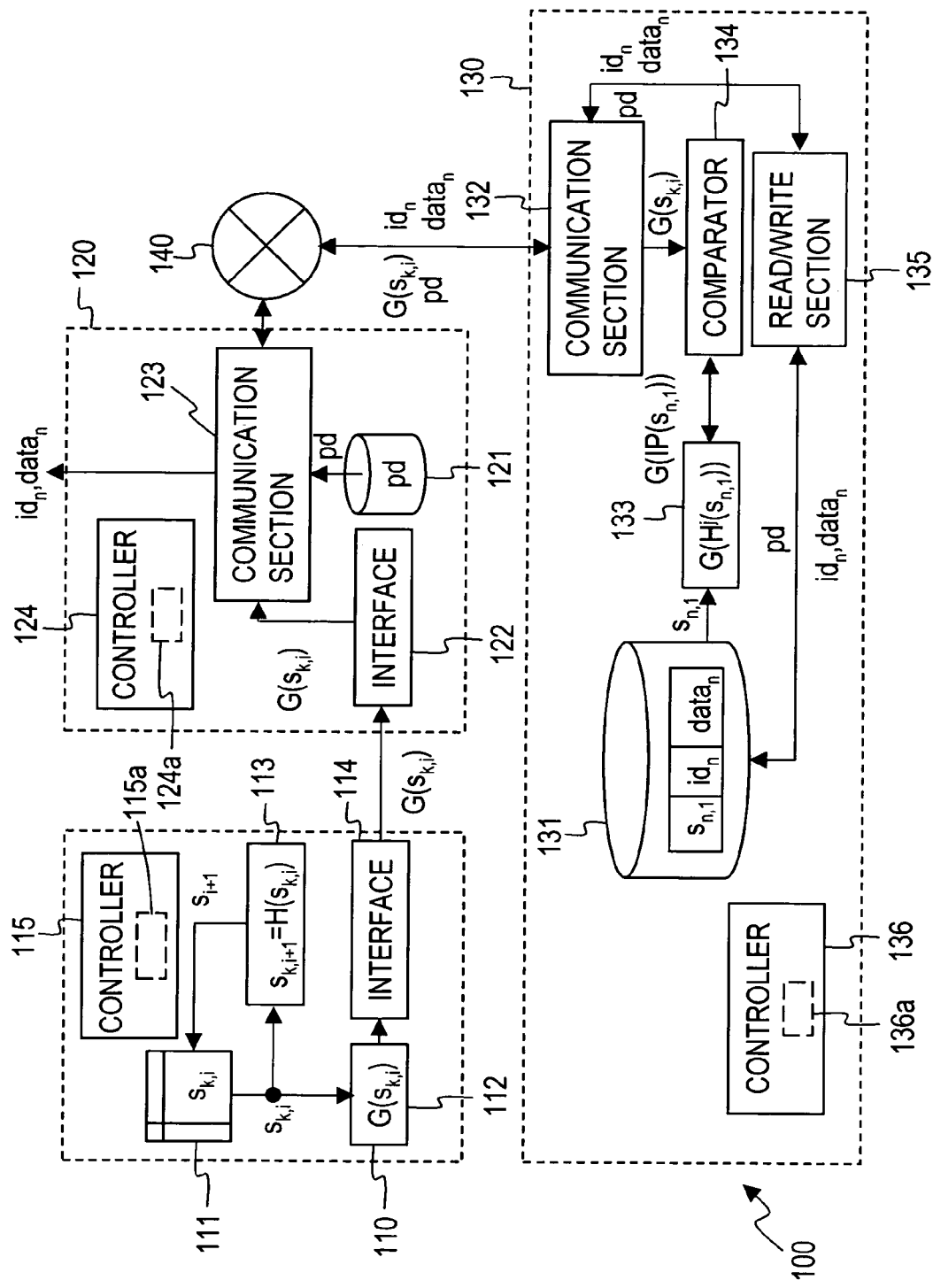
[FIG. 2] is an illustration of an overall arrangement of an automatic tag identification system of an embodiment 1.
Figure 3:
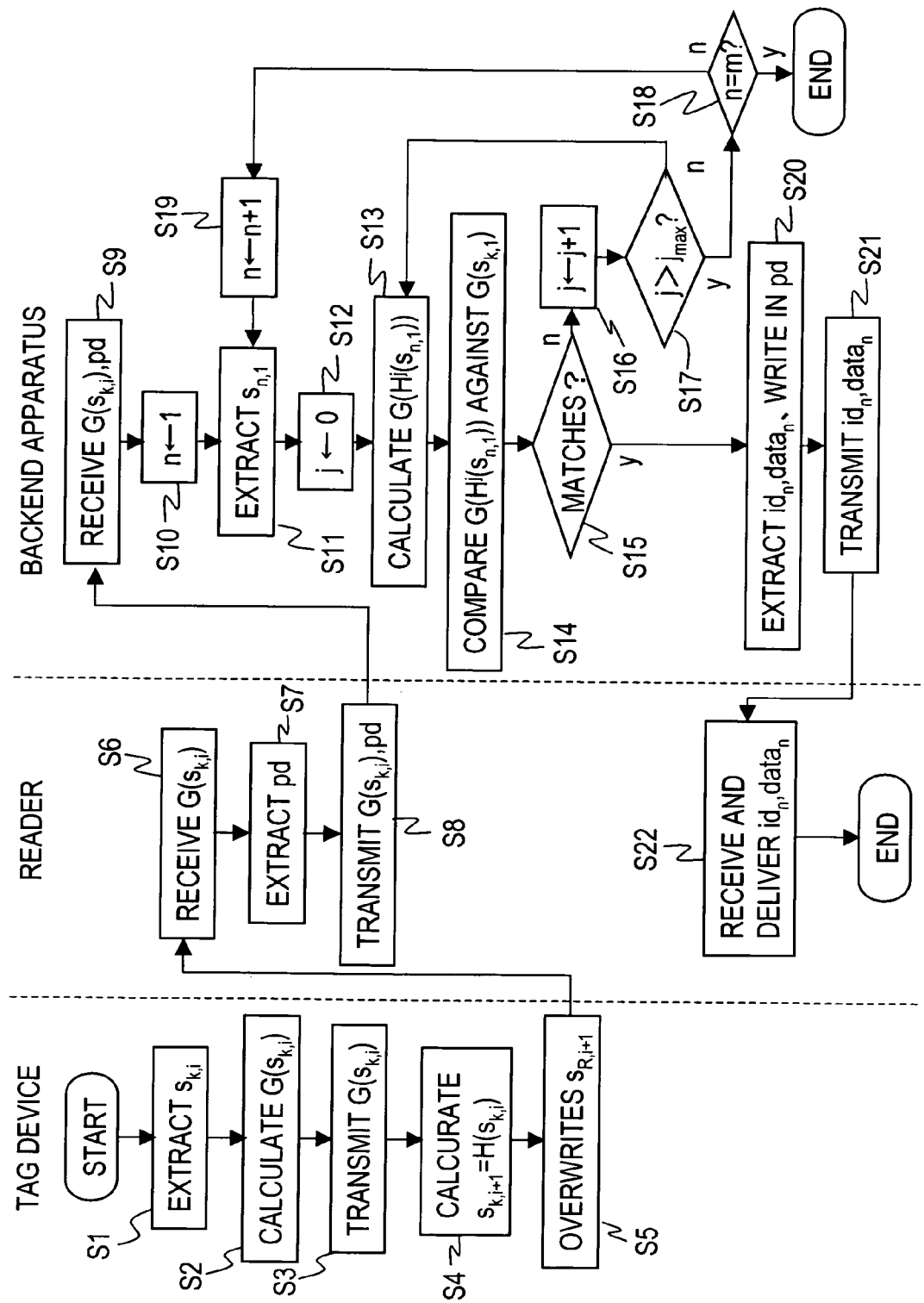
[FIG. 3] is a flow chart for describing processing in the embodiment 1.

FIG. 2 illustrates an overall arrangement of an automatic tag identification system 100 in an embodiment 1 according to the first mode, and FIG. 3 is a flow chart for describing processing in the embodiment 1.

Referring to these Figures, the functional arrangement and a method of processing in the embodiment 1 will be described below.

<Arrangement>

As illustrated in FIG. 2, the automatic tag identification system 100 of the embodiment 1 comprises a tag device 110, a reader 120 and a backend apparatus 130 which is connected to the reader 120 through a network 140 so as to be capable of communication therewith. While in FIG. 2, only one tag device 110 is shown for purpose for simplifying the description, it should be noted that more tag devices exist in actuality. In addition, while one reader 120 and one backend device 130 are shown in FIG. 2, more readers 120 and backend apparatus 130 may be used to construct the present system.

<Tag Device>

The tag 110 device in this example comprises a confidential value memory 111, a hash calculator 112 (equivalent to "second calculator"), a hash calculator 113 (equivalent to "first calculator"), an interface 114 (equivalent to "output section"), and a controller 115 including a memory 115a.

It is to be noted that the confidential value memory 111 and the memory 115a are memories capable of read/write operation such as EEPROM (Electronically Erasable and Programmable Read Only Memory), FeRAM (Ferroelectric Random Access Memory), a flash memory, NV (Nonvolatile) RAM or the like, for example.

The hash calculator 112 and the hash calculator 113 are integrated circuits constructed to apply one way functions or hash functions G, H: $\{0, 1\}^* \to \{0, 1\}^L$ to input values, for example, and to deliver results obtained. It is to be noted that $\{0, 1\}^*$ represents a set of all binary series and $\{0, 1\}^L$ represents a set of binary series having an L-bit length. Such hash functions G, H can be illustrated by SHA-1, MD5 or the like. It is to be noted that the hash function H is equivalent to "a first function F1, the inverse image of which is difficult to obtain", and the hash function G is equivalent to "a second function F2 which disturbs a relationship between elements of a domain of definition and its mapping". It is also to be noted that the controller 115 is an integrated circuit constructed so as to control processing of the entire tag device 110.

The interface 114 is a hardware which delivers data to the reader 120 by radio or wire communication, for example. Specifically, the interface 114 comprises an encoder/decoder circuit which performs an encoding/decoding using NRZ code, Manchester encoding, Miller code, single polarity RZ encoding or the like, a modulation/demodulation circuit which performs a modulation/demodulation by using the ASK (Amplitude Shift Keying), PSK (Phase Shift Keying), FSK (Frequency Shift Keying) or the like, and an antenna such as a dipole antenna, a microstrip antenna, a loop antenna or a cored coil to perform a transmission and reception of a signal using frequency in a low frequency band or ISM band (Industry Science Medical band). It is to be noted that the communication system utilizes the electromagnetic induction system or radio wave system.

The hash calculator 112 and the hash calculator 113 are electrically connected to the confidential value memory 111, and the hash calculator 112 is electrically connected to the interface 114 (equivalent to "output section"). While omitted from illustration in this Figure, the controller 115 is electrically connected to various portions of the tag device 110.

<Reader>

The reader 120 in this example comprises a products distribution information memory 121, an interface 122, a communication section 123, a memory 124a, and a controller 124.

The products distribution information memory 121 comprises a magnetic recorder such as a hard disc unit, flexible disc, or the like, an optical disc unit such as DVD-RAM (Random Access Memory), CD-R (Recordable)/RW (Re-Writable) or the like, a magneto-optical recorder such as MO (Magneto-Optical disc), a semiconductor memory such as EEP-ROM (Electronically Erasable and Programmable-Read Only Memory), a flash memory or the like, for example. The interface 122 is a hardware which is similar to the example of the interface 114, for example. The communication section 123 comprises a LAN card, modem, a terminal adapter or the like, for example, and the controller 124 comprises CPU (Central Processing Unit) of CISC (Complex Instruction Set Computer) type, RICS (Reduced Instruction Set Computer) type or the like and including the memory 124a.

The interface 122 and the products distribution information memory 121 are electrically connected to the communication section 123, and while omitted from illustration in this Figure, the controller 124 is electrically connected to various portions of the reader 120.

<Backend Apparatus>

The backend apparatus 130 in this example comprises a database memory 131, a communication section 132 (equivalent to "input section"), a hash calculator 133 (equivalent to "third calculator"), a comparator 134, a read/write section 135 (equivalent to "read-out section"), a memory 136a and a controller 136. Specifically, the backend apparatus 130 is constructed by the execution of a given program by a known computer of Neumann type including CPU, RAM, ROM (Read Only Memory), an external memory such as a magnetic recorder, an optical disc unit or the like, a LAN card, a modem, a terminal adapter or the like, which are connected together by buses. The CPU reads out a program stored in the RAM and executes a processing operation in accordance therewith to implement processing functions which are indicated below.

<Pre-Processing>

A given program is installed into the backend apparatus 130 so that the hash calculator 133 of the backend apparatus 130 can use the same hash functions G and H as contained in the tag device 110.

A confidential value $s_{k,\,1}$ (equivalent to "first confidential value") which corresponds to each tag ID information $id_k$ ($k \in \{1, \ldots, m\}$ where k corresponds to each tag device and m a total number of tag devices) is stored, one each, in the confidential value memory 111 of each tag device 110. The confidential value $s_{k,\,1}$ is a pseudo-random number $s_{k,\,1} \in \{0, 1\}^L$ which is generated by a random number generator (not shown) which is provided externally of the tag device 110, for example, in accordance with pseudo-random number generating algorithm which is based on a computer theory which uses a one-way hash function such as SHA-1 or the like. It is assumed that the random numbers $s_{k,\,1}$ which are stored in different tag devices are mutually non-coincident. A confidential value $s_{n,\,1}$ (equivalent to "second confidential value", $n \in \{1, \ldots, m\}$ and n corresponds to k) corresponding to each tag device n, tag ID information $id_n$ and data such as products distribution information $data_n$ are stored in the database memory 131 of the backend apparatus 130 in a manner relating to each other.

<Processing by Tag Device>

Processings which occur when the tag device 110 is read by the reader 120 at an i-th run (where i is a natural number) will be described below. It is to be noted that the processing by the tag device 110 takes place under the control of the controller 115, and data which is necessary for the control is sequentially read and written from or into the memory 115a.

Initially, in the hash calculator 112, a confidential value $s_{k,\,i}$ (equivalent to "first confidential value") is read from the confidential value memory 111 (step S1), and its hash value or tag output information $G(s_{k,\,i})$ is generated (step S2). This tag output information $G(s_{k,\,i})$ is sent to the interface 114 where it is transmitted to the reader 120 by either radio or wire communication (step S3).

Next, in the hash calculator 113, a hash value $s_{k,\,i+1} = H(s_{k,\,i})$ of the confidential value $s_{k,\,i}$ which is read from the confidential value memory 111 is calculated (step S4), and the hash value $s_{k,\,i+1}$ is saved in the confidential value memory 111 by overwriting as a new confidential value $s_{k,\,i+1}$ (equivalent to "new first confidential value"). (The confidential value $s_{k,\,i}$ in the confidential value memory 111 is erased, and instead the confidential value $s_{k,\,i+1}$ is stored: step S5.) It is to be understood that $H(*)$ implies a processing operation which applies the hash function H to $*$.

<Processing by the Reader>

The processing by the reader 120 takes place under the control of the controller 124, and data which is necessary for the control is sequentially read from or written into the memory 124a.

Initially, the interface 122 of the reader 120 receives tag output information $G(s_{k,\,i})$ transmitted from the tag device 110 (step S6), and sends it to the communication section 123. The communication section 123 extracts products distribution information pd (such as a store code where the reader 120 is installed, for example) from the products distribution information memory 121 (step S7), and transmits the products distribution information pd together with the tag output information $G(s_{k,\,i})$ to the backend apparatus 130 through the network 140 (step S8).

<Processing by the Backend Apparatus>

Processing by the backend apparatus 130 takes place under the control of the controller 136, and data which is necessary for the control is sequentially read and written from and into the memory 136a.

Initially, the communication section 132 of the backend apparatus 130 receives the products distribution information pd and tag output information $G(s_{k,\,i})$ transmitted by the reader 120 (accepts inputs: step S9). The received products distribution information pd and tag output information $G(s_{k,\,i})$ are stored in the memory 136a. Next, the controller 136 enters 1 for n, which is then stored in the memory 136a (step S10). The controller 136 then causes the hash calculator 133 to extract a confidential value $s_{n,\,1}$ from the database memory 131 while referring to n value in the memory 136a (step S11). The controller 136 then enters 0 for j, which is then stored in the memory 136a (step S12). The controller 136 then refers to j value in the memory 136a and causes the hash calculator 133 to calculate a hash value $G(H^j(s_{n,\,1}))$ (equivalent to "result of calculation in the third calculator") (step S13). It is to be noted that $H^j(s_{n,\,1})$ implies applying the hash function H to the confidential value $s_{n,\,1}$ j times. $H^0(s_{n,\,1})$ implies $s_{n,\,1}$.

Subsequently, in the comparator 134, the hash value $G(H^j(s_{n,\,1}))$ is acquired from the hash calculator 133 and the tag output information $G(s_{k,\,i})$ is acquired from the memory 136a, and the comparator 134 compare them against each other (step S14).

When these values do not match (step S15), the controller 136 enters j+1 for j in the memory 136a (step S16), and determines whether or not j has exceeded a given maximum value $j_{max}$ (step S17). When j is equal to or less than the maximum value $j_{max}$, the controller 136 causes the processings which start with the step S13 to be executed again, and when j exceeds the maximum value $j_{max}$, it determines whether or not n in the memory 136a is equal to m (step S18). If n=m does not apply, the controller 136 causes n+1 to be stored for n in the memory 136a (step S19), and causes the processings which start with step S11 to be executed again, and terminate the processings if n=m. It is to be noted that such processing is equivalent to executing the processings in the hash calculator 133 and the comparator 134 again by changing the value of at least one of n and j under the control of the controller 136 when the tag output information $G(s_{k,\,i})$—and the hash value $G(H^j(s_{n,\,1}))$ do not match.

On the other hand, in the event the tag output information $G(s_{k,\,i})$ and the hash value $G(H^j(s_{n,\,1}))$ match (step S15), the controller 136 sends the confidential value $s_{n,\,1}$ corresponding to the matched hash value $G(H^j(s_{n,\,1}))$ to the read/write section 135, which then extracts tag ID information $id_n$ and data such as products distribution information $data_n$ which are related to the confidential value $s_{n,\,1}$ corresponding to the matched hash value $G(H^j(s_{n,\,1}))$ from the database memory 131 and sends them to the communication section 132 (step S20). The read/write section 135 receives the products distribution information pd from the memory 136a and writes it into the database memory 131 in a manner relating to the confidential value $s_{n,\,1}$ (step S20).

The tag ID information $id_n$ and the data $data_n$ sent to the communication section 132 are transmitted to the reader 120 through the network 140 (step S21), and are received by the communication section 123 of the reader 120 to be delivered (step S22).

<Features of Embodiment 1>

[Impossibility of Tracing]

In the embodiment 1 of the present mode, the hash value $G(s_{k,\,i})$ is used in the communication as a tag output information. On account of the incapability of recognizing a hash value, this hash value $G(s_{k,\,i})$ appears to be a random number simply for an attacker who does not know a confidential value. Accordingly, this attacker cannot know whether or not $G(s_{k,\,i})$ and $G(s_{k,\,i+1})$ are delivered from the same tag device 110, and therefore, cannot trace the distribution process of the tag device 110.

[Forward Security]

In the embodiment 1 of the present mode, the confidential value in the confidential value memory 111 which is used in the communication is arranged to be updated in accordance with a hash function H. If the tag device 110 is subjected to a tampering to leak the confidential value $s_{k,\,i}$, the attacker cannot determine the past confidential value $s_{k,\,i-\Delta i}$ from the confidential value $s_{k,\,i}$ because of the one-way nature of the hash function. Accordingly, if the confidential value $s_{k,\,i}$ leaks, the attacker cannot find a correspondence between the acquired confidential value $s_{k,\,i}$ and the history of communications, and hence cannot trace the tag device 110.

[Traceability]

On the other hand, on account of the difficulty of collisions between the hash functions G and H (the property that hash values for different values hardly assume a same value), the backend apparatus 130 which knows the confidential value $s_{n,\,1}$ can trace the distribution process of the tag device 110.

[Efficiency]

Because only the calculation of hash functions constructs communication data, the scale of a circuit which is incorporated in the tag device 110 is small as compared with a conventional method of generating random numbers, and thus lends itself to an application for which a low price is demanded.

The hash value $H^j(s_{n,\,1})$ which is calculated at step S13 in the backend apparatus 130 may be recorded in the memory 136 to be utilized at a step S13 of the next loop. Specifically, using the recorded $H^j(s_{n,\,1})$, a hash value $H^{j+1}(s_{n,\,1})$ maybe determined by $H(H^j(s_{n,\,1}))$, and this value may be stored in the memory 136a. In this instance, the number of times the hash calculation is made in the hash calculator 133 can be reduced, allowing the calculation efficiency of the backend apparatus 130 to be improved.

Embodiment 2

An embodiment 2 is a modification of the embodiment 1, and differs from the embodiment 1 only in respect of the fact that the tag device additionally carries tag ID information $id_k$ (equivalent to "first proper value $w_k$") to update the confidential value $s_{k,\,i}$ according to $s_{k,\,i+1}=H(s_{k,\,i}|id_k)$. In the description to follow, only distinctions over the embodiment 1 will be described.

Figure 4:
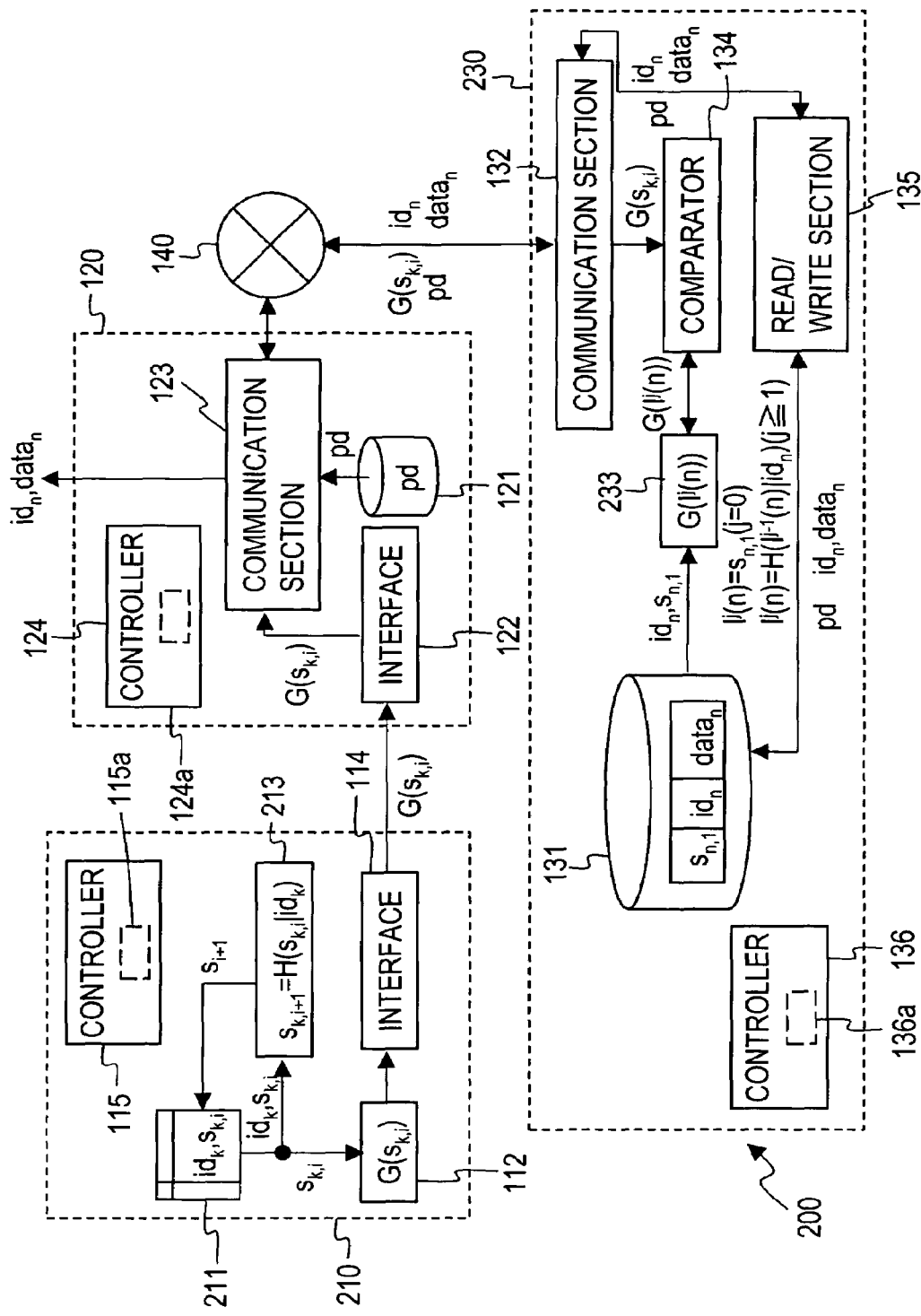
[FIG. 4] is an illustration of an overall arrangement of an automatic tag identification system according to an embodiment 2.

FIG. 4 illustrates an overall arrangement of an automatic tag identification system 200 according to the embodiment 2. It is to be noted that in this Figure, parts which are common with the embodiment 1 are designated by common characters as used in the embodiment 1. Referring to this Figure, the functional arrangement and a processing method of the embodiment 2 will be described below.

<Pre-Processing>

A distinction over the embodiment 1 lies in the fact that tag ID information $id_k$ and a corresponding confidential value $s_{k,\,i}$ are stored in a confidential value memory 211 of a tag device 210. A backend apparatus 130 includes a database memory 131 in which a confidential value $s_{n,\,1}$, tag ID information $id_n$ and data such as products distribution information data$_n$ which correspond to each tag device n are stored in a manner relating them to each other, and this tag ID information $id_n$ is equivalent to "second proper value $w_n$".

<Processing by Tag Device>

A difference with respect to the embodiment 1 lies only in the processing at step S4. Specifically, in place of the processing at the step S4 in the embodiment 1, a hash calculator 213 (equivalent to "first calculator") extracts a confidential value $s_{k,\,i}$ and tag ID information $id_k$ from a confidential value memory 211 to calculate $s_{k,\,i+1}=H(s_{k,\,i}|id_k)$. It is to be noted that $\alpha|\beta$ implies a bit combination of $\alpha$ and $\beta$. This result of calculation is overwritten into the confidential value memory 211 as a confidential value $s_{k,\,i+1}$.

<Processing by Reader>

This remains to be the same as in the embodiment 1.

<Processing by Backend Apparatus>

A difference with respect to the embodiment 1 lies only in the processings at steps S11, S13, and S14. Specifically, in the embodiment 2, in place of step S11, a hash calculator 233 (equivalent to "third calculator") of a backend apparatus 230 extracts a confidential value $s_{n,\,1}$ and corresponding tag ID information $id_n$ from the database memory 131.

Then, in the similar manner as in the embodiment 1, the controller 136 enters 0 for j, and stores it in the memory 136a (step S12). Subsequently, in place of step S13, the hash calculator 233 calculates a hash value $G(V(n))$. Here, a definition is made that $V(n)=s_{n,\,1}$ (j=0), $V(n)=H(V^{j-1}(n)|id_n)$ (j≧1). Thus the hash calculator 233 determines $V(n)$ recurrently from the confidential value $s_{n,\,1}$ and the corresponding tag ID information $id_n$, and calculates its hash value $G(V(n))$. This recurrent calculation is implemented by temporarily storing each $V(n)$ (j'∈{1, . . . , j−1}) appearing in the calculation process in the memory 136a to be used in the calculation of next $V^{j'+1}(n)$. $V(n)$ which is obtained when calculating the hash value $G(V(n))$ may be saved in the memory 136a at least until the next hash value $G(V^{j+1}(n))$ is calculated. In this manner, $V(n)$ which is once obtained can be utilized in the calculation of $V^{j+1}(n)=H(V(n)|id_n)$ which is used in determining the next hash value $G(V^{j+1}(n))$, allowing an improved efficiency of calculation.

Subsequently, in place of step S14, a comparator 134 acquires the hash value $G(V(n))$ from the hash calculator 233 and tag output information $G(s_{k,\,i})$ from the memory 136a and compare them against each other. Subsequently, the processings at step S15 and subsequent steps are executed in the similar manner as in the embodiment 1.

As described above, in the embodiment 2, the confidential value $s_{k,\,i}$ in the confidential value memory 211 of the tag device 210 is updated by a calculation $s_{k,\,i+1}=H(s_{k,\,i}|id_k)$. In this manner, a situation that updated contents of confidential values which correspond to different tag ID information $id_k$ may become semi-permanently coincident can be prevented. Specifically, when the same hash function is applied to different confidential values or the like, it is possible that result of these calculations may become coincident at a certain point in time (collision). However, even in such instance, tag ID information $id_k$ which corresponds to each confidential value $s_{k,\,i}$ is different, and hence a next confidential value which is calculated according to $s_{k,\,i+1}=H(s_{k,\,i}|id_k)$ cannot be the same. This represents an effect that cannot be obtain when a confidential value is updated according to $s_{k,\,i+1}=H(s_{k,\,i})$.

While tag ID information $id_k$ and $id_n$ have been used as the first proper value $w_k$ and the second proper value $w_n$ in the embodiment 2, other information which corresponds to each tag ID information may be used as a proper value.

Embodiment 3

This represents a modification of the embodiment 1, and the difference with respect to the embodiment 1 exists only in recording a calculated value $G(H^j(s_{n,\,1}))$ (j=0, . . . , $j_{max}$) which is previously calculated in the backend apparatus. Only a distinction over the embodiment 1 will be described below.

Figure 5:
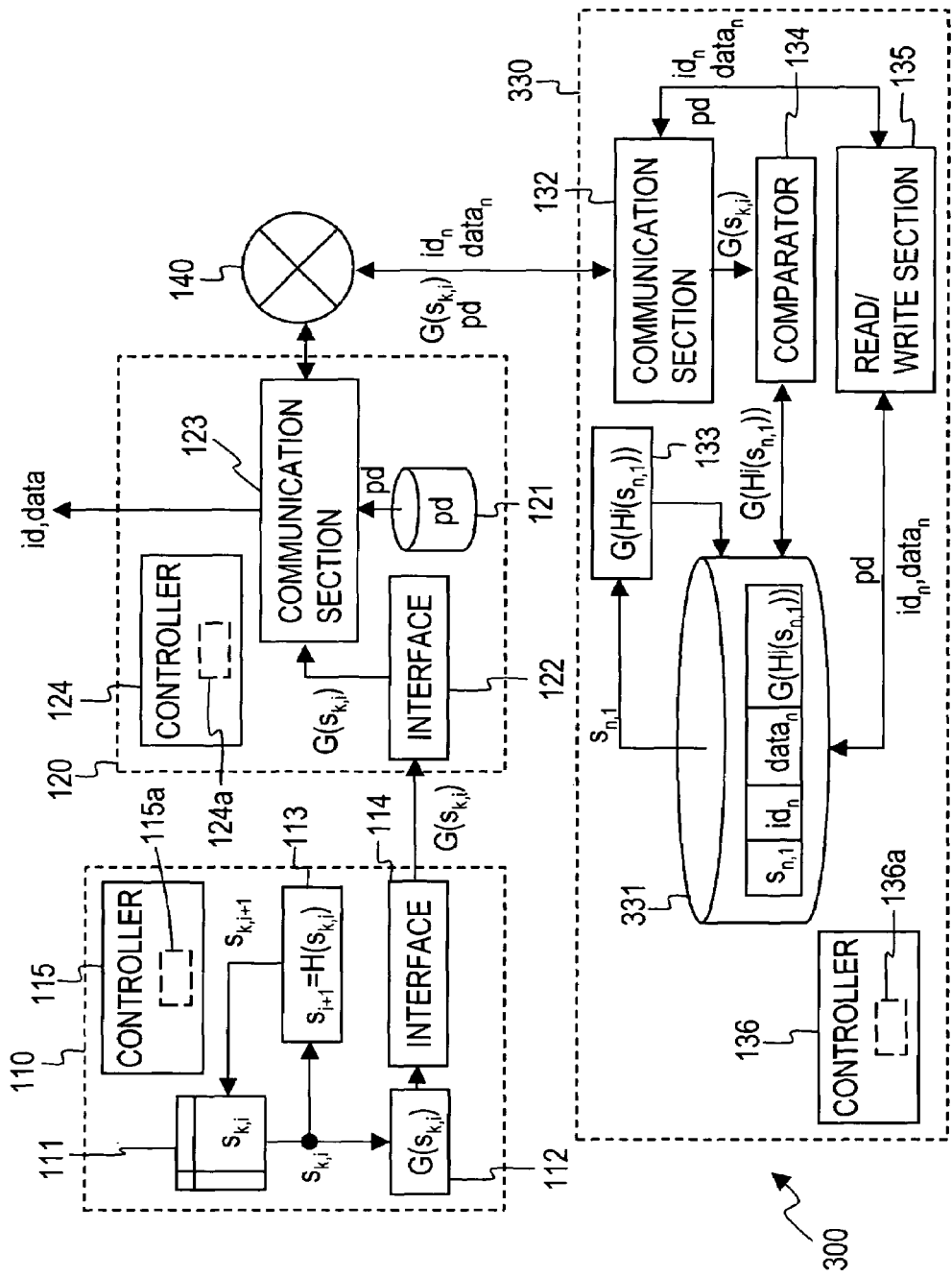
[FIG. 5] is an illustration of an overall arrangement of an automatic tag identification system according to an embodiment 3.
Figure 6:
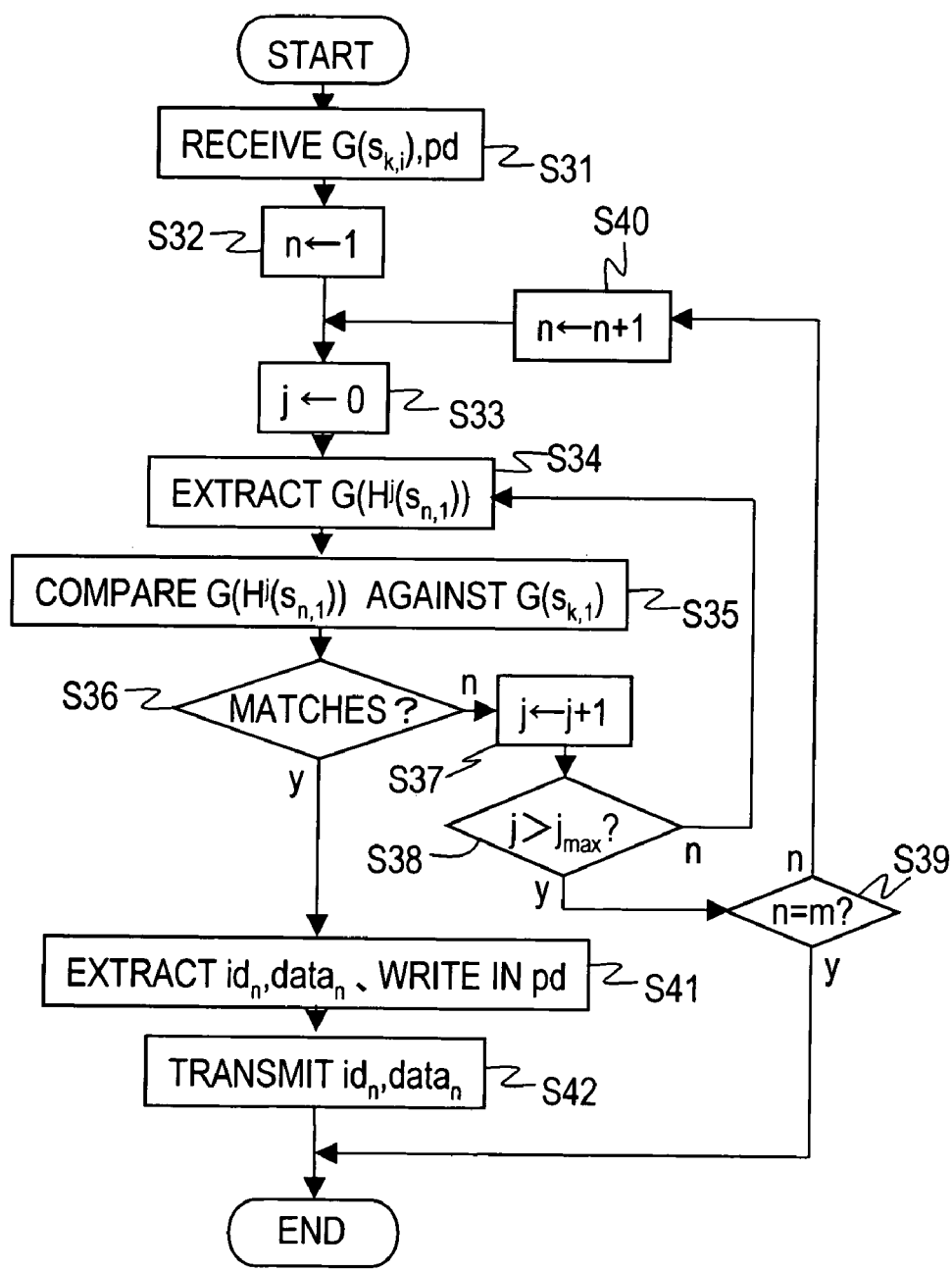
[FIG. 6] is a flow chart for describing processing by a backend apparatus of the embodiment 3.

FIG. 5 is an illustration of an overall arrangement of an automatic tag identification system 300 according to an embodiment 3. In this Figure, parts which are common to the embodiment 1 are designated by common characters as used in the embodiment 1. FIG. 6 is a flow chart for describing processings by a backend apparatus 330 in the embodiment 3.

A functional arrangement and the processing method of the embodiment 3 will be described below with reference to these Figures.

<Pre-Processing>

Storing a result of calculation $G(H^j(s_{n,1}))$ ($j=0, \ldots, j_{max}$) which is previously calculated by the hash calculator 133 in a database memory 331 of the backend apparatus 330 in a manner relating it to the confidential value $s_{n,1}$ represents a sole distinction with the respect to the first mode.

<Processing by Tag Device/Processing by Reader>

These remain to be similar to the embodiment 1.

<Processing by Backend Apparatus>

Initially, the backend apparatus 330 receives the products distribution information pd and tag output information $G(s_{k,i})$ transmitted from the reader 120 by means of a communication section 132 (step S31). The received products distribution information pd and tag output information $G(s_{k,i})$ are stored in a memory 136a. A controller 136 then enters 1 for n, and stores it in the memory 136a (step S32). The controller 136 then enters 0 for j, and stores it in the memory 136a (step S33). The controller 136 extracts a result of calculation $G(H^j(s_{n,1}))$ stored in a database memory 331 while referring to values of n and j in the memory 136a (step S34).

Then, a comparator 134 compares this result of calculation $G(H^j(s_{n,1}))$ against the tag output information $G(s_{k,i})$ which is extracted from the memory 136a (step S35).

In the event these values do not match (step S36), the controller 136 enters j+1 for j in the memory 136a (step S37) and determines whether or not j has exceeded the given maximum value $j_{max}$ (step S38). If j is less than the maximum value $j_{max}$, the controller 136 causes processings at step S34 and subsequent steps to be re-executed, and when j exceeds the maximum value $j_{max}$, it determines whether or not n in the memory 136a is equal to m (step S39). If n=m does not apply, the controller 136 stores n←n+1 (making n+1 to be a new n) in the memory 136a (step S40), causes processings at step 33 and subsequent steps to be re-executed, and terminates the processing operations for n=m. This operation is equivalent to re-executing the processings in the hash calculator 133 and the comparator 134 by changing the value of at least one of n and j under the control of the controller 136 when the tag output information $G(s_{k,i})$—and the hash value $G(H^j(s_{n,1}))$ do not match.

On the other hand, when the tag output information $G(s_{k,i})$ and the hash value $G(H^j(s_{n,1}))$ match (step S36), the controller sends the confidential value $s_{n,i}$ corresponding to the matched result of calculation $G(H^j(s_{n,1}))$ to the read/write section 135, which extracts the tag ID information $id_n$ and data $data_n$ such as the products distribution information or the like which are related to the confidential value $s_{n,1}$ which corresponds to the matched hash value $G(H^j(s_{n,1}))$ from the database memory 331 and sends them to the communication section 132 (step S40). The read/write section 135 receives the products distribution information pd from the memory 136a, and writes this products distribution information pd into the database memory 131 by relating it to the confidential value $s_{n,1}$ (step S40). The tag ID information $id_n$ and the data $data_n$ which are sent to the communication section 132 are transmitted to the reader 120 through the network 140 (step S41).

As described above, in the embodiment 3, an arrangement is made to store the result of calculation $G(H^j(s_{n,1}))$ which is previously calculated in the database memory 331. Consequently, the amount of a processing in the backend apparatus 330 can be reduced as compared with an arrangement in which $G(H^j(s_{n,1}))$ is calculated for each comparing processing.

Embodiment 4

An embodiment 4 is a modification of the embodiment 1, and differs from the embodiment 1 only in an arrangement that information specifying a number of times a confidential value is updated is transmitted from a tag device, and the number of times the confidential value is updated is used in a backend apparatus for purpose of processing. Only a distinction over the embodiment 1 will be described below.

Figure 7:
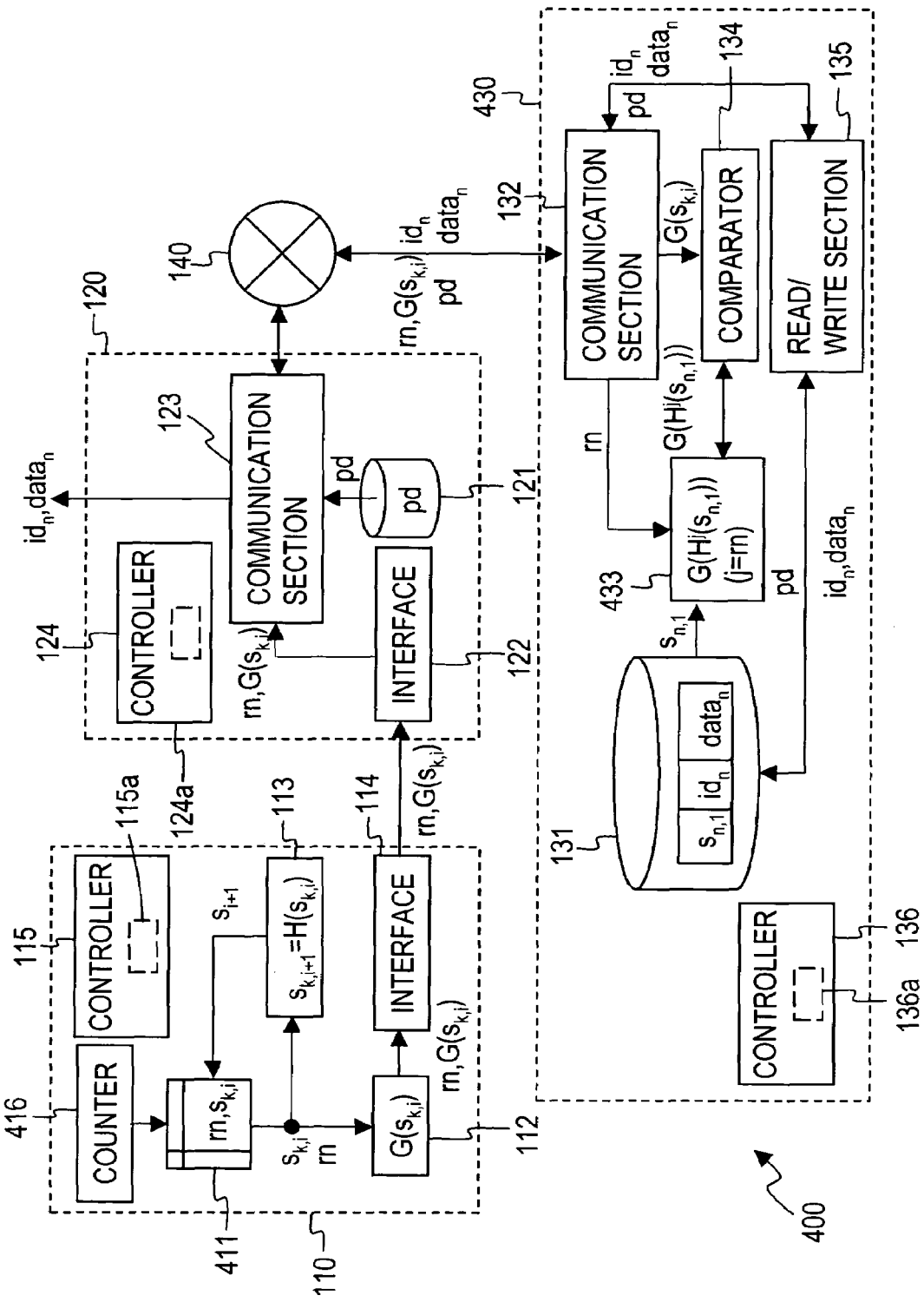
[FIG. 7] is an illustration of an overall arrangement of an automatic tag identification system according to an embodiment 4.
Figure 8:
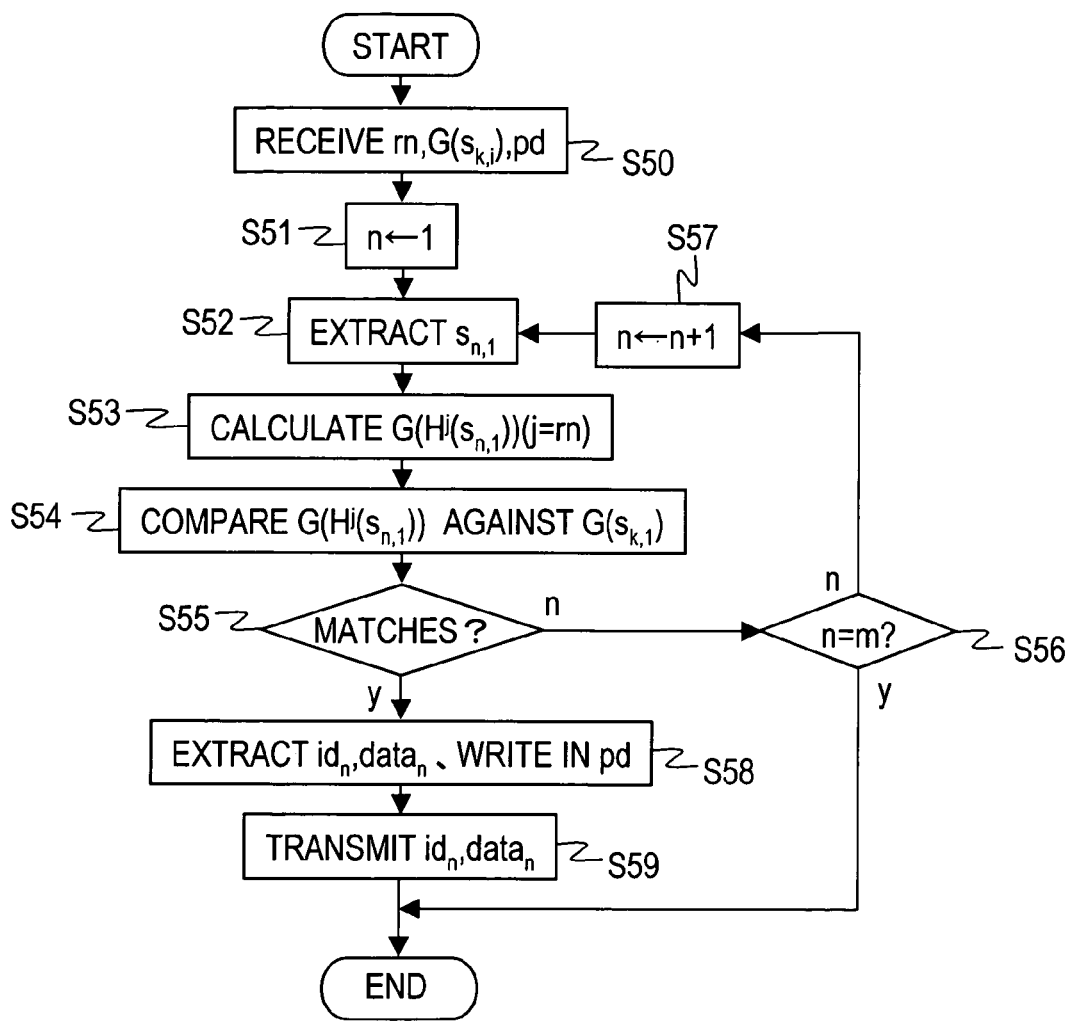
[FIG. 8] is a flow chart for describing processing by the backend apparatus of the embodiment 4.

FIG. 7 is an illustration of an overall arrangement of an automatic tag identification system 400 of the an embodiment 4. In this Figure, parts common to the embodiment 1 are designated by common characters as used in the embodiment 1. FIG. 8 is a flow chart for describing processing by a backend apparatus 430 of the embodiment 4. A functional arrangement and a processing method of the embodiment 4 will be described below with reference to these Figures.

<Arrangement of Tag Device>

A distinction over the embodiment 1 resides in a provision of a counter 416 in a tag device 410 which counts a number of times rn a confidential value is updated.

<Processing by Tag Device>

A distinction over the embodiment 1 resides in only an arrangement which stores a number of times rn a confidential value $s_{k,i}$ is updated as counted by a counter 416 in a confidential value memory 411 of a tag device 410 in addition to the confidential value $s_{k,i}$ and an arrangement by which information which specifies the number of times rn the update is performed is transmitted to the reader 120 through a hash calculator 112 and an interface 114 (equivalent to "output section").

<Processing by Reader>

A distinction over the embodiment 1 resides only in an arrangement in which an interface 122 also receives information specifying a number of times rn the update is performed and a communication section 123 transmits information specifying the number of times rn the update is performed to the backend apparatus 430 through the network 140.

<Processing by Backend Apparatus>

Initially, the communication section 132 of the backend apparatus 430 receives information specifying m, products distribution information pd and tag output information $G(s_{k,i})$ which are transmitted from the reader 120 (step S50). Information specifying m, the products distribution information pd and the tag output information $G(s_{k,i})$ which have been received are stored in the memory 136a. Then the controller 136 enters 1 for n, and stores it in the memory 136a (step S51). The controller 136 then causes a hash calculator 433 to extract a confidential value $s_{n,1}$ from the database memory 131 while referring to values of n and j in the memory 136a (step S52), and causes the hash function H to be applied thereto rn times and also causes the hash function G to be applied subsequently, thus allowing a hash value $G(H^j(s_{n,1}))$ (j=rn) to be calculated (step S53).

Then the comparator 134 acquires the hash value $G(H^j(s_{n,1}))$ from the hash calculator 133 and the tag output information $G(s_{k,i})$ from the memory 136a and compare them against each other (step S54).

In the event these values do not match (step S55), the controller 136 determines whether or not n in the memory 136a is equal to m (step D56). If n=m does not apply, the controller 136 stores n←n+1 (making n+1 to be a new n) in the memory 136a (step S57), causes processings at step S52 and subsequent steps to be re-executed and terminates the processing if n=m. It is to be noted that this processing is equivalent to re-executing the processings in the hash calculator 433 and the comparator 134 by changing the value of n when the hash value $G(H^j(s_{n,1}))$ and the tag output information $G(s_{k,i})$ do not match.

On the other hand, if the tag output information $G(s_{k,i})$ and the hash value $G(s_{k,i})$ match (step S55), the controller sends the confidential value $s_{n,1}$ corresponding to the matched hash value $G(s_{k,i})$ to the read/write section 135, which then extracts tag ID information $id_n$ and data $data_n$ such as products distribution information which are related to the confidential value $s_{n,1}$ which corresponds to the matched hash value $G(H^j(s_{n,1}))$ from the database memory 131 and sends them to the communication section (step S58). The read/write section 135 receives products distribution information pd from the memory 136a, and then writes this products distribution information pd into the database memory 131 in a manner relating it to the confidential value $s_{n,1}$ (step S59). Tag ID information $id_n$ and data $data_n$ which are sent to the communication section 132 are transmitted to the reader 120 through the network 140 (step S59).

As described above, in the embodiment 4, an arrangement is made so that the tag device 410 transmits rn and the backend apparatus 430 uses this rn to calculate the hash value $G(H^m(s_{n,1}))$ for purpose of a comparing processing. In this manner, a comparing processing by the backend apparatus 430 takes place only once for each $s_{n,1}$, allowing the amount of the processing required to be reduced.

Embodiment 5

An embodiment 5 is a modification of the embodiment 1, and differs from the embodiment 1 only in respect of performing an updating/comparison of the confidential value using a secret key encrypted function in place of a hash function. Only a distinction over the embodiment 1 will be described below.

Figure 9:
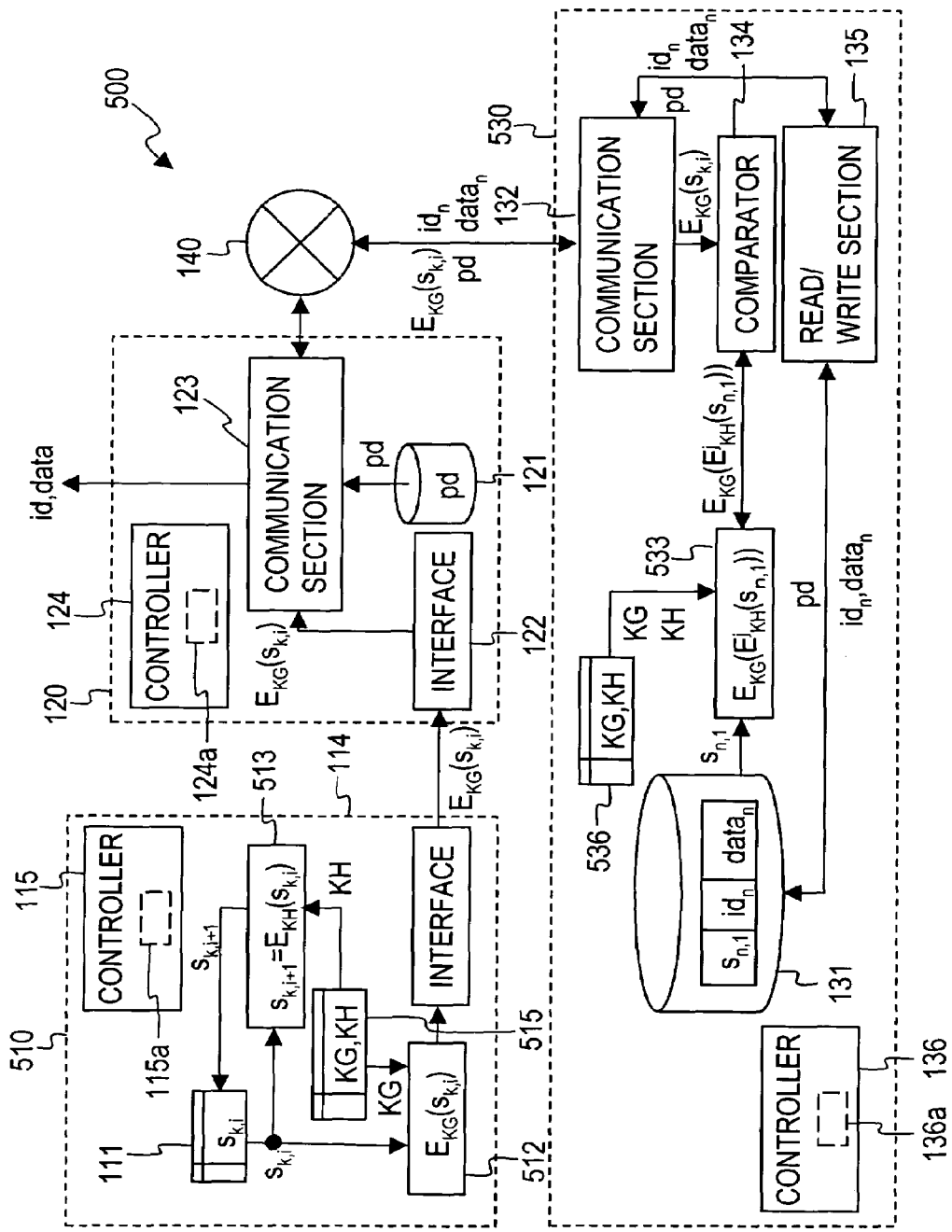
[FIG. 9] is an illustration of an overall arrangement of an automatic tag identification system of an embodiment 5.
Figure 10:
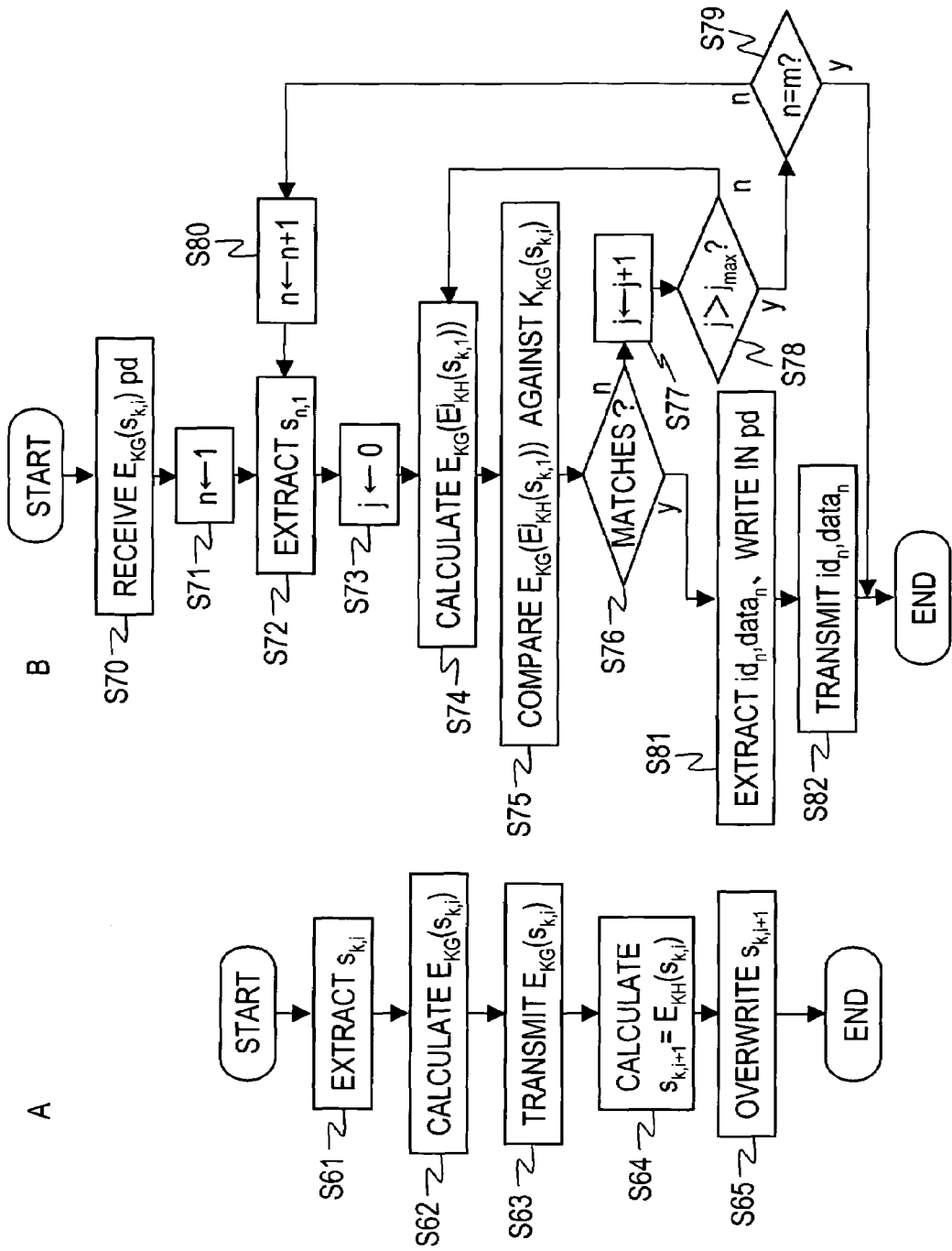
[FIG. 10] A is a flow chart for describing processing by a tag device of the embodiment 5, and B is a flow chart for describing processing by a backend apparatus of the present embodiment.

FIG. 9 is an illustration of an overall arrangement of an automatic tag identification system 500 of the embodiment 5. It is to be noted that in this Figure, parts which are common to the embodiment 1 are designated by common characters as used in the embodiment 1. FIG. 10A is a flow chart for describing processing by a tag device 510 in the embodiment 5, and FIG. 10B is a flow chart for describing processing by a backend apparatus 530 in the embodiment 5. A functional arrangement and a processing method of the present embodiment will be described below with reference to these Figures.

<Pre-Processing>

In the embodiment 5, a tag device 510 is provided with a key memory 515, and a backend apparatus 530 is provided with a key memory 536, each storing common keys KG and KH, respectively. In the tag device 510, encrypted function calculators 512 and 513 are substituted for the hash calculators 112 and 113 of the first embodiment, and in the backend apparatus 530, an encrypted function calculator 533 is substituted for the hash calculator 133. The encrypted function calculators 512, 513, and 533 are constructed to enable a calculation with a common key encryption function E such as AES, Camellia or the like in place of the hash function. In the embodiment 5, the common key encryption function E which uses the common KH is equivalent to "a first function F1, the inverse image of which is difficult to obtain", and the common key encryption function E which uses the common keys KG is equivalent to "a second function F2 which disturbs a relationship between elements of a domain of definition and its mapping". Thus, the first function F1 and the second function F2 in this example represent the same common key encryption function, to which different common keys are applied.

What is mentioned above represents a distinction over the embodiment 1.

<Processing by Tag Device>

Initially, an encrypted function calculator 512 (equivalent to "second calculator") extracts a confidential value $s_{k,i}$ from a confidential value memory 111 (step S61), extracts a common key KG from a key memory 515, and applies a common key encryption function E to the secret key $s_{k,i}$ with the common key ($E_{KG}(s_{k,i})$: step S62). An encrypted text $E_{KG}(s_{k,i})$ which is calculated is transmitted as the tag output information $E_{KG}(s_{k,i})$ from the interface 114 to the reader 120 through radio or wire communication (step S63).

Then, in an encrypted function calculator 513 (equivalent to "first calculator"), the common key KH is extracted from the key memory 515, the confidential value $s_{k,i}$ is extracted from the confidential value memory 111, and the common key encryption function E is applied to the confidential value $s_{k,i}$ with the common key KH (step 64), and a result of this calculation is saved by overwriting as a new confidential value $s_{i+1} = E_{KH}(s_{k,i})$ in the confidential value memory 111 (step 65).

<Processing by Reader>

This remains to be similar as in the embodiment 1.

<Processing by Backend Apparatus>

Initially, the backend apparatus 530 receives products distribution information pd and tag output information $E_{KG}(S_{k,i})$ transmitted by the reader 120 by the communication section 132 (step S70). Received products distribution information pd and tag output information $E_{KG}(s_{k,i})$ are stored in the memory 136a. Then, the controller 136 enters 1 for n, and stores it in the memory 136a (step S71). The controller 136 then causes the encrypted function calculator 533 (equivalent to "third calculator") to extract the confidential value $s_{n,1}$ from the database 131 while referring to the value n in the memory 136a (step S72). The controller 136 then enters 0 for j, and stores it in the memory 136a (step S73). The controller 136 causes the encrypted function calculator 533 to calculate an encrypted text $E_{KG}(E^j_{KH}(s_{n,1}))$ (equivalent to "result of a calculation in the third calculator") while referring to the value of j in the memory 136a (step S74). It should be noted that $E^j_{KH}(S_{n,1})$ implies applying a common key encryption function E to the confidential value $s_{n,1}$ j times using the common key KH. Then the comparator 134 acquires the encrypted text $E_{KG}(E^j_{KH}(s_{n,1}))$ from the hash calculator 133 and acquires tag output information $E_{KG}(S_{k,1})$ from the memory 136a, and compare them against each other (step S75).

In the event these values do not match (step S76), the controller 136 enters j+1 for j in the memory 136a (step S77), and determines whether not j has exceeded a given maximum value $j_{max}$ (step S78). If it is found that j is equal to or less than the maximum value $j_{max}$, the controller 136 causes processings at step S74 and subsequent steps to be re-executed and if j has exceeded the maximum value $j_{max}$, determines whether or not n in the memory 136a is equal to m (step S79). If n=m does not apply, the controller 136 saves n←n+1 (making n+1 to be a mew n) in the memory 136a (step S80), causes the processings at step 72 and subsequent steps to be re-executed and terminates the processing operation if n=m. It is to be noted that this processing is equivalent to re-executing the processings in the encrypted function calculator 533 and the comparator 134 by changing the value of at least one of n and j under the control of the controller 136 when tag output information $E_{KG}(s_{k,i})$ and the encrypted text $E_{KG}(E^j_{KH}(s_{n,1}))$ do not match.

On the other hand, if tag output information $E_{KG}(s_{k,i})$ and the encrypted text $E_{KG}(E^j_{KH}(s_{n,1}))$ match (step S76), the controller 136 sends the confidential value $s_{n,1}$ which corresponds to the matched encrypted text $E_{KG}(E^j_{KH}(s_{n,1}))$ to the read/write section 135, which then extracts the tag ID information $id_n$ and data $data_n$ such as products distribution information which are related to the confidential value $s_{n,1}$ which corresponds to the matched encrypted text $E_{KG}(E^j_{KH}(s_{n,1}))$ from the database memory 131, and sends them to the communication section 132 (step S81). The read/write section 135 receives products distribution information pd from the memory 136a, and writes the products distribution information pd into the database memory 131 by relating it with the confidential value $s_{n,1}$ (step S81). Tag ID information $id_n$ and data $data_n$ sent to the communication section 132 are transmitted to the reader 120 through the network 140 (step S82).

It is to be noted that the encrypted text $E^j_{KH}(s_{n,1})$ which is calculated at step S74 in the backend apparatus 530 may be recorded in the memory 136a to be utilized at the step S74 of the next loop. Specifically, using $E^j_{KH}(s_{n,1})$ which is recorded, an encrypted text $E_{j+1KH}(s_{n,1})$ may be determined according to $E_{KH}(E^j_{KH}(s_{n,1}))$, and this value may be stored in the memory 136a again. In this instance, a number of times an encrypted calculation is performed in the encrypted function calculator 533 can be reduced, improving the efficiency of the calculation by the backend apparatus 530. Alternatively, $E^j_{KH}(s_{n,1})$ ($j \in \{1, \ldots, j_{max}\}$) may be previously calculated in the backend apparatus 530 and stored in the memory 136a to be utilized at step S74. Again, the efficiency of calculation in the backend apparatus 530 can be improved.

While the embodiment 5 represents an example in which processings are performed by using the common key encryption function E which uses the common key KH as "the first function F1, the inverse image of which is difficult to obtain" and using the common key encryption function E which uses the common key KG as "the second function F2 which disturbs a relationship between elements of the domain of definition and its mapping", processings may be performed by using a hash function for one of the first function F1 and the second function F2. Also in the embodiments 1 to 4 or embodiments 6 to 11 which will be described later, processings may be performed by using a common key encryption function E which uses a common key KH or KG for at least one of the first function F1 and the second function F2.

In this manner, in the embodiment 5, an arrangement is made to update a confidential value $s_{k,i}$ using a common key encryption function. As a consequence, if the confidential value $s_{k,i}$ leaks from the tag device 510, it is impossible for an attacker to trace a distribution process of the tag device 10 on the basis of the confidential value $s_{k,i}$ and a history of communications. Since there is no need to provide a random number generator circuit in the tag device 510, a cost required for the tag device 510 can be reduced. In addition, if a common key encryption function which is lighter (requiring a lesser amount of calculations) than a hash function could be used, the amount of processings in the tag device 510 and backend apparatus 530 can be reduced.

Embodiment 6

An embodiment 6 is a modification of the embodiment 1 and differs from the embodiment 1 in that a hash value of a bit combination of a confidential value $s_{k,i}$ and a first proper value $w_k$ which is inherent to each tag is used as the tag output information.

Figure 11:
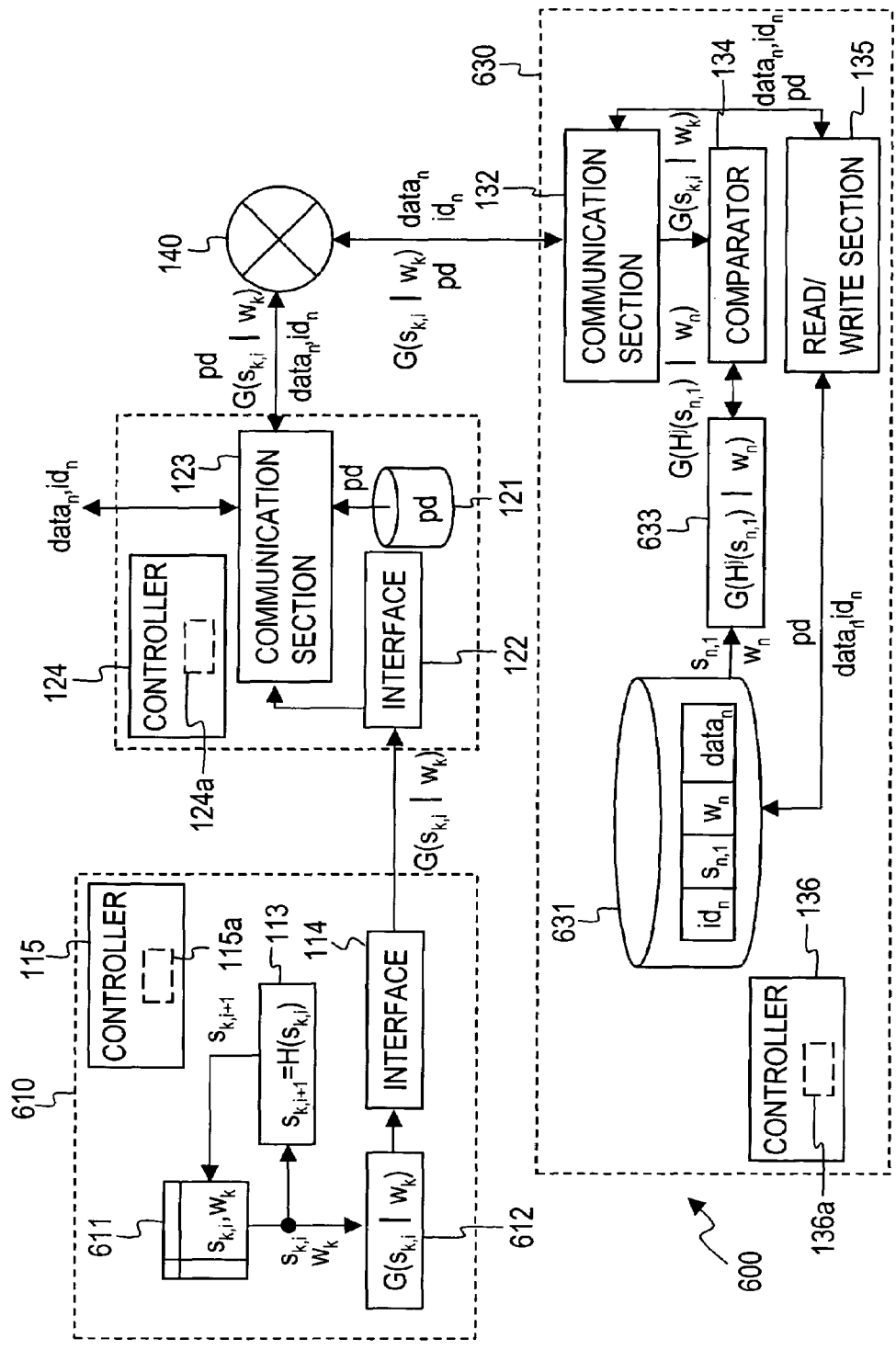
[FIG. 11] is an illustration of an overall arrangement of an automatic tag identification system of an embodiment 6.
Figure 12:
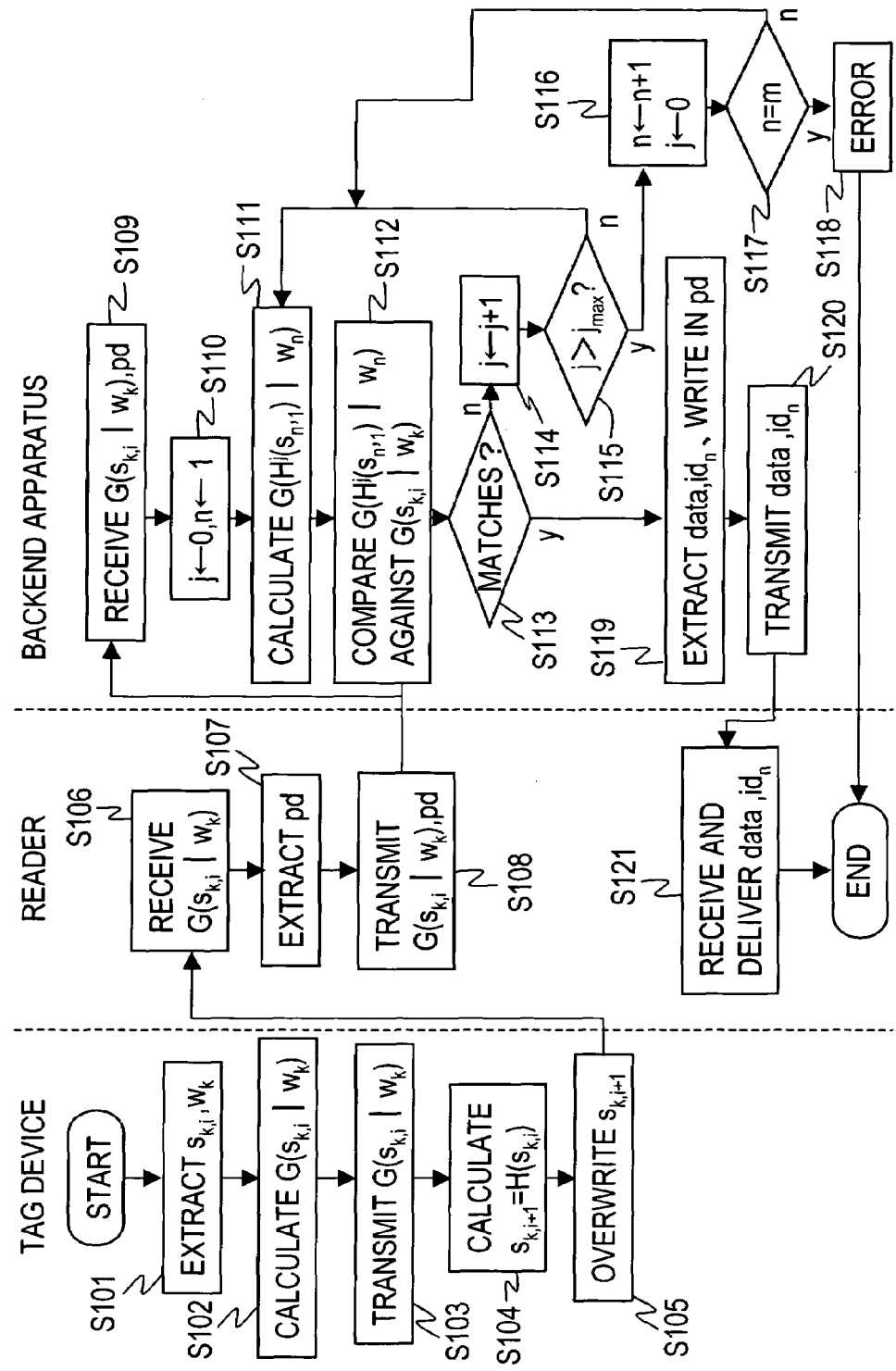
[FIG. 12] is a flow chart for describing processing in the embodiment 6.

FIG. 11 is an illustration of an overall arrangement of an automatic tag identification system 600 of the embodiment 6, and FIG. 12 is a flow chart for describing processing in the embodiment 6. It is to be noted that in FIG. 11, parts which are common to the embodiment 1 are designated by common characters as used in the embodiment 1. A functional arrangement and a processing method of the embodiment 6 will be described below with reference to these Figures.

<Pre-Processing>

Differences over the embodiment 1 reside in an arrangement that a confidential value $s_{k,i}$ corresponding to each tag ID information $id_k$ (equivalent to "first confidential value") and a proper value $w_k$ (equivalent to "the first proper value") are stored in a confidential value memory 611 of each tag device 610 and an arrangement in which each tag ID information $id_n$ ($n \in \{1, \ldots, m\}$) as well as a confidential value $s_{n,1}$ (equivalent to "second confidential value"), a proper value $w_n$ (equivalent to "second proper value") and data $data_n$ such as products distribution information which correspond thereto are stored in a database memory 631 of a backend apparatus 630 in a manner relating them to each other. As a proper value, tag ID information may be utilized, for example.

<Processing by Tag Device>

In the following, a processing which occurs when the tag device 610 is read by a reader 620 during an i-th run (i being a natural number) will be described.

Initially, a hash calculator 612 extracts a confidential value $s_{k,i}$ and a proper value $w_k$ from the confidential value memory 611 (step S101), and calculates tag output information $G(s_{k,i}|w_k)$ by applying a hash function G to a bit combination of the confidential value $s_{k,i}$ and the proper value $w_k$ (step S102). The interface 114 transmits this tag output information $G(s_{k,i}|w_k)$ to the reader 120 by either radio or wire communication (step S103).

Then a hash calculator 113 calculates a hash value $H(s_{k,i})$ by applying the hash function H to confidential value $s_{k,i}$ which is extracted from the confidential value memory 611 (step S1104), and overwrites the confidential value $s_{k,i}$ in the confidential value memory 611 by a new confidential value $s_{k,i+1}$ which is the hash function $H(s_{k,i})$ (the confidential value $s_{k,i}$ in the confidential value memory 611 is erased and the confidential value $s_{k,i+1}$ is saved instead: step S105).

<Processing by Reader>

The reader 120 receives at its interface 122 tag output information $G(s_{k,i}|w_k)$ which is transmitted from the tag device 610 (step S106) and sends it to the communication section 123. The communication section 123 extracts products distribution information pd from products distribution information memory 121 (step S107) and transmits the products distribution information pd and the hash value $G(s_{k,i}|w_k)$ to the backend apparatus 630 through the network 140 (step S108).

<Processing by Backend Apparatus>

The backend apparatus 630 receives the products distribution information pd and the tag output information $G(s_{k,i}|w_k)$ which are transmitted from the reader 120 at its communication section 132 (or accepts inputs: step S109). The received products distribution information and tag output information $G(s_{k,i}|w_k)$ are stored in a memory 136a.

Then the controller 136 enters 0 for parameters j and n, and store them in the memory 136a (step S10). The controller 136 then refers to j and n in the memory 136 and causes a hash calculator 633 (equivalent to "third calculator") to calculate a hash value $G(H^j(s_{n,1})|w_n)$ using a set of second confidential value $s_{n,i}$ and second proper value $w_n$ which are extracted from the database memory 631 (step S111). It is to be noted this $H^j(s_{n,1})$ may be calculated beforehand and stored in the database memory 631. In this instance, a calculation load of the backend apparatus 630 can be alleviated.

Then, a comparator 134 acquires a hash value $G(H^j(s_{n,1})|w_n)$ from the hash calculator 633 and acquires tag output information $G(s_{k,i}|w_k)$ from the memory 136a and compare them against each other (step S112).

In the event these values do not match (step S113), the controller 136 enters j+1 for j in the memory 136a (step S114), and determines whether or not j has exceeded a given maximum value $j_{max}$ (step S115). If j is equal to or less than the maximum value $j_{max}$, it returns to the processing at step S111, but if j exceeds the maximum value $j_{max}$, the controller 136 enters n+1 for n and 0 for j in the memory 136a (step S116), and determines whether n has exceeded a given maximum value $n_{max}$ (step S17). If n is equal to or less than the maximum $n_{max}$, it returns to the processing at step S111, but if n exceeds the maximum value $n_{max}$, an error termination results (step S118).

On the other hand, if a determination at step S113 reveals that the tag output information $G(s_{k,i}|w_k)$ and the hash value $G(H^j(s_{n,1})|w_n)$ match, the controller 136 applies this value of n to the read/write section 135, which uses this n to extract $id_n$ and $data_n$ which are related to the confidential value $s_{n,1}$ and the proper value $w_n$ which correspond to the matched hash value $G(H^j(s_{n,i})|w_n)$ from the database memory 631, and send these to the communication section 132. The read/write section 135 also receives the products distribution information pd from the memory 136a, and writes this products distribution information pd into the database memory 631 in a manner relating it to the confidential value $s_{n,1}$ and the proper value $w_n$ which correspond to the matched hash value $G(H^j(s_{n,1})|w_n)$ (step S119).

$id_n$ and $data_n$ which are sent to the commutation section 132 are transmitted to the reader 120 through the network 140, and are received by the communication section 123 of the reader 120 to be delivered (step S121).

<Features of Embodiment 6>

In the embodiment 6, tag output information $G(s_{k,i}|w_k)$ delivered from each tag device 610 represents a hash value of a bit combination of the confidential value $s_{k,i}$ and the proper value $w_k$ which is inherent to each tag device 610. The confidential value $s_{k,i}$ of each tag device is successively updated by the hash value $H(s_{k,i})$. If tag output information $G(s_{k,i}|w_k)$ becomes identical between tag devices (occurrence of a collision), because the proper value $w_k$ differs between tag devices, this collision can be eliminated with a high probability due to the difficulty of a collision occurring between hash functions if the confidential value $s_{k,i}$ of each tag device is updated. In this manner, a collision between tag output information $G(s_{k,i}|w_k)$ between tag devices 610 can be prevented from occurring in a continued manner, thus preventing a failure of the backend apparatus 630 to identify tag ID information uniquely from the tag output information $G(s_{k,i}|w_k)$.

Embodiment 7

An embodiment 7 is a modification of the embodiment 6, and differs from the embodiment 6 in that tag devices shares a confidential value in common. A distinction over the embodiment 1 and embodiment 6 will be principally described below.

Figure 13:
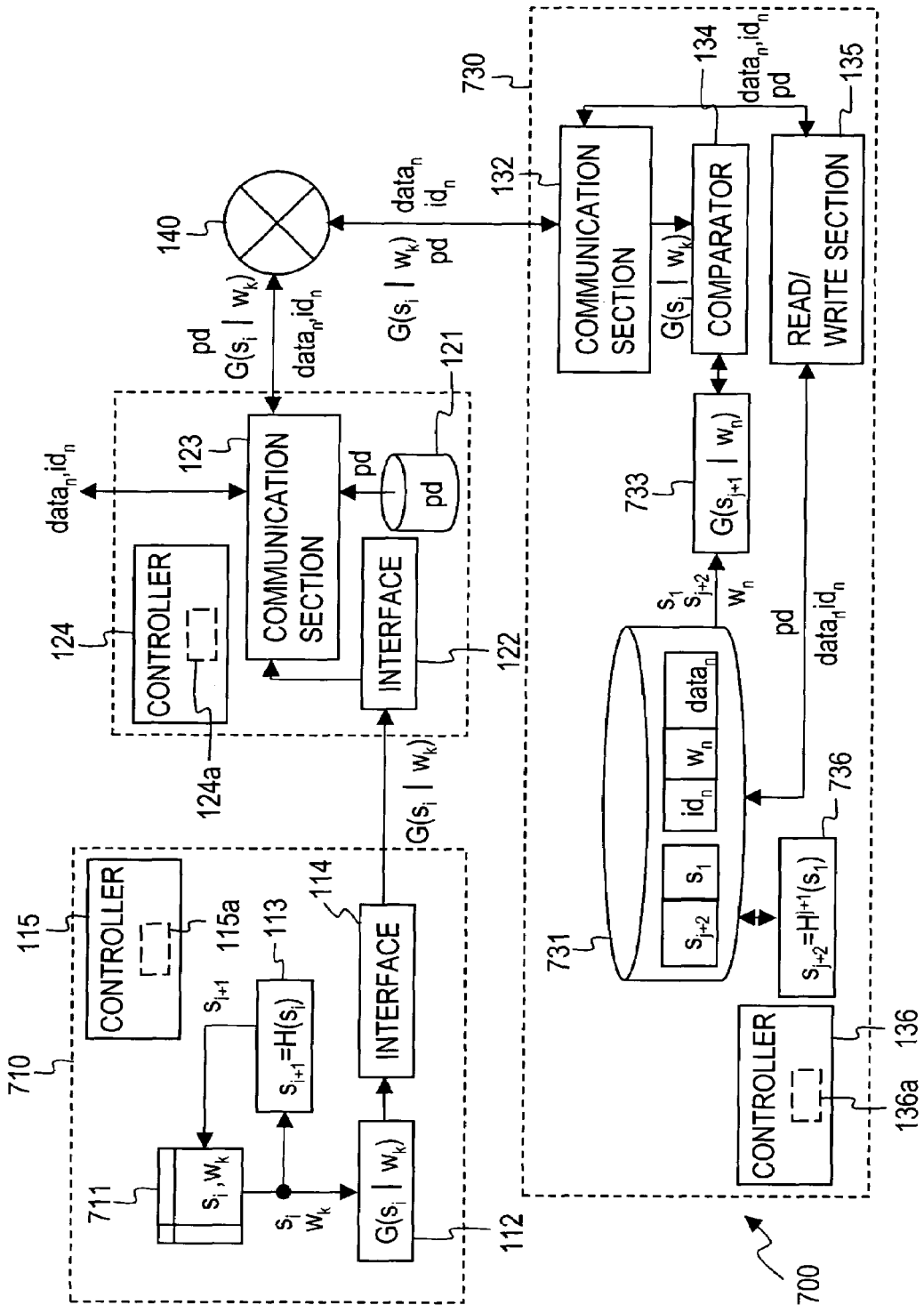
[FIG. 13] is an illustration of an overall arrangement of an automatic tag identification system of an embodiment 7.
Figure 14:
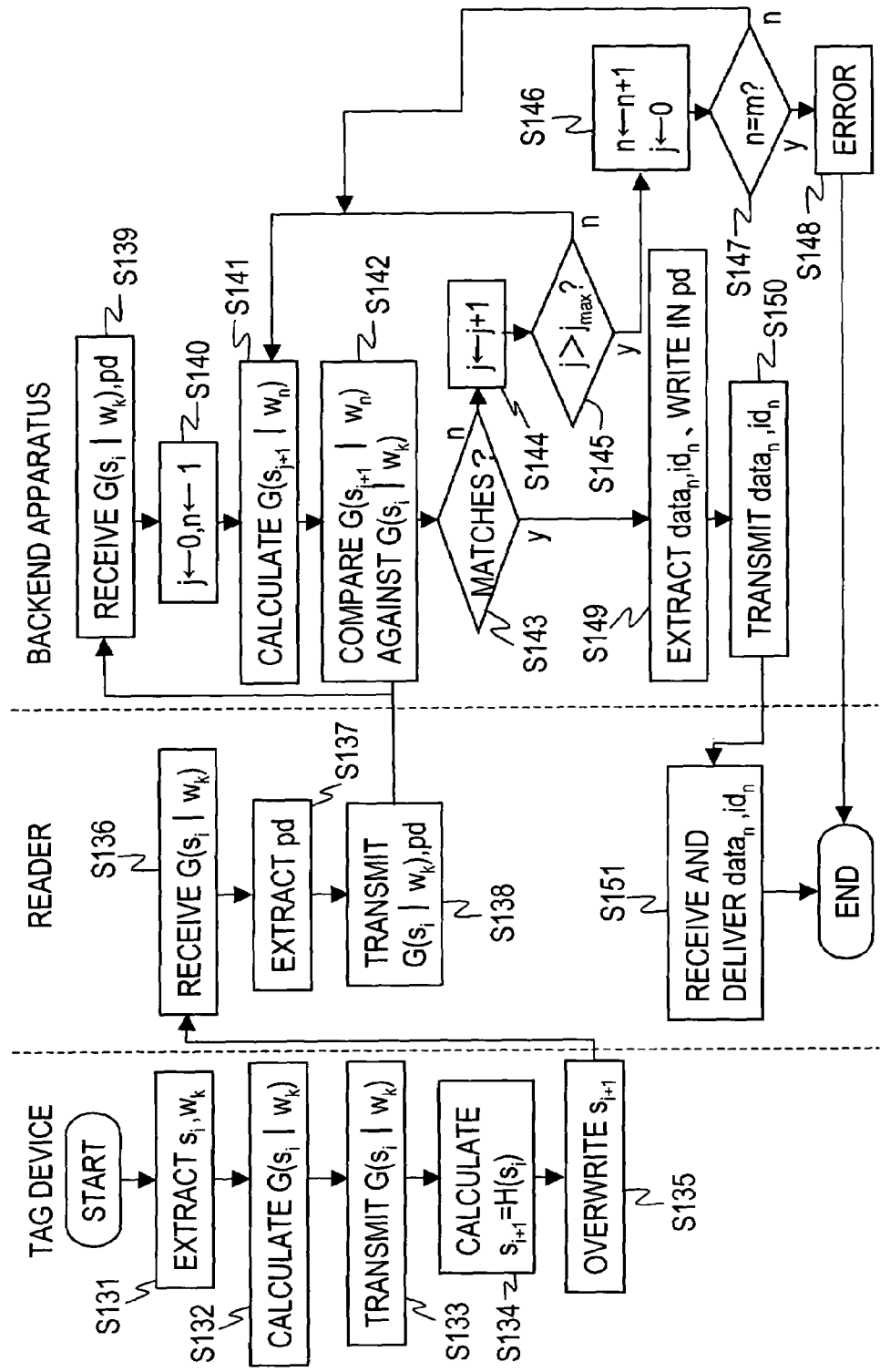
[FIG. 14] is a flow chart for describing processing in the embodiment 7.

FIG. 13 is an illustration of an overall arrangement of an automatic tag identification system 700 of the embodiment 7. It is to be noted that in this Figure, parts which are common to the embodiment 1 are designated by common characters as used in the embodiment 1. FIG. 14 is a flow chart for describing processing in the embodiment 7. A functional arrangement and a processing method of the embodiment 7 will be described below with reference to these Figures.

<Pre-Processing>

For each ID ($id_k$ (k=1, ..., m)) which corresponds to each tag device 710, a single random number $s_1 \in \{0, 1\}^r$ is generated, and is stored as a confidential value $s_1$ (which is an initial value of $s_i$ and is equivalent to "first confidential value") in the confidential value memory 711 of each tag device 710. For each tag ID information ($id_k$ (k=1, ..., m)) which corresponds to each tag device 710, a proper value $w_k$ which is inherent to each is generated, and is stored in the confidential value memory 711 of the respective tag device 710.

The confidential value $s_1$ which is the same as the confidential value $s_1$ stored in each tag device 710 is stored in a database memory 731 of a backend apparatus 730 as "second confidential value". Each proper value $w_n$ is also stored the database memory 731 in a manner relating it to tag ID information $id_n$ and $data_n$ such as products distribution information or the like of the corresponding tag device 710.

In addition, a hash value $s_{j+2} = H^{j+1}(s_1)$ (j=0, ..., $j_{max}$) of the confidential value $s_1$ which is common to each tag device 710 is calculated by a hash calculator 736 of the backend apparatus 730. Each calculated hash value $s_{j+2}$ is stored in the database memory 731.

<Processing by Tag Device>

In the following, a processing which takes place during an i-th run when the tag device is read by a reader 720 will be described.

Initially, a hash calculator 712 extracts a confidential value $s_i$ and a proper value $w_k$ from the confidential value memory 711 (step S131), and calculates a tag output information $G(s_i|w_k)$ which is a hash value of a bit combination of the confidential value $s_i$ and the proper value $w_k$ (step S132). The interface 114 transmits this tag output information $G(s_i|w_k)$ to the reader 120 (step S133).

A hash calculator 113 then calculates a hash value $H(s_i)$ of the confidential value $s_i$ which is extracted from the confidential value memory 711 (step S134) and the confidential value $s_i$ in the confidential value memory 711 is overwritten by the hash value $H(s_i)$ as a new confidential value $s_{i+1}$ (step S135).

<Processing by Reader>

This remains to be similar to the embodiment 1 (steps S136~S138).

<Processing by Backend Apparatus>

The backend apparatus 730 receives the products distribution information pd and tag output information $G(s_i|w_k)$ transmitted from the reader 120 at its communication section 132 (step S139). The received products distribution information pd and tag output information $G(s_i|w_k)$ are stored in the memory 136a.

Then the controller 136 enters 0 for parameters j and n and store them in the memory 136a (step S140).

In a hash calculator 733 (equivalent to "third calculator"), a hash value $G(s_{j+1}|w_n)$ is calculated using the proper value $w_n$ and the confidential value $s_i$ which are extracted from the database memory 731 or the hash value $S_{j+2}$ (which is calculated beforehand by the hash calculator 736) (step S141).

Then, a comparator 134 acquires the hash value $G(s_{j+1}|w_n)$ (equivalent to "result of calculation in the third calculator") from the hash calculator 733 and acquires the tag output information $G(s_i|w_k)$ from the memory 136a, and compare them against each other (step S142).

In the event these values do not match (step S143), the controller 136 enters j+1 for j in the memory 136a (step S144), and determines whether or not j has exceeded a given maximum value $j_{max}$ (step S145). If j is equal to or less than the maximum value $j_{max}$, it returns to the processing at step S141, but if j has exceeded the maximum value $j_{max}$, the controller substitutes n+1 for n and 0 for j in the memory 136a (step 146) and determines whether or not n has exceeded a given maximum value $n_{max}$ (step S147). If n is equal to or less than the maximum value $n_{max}$, it returns to the processing at step S141, but if n has exceeded the maximum value $n_{max}$, an error termination results (step S148).

If the determination at step S143 reveals that the tag output information $G(s_i|w_k)$ and the hash value $G(s_{j+1}|w_n)$ match, the read/write section 135 extracts $id_n$ and $data_n$ which are related to the proper value $w_n$ which corresponds to the matched hash value $G(s_{j+1}|w_n)$ from a database memory 731 and sends them to the communication section 132 under the control of the controller 136. The read/write section 135 also receives products distribution information pd from the communication section 132, and writes the products distribution information pd into the database memory 731 in a manner relating it to the proper value $w_n$ which corresponds to the matching hash value $G(s_{j+1}|w_n)$ (step S149).

$id_n$ and $data_n$ which are sent to the communication section 132 are transmitted to the 120 through the network 140 (step S150), and are received by the communication section 123 of the reader 120 to be delivered (step S151).

<Features of Embodiment 7>

In the embodiment 7, the confidential value $s_1$ which is common to each tag device 710 is used. Accordingly, the confidential value $s_{j+1}$ which is used in the processing at step S141 by the backend apparatus 730 can be used in common to each tag ID information $id_n$, whereby the amount of calculations in the backend apparatus 730 can be drastically reduced, permitting an efficient retrieval.

Specifically, denoting the number of the tag devices 710 by m and the number of hashing operations in the backend apparatus 730 (the number of times the confidential value is updated for the tag device 710) by j, the embodiment 1 required a number of hash operations which is equal to 2 mj. By contrast, in the embodiment 7, the number of hash operations can be suppressed to mj+j.

In addition, the tag device 710 delivers the number of times rn the confidential value $s_1$ is updated together with the tag output information $G(s_i|w_k)$, and if the number of the times it is updated rn is fed to the backend apparatus 730 (see the embodiment 4), the number of hash operations in the backend apparatus 730 can be reduced down to m+j.

Embodiment 8

An embodiment 8 is a modification of the embodiment 1, and differs from the embodiment 1 in that a combination of a plurality of elements is allotted as a value which is inherent to each tag device. In this manner, part of elements which are allotted to each tag device can be shared by a plurality of tag devices, with consequence that a total amount of calculations which are required to recognize a tag device can be reduced.

Figure 15:
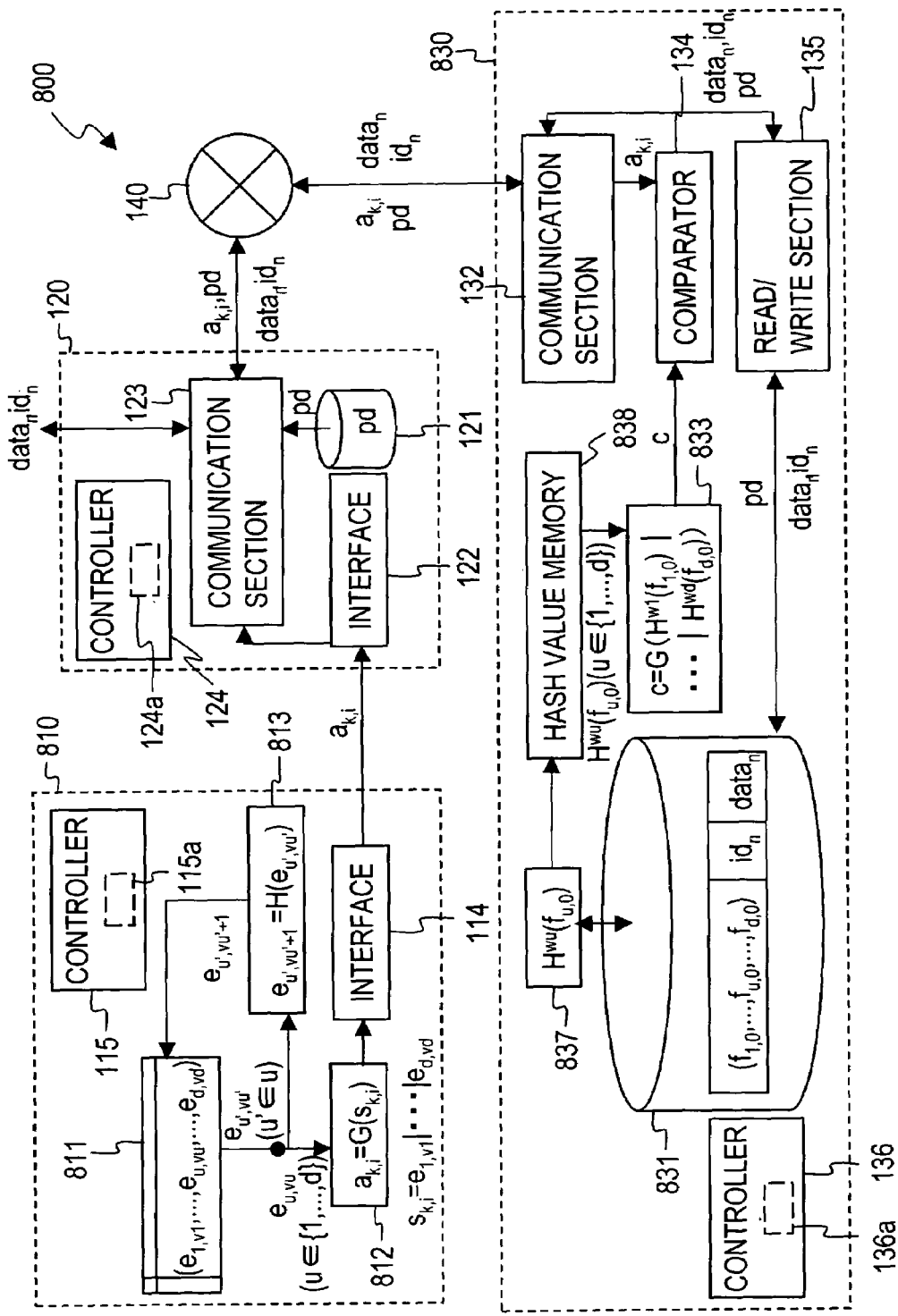
[FIG. 15] is an illustration of an overall arrangement of an automatic tag identification system of an embodiment 8.
Figure 16:
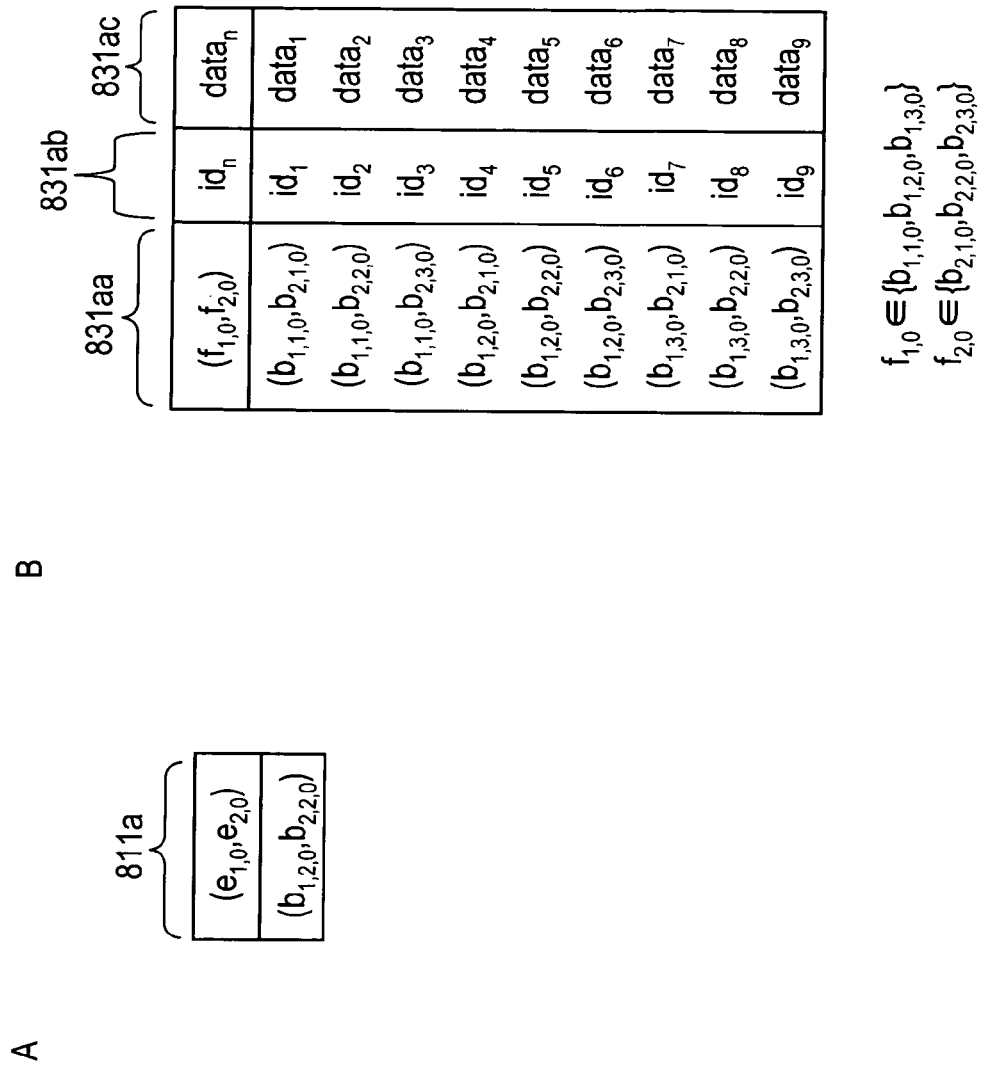
[FIG. 16] A is an illustration of data which is stored in the confidential value memory of a tag device, and B is an illustration of data stored in a database memory of a backend apparatus.
Figure 17:
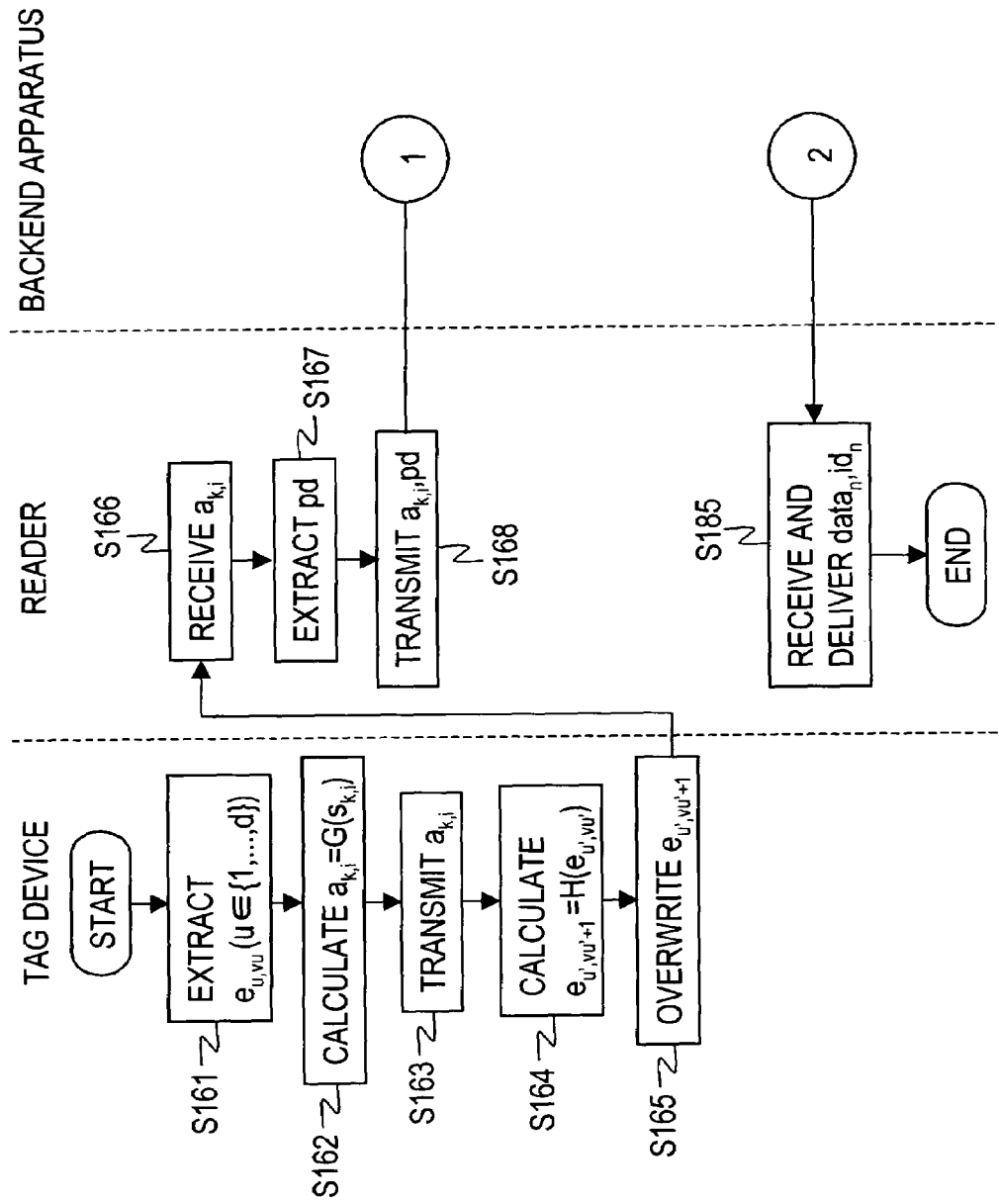
[FIG. 17] is a flow chart for describing processing in the embodiment 8.
Figure 18:
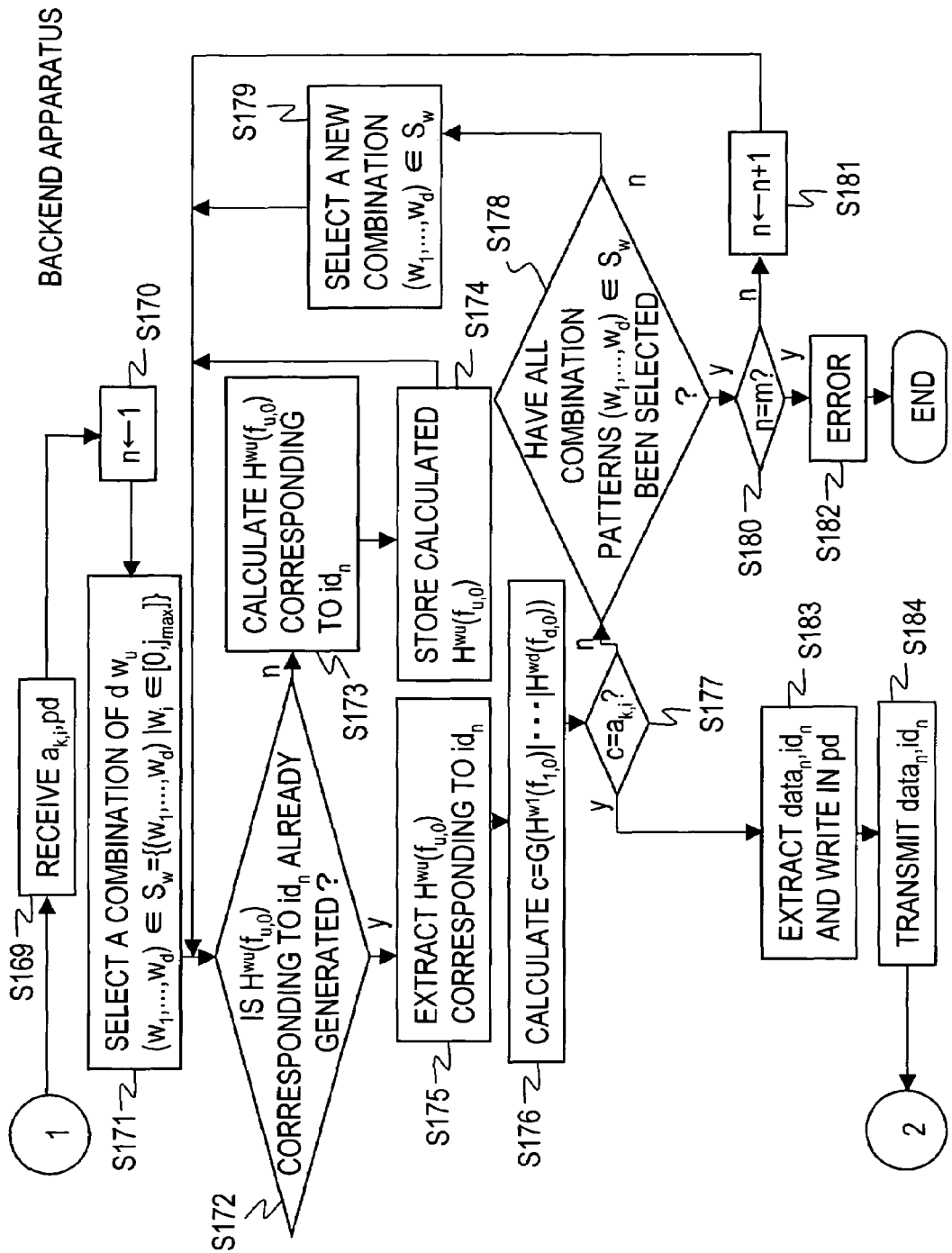
[FIG. 18] is a flow chart for describing processing in the embodiment 8.

FIG. 15 is an illustration of an overall arrangement of an automatic tag identification system 800 of the embodiment 8. In this Figure, parts which are common to the embodiment 1 are designated by like numerals as used in the embodiment 1. FIG. 16 A shows an example of data which are stored in a confidential value memory 811 of a tag device 810, and FIG. 16 B shows examples of data which are stored in a database memory 831 of a backend apparatus 830. In addition FIG. 17 and FIG. 18 are flow charts for describing processings in the embodiment 8.

A functional arrangement and a processing method of the embodiment 8 will be described below with reference to these Figures. It is to be noted that what is common to the embodiment 1 will be omitted from description.

<Pre-Processing>

By way of example, using a random number generator (not shown) or the like, a set of initial values of elements which are allotted to respective tag devices ($b_{1, 1, 0}, \ldots, b_{1, j, 0}, \ldots, b_{1, \rho, 0}$) $\ldots$ ($b_{u, l, 0}, \ldots, b_{u, j, 0}, \ldots, b_{u, \rho, 0}$) $\ldots$ ($b_{d, 1, 0}, \ldots, b_{d, j, 0}, \ldots, b_{d, \rho, 0}$) are generated. A set of elements within each "()" will be referred to as a sub-group $\alpha_u (u \in \{1, \ldots, d\})$.

Here, j is a natural number ($j \in \{1, \ldots, \rho\}$) which satisfies $1 \leq j \leq \rho$, and u is a natural number ($u \in \{1, \ldots, d\}$) which satisfies $1 \leq u \leq d$. In the embodiment 8, a combination of a plurality of elements defines one confidential value, and $d(d \geq 2)$ represents a number of elements which constitute one confidential value. m is a number equal to or greater than a total number of tag devices 810 (a total number of required confidential values) and which satisfies a requirement that $m = \rho^d$ is a natural number.

Combinations of elements thus generated are allotted to respective tag devices 810. Specifically, one element is selected from each of d kinds of sub-groups $\alpha_u$ which constitutes together the set of initial values of above mentioned elements, and selected d combinations of initial elements $f_{u, 0}$ ($f_{1, 0}, \ldots, f_{u, 0}, \ldots, f_{d, 0}$) are allotted to respective tag devices 810 ($f_{1, 0}, \ldots, \in \{b_{1, 1, 0}, \ldots, b_{1, q, 0}, \ldots, b_{1, \rho, 0}\}, \ldots, f_{u, 0} \in \{b_{u, 1, 0}, \ldots, b_{u, q, 0}, b_{u, \rho, 0}\}, \ldots, f_{d, 0} \in \{b_{d, 1, 0}, \ldots, b_{d, q, 0}, \ldots, b_{d, \rho, 0}\}$). It is to be noted that this allotment is made so that a same combination does not occur for different tag devices 810, and a total of m kinds (a total number of tag devices 810) of combinations ($f_{1, 0}, \ldots, f_{u, 0}, \ldots, f_{d, 0}$) are allotted. Alternatively, a plurality of combinations of initial elements $f_{u, 0}$ may be related to a single tag device 810, and in this instance, a total of m kinds or more (a total number of tag devices 810 or more) combinations of ($f_{1, 0}, \ldots, f_{u, 0}, \ldots, f_{d, 0}$) are allotted. At least part of elements which constitute each ($f_{1, 0}, \ldots, f_{u, 0}, \ldots, f_{d, 0}$) is shared by a plurality of tag devices 810.

All the combinations ($f_{1, 0}, \ldots, f_{u, 0}, \ldots, f_{d, 0}$) which are generated (combinations of $d(d \geq 2)$ initial elements $f_{u, 0} (u \in \{1, \ldots, d\})$) are related to tag ID information $id_n$ of each allotted tag device 810 and data $data_n$ corresponding to each tag device 810, and are stored in a database memory 831 of the backend apparatus 830. It is to be noted that n assumes a value which corresponds to each tag device, and corresponds to a suffix k of tag output information $a_{k, i}$ (to be described later) which is delivered from each tag device. In other words, the number of combinations of d initial elements $f_{u, 0}$ which are stored in the database memory 831 is equal to the total number of tag devices 810. Where a plurality of combinations of initial elements $f_{u, 0}$ are related to a single tag device 810, the number of combinations of d initial elements $f_{u, 0}$ which are stored in the database memory 831 will be equal to or greater than the total number of tag devices 810.

Combinations of generated initial elements ($f_{1,0}, \ldots, f_{u,0}, \ldots, f_{d,0}$) (equivalent to "combinations each comprising $d(d \geq 2)$ elements $e_{u, vu} (u \in \{1, \ldots, d\})$ and corresponding to respective tag ID information $id_k$" where vu represents an integer equal to or greater than 0 and indicating the number of times the element $e_{u, vu}$ is updated and the suffix vu of the element $e_{u, vu}$ represents $v_v$) are stored in the confidential value memory 811 of respective allotted tag devices 810. In the description to follow, a combination of initial elements which is stored in the confidential value memory 811 of each tag device 810 is indicated by ($e_{1,0}, \ldots, e_{u,0}, \ldots, e_{d,0}$).

In the example of FIG. 16, an allotment of initial elements for d=2, $\rho$=3, m=9 is shown.

As shown in FIG. 16 B, for this example, combinations 831aa of initial elements (($f_{1, 0}, f_{2, 0}$) ($f_{1, 0} \in \{b_{1, 1, 0}, b_{1, 2, 0}, b_{1, 3, 0}\}, f_{2, 0} \in \{b_{2, 1, 0}, b_{2, 2, 0}, b_{2, 3, 0}\}$), tag ID information

831ab (id$_n$ (n∈{1, . . . , 9}) and data 831ac (data$_n$ (n∈ {1, . . . , 9}) are stored in the database memory 831 of the backend apparatus 830 in a manner relating to each other.

As shown in FIG. 16A, one set of combinations of initial elements 811a (($e_{1,0}$, $e_{2,0}$)=($b_{1,2,0}$, $b_{2,2,0}$)) which corresponds to the tag ID information id is stored in the confidential value memory 811 of the tag device 810. It is to be noted that part of the element $e_{u, vu}$ which is stored in the confidential value memory 811 is also stored in the confidential value memory of another tag device as a corresponding element in another tag device.

<Processing by Tag Device>

A processing which takes place when the tag device 810 is read by the reader 20 during an i-th run (i is a natural number) will be described below.

Initially, in a hash calculator 812 (equivalent to "second calculator"), d elements $e_{u, vu}$ are extracted from the confidential value memory 811 (step S161), and a hash function G is applied to a combined value of these bit trains (confidential value $s_{k, i}$) to calculate the tag output information $a_{k, i}$=G($s_{k, i}$) (step S162) where k represents a value corresponding to each tag device and i is a natural number indicating a number of times delivered from the output section. It is to be noted that in the present embodiment, the confidential value $s_{k, i}$= $e_{1, v1}$|. . .|$e_{u, vu}$|. . .|$e_{d, vd}$ and the tag output information $a_{k, i}$=G($e_{1, v1}$|. . .|$e_{u, vu}$|. . .|$e_{d, vd}$) are used, but the sequence in which bits of the respective elements $e_{u, vu}$ are disposed are not limited thereto.

The generated tag output information $a_{k, i}$ is sent to an interface 114, which delivers the tag output information $a_{k, i}$ (step S163).

Subsequently, a hash calculator 813 (equivalent to "first calculator") extracts elements $e_{u', vu'}$ (u'∈{1, . . . , d}), which are at least part thereof, from the confidential value memory 811, calculates a hash value H($e_{u', vu'}$) of the extracted elements $e_{u', vu'}$ (step S164) and saves by overwriting the hash value H($e_{u', vu'}$) as a new element $e_{u', vu'+1}$ in the confidential value memory 811 (step S165). It is to be understood that a method of selecting u'∈{1, . . . , d} may be any desired one. By way of example, a method of selecting a different u' each time the tag device 810 performs a communication, a method in which a separate u' is selected at the time every element $e_{u', vu'}$ has been updated for one u', a method of selecting two or more u' concurrently can be cited.

<Processing by Reader>

The reader 120 receives a tag output information $a_{k, i}$ transmitted from the tag device 810 at its interface 122 (step S166), and sends it to the communication section 123. The communication section 123 extracts products distribution information pd from products distribution information memory 121 (step S167) and transmits the products distribution information pd and the tag output information $a_{k, i}$ to the backend apparatus 830 through the network 140 (step S168).

<Processing by Backend Apparatus>

The tag output information $a_{k, i}$ and the products distribution information pd which are transmitted from the reader 120 are received by the communication section 132, and are stored in the memory 136a (step S169).

This triggers the controller 136 to substitute 1 for n and to store it in the memory 136a (step S170), to select a combination of d $w_u$ in the manner indicated below and to store the combination in the memory 136a (step S171). ($w_1$, . . . , $w_d$)∈$S_W$={$w_1$, . . . , $w_d$|$w_u$∈[0, $j_{max}$]} (where [α, β] represents a set of integers equal to or greater than α and equal to or less than β.)

Then the controller 136 verifies, while referring to n and the combination of d $w_u$ in the memory 136a and also referring to a hash value memory 838, whether or not a hash value $H^{wu}(f_{u, 0})$ which is a result of applying $w_u$ times the hash function H to d initial elements $f_{u, 0}$ (u∈{1, . . . , d}) corresponding to the tag ID information id$_n$ is stored (is already generated) in the hash value memory 838 (step S172). It is to be noted that super-index wu in $H^{wu}(f_{u, 0})$ represents $w_u$.

In the event it is determined that there remain some of hash values $H_{wu}(f_{u, 0})$ corresponding to the tag ID information id$_n$ which have not yet been calculated, a hash calculator 837 extracts initial elements $f_{u, 0}$ corresponding to those of "the hash values $H^{wu}(f_{u, 0})$ corresponding to the tag ID information id$_n$ which have not yet been calculated" from the database memory 831, applies $w_u$ times the hash function H to these initial elements $f_{u, 0}$ to calculate the hash value $H^{wu}(f_{u, 0})$ (step S173). The calculated hash value $H^{wu}(f_{u, 0})$ is stored in the hash value memory 838 (step S174), then returning to the processing at step S172.

On the other hand, if it is determined at step S172 that all of hash values $H^{wu}(f_{u, 0})$ corresponding to the tag ID information id$_n$ have been generated, the controller 136 causes, while referring to n and combinations of d $w_u$ in the memory 136a, a hash calculator 833 (equivalent to "third calculator") to extract the hash values $H^{wu}(f_{u, 0})$ which are obtained by applying $w_u$ times the first function F1 to d initial elements $f_{u, 0}$ (u∈{1, . . . , d}) corresponding to the tag ID information id$_n$ from the hash value memory 838 (step S175) and to calculate a value c which is obtained by applying the hash value G to a bit combination value of these hash values $H^{wu}(f_{u, 0})$ (step 176). The calculated value c may be illustrated by c=G($H_{w1}(f_{1, 0})$|. . .|$H^{wu}(f_{u, 0})$|. . .|$H^{wd}(f_{d, 0})$), for example, but the bit disposition sequence of each hash value $H^{wu}(f_{u, 0})$ is not limited thereto. However, the sequence should correspond to the bit disposition sequence of each element $e_{u, vu}$ in the hash calculator 812 of the tag device 810.

Then, the comparator 134 reads the tag output information $a_{k, i}$ from the memory 136a, receives the calculated value c from the hash calculator 833 and compare them to determine if c=$a_{k, i}$ (step S177). In this example, the hash value c=G($H^{w1}$ ($f_{1, 0}$)|. . .|$H^{wu}(f_{u, 0})$|. . .|$H^{wd}(f_{d, 0})$) and the tag output information $a_{k, i}$ are compared against each other.

In the event it is determined that these do not match, the controller 136 determines whether or not all of d combination patterns ($w_1$, . . . , $w_d$)∈$S_w$ have been selected while referring to the memory 136a (step S178). If it is determined that there exists a combination pattern which has not yet been selected, the controller 136 selects a new combination ($w_1$, . . . , $w_d$)∈$S_w$, stores it in the memory 136a (step S179) and causes the processings at step S172 and subsequent steps to be executed for this new combination and n.

On the other hand, if it is determined at step S178 that all of combination patterns have been selected, the controller 136 determines whether or not n=m while referring to n in the memory 136a (step S180). If it is determined that n=m does not apply, the controller 136 updates n in the memory 136a by n+1 (step S181) and causes processings at step S172 and subsequent steps to be executed. On the other hand, if it is determined that n=m, an error termination of the processing results (step S182).

It is to be noted that the processings which take place at steps S172~181 are equivalent to re-executing the processings in the hash calculator 833 and the comparator 134 by changing the value of at least part of n and $w_u$ under the control of the controller 136 when the tag output information $a_{k, i}$ and the calculated value c do not match.

On the other hand, if it is determined at step S177 that the hash value c and the tag output information $a_{k, i}$ match, the read/write section 135 selects tag ID information id$_n$ which is related to the combination of a plurality of initial elements $f_{u, 0}$ corresponding to the hash value c from the database memory 831 under the control of the controller 135, extracts the tag ID information $id_n$ and its corresponding data $data_n$ and sends them to the communication section 132. The read/write section 135 receives the products distribution information pd from the memory 136a, and writes this products distribution information pd as data $data_n$ corresponding to the tag ID information $id_n$ into the database memory 831 as an addition (step S183).

The tag ID information $id_n$ and data $data_n$ which are sent to the communication section 132 are transmitted to the reader 120 through the network 140 (step S184), and are received by the communication section 123 of the reader 120 to be delivered (step S185).

<Features of Embodiment 8>

[Efficiency]

To calculate the hash value c in the hash calculators 838 of the backend apparatus 830, it is necessary to calculate a hash value $H^{wu}(f_{u, 0}) = f_{u, vu}$. In the embodiment 8, each element $e_{u, vu}$ can be used in common by a plurality of tag devices 810, and accordingly, if the hash value $H^{wu}(f_{u, 0}) = f_{u, vu}$ which is calculated to calculate the hash value c corresponding to either one of the tag devices 810 is stored in the hash value memory 838, this element $f_{u, vu}$ can also be utilized in the calculation of hash values c corresponding to other tag devices 810. In this manner, the number of tag devices 810 which can be accommodated can be increased without increasing the number of hash values $H^{wu}(f_{u, 0})$ which must be calculated. Specifically, initial elements which are inherent to tag devices which are equal in number to $\rho^d$ can be allotted by using $d*\rho$ elements.

Because communication data is constructed by the calculation of hash functions alone, the scale of a circuit which is incorporated into the tag device 810 is small in comparison to a conventional method which generates random numbers, and this embodiment lends itself to an application which demands a low cost.

[Impossibility of Tracing]

In the embodiment 8, tag output information $a_{k, i} = G(s_{k, i})$ is used in the communication. Because of the incapability to identify a hash value, this tag output information $a_{k, i} = G(s_{k, i})$ appears to be a mere random number to an attacker who does not know a confidential value. Accordingly, the attacker cannot know whether or not the tag output information $a_{k, i} = G(s_{k, i})$ and $a_{k, i+1} = G(s_{k, i+1})$ have been delivered from the same tag device 810, and therefore cannot trace the distribution process of the tag device 810.

[Forward Security]

In the embodiment 8, an arrangement is used that the confidential value in the confidential value 811 which is used in the communication is updated by the hash function H. In addition, if the tag device 810 is tampered with to leak each element $e_{u, vu}$, the attacker cannot determine a past element $e_{u, vu-\Delta vu}$ from the element $e_{u, vu}$ due to the one-way nature of the hash function. Accordingly, if each element $e_{u, vu}$ were leaked, the attacker cannot find a correspondence between each element $e_{u, vu}$ acquired and the history of communications, and hence cannot trace the tag device 810.

[Traceability]

On the other hand, on account of the difficulty of a collision between the hash functions G and H (the property that hash values of different values can hardly assume a same value), the backend apparatus 830 which knows each element $e_{u, vu}$ is capable of tracing the distribution process of the tag device.

In the embodiment 8, the set of initial elements which are generated by the backend apparatus 830 is chosen to be as follows: $(b_{1, 1, 0}, \ldots, b_{1, j, 0}, \ldots, b_{1, \rho, 0}) \cdots (b_{u, 1, 0}, \ldots, b_{u, j, 0}, \ldots, b_{u, \rho, 0}) \cdots (b_{d, 1, 0}, \ldots, b_{d, j, 0}, \ldots, b_{d, \rho, 0})$ Thus, $\rho$ initial elements b are generated for each u ($u \in \{1, \ldots, d\}$). However, the number of initial elements which are generated for each u ($u \in \{1, \ldots, d\}$) may be different.

The hash value $H^{wu}(f_{u, 0})$ ($u \in \{1, \ldots, d\}$) which is required in the processing at step S176 may be determined by the hash calculator 837 of the backend apparatus 830 at the pre-processing step, and stored in the hash value memory 838.

Embodiment 9

An embodiment 9 is a modification of the embodiment 8, and differs from the embodiment 8 in that a proper value which is inherent to each tag device is additionally stored in the confidential value memory of the tag device and the database memory of the backend apparatus, and a hash value $a_{k, i} = G(s_{k, i})$ of a combination of bit trains including each element $e_{u, vu}$ and a proper value $\gamma_k$ is used as tag output information. This allows a situation that a confidential value of a particular tag device be determined on the basis of elements $e_{u, vu}$ which are collected by tampering with other tag devices to trace the tag device to be prevented from occurring.

Only a distinction over the embodiment 8 will be described below while omitting a description for what are common with the embodiment 8.

Figure 19:
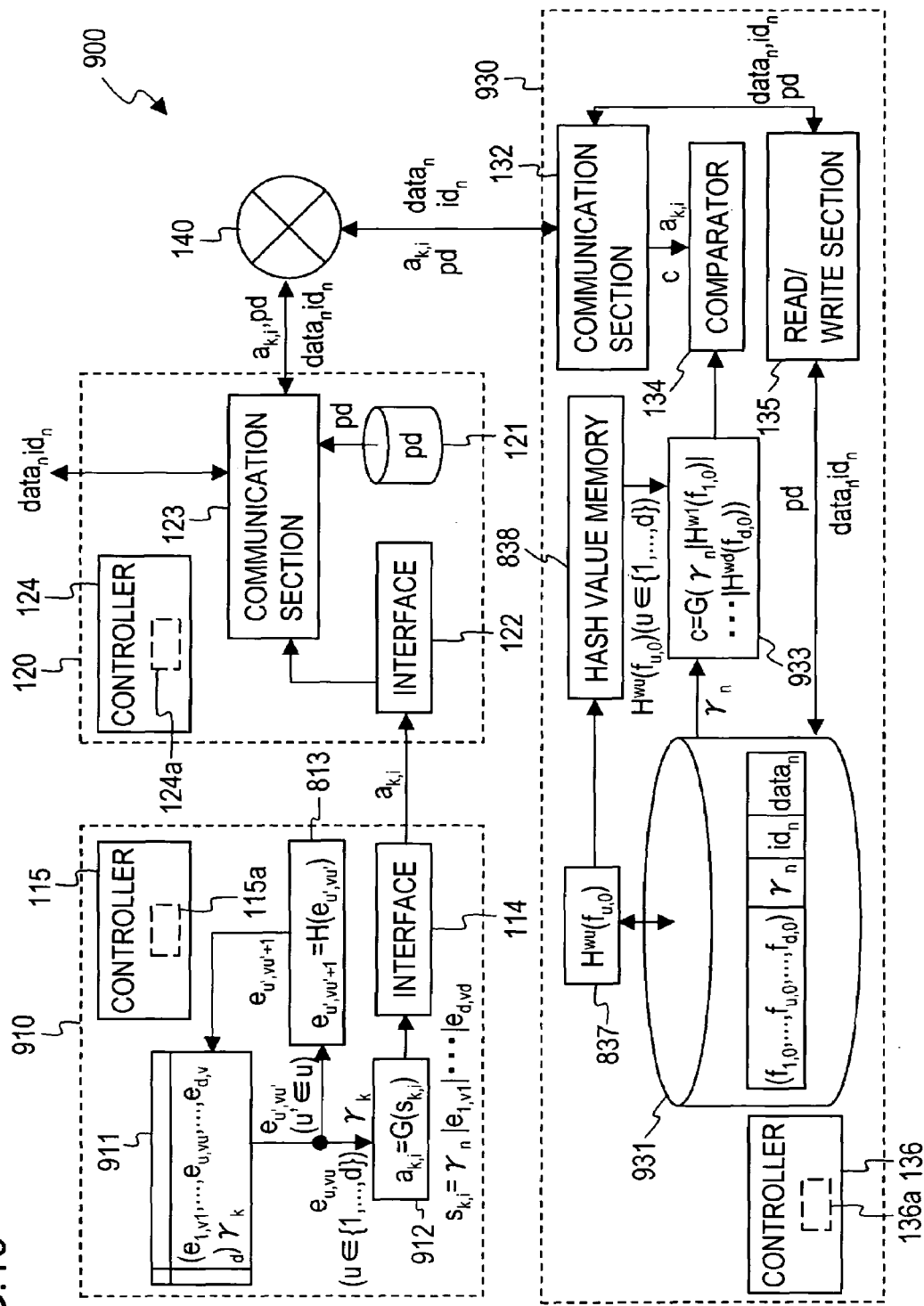
[FIG. 19] is an illustration of an overall arrangement of an automatic tag identification system of an embodiment 9.

FIG. 19 is an illustration of an overall arrangement of an automatic tag identification system 900 of the embodiment 9. FIG. 20 A illustrates examples of data which are stored in a confidential value memory 911 of a tag device 910, and FIG. 20 B shows examples of data which are stored in a database memory 931 of a backend apparatus 930. It is to be noted that in FIG. 19, a functional arrangement which is common with the embodiment 1 is denoted by like characters as used in FIG. 2, and a functional arrangement which is common with the embodiment 8 is denoted by like characters as used in FIG. 15 without giving a description thereof. It is to be noted that while FIG. 19 shows only one tag device 910, there are a plurality of tag device 910 in actuality.

A functional arrangement and a processing method of the embodiment 9 will be described below with reference to these Figures.

<Pre-Processing>

Differences over the embodiment 8 reside in that a proper value $\gamma_k$ is additionally stored in the confidential value memory 911 of the tag device 910 and that a combination of d ($d \geq 2$) initial elements $f_{u, 0}$ ($u \in \{1, \ldots, d\}$), a proper value $\gamma_k$ which is inherent to each tag device, and tag ID information $id_n$ of each tag device (n assuming a value which corresponds to each tag device) are stored in the database memory 931 of the backend apparatus 930 in a manner relating these to each other. It is to be noted that proper values $\gamma_k$ and $\gamma_n$ are random values, for example.

In the example shown in FIG. 20, an allotment of combined proper values for d=2, $\rho$=3, m=9 is shown.

As shown in FIG. 20 B, in this example, a combination 931*aa* of initial elements (($f_{1, 0}, f_{2, 0}$) ($f_{1, 0} \in \{b_{1, 1, 0}, b_{1, 2, 0}, b_{1, 3, 0}\}, f_{2, 0} \in \{b_{2, 1, 0}, b_{2, 2, 0}, b_{2, 3, 0}\}$)), the tag ID information 931*ab* ($id_n$ ($n \in \{1, \ldots, 9\}$)), data 931*ac* ($data_n$ ($n \in \{1, \ldots, 9\}$)), and a proper value 931*ad* which is inherent to each tag device ($\gamma_k, k \in \{1, \ldots, 12\}$) are stored in the database memory 931 of the backend apparatus 930 in a manner relating these to each other. As shown in FIG. 20 A, a combination 911*a* of initial elements (($e_{1, 0}, e_{2, 0}$)=($b_{1, 2, 0}, b_{2, 2, 0}$)) and a proper value 911*b* ($\gamma_k = \gamma_5$) are stored in the confidential value memory 911 of the tag device 910.

<Processing by Tag Device>

A processing which occurs when the tag device 910 is read by the reader 120 during an i-th run (i being a natural number) will be described below.

Initially, a hash calculator 912 (equivalent to "second calculator") extracts each element $e_{u, vu}$ and a proper value $\gamma_k$ from the confidential value memory 911, and calculates the tag output information $a_{k, i} = G(s_{k, i})$ which is a hash value of a combination value (confidential value $s_{k, i}$) of bit trains including the extracted elements $e_{u, vu}$ and the proper value $\gamma_k$. In the embodiment 9, a confidential value and tag output information are chosen to be $s_{k, i} = \gamma_k | e_{1, v1} | \ldots | e_{u, vu} | \ldots | e_{d, vd}$ and $a_{k, i} = G(\gamma_k | e_{1, v1} | \ldots | e_{u, vu} | \ldots | e_{d, vd})$ Subsequently, the tag output information $a_{k, i}$ is delivered and the elements in the confidential value memory 911 are updated in the similar as in the embodiment 8.

<Processing by Reader>

This remains to be similar to the embodiment 8.

<Processing by Backend Apparatus>

A distinction over the embodiment 8 resides in that in place of the processing at step S176 in the embodiment 8 (FIG. 18), a hash calculator 933 (equivalent to "third calculator") reads a proper value $\gamma_n$ from the database memory 931 and calculates a hash value c of a combination value of bit trains including the hash value $H^{wu}(f_{u, 0})$ and the proper value $\gamma_n$. In this example, a hash value $c = G(\gamma_n | H^{w1}(f_{1, 0}) | \ldots | H^{wu}(f_{u, 0}) | \ldots | H^{wd}(f_{d, 0}))$ is calculated. In other respects, the processing is similar to the embodiment 8.

<Features of Embodiment 9>

[Impossibility of Tracing]

In the embodiment 9, the tag output information $a_{k, i} = G(s_{k, i})$ which is a hash value of a combination of bit trains including elements $e_{u, vu}$ and the proper value $\gamma_k$ is delivered from the tag device 910. The proper value $\gamma_k$ is a value which is inherent to each tag device 910. Accordingly, if a certain tag device is tampered with, it is impossible to determine the past tag output information of a different tag device which shares the element $e_{u, vu}$ from the hash value of data which are stored in the first mentioned tag device. Accordingly, an attacker cannot trace the different tag device.

Embodiment 10

An embodiment 10 is a modification of the embodiment 8, and differs from the embodiment 8 in that t kinds (t≧2) of manifold values z are stored in a manifold value memory of a tag device, and a hash value $a_{k, i} = G(s_{k, i})$ of a bit combination value (confidential value $s_{k, i}$) of each element $e_{u, vu}$ extracted from a confidential value memory and either one of the manifold values z is used as tag output information, with the confidential value memory being updated once for communication which counts t times.

Only a distinction over the embodiment 8 will be described below while omitting a description for what is common with the embodiment 8.

Figure 21:
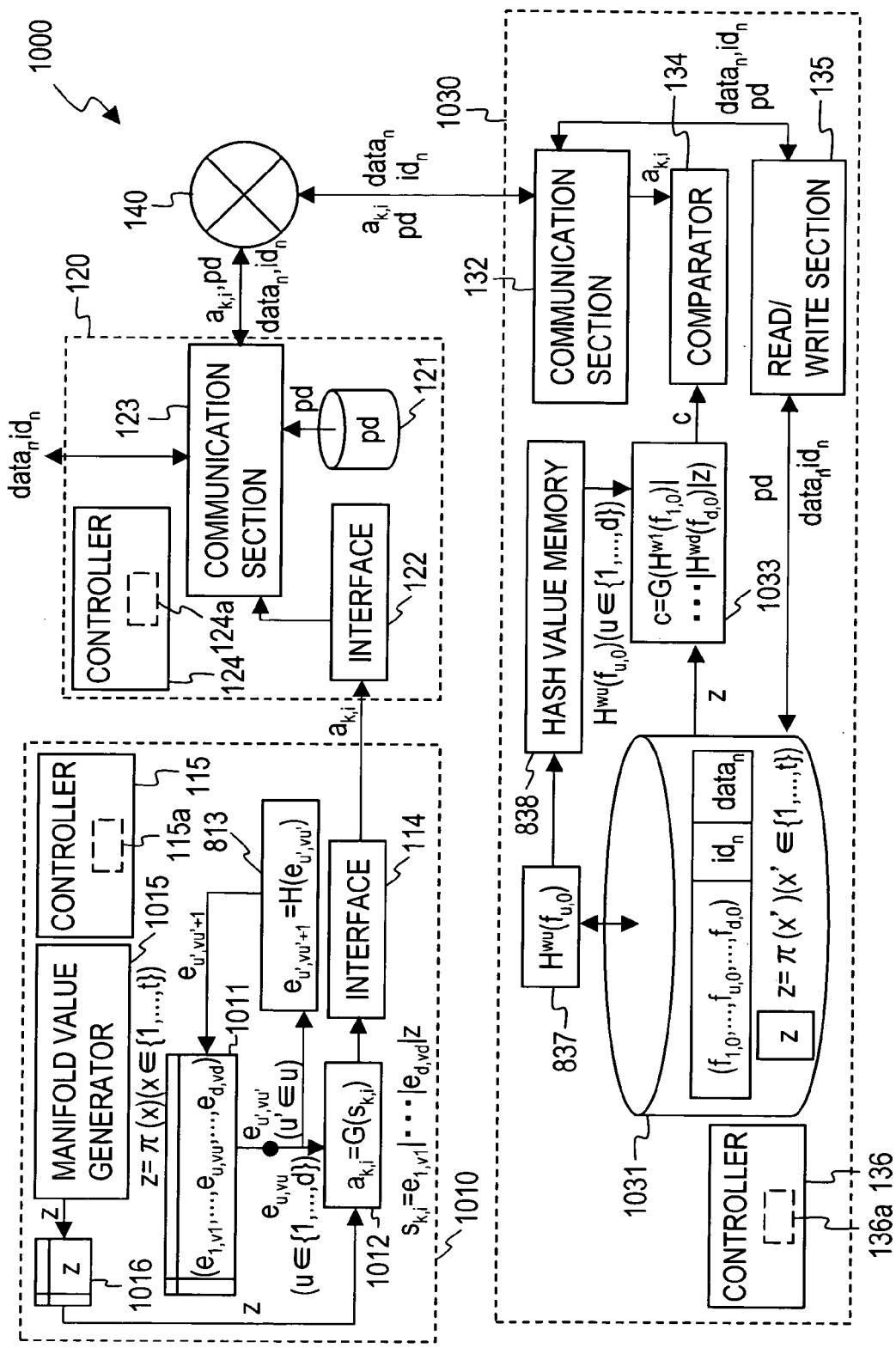
[FIG. 21] is an illustration of an overall arrangement of an automatic tag identification system of an embodiment 10.
Figure 22:
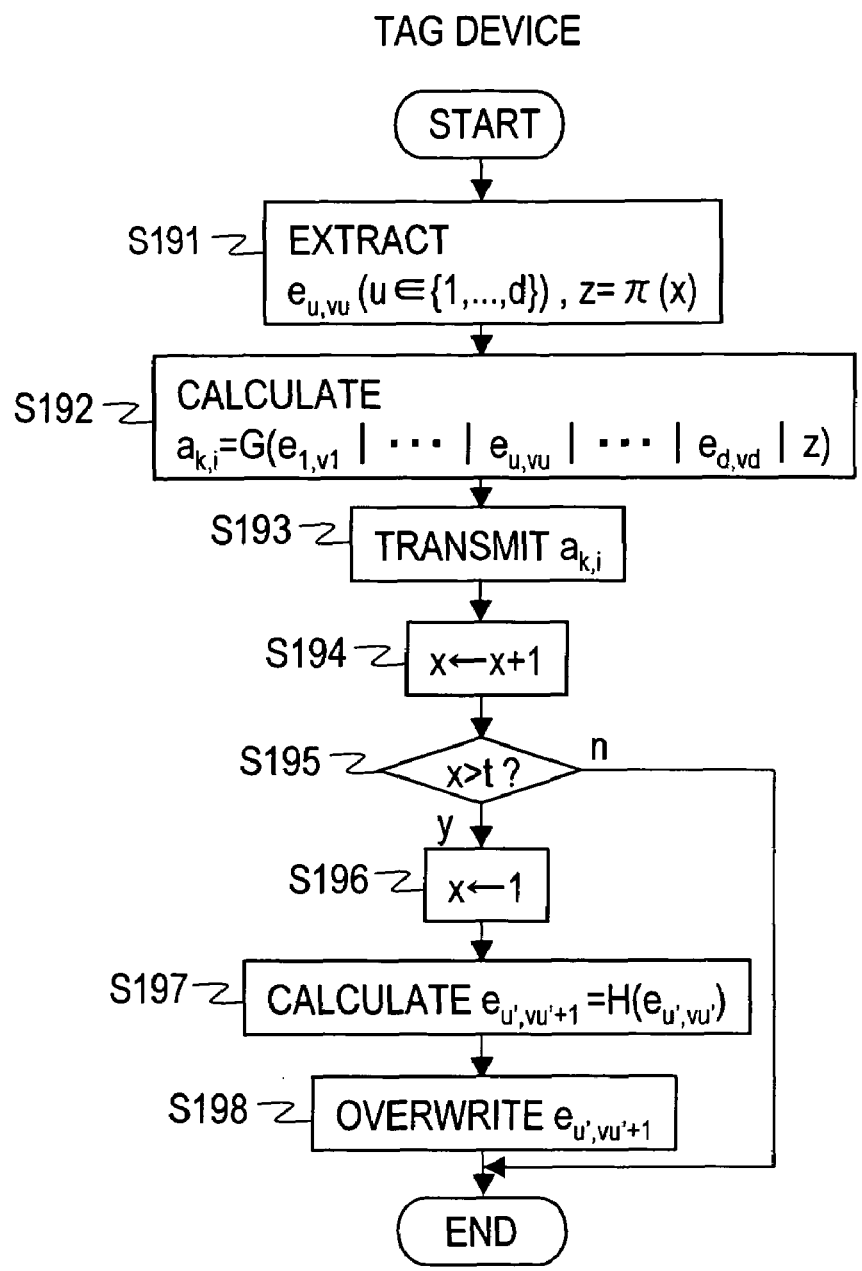
[FIG. 22] is a flow chart for describing processing by a tag device of the embodiment 10.
Figure 23:
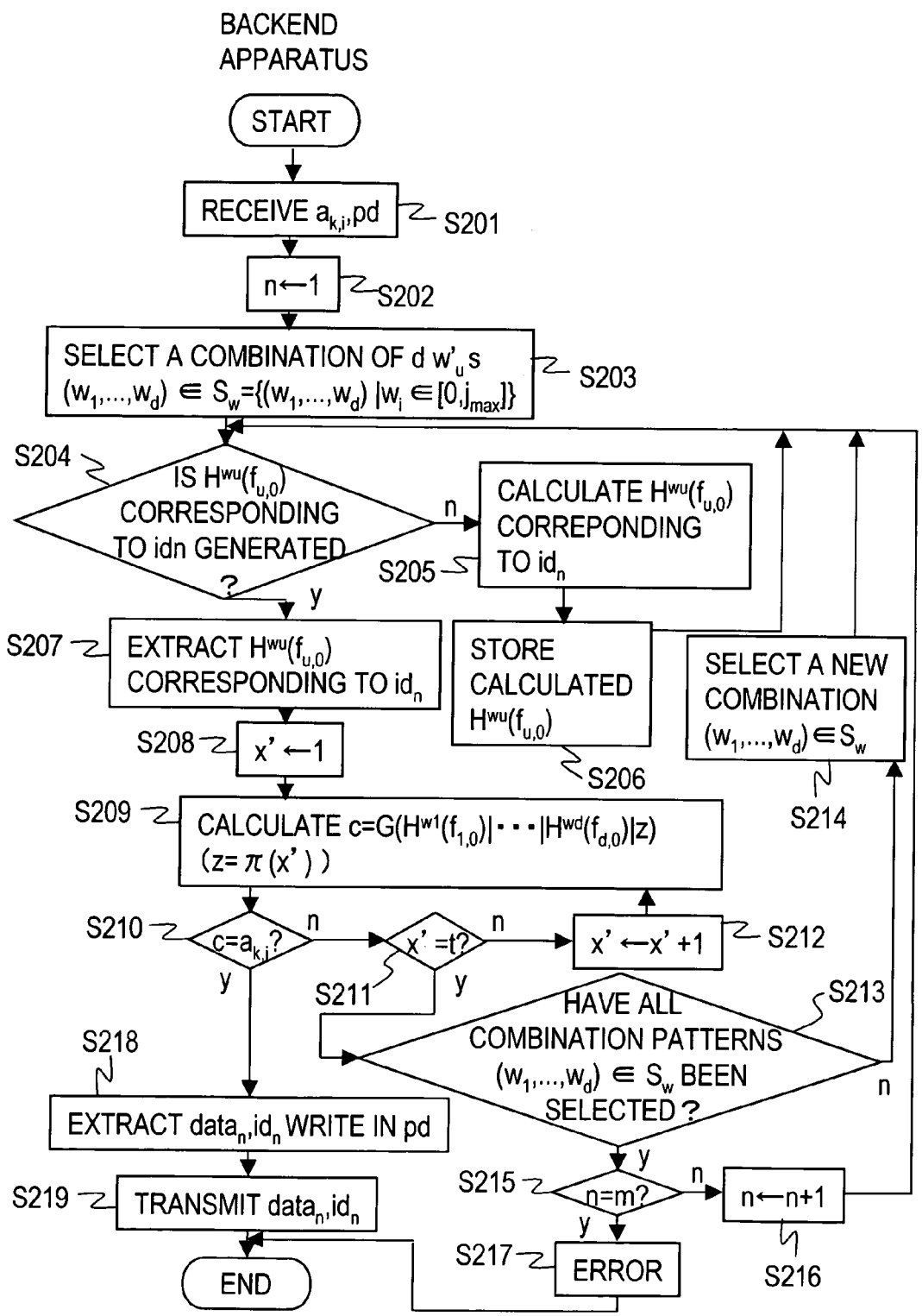
[FIG. 23] is a flow chart for describing processing by a backend apparatus of the embodiment 10.

FIG. 21 is an illustration of an overall arrangement of an automatic tag identification system 1000 of the embodiment 10. FIG. 22 is a flow chart for describing processing in a tag device 1010, and FIG. 23 is a flow chart for describing processing in a backend apparatus 1030. It is to be noted that in FIG. 21, functional arrangements which are common to the embodiment 1 and the embodiment 8 are designated by like characters as used in FIGS. 2 and 15. It is also to be noted that while FIG. 21 shows only one tag device 1010, there exist a plurality of tag devices 1010 in actuality.

A functional arrangement and a processing method of the present embodiment will be described below with reference to these Figures.

<Pre-Processing>

Differences over the embodiment 8 reside in that t kinds (t≧2) of manifold values z are generated in a manifold value generator 1015 of the tag device 1010 and are stored in a manifold value memory 1016 (equivalent to "first manifold value memory") and that t kinds (t≧2) of manifold values z which are shared by respective tag devices 1010 are stored in a database memory 1031 (equivalent to "second manifold value memory") of the backend apparatus 1030.

A manifold value generator 1015 can be illustrated by a counter which counts $z = 1 \ldots t$, a hash calculator which performs a calculation $z = H(\text{seed}, x)$, $x \in \{1, \ldots, t\}$, a hash calculator which performs a calculation $z = H^x(\text{seed})$, $x \in \{1, \ldots, t\}$ or the like. Here, seed represents an initial value. In a description to follow, a manifold value z will be represented as $z = \pi(x)$ and count $x \in \{1, \ldots, t\}$. Preferably manifold values $z = \pi(x)$ which correspond to respective values of $x \in \{1, \ldots, t\}$ do not coincide.

It is to be noted that the generation and storage of the manifold value z need not be performed during the pre-processing, but may be performed when processing a communication with the tag device 1010 or when processing a retrieval by the backend apparatus 1030.

<Processing by Tag Device>

A processing which occurs when the tag device 1010 is read by the reader 120 during an i-th run (i being a natural number) will be describes below. It is to be noted that the initial value (i=1) of the count x is 1, and the count x is saved in a memory 115a under the control of a controller 115.

Initially, a hash calculator 1012 (equivalent to "second calculator") extracts each element $e_{u, vu}$ from a confidential value memory 1011 and extracts either one of manifold values z (which is $z = \pi(x)$ in this example) from a manifold value memory 1016 (step S191). The hash calculator 1012 calculates a hash function $a_{k, i} = G(s_{k, i})$ of a bit combination value (confidential value $s_{k, i}$) of each extracted element $e_{u, vu}$ and manifold value z as tag output information (step S192). In this example, a confidential value is chosen to be $s_{k, i} = e_{1, v1} | \ldots | e_{u, vu} | \ldots | e_{d, vd} | z$, and tag output information is chosen to be $a_{k, i} = G(e_{1, v1} | \ldots | e_{u, vu} | \ldots | e_{d, vd} | z)$. It is to be noted the bit disposition sequence of each element $e_{u, vu}$ and the manifold value z and the number of manifold values z for bit combinations are not limited to this. Since it is presumed that manifold values $z = \pi(x)$ corresponding to $x \in \{1, \ldots, t\}$ do not coincide, it follows that as long as elements in the confidential value 1011 are not updated, the manifold value z which is used by the hash calculator 1012 in generating tag output information $a_{k, i}$ varies from communication to communication.

The generated tag output information $a_{k, i}$ is sent to an interface 114, which delivers the tag output information $a_{k, i}$ (step S193).

Subsequently, a controller 115 performs an arithmetic operation $x \leftarrow x + 1$ (count up) (step S194), and determines whether or not x>t (step S195). If it is determined that x>t does not apply, the processing in the tag device 1010 is terminated while maintaining the value x in the memory 115a.

On the other hand, if it is determined that x>t, the controller 115 changes the count x in the memory 115a to $x \leftarrow 1$ (step S196), and a hash calculator 1013 extracts at least part of elements $e_{u', vu'}$ ($u' \in \{1, \ldots, d\}$) from the confidential value memory 1011 and calculates a hash value $H(e_{u', vu'})$ of extracted element $e_{u', vu'}$ (step S197). The hash calculator 1013 overwrites this hash value $H(e_{u', vu'})$ into the confidential value memory 1011 as a new element $e_{u', vu'+1}$ (step S198). Any technique of selecting $u' \in \{1, \ldots, d\}$ may be used.

<Processing by Reader>

This remains to be similar to the embodiment 8.

<Processing by Backend Apparatus>

The tag output information $a_{k, i}$ and products distribution information pd which are transmitted from the reader 120 are received by a communication section 132 and stored in a memory 136a (step S201).

This triggers the controller 136 to substitute 1 for n to be stored in the memory 136a (step S202), to select a combination d $w_u$'s in the manner indicated below, and to store the combination in the memory 136a (step S203).

$$(w_1, \ldots, w_d) \in S_w = \{w_1, \ldots, w_d | w_u \in [0, j_{max}]\}$$

The controller 136 then refers to n and the combination of d $w_u$'s in the memory 136a and also refers to the hash value memory 838 to verify whether or not hash values $H^{wu}(f_{u, 0})$ which are results of applying $w_u$ times the hash function H to d initial elements $f_{u, 0}$ ($u \in \{1, \ldots, d\}$) corresponding to tag ID information $id_n$ are stored in the hash value memory 838 (whether or not they have been generated) (step S204). It is to be noted that the super-index wu in $H^{wu}(f_{u, 0})$ represents $w_u$.

If it is determined that there exist some of the hash values $H^{wu}(f_{u, 0})$ corresponding to the tag ID information $id_n$ which have not yet been calculated, a hash calculator 837 extracts initial elements $f_{u, 0}$ corresponding to "some of the hash values $H^{wu}(f_{u, 0})$ corresponding to tag ID information $id_n$ which have not yet been calculated" from the database memory 1031, and calculates the values $H^{wu}(f_{u, 0})$ by applying $w_u$ times the hash function H to these initial elements $f_{u, 0}$ (step S205). The calculated hash values $H^{wu}(f_{u, 0})$ are stored in the hash value memory 838 (step S206), then returning to the processing at the step S204.

On the other hand, if it is determined at the step S204 that all of hash values $H^{wu}(f_{u, 0})$ corresponding the tag ID information $id_n$ have been generated, the controller 136 causes, while referring to n and the combination of d $w_u$'s in the memory 136a, a hash calculator 1033 (equivalent to "third calculator") to extract a hash value $H^{wu}(f_{u, 0})$ which is a result of applying $w_u$ times the first function F1 to each of d initial elements $f_{u, 0}$ ($u \in \{1, \ldots, d\}$) corresponding to the tag ID information $id_n$ (step S207). The controller 136 sets up a count x' of 1 and stores it in the memory 136a (step S208) and extracts a manifold value $z = \pi(x')$ from the database memory 1031 to be fed to the hash calculator 1033. The hash calculator 1033 then calculates a calculated value c by applying the hash value G to a bit combination value of the hash value $H^{wu}(f_{u, 0})$ and the manifold value z (step S209). The calculated value c can be illustrated as $c = G(H^{w1}(f_{1, 0}) | \ldots | H^{wu}(f_{u, 0}) | \ldots | H^{wd}(f_{d, 0}) | z)$, for example, but the bit disposition sequence of each hash values $H^{wu}(f_{u, 0})$ and the manifold value z and the number of the manifold value z which are used in the bit combination are not limited to this. However, there is a requirement that the sequence thereof or the like should be related to the bit disposition sequence of elements in the hash calculator 1012 of the tag device 1010.

The comparator 134 then reads tag output information $a_{k, i}$ from the memory 136a, receives the calculated value c from the hash calculator 1033, and compare them to determine whether or not $c = a_{k, i}$ (step S210). In this example, the hash value $c = G(H^{w1}(f_{1, 0}) | \ldots | H^{wu}(f_{u, 0}) \ldots | H^{wd}(f_{d, 0}) | z)$ and the tag output information $a_{k, i}$ are compared against each other.

In the event it is determined that these do not match, the controller 136 determines whether or not x' in the memory 136a is t (step S211). If it is determined that x'=t does not apply, the controller 136 updates x' in the memory 136a by x'+1 and then causes the processings at step S209 and subsequent steps to be executed (step S212). On the other hand, if it is determined that x'=t, the controller 136 determines, by referring to the memory 136a, whether or not all of d combination patterns $(w_1, \ldots, w_d) \in S_w$ are already selected (step S213).

If it is determined that there exist some combination patterns which are not yet selected, the controller 136 selects a new combination $(w_1, \ldots, w_d) \in S_w$, stores it in the memory 136a (step S214) and causes the processings at and subsequent to step S204 to be executed for this new combination and n. On the other hand, if it is determined at step S213 that all of combination patterns have been selected, the controller 136 determines whether or not n=m by referring to n in the memory 136a (step S215). If it is determined that n=m does not apply, the controller 136 updates n in the memory 136a by n+1 (step S216), and causes the processings at and subsequent to step S204 to be executed. However, if it is determined that n=m, an error termination of the processing results (step S217).

It is to be noted that the processings which take place at steps S204~216 are equivalent to re-executing the processings in the hash calculator 1033 and the comparator 134 by changing the value of at least part of n, $w_u$, and z under the control of the controller 136 when the tag output information $a_{k, i}$ and the calculated value c do not match.

On the other hand, if it is determined at step S210 that the hash value c matches the tag output information $a_{k, i}$, the read/write section 135 selects tag ID information $id_n$ which is related to the combination of a plurality of initial elements $f_{u, 0}$ corresponding to the hash value c from the database memory 1031, extracts this tag ID information $id_n$ and its corresponding data $data_n$ and sends them to the communication section 132 under the control of the controller 135. In addition, the read/write section 135 receives products distribution information pd from the memory 136a, and writes this products distribution information pd as data $data_n$ which corresponds to the tag ID information $id_n$ into the database memory 1031 as an addition (step S218). The tag ID information $id_n$ and data $data_n$ which are sent to the communication section 132 are transmitted to the reader 120 through the network 140 (step S219).

<Features of Embodiment 10>

<Impossibility of Tracing>

In the tag device 1010 in the present embodiment, a hash value of a bit combination value of elements $e_{u, vu}$ and the manifold values z is used as tag output information $a_{k, i}$. Accordingly, the output value can be changed by changing the manifold value z without updating the elements $e_{u, vu}$. On account of one-way nature of the hash function, a correlation with the output value which is changed in this manner cannot be obtained. In addition, because the manifold value z assumes t kinds of values, it is possible for the tag device to perform t times at maximum of communication which it is difficult to trace without updating elements $e_{u, vu}$.

[Efficiency]

In the tag device 1010 of the present embodiment, elements $e_{u, vu}$ in the confidential value memory 11 are updated only once for t times of communications. Accordingly, the amount of the calculations required for updating processing in the tag device 1010 can be reduced by a factor of 1/t.

Also, a comparison between the hash value c and the tag output information $a_{k, i}$ which takes place in the backend apparatus 1030 can take place T times at maximum without changing a combination of hash values $H^{wu}(f_{u, 0})$. Accordingly, if a permissible number of communications of the tag device 210 (a maximum value of accesses from the reader 120 to the tag device 1010) were increased, the hash processing in the backend apparatus 1030 does not increase significantly.

Embodiment 11

An embodiment 11 is a modification of the embodiment 10, and differs from the embodiment 10 in that a manifold value $z_u$ which assumes $t_u$ kinds ($t_u \geq 2$) of values is stored for each u ($u \in \{1, \ldots, d\}$) in a manifold value memory of a tag device, and a tag output information $a_{k,i} = G(e_{1,v1}|z_1|\ldots|e_{d,vd}|z_1)$ for a bit combination value of each element $e_{u,vu}$ extracted from a confidential value memory and either one of manifold values $z_u$ is used as an output value. In addition, while the update of each element $e_{u,vu}$ in the confidential value memory which corresponds to each u ($u \in \{1, \ldots, d\}$) is performed once for commutations of t times, in the embodiment 11, the point in time of communication when element $e_{u,vu}$ is updated is shifted, so that either one of elements $e_{u',vu'}$ ($u' \in \{1, \ldots, d\}$) in the confidential value memory is updated each time the tag device delivers the tag output information $a_{k,i}$. This prevents the tag device from being traced if the tag device is tampered with at any point in time of communication.

Figure 24:
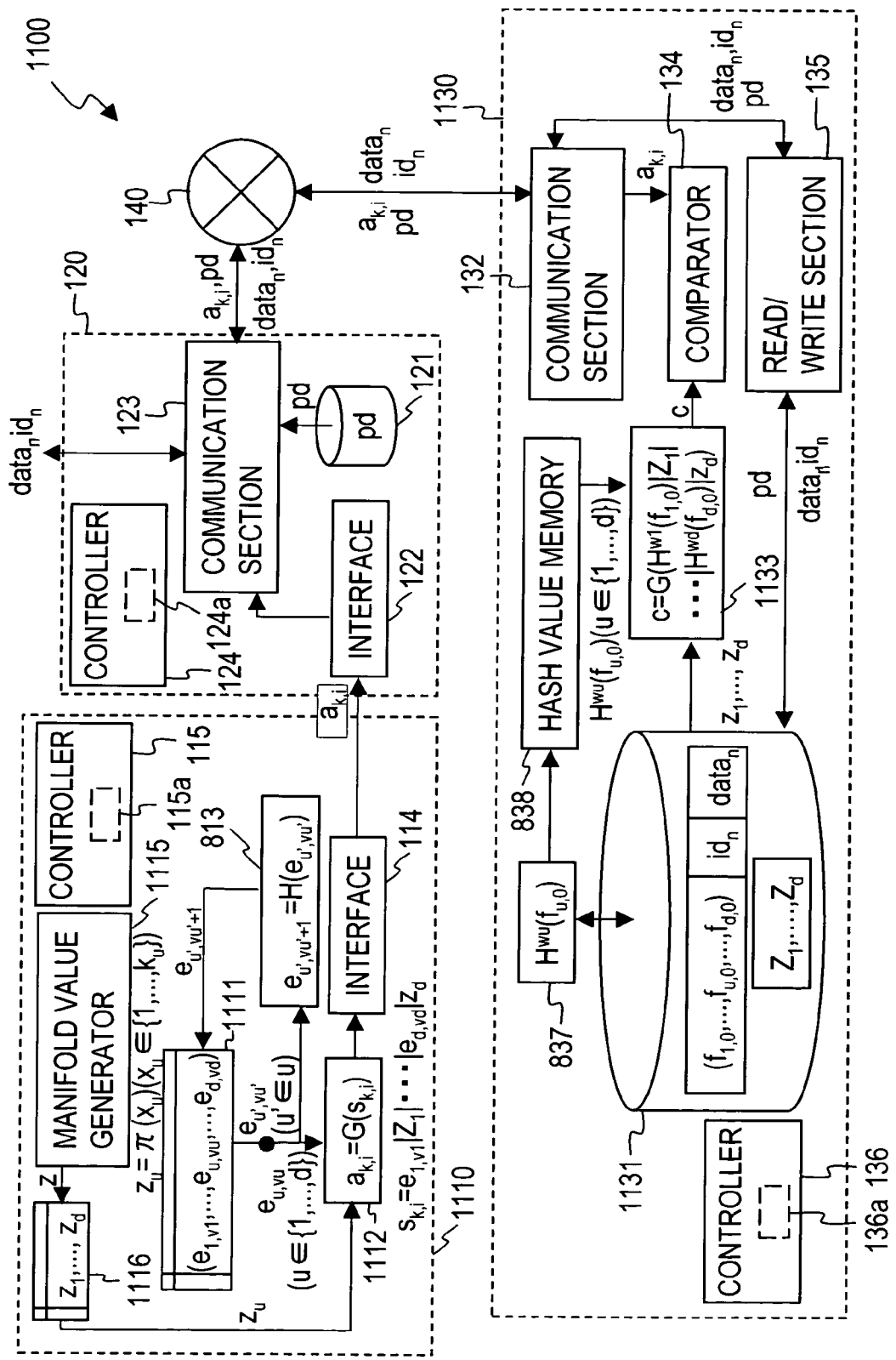
[FIG. 24] is an illustration of an overall arrangement of an automatic tag identification system of an embodiment 11.
Figure 25:
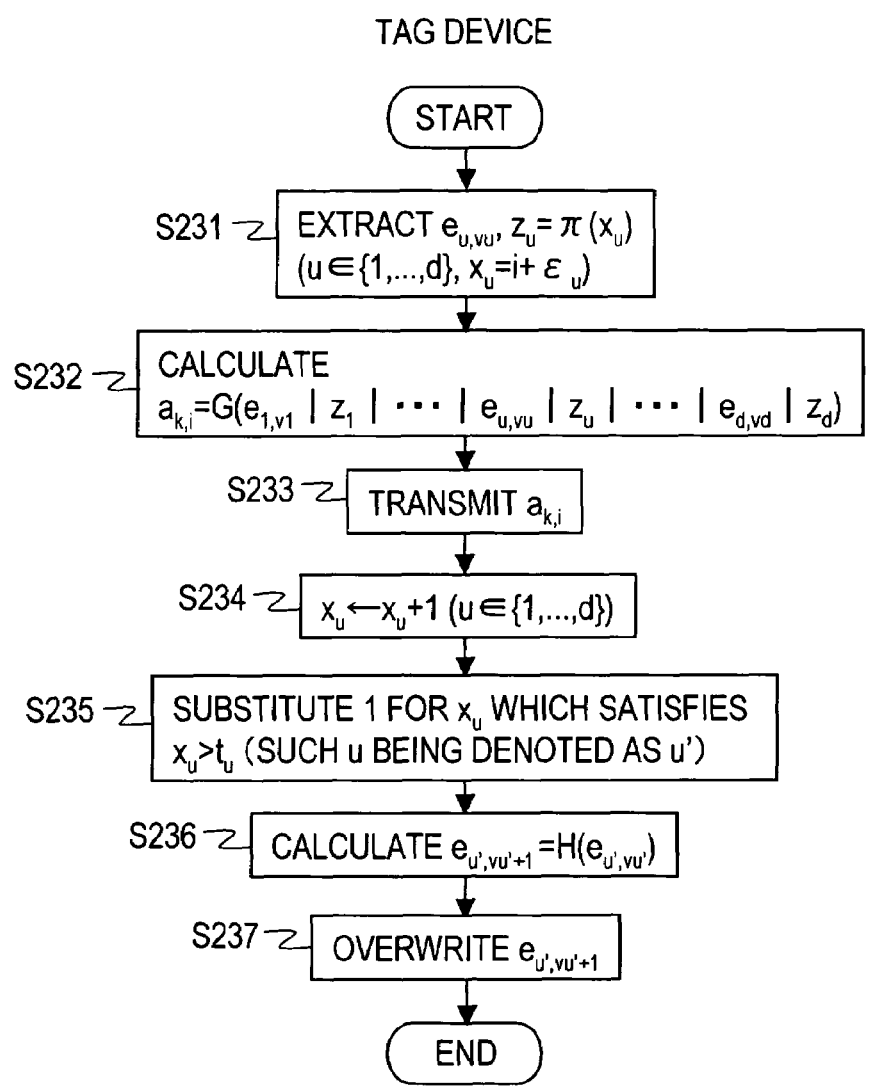
[FIG. 25] is a flow chart for describing processing by a tag device of the embodiment 11.
Figure 26:
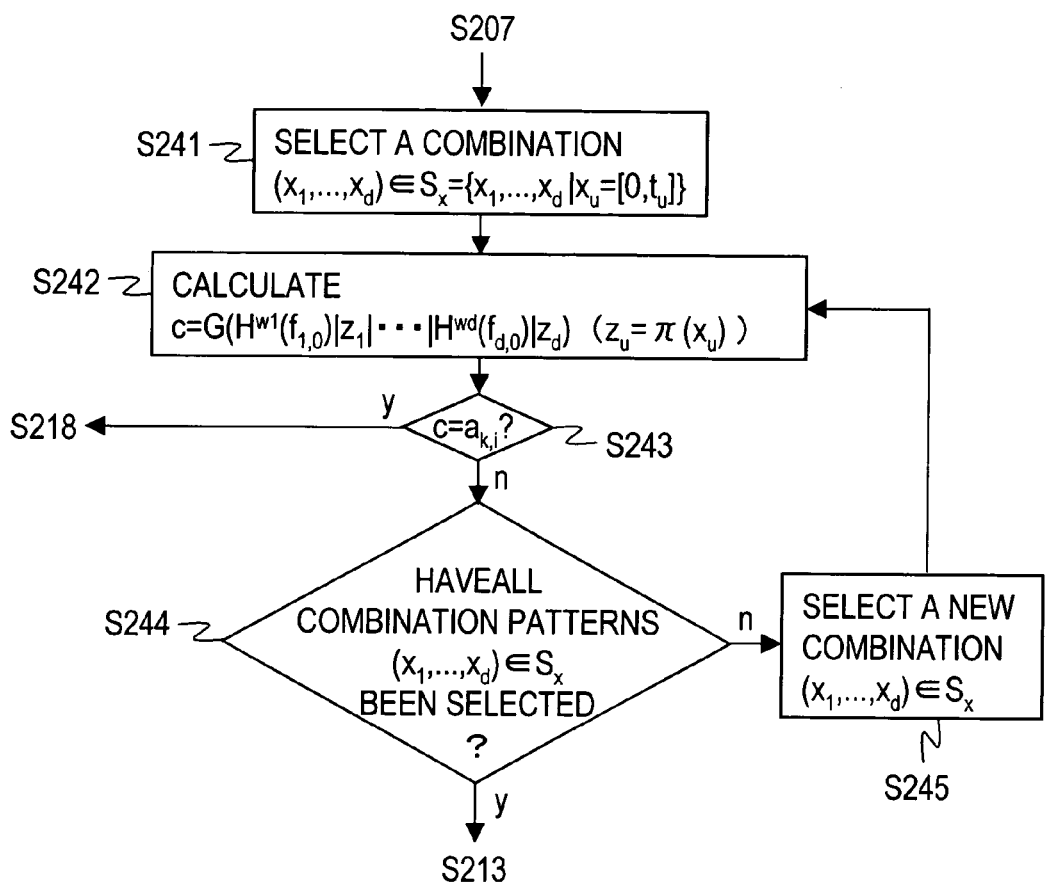
[FIG. 26] is a flow chart for describing part of processing by a backend apparatus of the embodiment 11.

Only a distinction over the embodiment 1 and the embodiment 10 will be described below while omitting a description for what is common with the embodiment 1 and the embodiment 10;

FIG. 24 is an illustration of an overall arrangement of an automatic tag identification system 1100 of an embodiment 11. FIG. 25 is a flow chart for describing processing by a tag device 1110, and FIG. 26 is a flow chart for describing part of processing by a backend apparatus 1130. It is to be noted that in FIG. 24, functional arrangements which are common to the embodiment 1 and 8 are designated by like characters as used in FIGS. 2 and 15. In addition, while only one tag device 1110 is shown in FIG. 24, in actuality, there are a plurality of tag devices 1110.

A functional arrangement and a processing method of the present embodiment will be described below with reference to these Figures.

<Pre-Processing>

Differences with respect to the embodiment 10 reside in that a manifold value generator 1115 of a tag device 1110 sets up a manifold value $z_u$ which assumes $t_u$ kinds ($t \geq 2$) of values for each u ($u \in \{1, \ldots, d\}$) and it is stored in a manifold value memory 1116 (equivalent to "first manifold value memory") and that a manifold value $z_u$ which assumes $t_u$ kinds ($t \geq 2$) of values for each u ($u \in \{1, \ldots, d\}$) is stored in the database memory 1131 (equivalent to "second manifold value memory") of a backend apparatus 1130. It is to be noted that manifold values $z_u$ which are stored in the database memory 1131 are same as manifold values $z_u$ which are stored in respective tag devices 1110.

The manifold value generator 1115 can be illustrated by a counter which counts $Z_u = 1 \ldots t_u$ for each u ($u \in \{1, \ldots, d\}$), a hash calculator which performs a calculation of $Z_u = H(\text{seed}, x_u)$, $x_u \in \{1, \ldots, t_u\}$ or a hash calculator which performs a calculation of $Z_u = H^{xu}(\text{seed})$, $X_u \in \{1, \ldots, t_u\}$. In the description to follow, manifold value $z_u$ is expressed as $z_u = \pi_u(x_u)$, $x_u \in \{1, \ldots, t_u\}$. Preferably, $\pi_u$ is set up such that for an equal value of u, manifold values $z_u = \pi_u(x_u)$ corresponding to $X_u \in \{1, \ldots, t_u\}$ do not coincide.

In the embodiment 11, each $x_u$ is expressed as $x_u = i + \in_u$ ($u \in \{1, \ldots, d\}$) where i represents the number of times a communication is made by the tag device 1110, and $\in_u$ represents a constant representing an offset from i of each $x_u$ (an integer which satisfies $0 \leq \in_u \leq r_{max}$), and where $r_{max}$ represents a maximum number of times an access is made from the reader 120 to the tag device 1110.

In addition, in the embodiment 11, $\in_u$ and $t_u$ are set up such that at any point in time when a communication is made, $x_u = t_u$ is always satisfied by either one of $x_u$. For example, $t_u$ corresponding to each u ($u \in \{1, \ldots, d\}$) always assumes an equal value while each $\in_u$ is set up such that a set of $\in_u$ ($u \in \{1, \ldots, d\}$) becomes a universal set of natural numbers less than $t_u$.

It is not necessary that the generation and the storage of manifold values $z_u$ be performed during the pre-processing, but may be performed at the time a communication with the tag device 1110 is processed or at the time a retrieval by the backend apparatus 1130 is processed.

<Processing by Tag Device>

A processing which takes place when the tag device 1110 is read by the reader 120 during an i-th run (i being a natural number) will be described below. It is to be noted that the count $x_u$ ($u \in \{1, \ldots, d\}$) has an initial value (at i=1) which is equal to $1 + \in_u$, and each count $x_u$ is saved in a memory 115a under the control of the controller 115.

Initially, a hash calculator 1112 (equivalent to "second calculator") extracts each element $e_{u,vu}$ from a confidential value memory 1111 and extracts either manifold value $z_u$ (which is $z_u = \pi_u(x_u)$ in this example) from a manifold value memory 1116 (step S231). The hash calculator 1112 calculates tag output information $a_{k,i} = G(e_{1,v1}|z_1|\ldots|e_{d,vd}|z_d)$ which is a hash value of a bit combination value (confidential value $s_{k,i}$) of each extracted element $e_{u,vu}$ and either manifold value $z_u$ (step S232). Where $\pi_u$ is set up such that manifold values $z_u = \pi_u(x_u)$ corresponding to $x_u \in \{1, \ldots, t_u\}$ do not coincide for an equal value of u, it follows that as long as elements in the confidential value memory 1111 are not updated, the manifold value $z_u$ which is used by the hash calculator 1112 in generating tag output information $a_{k,i}$ varies from communication to communication. In addition, a bit combination sequence in the confidential value $s_{k,i} = e_{1,v1}|z_1|\ldots|e_{d,vd}|z_d$ is not limited thereto. The generated tag output information $a_{k,i}$ is sent to the interface 114, which transmit this tag output information $a_{k,i}$ (step S233).

Subsequently, in the controller 136, an arithmetic operation of $x_u \leftarrow x_u + 1$ ($u \in \{1, \ldots, d\}$) takes place for $x_u$ in the memory 136a (step S234). It is to be noted that in the embodiment 11, $\in_u$ and $t_u$ are set up such that $x_u = t_u$ applies for either $x_u$ at any point in time of any communication. Accordingly, as a result of the arithmetic operation $x_u \leftarrow x_u + 1$, $x_u > t_u$ applies for either $x_u$. The controller 136 then substitutes 1 for $x_u$ which satisfies $x_u > t_u$ (step S235). In the present embodiment, u which corresponds to this $x_u$ is represented by u'.

Subsequently, the hash calculator 813 extracts a partial element $e_{u,vu}$ (an element corresponding to above mentioned $u' \in \{1, \ldots, d\}$) from the confidential value memory 1111, and calculates a hash value $H(e_{u',vu'})$ of the extracted element $e_{u',vu'}$ (step S236). The hash calculator 813 overwrites the hash value $H(e_{u',vu'})$ as a new element $e_{u',vu'+1}$ into the confidential value memory 1111 (step S237), then completing a processing by the tag device 1110.

By the processing mentioned above, it follows that each time the interface 114 delivers tag output information $a_{k,i}$, the hash calculator 813 extracts at least one of elements $e_{u',vu'}$ ($u' \in \{1, \ldots, d\}$) from the confidential value memory 1111, calculates the hash value $H(e_{u',vu'})$ of the extracted element $e_{u',vu'}$, thus updating the confidential value memory 1111.

<Processing by Reader>

This remains to be similar to the first mode.

<Processing by Backend Apparatus>

A distinction of the embodiment 11 over the embodiment 10 resides in that the processing indicated at FIG. 26 is performed in place of processings at steps S208~S213 shown in FIG. 23.

Specifically, subsequent to the processing at the step S207, the controller 136 selects a combination of $(x_1, \ldots, x_d) \in S_x$ as indicated below, and stores it in the memory 136a (step S241).

$$(x_1, \ldots, x_d) \in S_x = \{x_1, \ldots, x_d | x_u \in [0, t_u]\}$$

The controller 136 refers to the combination of $(x_1, \ldots, x_d) \in S_x$ in the memory 136a, extracts d manifold values $z_u = \pi(x_u)$ ($u \in \{1, \ldots, d\}$) which correspond to this from the database memory 1131, and send them to a hash calculator 1133, which then calculates a calculated value c which is a result of applying the hash value G to a bit combination value of the hash value $H^{wu}(f_{u, 0})$ and the manifold value $z_u$ (step S242). The calculated value c can be illustrated by $c = G(H^{w1}(f_{1, 0})|z_1| \ldots H^{wu}(f_{u, 0})|z_u| \ldots |H^{wd}(f_{d, 0})| z_d)$, for example, but the bit disposition sequence of each hash value $H^{wu}(f_{u, 0})$ and the manifold value $z_u$ is not limited thereto. However, the sequence or the like is required to correspond to the bit disposition sequence of each element in the hash calculator 1112 of the tag device 1110.

The comparator 134 then reads tag output information $a_{k, i}$ from the memory 136a, receives the calculated value c from the hash calculator 1133, and compares them against each other to determine whether or not $c = a_{k, i}$ (step S243). In this example, the hash value $c = G(H^{w1}(f_{1, 0})|z_1| \ldots |H^{wu}(f_{u, 0})| \ldots |z_u| \ldots |H^{wd}(f_{d, 0})|z_d)$ and the tag output information $a_{k, i}$ are compare against each other.

In the event it is determined that these do not match, the controller 136 refers to the memory 136a to determine whether or not all of combination patterns $(x_1, \ldots, x_d) \in S_x$ have been selected (step S244). If it is determined that all of combination patterns $(x_1, \ldots, x_d) \in S_x$ have not been selected, the controller 136 selects a new combination $(x_1, \ldots, x_d) \in S_x$, and stores it in the memory 136a, whereupon it causes the processings at and subsequent to step S242 to be executed. On the other hand, if it is determined at step S244 that all of the combination patterns $(x_1, \ldots, x_d) \in S_x$ have been selected, the operation proceeds to step S213 in FIG. 23. On the other hand, if the processing at step S243 reveals a determination that $c = a_{k, i}$, the operation proceeds to step S218 in FIG. 23.

[Efficiency]

The comparison between the hash value c and the tag output information $a_{k, i}$ in the backend apparatus 1130 takes place $t_1 + t_2 + \ldots + t_{d-1} + t_d$ times at maximum without changing the combination of hash values $H^{wu}(f_{u, 0})$. Accordingly, if a permissible number of communications of the tag device 1110 (a maximum value of accesses from the reader 120 to the tag device 1110) increases, the amount of the processing in the backend apparatus 130 does not increase significantly.

[Impossibility of Tracing]

In the tag device 1110 of the embodiment 11, each time the tag output information $a_{k, i}$ is delivered, either element $e_{u', vu'}$ ($u' \in \{1, \ldots, d\}$) which is stored in the confidential value memory 1111 is updated by a hash chain. Accordingly, if the tag device 1110 is tampered with and an element $e_{u', vu'}$ within the confidential value memory 1111 is leaked to an attacker, the attacker cannot find a correlation between the element $e_{u', vu'-t}$ before the updating and an element $e_{u', vu'}$ after updating due to one-way nature of the hash function. Hence, the attacker cannot obtain a correlation between an element acquired from the confidential value memory 1111 and an output value which is delivered from the tag device in the past. In this manner, a tracing of the tag device 1110 can be prevented.

In addition, in the embodiment 11, if the tag device 1110 is tampered with to leak each manifold value $z_u$, any element $e_{u', vu'}$ which is stored in the confidential value memory 1111 is updated by overwriting. In this manner, an influence of the tag device 1110 being tampered with can be minimized.

It is to be noted that in the embodiment 11, $\in_u$ and $t_u$ are set up so that it is assured that $x_u = t_u$ is satisfied by either $x_u$ at any point in time of communication. By way of example, a choice is made such that $t_1 = t_2 = \ldots = t_d$, and a counter $x_u$ corresponding to each element $e_{u, vu}$ is displaced by 1 ($x_u = i + u/d$).

However, rather than choosing an equal value for $t_u$ ($u \in \{1, \ldots, d\}$) each counter $x_u$ corresponding to each element $e_{u, vu}$ may be displaced by a spacing which is determined by dividing $t_u$ having a largest value into d sections. In this instance, the requirement of perfectly forward secure may not be satisfied, but it is at least possible to suppress the influence of tampering.

Embodiment 12

An embodiment 12 is a modification of the embodiment 11. In a similar manner as in the embodiment 11, in the embodiment 12 also, a point in time of communication when each element $e_{u, vu}$ is updated is shifted. However, in the embodiment 12, each time a tag device delivers the tag output information $$a_{k,i} \sum_{u=1}^{d} t_u$$

times, either element $e_{u', vu'}$ is extracted, and a hash value $H(e_{u', vu'})$ of the extracted element $e_{u', vu'}$ is calculated.

Specifically, in response to each external access, the tag device of the embodiment 12 counts up a counter $x_u \in \{1, \ldots, t_u\}$ corresponding to either one of d elements $e_{u, vu}$ (for example, counts up by 1 in the sequence of $e_{1, v1} \ldots e_{d, vd}$). Because the counter $x_u$ corresponds to the manifold value $z_u$ which constitutes the tag output information $a_{k, i} = G(e_{1, v1}|z_1| \ldots |e_{d, vd}|z_d)$, this tag device is capable of delivering the tag output information $a_{k, i}$ having different values $$\sum_{u=1}^{d} t_u$$

times without updating each element $e_{u, vu}$. In the present embodiment, either element $e_{u, vu}$ is updated each time the tag output information $a_{k, i}$ is delivered $$\sum_{u=1}^{d} t_u$$

times. In this manner, the amount of calculations for updating the tag device is minimized while maintaining the manifoldness of output values of the tag device.

In the following, only a distinction over the embodiments 1 and 11 will be described while omitting a description for what is common with the embodiments 1 and 11.

Figure 27:
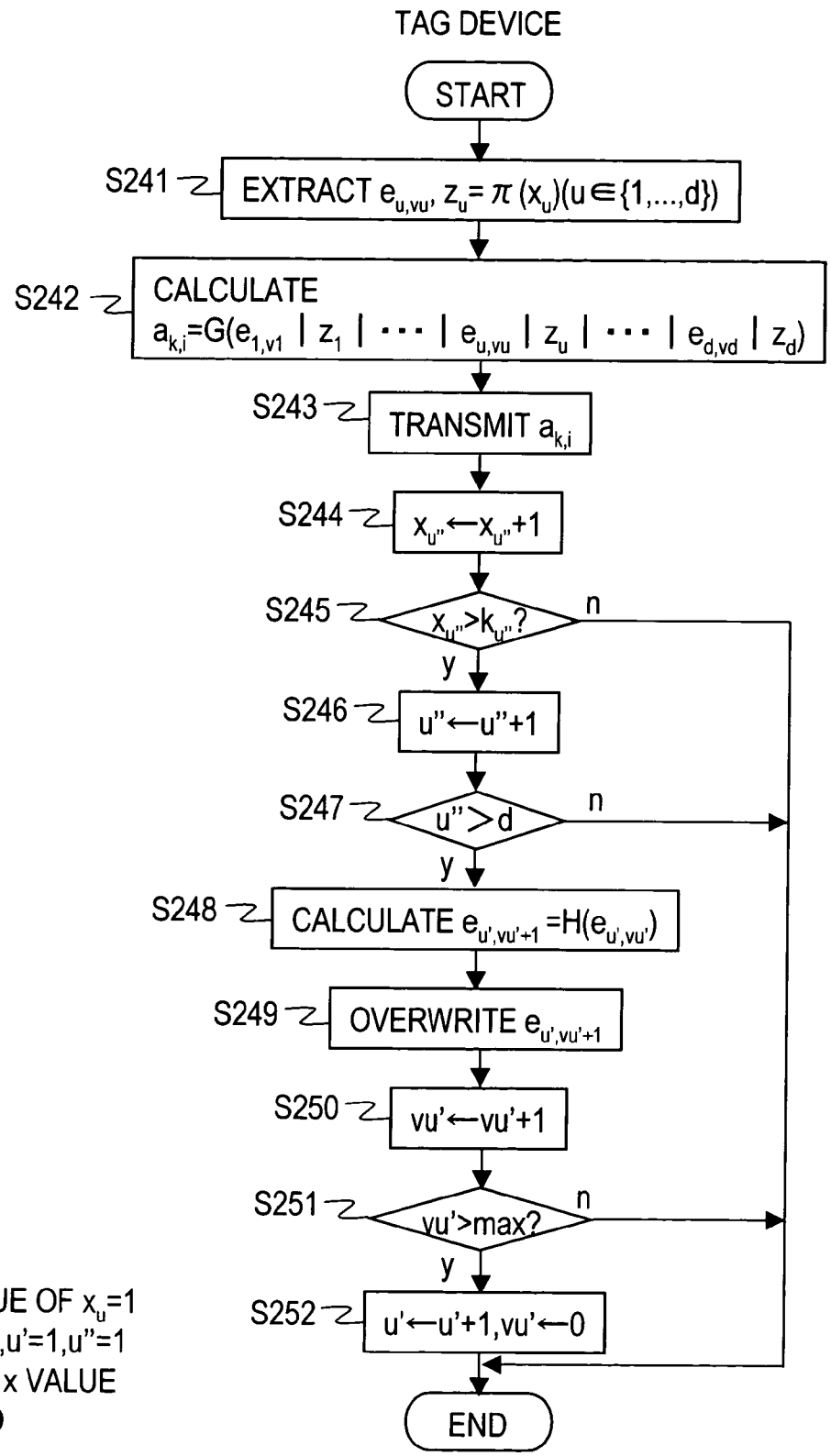
[FIG. 27] is a flow chart for describing a processing by a tag device of an embodiment 12.

FIG. 27 is a flow chart for describing processing by the tag device of the embodiment 12. It should be noted that the entire functional arrangement is similar to embodiment 11 (FIG. 24).

A processing method of the present embodiment will be described below with reference to these Figures.

<Pre-Processing>

In the embodiment 11, a choice is made that $x_u = i + \in_u$ ($u \in \{1, \ldots, d\}$) and $\in_u$ and $t_u$ are set up such that it is assured that $x_u = t_u$ is satisfied by either $x_u$ at any point in time of communication. In the embodiment 12, these limitations are not employed.

<Processing by Tag Device>

A processing which occurs when a tag device 310 is read by a reader 20 during an i-th run (i being a natural number) will be described below. It is to be noted that the count $x_u$ ($u \in \{1, \ldots, d\}$) has an initial value (at i=1) equal to 1, and u' and u' also have initial values of 1. It is to be noted that u' corresponds to an element $e_{u', vu'}$ being updated while u" corresponds to the count $x_{u''}$ of an element $e_{u'', vu''}$ which is being counted up. Each parameter is stored in a memory 136a under the control of the controller 136.

Initially, the hash calculator 1112 extracts each element $e_{u, vu}$ from the confidential value memory 1111, and extracts either manifold value $z_u$ (which is $z_u = \pi_u(x_u)$ in this example) from the manifold value memory 1116 (step S241). The hash calculator 1112 then calculates tag output information $a_{k, i} = G(e_{1, v1}|z_1| \ldots |e_{d, vd}|z_d)$ which is a hash value of a bit combination value of each extracted element $e_{u, vu}$ and either manifold value $z_u$ (step S242).

The generated tag output information $a_{k, i}$ is sent to the interface 114, which transmits the tag output information $a_{k, i}$ (step S243).

Subsequently, an arithmetic operation of $x_{u''} \leftarrow x_{u''} + 1$ ($u'' \in \{1, \ldots, d\}$) is applied to $x_{u''}$ in the memory by the controller 136 (step S244), thus determining whether or not $x_{u''} > t_{u''}$ (where $t_{u''}$ represents a maximum value of $x_{u''}$) (step S245). If it is determined that $x_{u''} > t_{u''}$ does not apply, processings by the tag device 1110 are terminated.

On the other hand, if it is determined that $x_{u''} > t_{u''}$, the controller 136 substitutes u"+1 for u" in the memory 136a (step S246), and determines whether or not u">d (step S247). If u">d does not apply, the processings by the tag device 1110 are terminated, but if u">d applies, the hash calculator 813 extracts an element $e_{u', vu'}$ (an element corresponding to u'∈{1, ..., d} mentioned above) from the confidential value memory 1111, and calculates a hash value $H(e_{u', vu'})$ of the extracted element $e_{u', vu'}$ (step S248). The hash calculator 813 then saves this hash value $H(e_{u', vu'})$ as a new element $e_{u', vu'+1}$ in the confidential value memory 1111 by overwriting (step S249).

Subsequently, an arithmetic operation of v u' ← vu'+1 (a number of updates) takes place in the hash calculator 813, for example, (step S250) and it is determined whether or not vu' has exceed a maximum value (max) of the number of updates for the element $e_{u', vu'}$ (step S251). If it is determined that vu'>max does not apply, processings by the tag device 1110 are terminated, but if vu'>max, arithmetic operations of u'←u'+1 (a change of the element being updated) and vu'←0 (resetting of the number of updates for the element being updated) take place in the controller 136 (step S252), and these results are stored in the memory 136a before terminating the processing by the tag device 1110.

By the processings mentioned above, it is seen that each time the interface 114 delivers tag output information $$a_{k, i} \sum_{u=1}^{d} t_u$$

times, the hash calculator 813 extracts either element $e_{u', vu'}$ from the confidential value memory 1111 and calculates a hash value $H(e_{u', vu'})$ of the extracted element $e_{u', vu'}$ to update the confidential value memory 11.

<Processing by Reader>

This remains to be similar to the embodiment 8.

<Processing by Backend Apparatus>

This remains to be similar to the embodiment 11.

<Features of Embodiment 12>

[Efficiency]

In the embodiment 12, either element $e_{u', vu'}$ is updated each time the tag device 1110 performs a communication $$\sum_{u=1}^{d} t_u$$

times, and accordingly an amount of calculations for updating processing in the tag device 1110 can be reduced. In other words, in the present embodiment, tag output information $a_{k, i} = G(e_{1, v1}|z_1| \ldots |e_{d, vd}|z_d)$ is generated and delivered while substituting manifold values which are equal in number to $$\sum_{u=1}^{d} t_u$$

for every communication. Accordingly, during the communications which are equal in number to $$\sum_{u=1}^{d} t_u,$$

the manifoldness of the output value of the tag device can be secured without updating the element $e_{u, vu}$. By updating either element $e_{u', vu'}$ for every $$\sum_{u=1}^{d} t_u$$

communications, the manifoldness of the output during the following $$\sum_{u=1}^{d} t_u$$

communications can be secured. Since the element $e_{u', vu'}$ is updated only once for $$\sum_{u=1}^{d} t_u$$

communications, the amount of calculations for updating in the tag device 1110 can be minimized.

[Impossibility of Tracing]

The tag device 1110 of the present embodiment is constructed such that each time the interface 114 delivers tag output information $$a_{k,i} \sum_{u=1}^{d} t_u$$

times, the hash calculator 813 updates the confidential value memory 1111. Accordingly, if the tag device 1110 is tampered with to leak elements $e_{u', vu'}$ in the confidential value memory 1111 to an attacker, the number of past output values from the tag device 1110 which the attacker can know is less than $$\sum_{u=1}^{d} t_u.$$

This allows the tracing of the tag device 110 to be suppressed while reducing the amount of processing for update calculations of the tag device 1110.

Embodiment 13

An embodiment 13 is a modification of the embodiments 1 to 4, and 6 to 12, and is characterized in two kinds of hash functions G(x) and H(x) used. In the description to follow, only these hash functions H(x) and G(x) will be described.

<No. 1>

The hash function G(x) in this example is hash(1|x) where hash represents a hash function for $\{0, 1\}^* \rightarrow \{0, 1\}^r$ where r represents a natural number, and the hash function H(x) is hash(0|x). It should be noted that α|β represents a bit combination of α and β. The hash function G(x) may be chosen to be hash(0|x) while the hash function H(x) may be chosen to be hash(1|x).

<No. 2>

The hash function H(x) (first function F1) in this example is hash(p|x) where r, s are natural numbers, hash represents a hash function for $\{0, 1\}^* \rightarrow \{0, 1\}^r$, and $p \in \{0, 1\}^s$. The hash function G(x) (second function F2) is hash(q|x) where $q \in \{0, 1\}^s$ and p≠q.

<No. 3>

The hash function H(x) (first function F1) is hash(pad(x, p)) when p padded to x (a padding of p to x) is represented by pad(x, p) where $p \in \{0, 1\}^s$. The function G(x) (second function F2) is hash(pad(x, q)) when q padded to x (a padding of q to x) is represented as pad(x, q) where $q \in \{0, 1\}_s$ and p≠q. A padding position (a position in a bit train) of p or q relative to x is not restricted in particular. By way of example, p or q may be bit combined before or after x or may be inserted into a bit train of x.

<No. 4>

The hash function H(x) (first function F1) is hash(x) where hash represents a hash function for $\{0, 1\}^* \rightarrow \{0, 1\}^r$, and the function G(x) (second function F2) is hash(rx) where rx represents a bit inversion of x.

<Effect of Embodiment 13>

In the present embodiment, while using only one kind of hash function, two kinds of hash calculations G(x), H(x) can be implemented without collapsing the properties thereof (one-way nature, delivering random values). This allows a circuit scale which constitutes a hash function to be reduced, with a consequence that the scale of a circuit which is assembled into a tag device can be made smaller, realizing a reduction in the cost of a tag device.

[Second Mode]

<Arrangement>

A second mode for carrying out the present invention will now be described.

In this mode, an updater which is provided externally of a tag device updates a privileged ID information which is stored in a tag device to a new privileged ID information, the association of which with respect to the privileged ID information is difficult to follow at a given opportunity.

<Arrangement>

Figure 28:
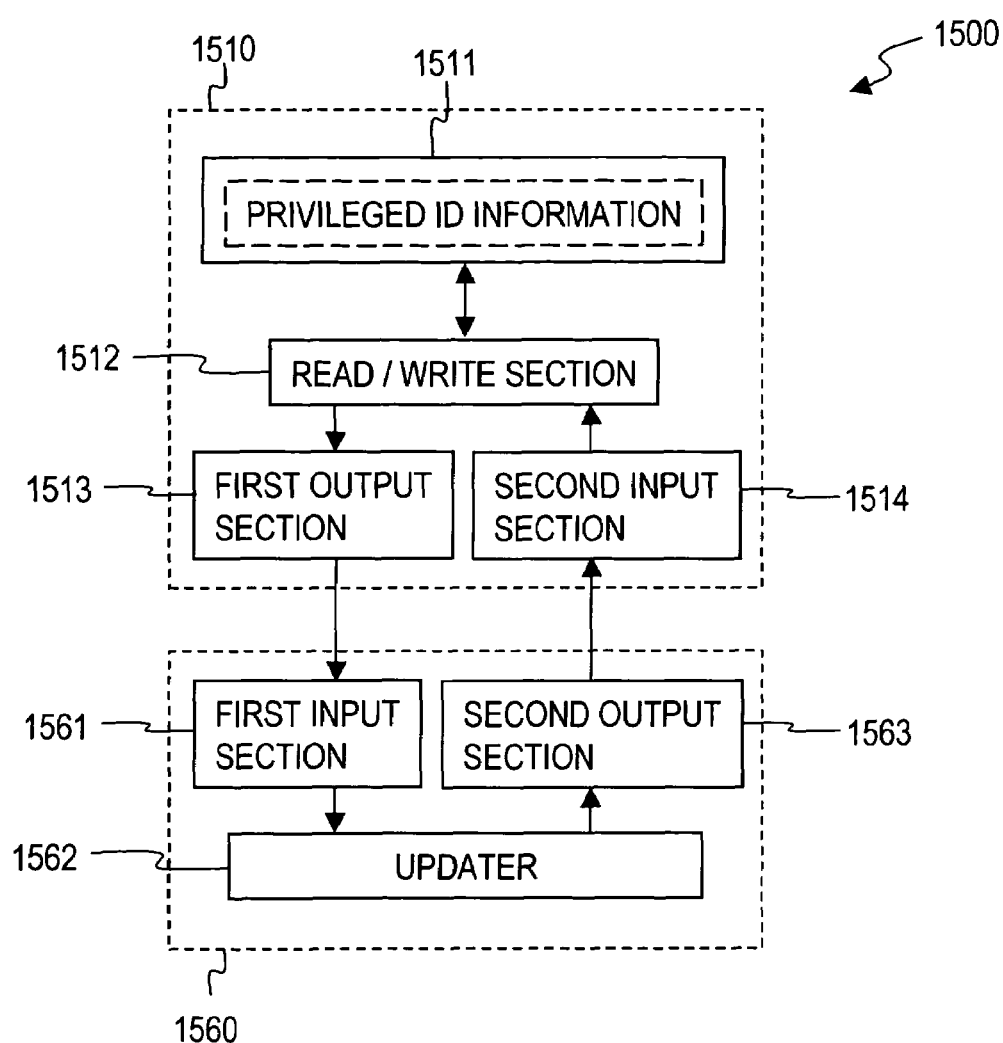
[FIG. 28] is a block diagram showing a schematic arrangement of a second mode for carrying out the invention.

FIG. 28 is a block diagram illustrating a schematic arrangement of the present mode.

An illustrated in FIG. 28, an updating system 1500 of the present mode comprises a tag device 1510 and a security server 1560 which is provided externally thereof.

A tag device 1510 comprises a confidential value memory which stores privileged ID information which has privileged a tag ID information which is inherent to each tag device, a read/write section 1512 electrically connected with the confidential value memory, a first output section 1513 and a second input section 1514 electrically connected with the read/write section 1512.

A security server 1560 comprises a first input section 1561, an updater 1562 electrically connected with the first input section 1561, and a second output section connected to the updater 1562.

<Update Processing of Privileged ID>

An updating of a privileged ID takes place as described below.

Initially, at a given opportunity, the read/write section 1512 of the tag device 1510 reads out privileged ID information $sid_h$ which is stored in the confidential value memory 1511, and the first output section 1513 delivers the privileged ID information $sid_h$ to the security server 1560 which is provided externally of respective tag devices.

The first input section 1561 of the security server 1560 accepts an input of privileged ID information $sid_h$. And the updater 1562 generates new privileged ID information $sid_h'$, the association of which with the privileged ID information $sid_h$ is difficult to follow, and the second output section 1563 delivers the new privileged ID information $sid_h'$ to the tag device 1510.

The second input section 1514 of the tag device 1510 accepts an input of the new privileged ID information $sid_h'$, and the read/write section 1512 stores the new privileged ID information $sid_h'$ in the confidential value memory 1511.

Embodiment 14

Figure 29:
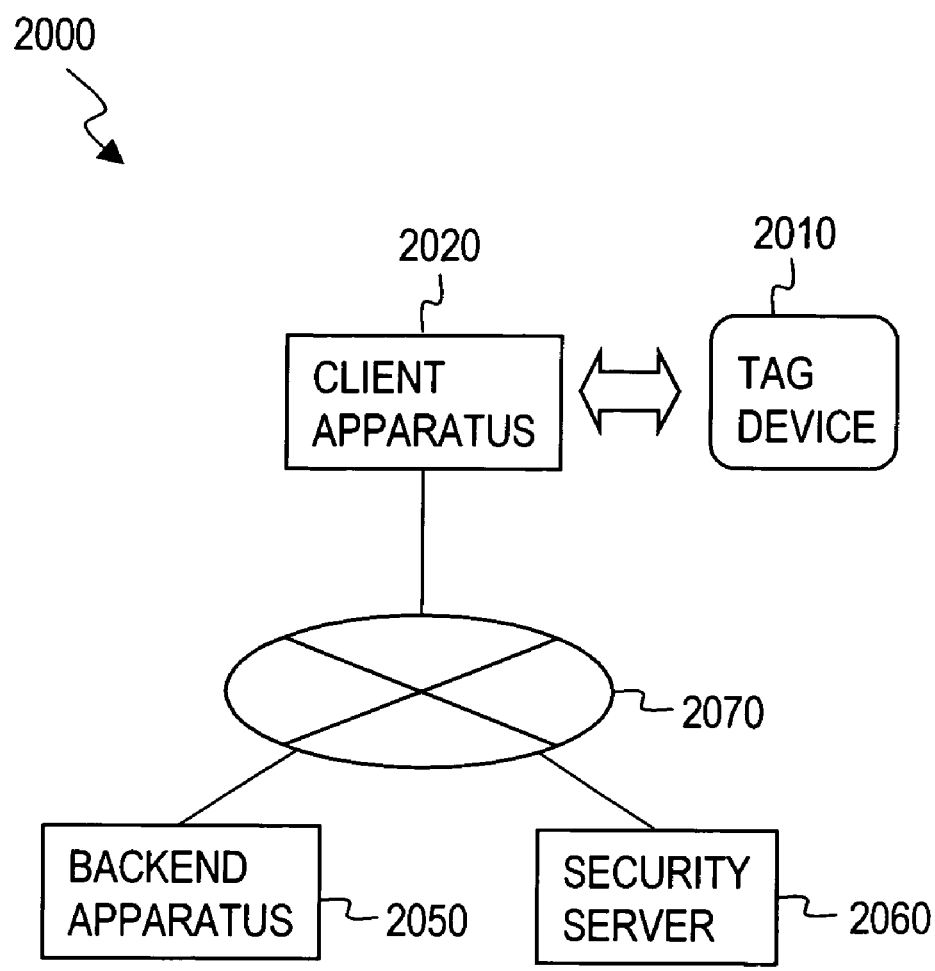
[FIG. 29] is a conceptual view illustrating an overall arrangement of an updater system of an embodiment 14.

FIG. 29 is a conceptual view illustrating an overall arrangement of an updating system 2000 of an embodiment 14.

As illustrated in this Figure, the updating system 2000 comprises a tag device 2010 such as a radio tag which is applied to goods, a client apparatus 2020, a backend apparatus 2050 which controls products distribution information or the like which relates to ID in plain text, and a security server 2060 which performs a restoration of ID, re-privileging of privileged ID (a server which re-privileges the privileged ID which is transmitted through the network and is equivalent to "updater"). The client apparatus 2020, the backend apparatus 2050 and the security server 2060 are connected to be capable of communication with each other through a network 2070 such as internet or the like. It is to be noted that the client apparatus 2020 has the function to operate as a reader described above in connection with the first mode. The effect which is implemented with the tag device, the reader and the backend apparatus in the first mode is implemented by the tag device 2010, the client apparatus 2020, the backend apparatus 2050 and the security server 2060. While one tag device 2010, client apparatus 2020, backend apparatus 2050 and security server 2060 are illustrated in this Figure, it should be understood that normally there are a plurality of tag devices, and a plurality of client apparatus, backend apparatus and security servers may also be provided.

The client apparatus 2020 of this example initially reads the privileged ID from the tag device 2010, and sends it to the security server 2060. The security server 2060 restores ID from the privileged ID, and returns this ID to the client apparatus 2020. Upon receiving the ID, the client apparatus 2020 accesses the backend apparatus 2050 to demand an entry of information such as ID, a date and time of reading, a location of reading, a temperature or the like and an acquisition of information relating to ID or the like. A manner of utilizing a proxy model can be contemplated that the client apparatus 2020 transmits the privileged ID to the security server 2060, which then directly accesses the backend apparatus 2050. What is characterizing the present embodiment is that an apparatus such as the security server 2060 or the like which is provided externally of the tag device 2010 re-privileges the privileged ID within the tag device 2010 (namely, updates the privileged ID to a separate privileged ID).

Figure 30:
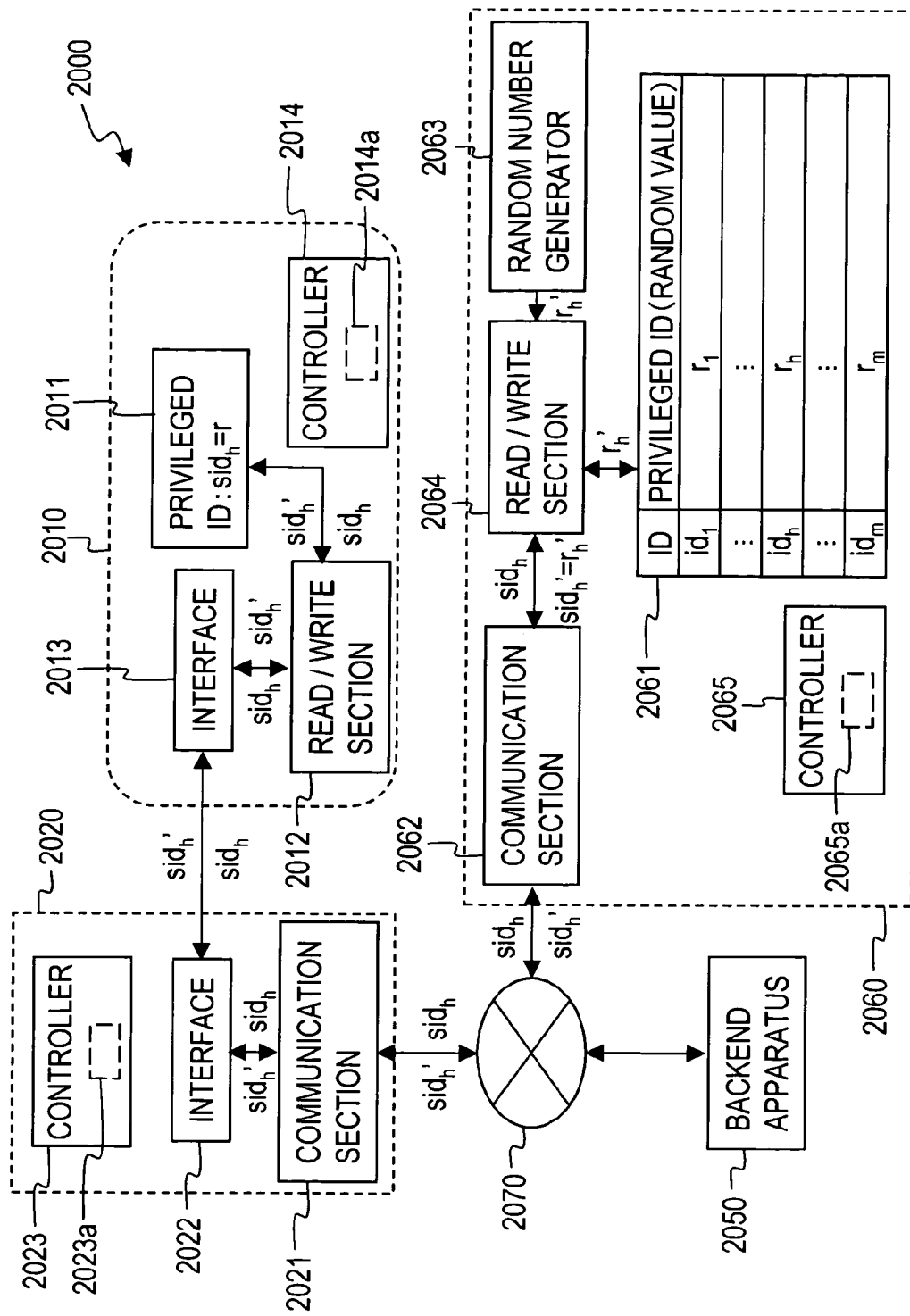
[FIG. 30] is a block diagram showing a functional arrangement of an updater system of the embodiment 14.

FIG. 30 is a block diagram illustrating a functional arrangement of an updating system 1 of the present embodiment.

<Tag Device>

A tag device 2010 in this example comprises a confidential value memory 2011, a read/write section 2012 (equivalent to "first read/write section"), an interface 2013 (equivalent to "first output section" and "second input section"), a memory 2014a and a controller 2014.

Here, each of the confidential value memory 2011 and the memory 2014a is an RAM (Random Access Memory) capable of read/write operation such as EEPROM (Electronically Erasable and Programmable Read Only Memory), FeRAM (Ferroelectric Random Access Memory), a flash memory, NV (Nonvolatile) RAM or the like, for example. The read/write section 2012 is a hardware which reads/writes data from or into the confidential value memory 2011 at a given address under the control of the controller 2014. The controller is an integrated circuit constructed to control processing by the entire tag device 2010, for example.

The interface 2013 is a hardware which inputs or outputs data with respect to the client apparatus 2020 by the radio or wire communication. Specifically, the interface 2013 comprises an encoding/decoding circuit which performs an encoding/decoding according to NRZ code, a Manchester code, Miller code, a single polarity RZ code or the like, a modulator/demodulator which performs a modulation/demodulation in accordance with ASK (Amplitude Shift Keying), PSK (Phase Shift Keying), FSK (Frequency Shift Keying) or the like, and an antenna such as a dipole antenna, a microstrip antenna, a loop coil, a cored coil or the like for performing a signal transmission and reception using a frequency in a low frequency band or ISM band (Industry Science Medical band). A communication system used may comprise an electromagnetic induction system or a radio wave system, for example.

The confidential value memory 2011 is electrically connected with the read/write section 2012, which is in turn electrically connected with the interface 2013. While not shown in this Figure, the controller 2014 is electrically connected to various parts of the tag device 2010.

<Client Apparatus>

The client apparatus 2020 of this example comprises an interface 2022, a communication section 2021, a memory 2024a and a controller 2024.

A products distribution information memory 121 is a magnetic recorder such as a hard disc unit, a flexible unit or the like, an optical disc unit such as DVD-RAM (Random Access Memory), CD-R (Recordable)/RW (ReWritable) or the like, a magneto-optical such as MO (Magneto-Optical disc) or the like, or a semiconductor memory such as EEPROM (Electronically Erasable and Programmable Read Only Memory), a flash memory or the like. The interface 2022 is a hardware which is similar to the example of the interface 2013. The communication section 2021 comprises LAN card, a modem, a terminal adapter or the like, and the controller 2023 is CPU (Central Processing Unit) of CISC (Complex Instruction Set Computer) type, RISC (Reduced Instruction Set Computer) type, or the like and including a memory 2023a.

The interface 22 and the communication section 2021 are electrically connected together, and while omitted from illustration in this Figure, the controller 2024 is electrically connected to various parts of the client apparatus 2020.

<Updater>

The security server 2060 comprises a communication section 2062 (equivalent to "first input section" and "second output section"), a random number generator 2063, a read/write section 2064 (equivalent to "second read/write section"), a privileged ID memory 2061, a memory 2065a and a controller 2065. It is to be noted that the random number generator 2063, the read/write section 2964 and the privileged ID memory 2061 constitute together "updating section". Specifically, the security server 2060 is constituted by a known computer of Neumann type which is formed by connecting together a CPU, an RAM, an ROM (Read Only Memory), an external memory such as a magnetic recorder or an optical disc unit, a LAN card, a modem, a terminal adapter and like through busses, for example, and which executes a given program. Each of processing functions indicated below are implemented by CPU which reads a program stored in the RAM and executes a processing in accordance therewith.

<Processing>

Figure 31:
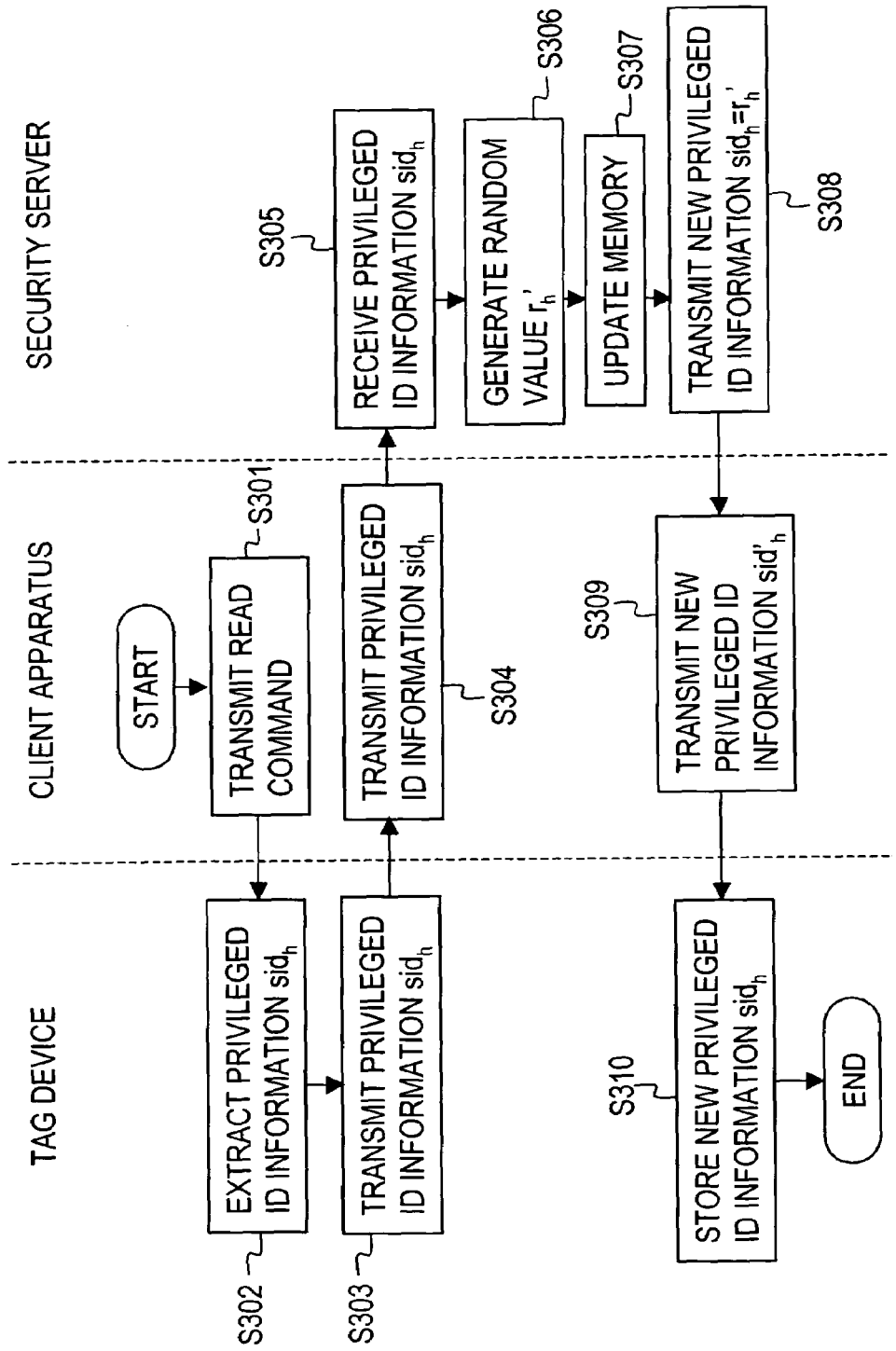
[FIG. 31] is a flow chart for describing a processing procedure of the embodiment 14.

FIG. 31 is a flow chart for describing a processing procedure of the present embodiment. A functional arrangement and a processing of the present embodiment will be described below with reference to FIGS. 29 to 31. It is to be understood that the tag device 2010, the client apparatus 2020 and the security server 2060 execute respective processings under the control of the controllers 2014, 2023 and 2065, respectively. Data which are processed are sequentially stored in the memory 2014a, 2023a or 2065a, which is accessed as a processing such as a calculation takes place, but a description for this will be omitted in the description to follow.

<Pre-Processing>

Privileged ID information in this example is a random value $r_h$ which is related to tag ID information $id_h$. A random value $r_h$ corresponding to the tag ID information $id_h$ which is inherent to the tag device 2010 is stored as privileged ID information $sid_h$ in the confidential value memory 2011 of the tag device 2010. Tag ID information $id_1, \ldots, id_m$ which corresponds to each tag device 2010 and privileged ID information or random values $r_1, \ldots, r_m$ which are related to the respective the tag ID information are stored in a privileged ID memory 2061 of the security server 2060. It is to be noted that h represents a natural number equal to or greater than 1 and equal to or less than m, and represents the number of each tag device 2010. m presents a total number of tag devices.

<Privileged ID Information Updating Processing>

Initially, utilizing some sort of authentication technology, an authentication of each other is made between the client apparatus 2020 and security server 2060. A communication between the client apparatus 2020 and security server 2060 takes place under encryption according to some sort of encryption technology.

An updating processing of the privileged ID information $sid_h$ is initiated by a trigger, which may be a passage through a location such as a porch which a man never fails to pass when he leaves a house, a number of times the privileged ID information stored in the tag device 2010 is used (a count reaching a given value) or the like. In response to the trigger, the client apparatus 2020 initially transmits a read command to the tag device 2010 from its interface 2022 (step S301). This read command is received by the interface 2013 of the tag device 2010, and this triggers the read/write section 2012 to extract the privileged ID information $sid_h$ from the confidential value memory 2011 (step S302). The extracted privileged ID information $sid_h$ is transmitted (delivered) from the interface 2013 to the client apparatus 2020 (step S303). The privileged ID information $sid_h$ is received by the interface 2022 of the client apparatus 2020, and is transmitted together with a solicitation to update the privileged ID information (a demand to re-privilege) by the communication section 2021 to the security server 2060 through the network 2070 (step 304).

Information such as the privileged ID information ($sid_h$) or the like is received by the communication section 2062 of the security server 2060 (its input is accepted) (step S305), and is sent to a read/write section 2064. This also triggers the random number generator 2063 (equivalent to "random value generator") to generate a random number $r_h'$ (step S306).

The generation of the random number $r_h'$ is carried out so as to avoid assuming a same value as privileged ID information in the privileged ID memory 2061. This generation takes place by using a pseudo-random number generating algorithm which is based on a calculation theory constructed with a one-way hash function such as SHA-1, for example, or the like, and the generated random number $r_h'$ is sent to the read/write section 2064. The read/write section 2064 retrieves (selects) tag ID information $id_h$ corresponding to the privileged ID information $sid_h$ from the privileged ID memory 2061, relates the random number $r_h'$ (equivalent to "random value") as a new privileged ID information $sid_h'$ to the tag ID information $id_h$, and stores it in the privileged ID memory 2061 (step S307). In addition, the read/write section 2064 sends the new privileged ID information $sid_h'=r_h'$ to a communication section 2062, which then transmits the new privileged ID information $sid_h'$ to the client apparatus 2020 (equivalent to "delivered to tag device") through the network 2070 (step S308).

The transmitted new privileged ID information $sid_h'$ is received by the communication section 2021 of the client apparatus 2020, and is transmitted to the tag device 2010 from the interface 2022 (step S309). The tag device 2010 receives the new privileged ID information $sid_h'$ at the interface 2013 (accepts an input) and sends it to the read/write section 2012, which sends the new privileged ID information $sid_h'$ to the confidential value memory 2011 to be stored therein (step S310). Subsequently, the tag device 2010 sends this new privileged ID information $sid_h'$ to the backend apparatus 2050 through the reader in response to a read demand from the reader (not shown). The backend apparatus 2050 sends the received privileged ID information $sid_h'$ to a database memory 1131, which receives it at its communication section 2062 and sends it to the read/write section 2064. The read/write section 2064 retrieves a random value which coincides with the privileged ID information $sid_h'$ from the privileged ID memory 2061, reads out the tag ID information $id_h$ which is related to the coinciding random value $r_h$ and sends it to the communication section 2062, which then transmits it to the backend apparatus 2050.

<Features of Embodiment 14>

In the present embodiment, the privileged ID information which is stored in the tag device 2010 can be updated at arbitrary timing. This allows a tracing of the tag device 2010 on the basis of a common character of privileged ID information which remains in the history of communications or the like to violate the privacy to be avoided. Since a random value is used as privileged ID information, an attacker cannot know the association between privileged ID information before and after the update. Accordingly, a firm prevention of a tracing of the tag device 2010 can be realized. In addition, since a complicated re-privileging processing is performed in the security server 2060 which is external to the tag device 2010, there is no need to provide a circuit which would be required for purpose of re-privileging processing within the tag device 2010 itself. As a consequence, the cost of the tag device 2010 itself can be suppressed low.

Embodiment 15

This embodiment is a modification of the embodiment 14, and differs from the embodiment 14 in that an encrypted text according to a common key encryption technique is used as privileged ID information. In the following, a distinction over the embodiment 14 will be principally described.

Figure 32:
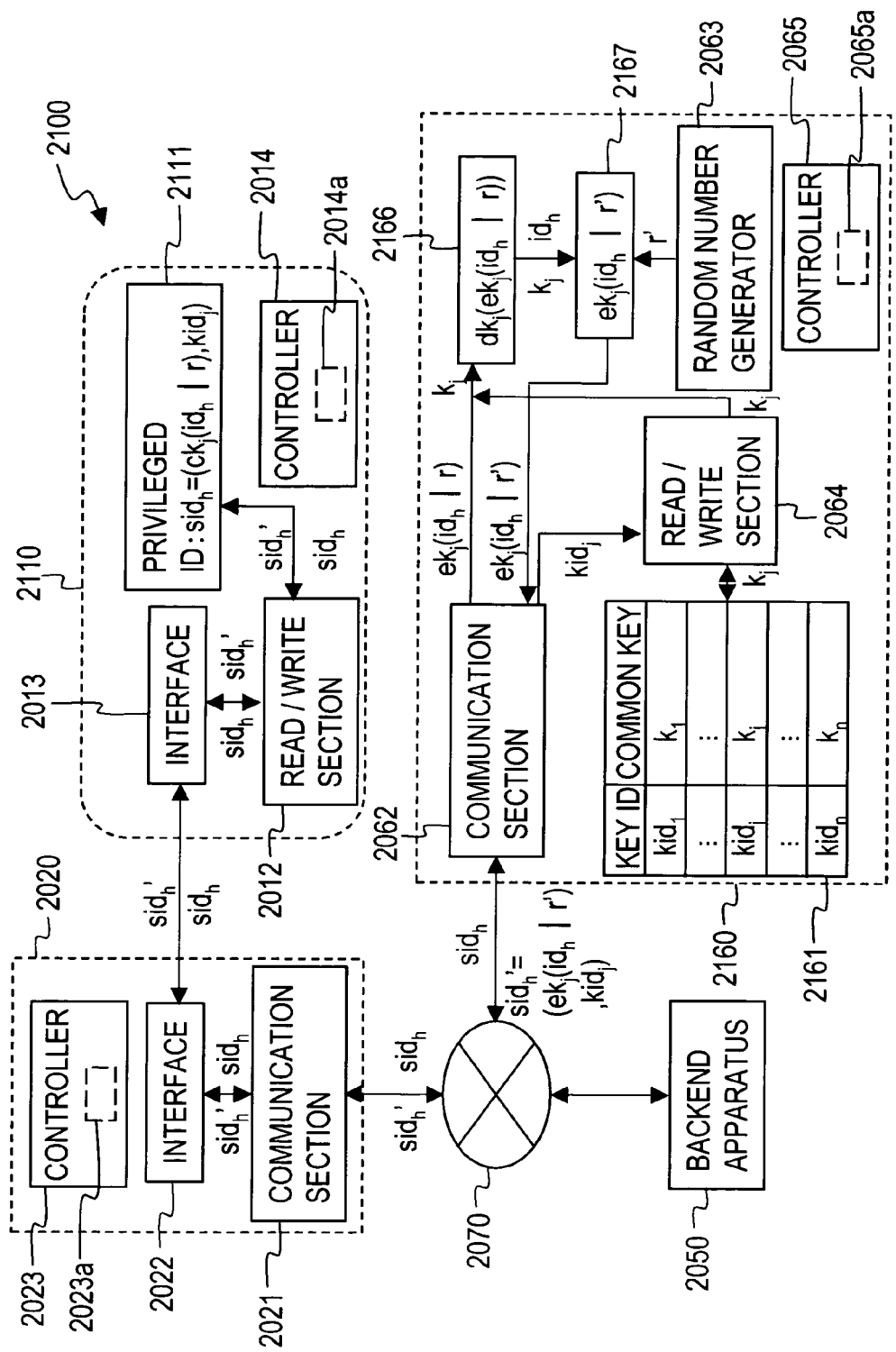
[FIG. 32] is a block diagram showing a functional arrangement of an updater system of an embodiment 15.
Figure 33:
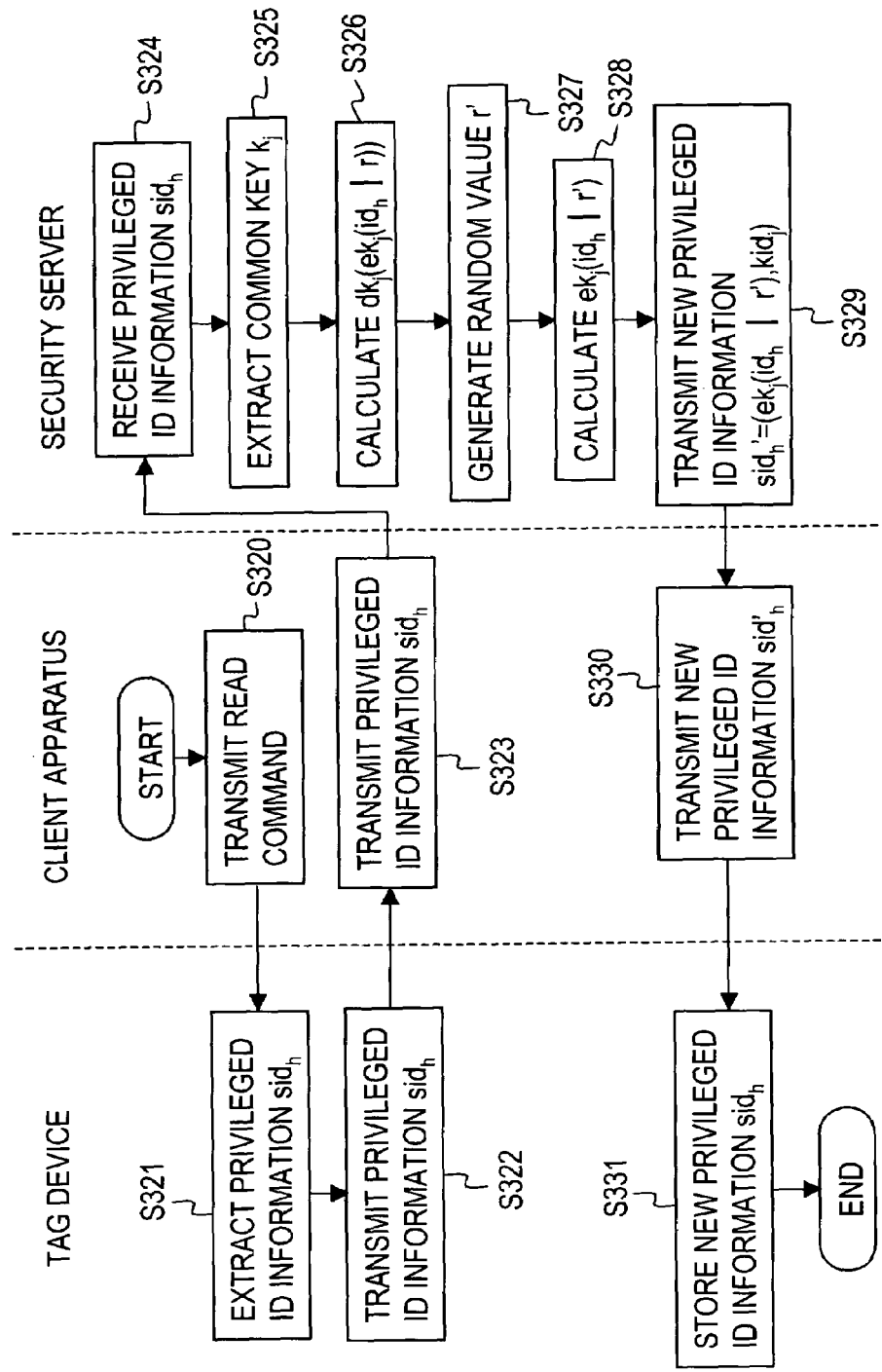
[FIG. 33] is a flow chart for describing a processing procedure of the embodiment 15.

FIG. 32 is a block diagram illustrating a functional arrangement of an updating system 2100 of the present embodiment. FIG. 33 is a flow chart for describing a processing procedure therefor. A functional arrangement and a processing of the present embodiment will be described below with reference to these Figures. It is to be noted that arrangements which are common to the embodiment 14 are designated in FIG. 32 by like characters as used in FIG. 30. A security server 2160 executes various processings under the control of a controller 2065. A key memory 2161, a read/write section 2064 and an ID extractor 2166, an encryptor 2167 and a random number generator 2063 constitute together "updating section".

<Pre-Processing>

Privileged ID information of this mode represents information including a first encrypted text according to a common key encryption technique such as AES and a key ID information which corresponds to the common key used in this encryption. In this example, privileged ID information of a tag device 2110 is defined as $sid_h=(ek_j(id_h|r), kid_j)$ where h is a natural number equal to or greater than 1 and equal to or less than m, and represents the number corresponding to the tag device 2110 and j is a natural number equal to or greater than 1 and equal to or less than n and represents the number corresponding to each key. m represents a total number of tag devices and n represents a total number of keys. In addition, $k_j$ represents a j-th common key, $kid_j$ key ID information corresponding to the common key $k_j$ and r a random number. In addition, $ek(\alpha)$ represents an encrypted text which is obtained by encrypting $\alpha$ according to the common key encryption technique using a common key k, and $\alpha|\beta$ represents a bit combination of $\alpha$ and $\beta$.

Privileged ID information $sid_h=(ek_j(id_h|r), kid_j)$ which corresponds to tag ID information $id_h$ is stored in the confidential value memory 2111 of the tag device 2110 of this example. Each key ID information $(kid_1, \ldots, kid_n)$ and a common key $(k_1, \ldots, k_n)$ of the common encryption technology are stored in a key memory 2161 of a security server 2160 (equivalent to "updater") in a manner relating to each other. In addition, information relating to the magnitude (bit length) and the padding position of a random number r appearing in $sid_h=(ek_j(id_h|r), kid_j)$ is stored in a memory 2065a.

It is to be noted that in this example, it is assumed that the total number m of the tag devices is sufficiently greater than the total number of keys (m>>n) such that identical key ID information is allotted to tag devices which are not related to each other. Specifically, for example, rather than allotting the identical key information to tag devices which are applied to a same variety of goods, the identical key ID information is allotted to tag devices which are applied to unrelated goods. In this manner, it is possible to prevent the variety of goods or a specific one of goods from being identified on the basis of the key ID information.

<Privileged ID Updating Processing>

In the similar manner an in the embodiment 14, the client apparatus 2020 transmits a read command to the tag device 2110 initially (step S320). The tag device 2110 extracts privileged ID information $(sid_h=(ek_j(id_h|r), kid_j))$ from the confidential value memory 2111 (step S321), and transmits it to the client apparatus 2020 (step S322). In response thereto, the client apparatus 320 transmits the privileged ID information $sid_h$ together with a solicitation for update to the security server 2160 (step 323).

Information including the privileged ID information $sid_h$ is received by the communication section 2062 of the security server 2160 (step S324), and the first encrypted text $ek_j(id_h|r)$ which constitutes the privileged ID information $sid_h$ is sent to an ID extractor 2166 while the key ID information $kid_j$ is sent to the read/write section 2064. $kid_j$ is also recorded in the memory 2065a.

Upon receiving the key ID information $kid_j$, the read/write section 2064 extracts the common key $k_j$ which corresponds to the key ID information $kid_j$ from the key memory 2161 and sends it to the ID extractor 2166 (step S325). Upon receiving it, ID extractor 2166 decrypts the first encrypted text $(ek_j(id_h|r))$ using the common key $k_j$ and extracts tag ID information $id_h$. Specifically, the ID extractor 2166 calculates $(id_h|r)$ from $id_h=dk_j(ek_j(id_h|r))$, and extracts $id_h$ using information relating to the magnitude and the padding position of the random number r which is stored in the memory 2065a (step S326). Here, $dk(\alpha)$ represents a decryption of an encrypted text a with the common key k. The calculated tag ID information $id_h$ is sent to an encryptor 2167 together with the common key $k_j$. The random number generator 2063 generates a random number r', and sends it to the encryptor 2167 (step S327). Using the common key $k_j$, the tag ID information $id_h$ and the random number r' which are sent thereto and information relating to the magnitude and the padding position of the random number which is stored in the memory 2065a, the encryptor 2167 generates (calculates) a second encrypted text $(ek_j(id_h|r'))$ (a second encrypted text being one, the association of which with the first encrypted text is difficult to follow), and sends it to the communication section 2062 (step S328).

The communication section 2062 transmits (delivers) the encrypted text $(ek_j(id_h|r'))$ which is sent thereto and the key ID information $kid_j$ in the memory 2065a as a new privileged ID information $(sid_h'=(ek_j(id_h|r'), kid_j))$ (step S329).

The new privileged ID information $sid_h'$ which is transmitted is received by the client apparatus 2020 through the network 2070 in the similar manner as in the embodiment 14, and is transmitted to the tag device 2110 (step S330). The tag device 2110 receives the new privileged ID information $sid_h'$ at its interface 2013, and the read/write section 2012 stores it in the confidential value memory 2111 (step S331), and in response to a subsequent read command from the reader, sends the new privileged ID information $sid_h'$ to the backend apparatus 2050 through the reader. The backend apparatus 2050 sends the received the privileged ID information $sid_h'$ to the security server 2160, which receives it at its communication section 2062. The security server 2160 then decrypts the tag ID information by a procedure which is similar to steps S324 and 325, and sends it through the communication section 2062 and the network 2070 to the backend apparatus 2050.

<Features of Embodiment 15>

In the present embodiment, information including an encrypted text which is formed according to the common key encryption technique is used as privileged ID information, and accordingly, an attacker who does not know the common key cannot know an association of the privileged ID information before and after the update. In this manner, a firm prevention of a tracing of the tag device 2010 can be realized.

While an encrypted text formed by an exclusive logical sum of the random number and ID constitutes privileged ID information in the present embodiment, the privileged ID information may be constituted by any other method as long as the property of probability encryption (the property that if a same ID is encrypted with a same key, a different encrypted text can be delivered) is maintained. The same is true in an embodiment 16.

Embodiment 16

An embodiment 16 is a modification of the embodiment 14, and differs from the embodiment 14 in that an encrypted text formed according to a public key encryption technique is used as privileged ID information. A distinction over the embodiment 14 will be principally described below.

Figure 34:
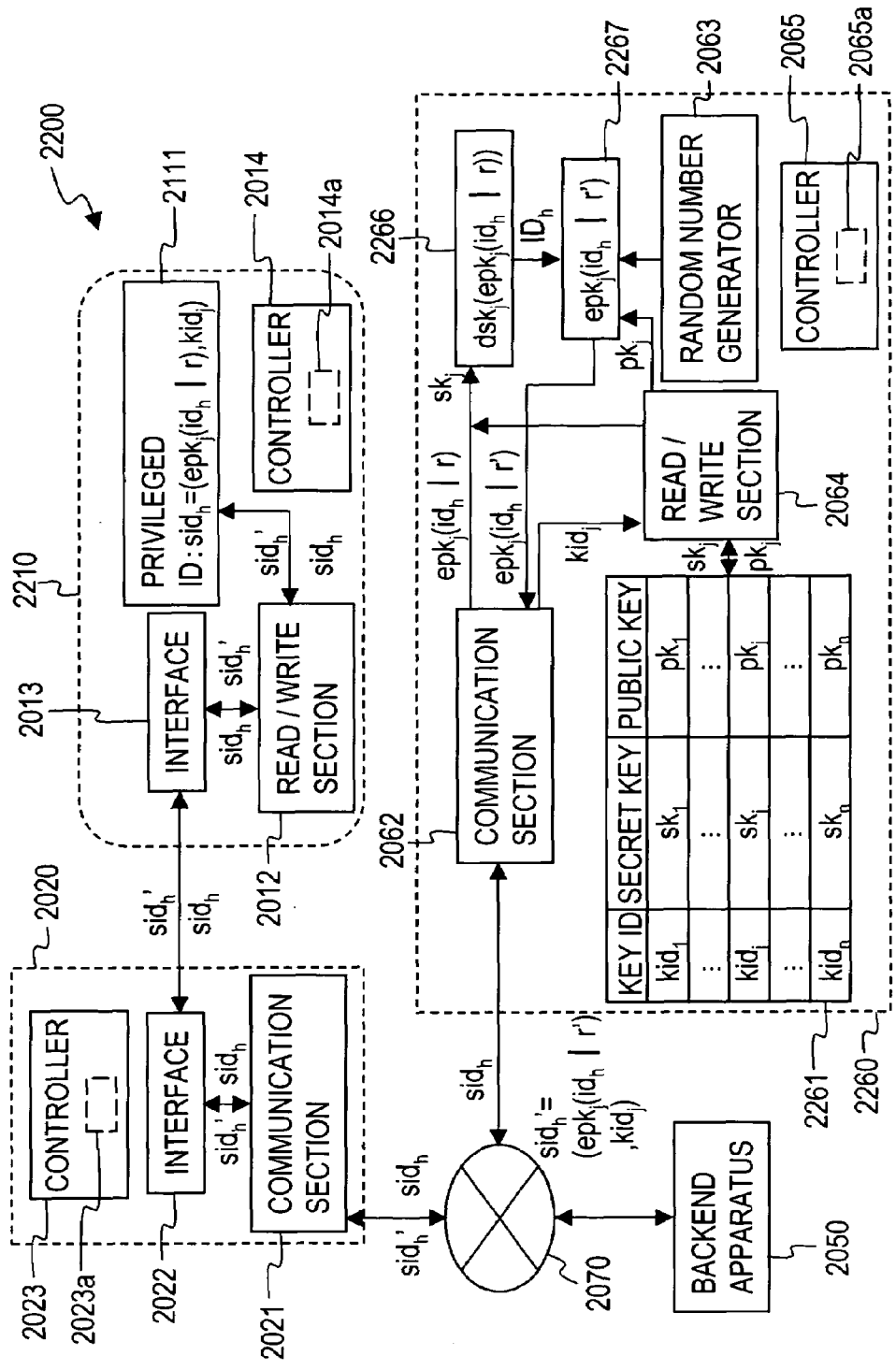
[FIG. 34] is a block diagram showing a functional arrangement of an updater system of an embodiment 16.
Figure 35:
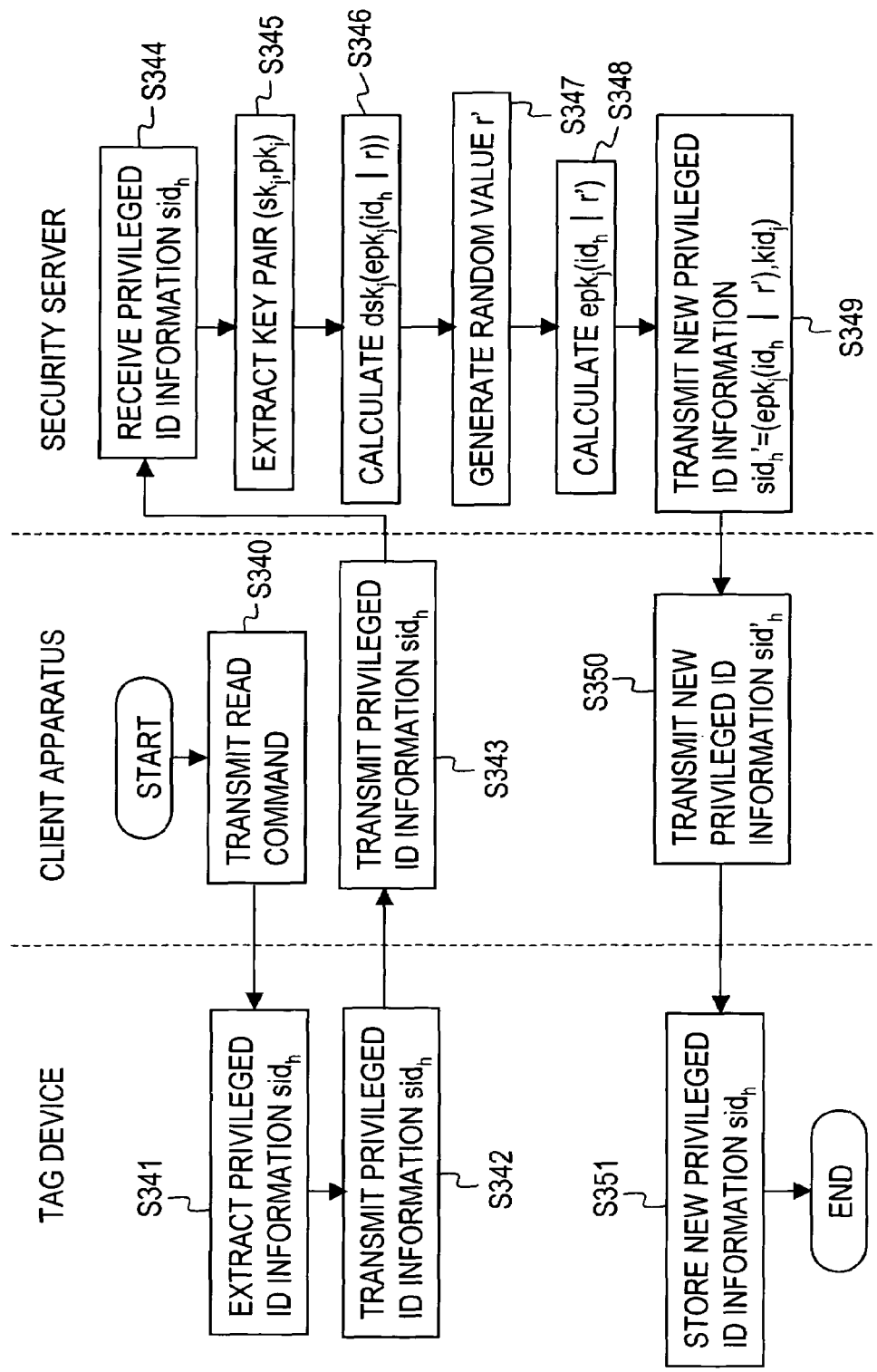
[FIG. 35] is a flow chart for describing a processing procedure in the embodiment 16.

FIG. 34 is a block diagram illustrating a functional arrangement of an updating system 2200 of the present embodiment, and FIG. 35 is a flow chart for describing a processing procedure therefor. A functional arrangement and a processing according to the present embodiment will be described below with reference to these Figures. It is to be noted that in FIG. 34, arrangements which are common to the embodiment 14 are designated by like characters as used in the embodiment 14. A read/write section 2064, a key memory 2261, an ID extractor 2266, an encryptor 2267 and a random number generator 2063 constitute together an "updating section".

<Pre-Processing>

Privileged ID information in this mode comprises information including a first encrypted text according to an public key encryption technique such as RSA and a key ID information which corresponds to the public key used in the encryption. In this example, privileged ID information of a tag device 2210 is defined as $sid_h=(epk_j(id_h|r), kid_j)$. It is to be understood that $pk_j$ represents a j-th public key, $kid_j$ key ID information which corresponds to the public key $pk_j$ and $epk(\alpha)$ an encrypted text formed by encrypting a according to the public key encryption technique using the public key pk.

Privileged ID information $sid_h=(epk_j(id_h|r), kid_j)$ is stored in a confidential value memory 2211 of the tag device 2210 of this example. Each key ID information $(kid_1, \ldots, kid_n)$, a common key $(sk_1, \ldots, sk_n)$ and a public key $(pk_1, \ldots, pk_n)$ of the public key encryption technique (a key pair $(sk_j, pk_j)$) are stored in a manner relating to each other in a key memory 2261 of a security server 2260 (equivalent to "updater"). Information relating to the magnitude (bit length) and the padding position (bit position) of the random number r in $sid_h=(epk_j(id_h|r), kid_j)$ are stored in a memory 2065a of this example.

In the similar manner as in the embodiment 15, in this example, an identical key ID information is allotted to unrelated tag devices. This allows the variety of goods or a specific one of goods to be prevented from being identified on the basis of the key ID information.

<Privileged ID Updating Processing>

In the similar manner as in the embodiment 14, a client apparatus 2020 initially transmits a read command to the tag device 2210 (step S340). The tag device 2210 extracts privileged ID information $sid_h=(epk_j(id_h|r), kid_j)$ from the confidential value memory 2211 (step S341), and transmits it to the client apparatus 2020 (step S342). In response thereto, the client apparatus 2020 transmits the privileged ID information $sid_h$ together with a solicitation for update to the security server 2260 (step 343).

Infomation including the privileged ID information $sid_h$ or the like is received by the communication section 2062 of the security server 2260 (step S344), and the first encrypted text $epk_j(idh|r)$ which constitutes the privileged ID information $sid_h$ is sent to the ID extractor 2266 while the key ID information $kid_j$ is sent to the read/write section 2064. The key ID information $kid_j$ is also recorded in the memory 2065a.

Upon receiving the key ID information $kid_j$, the read/write section 2064 extracts a secret key $sk_j$ and a public key $pk_j$ (or key pair) which corresponds to the key ID information $kid_j$ from the key memory 2261, and sends the secret key $sk_j$ to the ID extractor 2266 and sends the public key $pk_j$ to the encryptor 2267, respectively (step S345). Upon receiving the secret key $sk_j$, the ID extractor 2266 decrypts the first encrypted text $epk_j(id_h|r)$ using the secret key $sk_j$, and extracts tag ID information $id_h$. Specifically, $(id_h|r)$ is calculated according to $id_h=dsk_j(epk_j(id_h|r))$, and $id_h$ is calculated using information relating to the magnitude and the padding position of the random number r in the memory 2065a (step S346). Here, $dsk(\alpha)$ represents a decryption of an encrypted text a with the secret key sk. The calculated tag ID information $id_h$ is sent to the encryptor 2267. The random number generator 2063 generates a random number r', and sends it to the encryptor 2267 (step S347). Using the public key $pk_j$, the tag ID information $id_h$ and the random number r' which are sent thereto and information relating to the magnitude and the padding position of the random number, the encryptor 2267 generates (calculates) an encrypted text $(epk_j(id_h|r'))$ (a second encrypted text, the association with the first encrypted text of which is difficult to follow), and sends it to the communication section 2062 (step S348).

The communication section 2062 transmits (delivers) the second encrypted text $(epk_j(id_h|r'))$ which is sent thereto and the key ID information $kid_j$ in the memory 2065a as a new privileged ID information $sid_h'=(epk_j(id_h|r'), kid_j)$ (step S349).

The transmitted new privileged ID information $sid_h'$ is received by the client apparatus 2020 through the network 2070 in the similar manner as in embodiment 14, and is transmitted to the tag device 2210 (step S350). The tag device 2210 causes its read/write section 2012 to store the new privileged ID information $sid_h'$ in the confidential value memory 2211 (step S351). In response to a subsequent read command from the reader, this new privileged ID information $sid_h'$ is sent to the backend apparatus 2050 through the reader. The backend apparatus 2050 sends the received privileged ID information $sid_h'$ to the security server 2260, which then receives it by the communication section 2062. Subsequently, the security server 2260 decrypts tag ID information by a procedure similar to steps S345 and 346, and sends it to the backend apparatus 2050 through the communication section 2062 and the network 2070.

<Features of Embodiment 16>

Since information containing an encrypted text formed according to the public key encryption technique is used as privileged ID information in the present embodiment, an attacker who does not know the secret key cannot know the association between the privileged ID information before and after the update. In this manner, a firm prevention of a tracing of the tag device 2210 can be realized.

Embodiment 17

This embodiment is a modification of the embodiment 14, and differs from the embodiment 14 in that privileged ID information is updated using an encryption algorithm having the property of re-encryption (the property of an encryption capable of generating a different encrypted text data only using encrypted data and the public key. A decryption takes place by using the same secret key). A distinction over the embodiment 14 will be principally described below.

Figure 36:
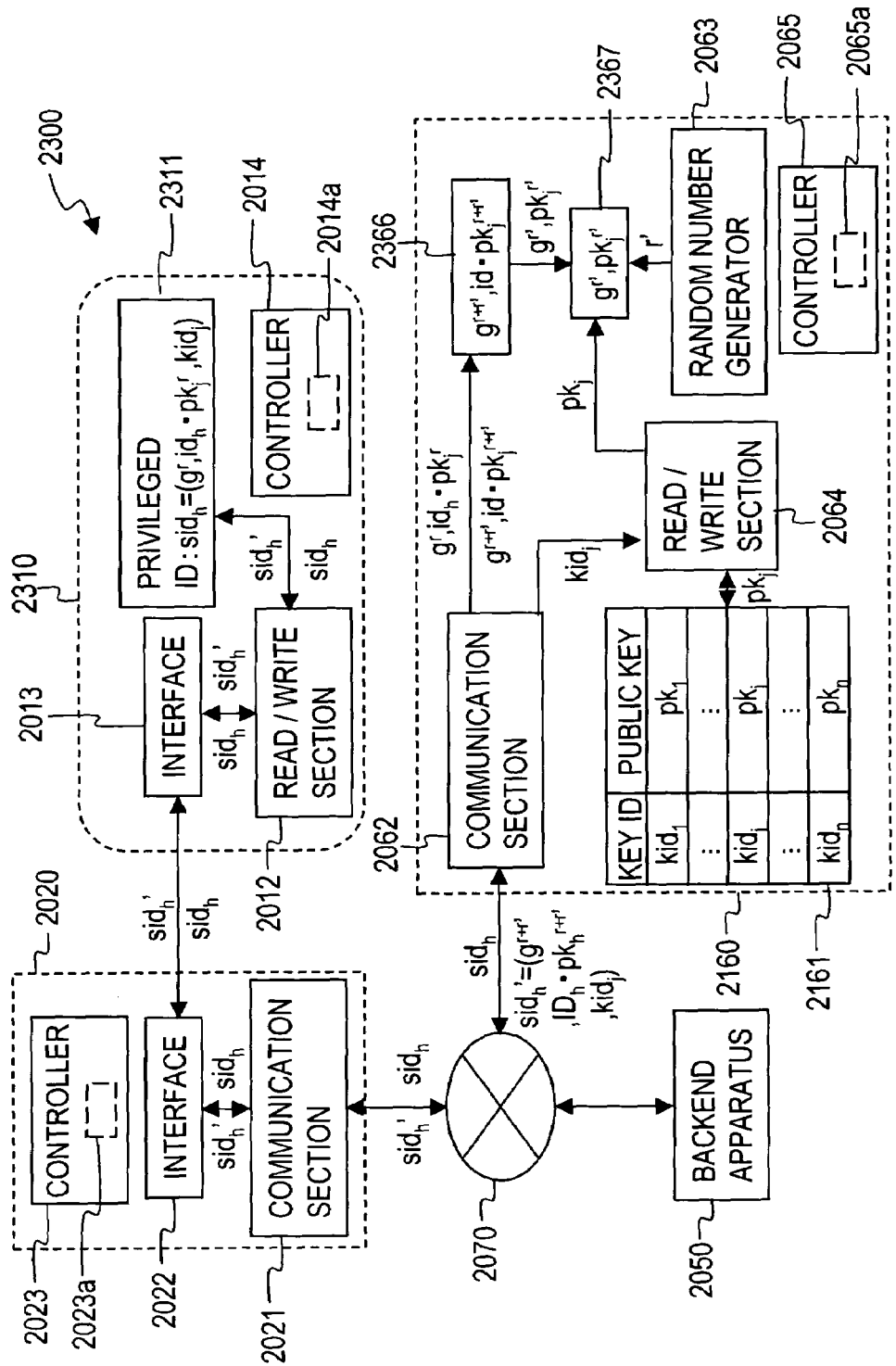
[FIG. 36] is a block diagram illustrating a functional arrangement of an updater system of an embodiment 17.
Figure 37:
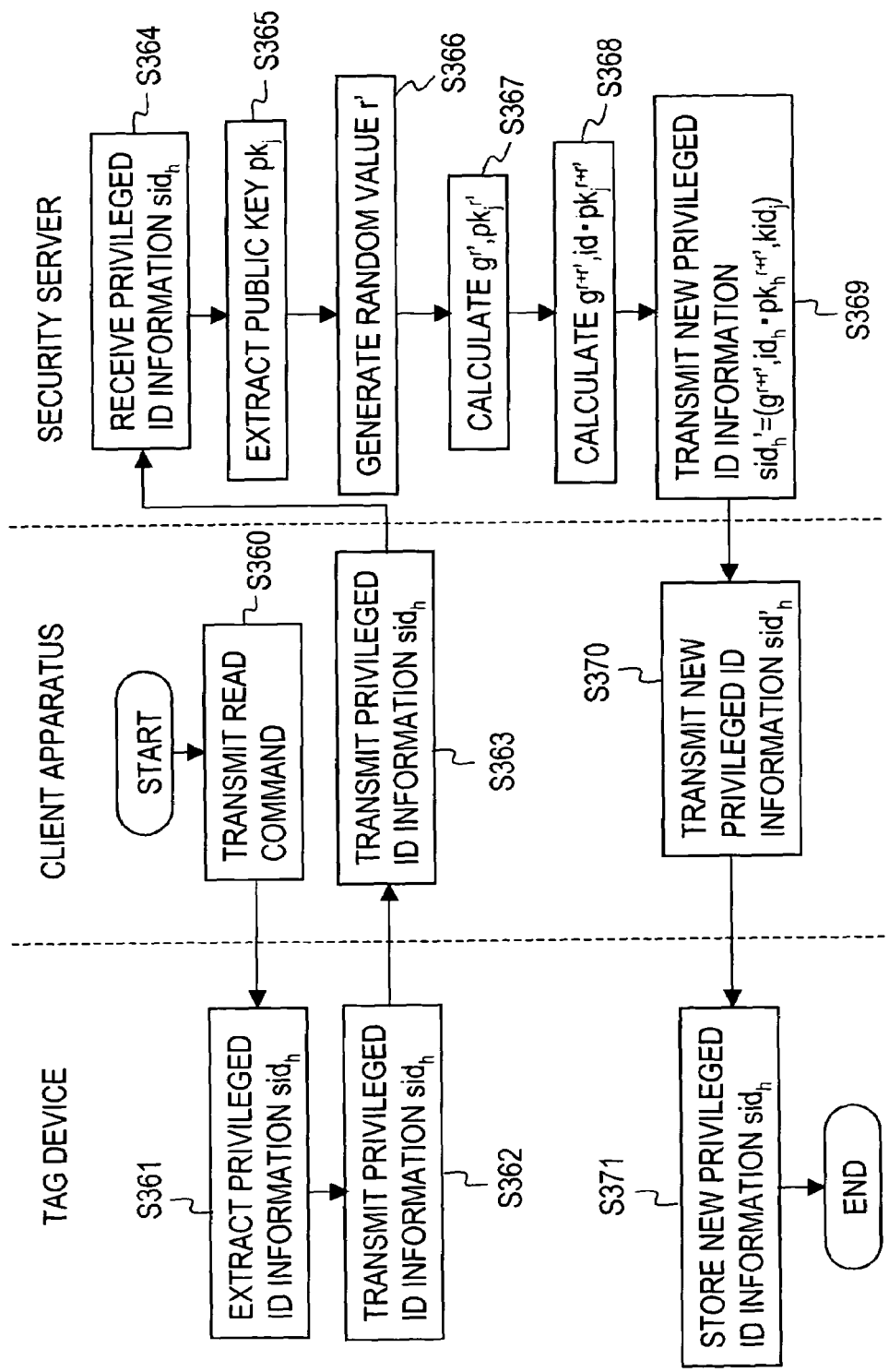
[FIG. 37] is a flow chart for describing a processing procedure of the embodiment 17.

FIG. 36 is a block diagram illustrating a functional arrangement of an updating system 2300 of the present embodiment, and FIG. 37 is a flow chart for describing a processing procedure therefor. A functional arrangement and a processing of the present embodiment will be described below with reference to these Figures. It is to be noted that in FIG. 36, arrangements which are common with the embodiment 14 are designated by like characters as used in the embodiment 14. A security server 2360 executes various processings under the control of a controller 2065. A key memory 2361, a read/write section 2064, a random number generator 2063, a remainder multiplication calculator 2366 and a remainder power calculator 2367 constitute together an "updating section".

<Pre-Processing>

Privileged ID information according to this mode is information including a first encrypted text according an encryption algorithm (public key encryption technique) which has the property of re-encryption, and key ID information which corresponds to the public key used in the encryption. In this example, ElGamal encryption (see Tatsuaki Okamoto and HirosukeYamamoto, "Modem encryption", 1998, p118~119, for example) is used, and privileged ID information of a tag device 2310 is defined as $sid_h=(g^r \bmod p, id_h \cdot pk_j^r \bmod p, kid_j)$. Here, g represents a publicized element of generation, p a sufficiently large primary number, r an arbitrary integer equal to or greater than 0 and equal to or less than p-1, $pk_j=g^{sj}$ mod p a j-th public key, $sk_j$ a j-th secret key, and ($g^r$ mod p, $id_h \cdot pk_j^r$ mod p) an encrypted text. It is to be noted that super-index "skj" in $pk_j=g^{skj}$ mod p means "$sk_j$". In the description to follow and associated Figures, "mod p" will be omitted from description.

Privileged ID information $sid_h=(g^r, id_h \cdot pk_j^r, kid_j)$ is stored in a confidential value memory 2311 of the tag device 2310 of the present example. In addition, each key ID information ($kid_1, \ldots, kid_n$) and a pubic key ($pk_1, \ldots, pk_n$) are stored in a key memory 2361 of a security server 2360 (equivalent to "updater") in a manner relating to each other. An element of generation g is stored in a memory 2065a.

Again in this example, an identical key ID information is allotted to unrelated tag devices. This allows an identification of the variety of goods or a particular one of goods on the basis of the key ID information to be prevented.

<Privileged ID Updating Processing>

In the similar manner as in the embodiment 14, a client apparatus 2020 initially transmits a read command to the tag device 2310 (step S360). The tag device 2310 extracts privileged ID information $sid_h=(g^r, id_h \cdot pk_j^r, kid_j)$ from the confidential value memory 2311 (step S361), and transmits it to the client apparatus 2020 (step S362). In response thereto, the client apparatus 2020 transmits the privileged ID information $sid_h$ together with a solicitation to update to the security server 2260 (step S363).

Information inclusive of the privileged ID information $sid_h$ is received by the communication section 2062 of the security server 2360 (step S364), and ($g^r, id_h \cdot pk_j^r$) which constitutes the privileged ID information $sid_h$ is sent to a remainder multiplication calculator 2366 (which constitutes "encrypting section") while $kid_j$ is sent to the read/write section 2064. $kid_j$ is also recorded in the memory 2065a.

Upon receiving key ID information $kid_j$, the read/write section 2064 extracts a public key $pk_j$ which corresponds to this key ID information $kid_j$ from the key memory 2361, and sends it to a remainder power calculator 2367 (which constitutes "encrypting section") (step S365). This triggers the random number generator 2063 to generate a random number r' which is equal to or greater than 0 and equal to or less than p−1, and to send it to the remainder power calculator 2367 (step S366). The remainder power calculator 2367 calculates ($g^{r'}, pk_j^{r'}$) using the element of generation g in the memory 2065a, the public key $pk_j$ and the random number r' which are received, and sends a result of calculation to the remainder multiplication calculator 2366 (step S367). The remainder multiplication calculator 2366 calculates ($g^{r+r'}, id_h \cdot pk_j^{r+r'}$) using ($g^{r'}, pk_j^{r'}$) and ($g^r, id_h \cdot pk_j^r$) which are received, and sends a result of calculation as an encrypted text (a second encrypted text) to the communication section 2062 (step S368).

The communication section 2062 transmits the sent encrypted text ($g^{r+r'}, id_h \cdot pk_j^{r+r'}$) (a second encrypted text, the association with the first encrypted text of which is difficult to follow) and key ID information $kid_j$ in the memory 2065a as new privileged ID information ($sid'_h=(g^{r+r'}, id_h \cdot pk_j^{r+r'}, kid_j)$) (step S369).

The transmitted new privileged ID information $sid_h'$ is received through the network 2070 by the client apparatus 2020 in the similar manner as in the embodiment 14, and is transmitted to the tag device 2310 (step S370). The read/write section 2012 of the tag device 2310 then stores the new privileged ID information $sid_h'$ in the confidential value memory 2311 (step S371). Subsequently, the tag device 2310 responds with this new privileged ID information ($sid_h'$) in response to a subsequent read command.

<Features of Embodiment 17>

In this embodiment, privileged ID information is updated using an encryption algorithm having a property of re-encryption, and accordingly, the privileged ID information can be updated without decrypting ID in plain text. Consequently, there is no likelihood that ID be eavesdropped during the updating processing of privileged ID information and a firm prevention of a tracing of the tag device 2310 can be realized.

While a public key ($pk_1, \ldots, pk_n$) is stored in the key memory 2361 of the security server 2360 in the present embodiment, an arrangement can be used in which the security server 2360 does not maintain the pubic key ($pk_1, \ldots, pk_n$), but acquires the public key ($pk_1, \ldots, pk_n$) from a given public key server for use.

While ElGamal encryption is used in the present embodiment, a different algorithm such as a higher order remainder encryption may also be used provided it is an encryption algorithm having the property of re-encryption.

In addition, as modifications of the embodiment 16 and the embodiment 17, the tag ID information may be encrypted with a common key, and an encrypted text of the common key and tag ID information may be encrypted with the public key according to the above mentioned public key encryption technique to provide privileged ID information (hybrid encryption). In this instance, the security server acquires the common key by decrypting the privileged ID information with the secret key which corresponds to this public key, and decrypts the encrypted text of tag ID information using this common key to obtain tag ID information. Subsequently, the security server generates a separate encrypted text form this tag ID information according to the common key encryption technique, and the common key and the encrypted text may be further encrypted according to the public encryption technique. The resulting encrypted text may be used as a new privileged ID information to be returned to a client apparatus. Subsequently, this new privileged ID information is stored in the confidential value memory of the tag device in the similar as in the embodiment 16 or the like.

Embodiment 18

In an embodiment 18, a security server is changed at the time the privileged ID information is updated. A distinction over the embodiment 14 will be principally described below.

Figure 38:
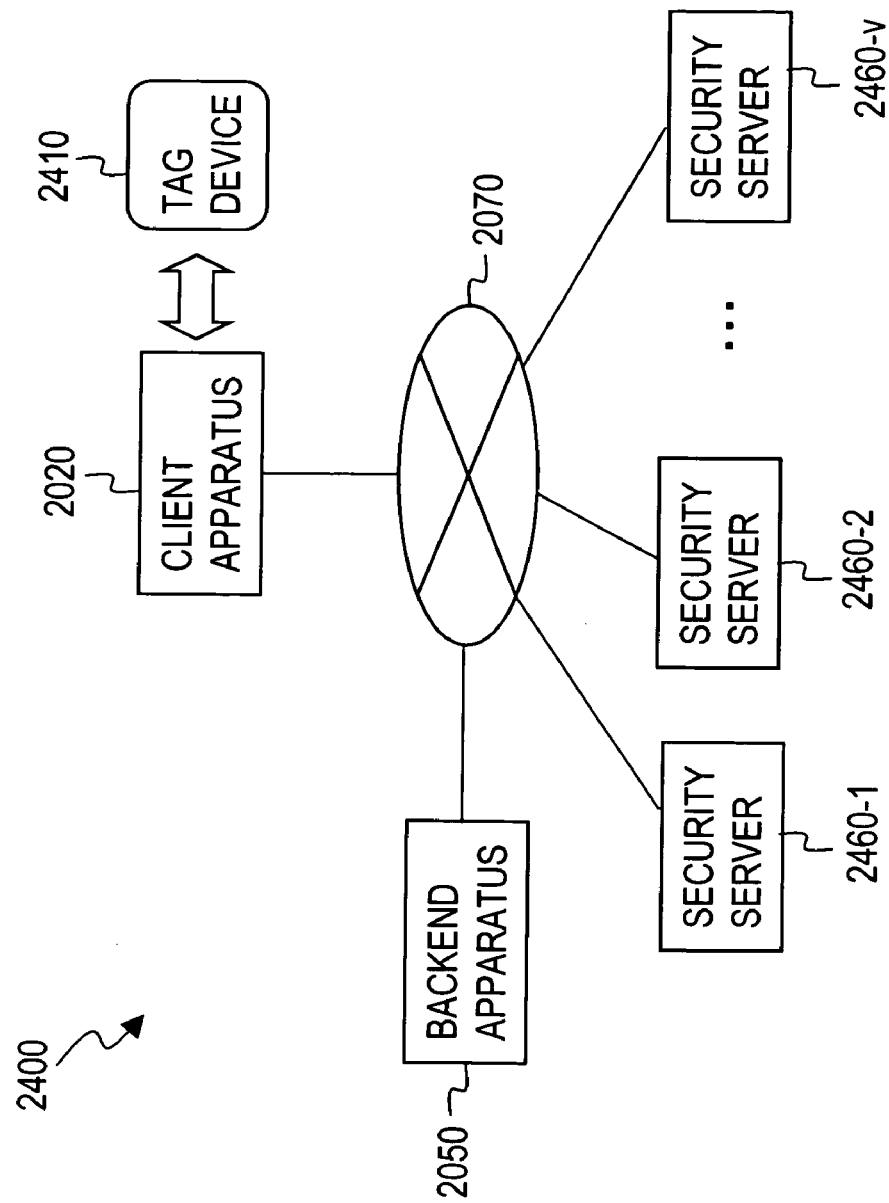
[FIG. 38] is a conceptual view showing an overall arrangement of an updater system of an embodiment 18.

FIG. 38 is a conceptual view illustrating an overall arrangement of an updating system 2400 of the present embodiment. It is to be noted that in FIG. 38, arrangements which are common with the embodiment 14 are designated by like characters as used in the embodiment 14.

As illustrated in this Figure, the updating system 2400 comprises a tag device 2410, a client apparatus 2020 (equivalent to "update solicitor"), a plurality of security servers 2460-1~v (equivalent to "updaters") and a backend apparatus 2050, which are connected together to enable a commutation therebetween through the network 2070.

Figure 39:
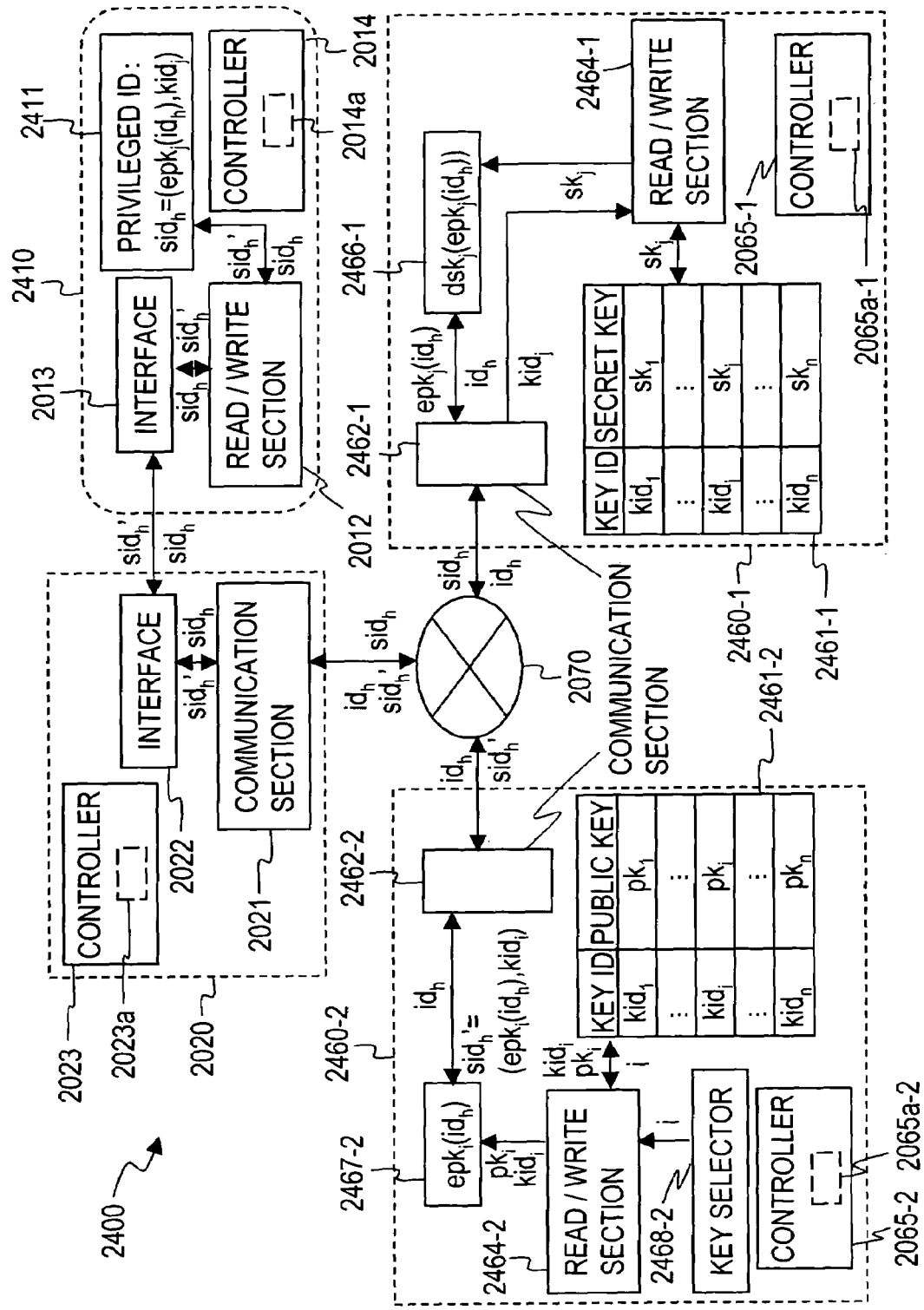
[FIG. 39] s a block diagram showing a functional arrangement of an updater system of the embodiment 18.
Figure 40:
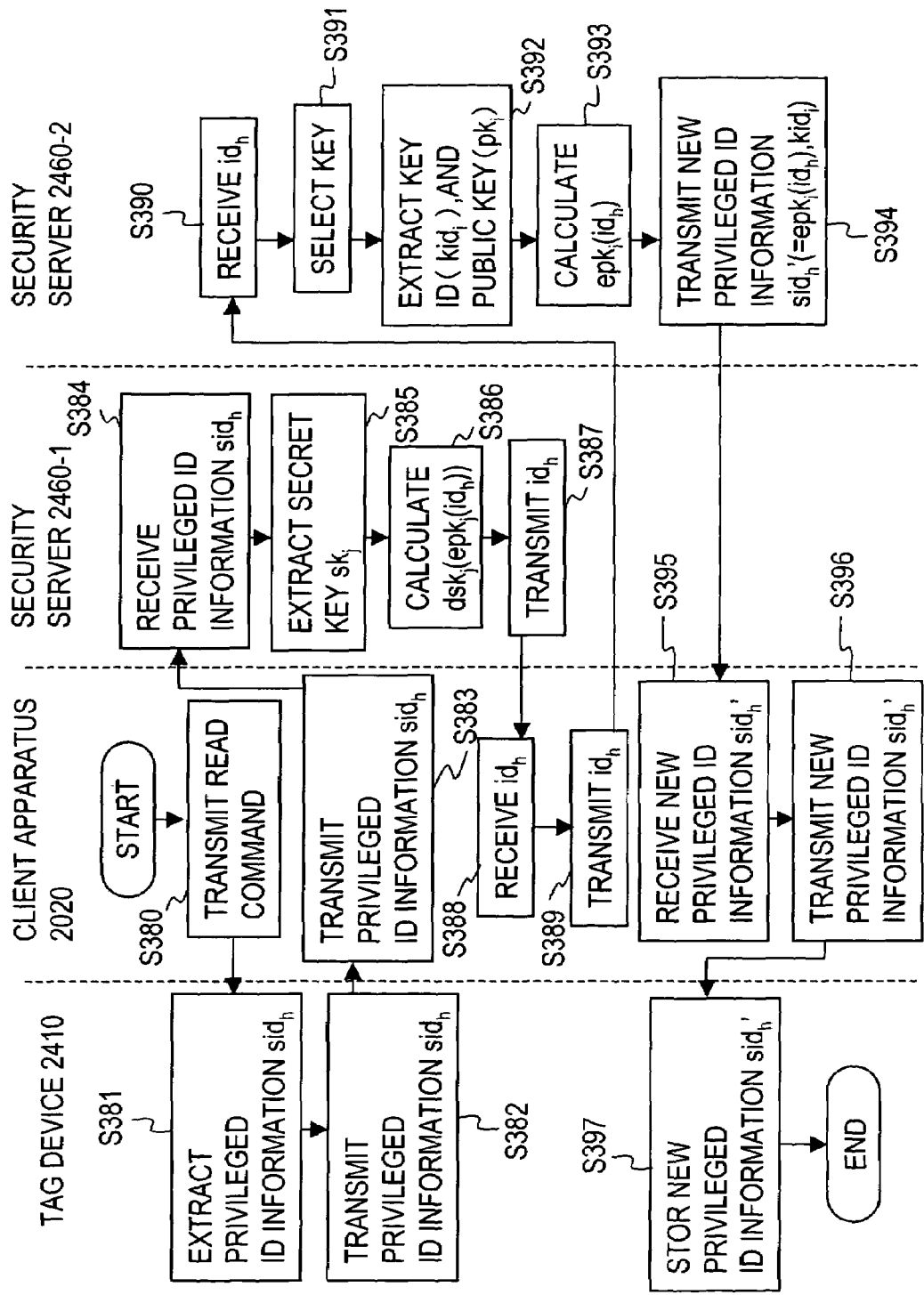
[FIG. 40] is a flow chart for describing a processing procedure of the embodiment 18.

FIG. 39 is a block diagram illustrating a functional arrangement of an updating system 2400 of the present embodiment, and FIG. 40 is a flow chart for describing a processing procedure therefor. A functional arrangement and a processing according to the present embodiment will be described below with reference to these Figures. It is to be noted that in FIG. 39, arrangements which are common with the embodiment 14 are designated by like characters as used in the embodiment 14. For brevity of illustration, only two security servers 2460-1 and 2460-2 are shown in FIGS. 38 and 39, but it should be understood that more than two security servers may be used to construct a system. In addition, while only processing function/data which are required for purpose of description are indicated in FIG. 39, it should be understood that either one of the security servers 2460-1 and 2460-2 may also contain processing functions and data which the other security server contains. The security servers 2460-1 and 2460-2 execute respective processings under the control of controllers 2465-1 and 2465-2.

<Pre-Processing>

Privileged ID information according to this mode is information including an encrypted text according to the public key encryption technique and key ID information which corresponds to the public key used in the encryption. In the present example, privileged ID information of the tag device 2410 is defined as $sid_h=(epk_j(id_h), kid_j)$.

This privileged ID information $sid_h=(epk_j(id_h), kid_j)$ is stored in the confidential value memory 2411 of the tag device 2410 of this example. Each key ID information ($kid_1, \ldots, kid_n$) and a secret key ($sk_1, \ldots, sk_n$) of the public key encryption technique are stored in a key memory 2461-1 of the security server 2460-1 in a manner relating to each other. Also, each key ID information ($kid_1, \ldots, kid_n$) and a public key ($pk_1, \ldots, pk_n$) of the public key encryption technique are stored in a key memory 2461-2 of the security server 2460-2 in a manner relating to each other.

In this example also, an identical key ID information is allotted to unrelated tag devices. This allows the variety of goods or a particular one of the goods to be prevented from being identified on the basis of the key ID information.

<Privileged ID Updating Processing>

In the similar as in the embodiment 14, a client apparatus 2020 initially transmits a read command to tag device 2410 (step S380). The tag device 2410 extracts the privileged ID information ($sid_h=(epk_j(id_h), kid_j)$) from the confidential value memory 2411 (step S381) and transmits it to the client apparatus 2020 (step S382). In response thereto, the client apparatus 2020 causes its communication section 2021 (equivalent to "first ID output section") to transmit (deliver) the privileged ID information $sid_h$ extracted from the tag device 2410 together with a solicitation to update to the security server 2460-1 (step 383). It is to be noted that the security server 2460-1 is the security server which controls the privileged ID information stored in the tag device 2410 at this point in time.

Information inclusive of the privileged ID information $sid_h$ is received by a communication section 2462-1 (equivalent to "first input section") of the security server 2460-1 (step S384), and $epk_j(id_h)$ which constitutes the privileged ID information $sid_h$ is sent to an ID extractor 2466-1 while $kid_j$ is sent to a read/write section 2464-1. Upon receiving the key ID information kids, the read/write section 2464-1 extracts a secret key $sk_j$ which corresponds to the key ID information $kid_j$ from the key memory 2461-1 and sends it to the ID extractor 2466-1 (step S385). Upon receiving the secret key $sk_j$, the ID extractor 2466-1 decrypts an encrypted text $epk_j(id_h)$ using the secret key $sk_j$ to determine tag ID information $id_h$ ($id_h=dsk_j(epk_j(id_h))$) (step S386). The tag ID information $id_h$ which is thus determined is sent to a communication section 2462-1 (equivalent to "second output section"), and thence transmitted (delivered) to the client apparatus 2020 through the network 2070 (step S387).

The tag ID information $id_h$ delivered from the security server 2460-1 is received by the communication section 2021 of the client apparatus 2020 (accepted as an input) (step S388). Subsequently, the communication section 2021 transmits (delivers) the tag ID information $id_h$ to an arbitrarily selected security server 2460-2 to solicit to update the privileged ID information (step S389).

The communication section 2462-2 (equivalent to "third input section") of the security server 2460-2 receives this tag ID information $id_h$, (accepts as an input) which is transmitted through the network 2070 and sends it to an encryptor 2467-2 (step S390). This triggers a key selection by a key selector 2468-2, and such information is sent to a read/write section 2464-2 (step S391). In the present example, the key selector 2468-2 selects an arbitrary key number i (such as a random number) from natural numbers equal to or greater than 1 and equal to or less than n, and sends this key number i to the read/write section 2464-2. The read/write section 2464-2 extracts key ID information kids and the public key $pk_i$ which correspond to the received key number I from the key memory 2461-2, and sends them to the encryptor 2467-2 (step S392). The encryptor 2467-2 encrypts (privileges) the tag ID information $id_h$ using the received public key $pk_i$ ($epk_i(id_h)$), and generates a new privileged ID information ($sid_h'=(epk_i(id_h), kid_i)$) which comprises the encrypted text and the key ID information $kid_i$ (step S393). The generated privileged ID information $sid_h'$ is sent to the communication section 2462-2, and the communication section 2464-2 (equivalent to "third output section") transmits (delivers) this privileged ID information $sid_h'$ to the client apparatus 2020 through the network 2070 (step S394).

The client apparatus 2020 receives the privileged ID information ($sid_h'$) (accepts as an input) by its communication section 2021 (equivalent to "second input section") (step S395), and transmits it through the interface 2022 to the tag device 2410 (step S396). The tag device 2460 stores the new privileged ID information $sid_h'$ in the confidential value memory 2411 (step S397), and responds with the new privileged ID information $sid_h'$ in response to a subsequent read demand. Hereafter, the security server 2460-2 acts as the security server which controls the privileged ID information stored in the tag device 2410. Accordingly, a decryption of the new privileged ID information $sid_h'$ takes place in the security server 2460-2 subsequently. Tag ID information $id_h$ which represents a result of decrypting operation will be sent to the client apparatus 2020, the backend apparatus 2050 or the like. A decryption of the privileged ID information $sid_h'$ in the security server 2460-2 takes place using the secret key $sk_i$ stored in a key memory 2461-2 (a secret key corresponding to $kid_i$, not shown).

<Features of Embodiment 18>

It will be seen that in the embodiment 18, privileged ID information is decrypted by the security server 2460-1 which controls the privileged ID information in the tag device 2410, and the security server 2460-2 which is separate generates new privileged ID information to update the privileged ID information stored in the tag device 2410. In other words, an updating of the privileged ID information takes place simultaneously with changing the security server which controls the privileged ID information in the tag device 2410. This prevents a concentration of information relating to a history of updating the privileged ID information in a single security server, allowing the risks of information leaking from the security server and of a tort by a security server which is set up with a malignant intention to be alleviated. By making the changed security server to be a local one which the public has no access, a higher level of safety can be realized.

The updating system of the present embodiment may be constructed with the common key encryption technique rather than the public key encryption technique.

Alternatively the updating system of the present embodiment may be constructed by applying the mode such as the embodiment 14 in which a random value is used in the privileged ID information. In this instance, the new security server generates a random value in place of the encryption mentioned above, and adds the generated random value (privileged ID) and ID anew to the privileged ID memory as used in the embodiment 14.

Embodiment 19

In an embodiment 19, re-privileging processing of the privileged ID information is performed by a client apparatus. Thus the client apparatus functions as an updater. In this instance, the client apparatus performs a re-privileging processing of the privileged ID information which is directly read out.

Figure 41:
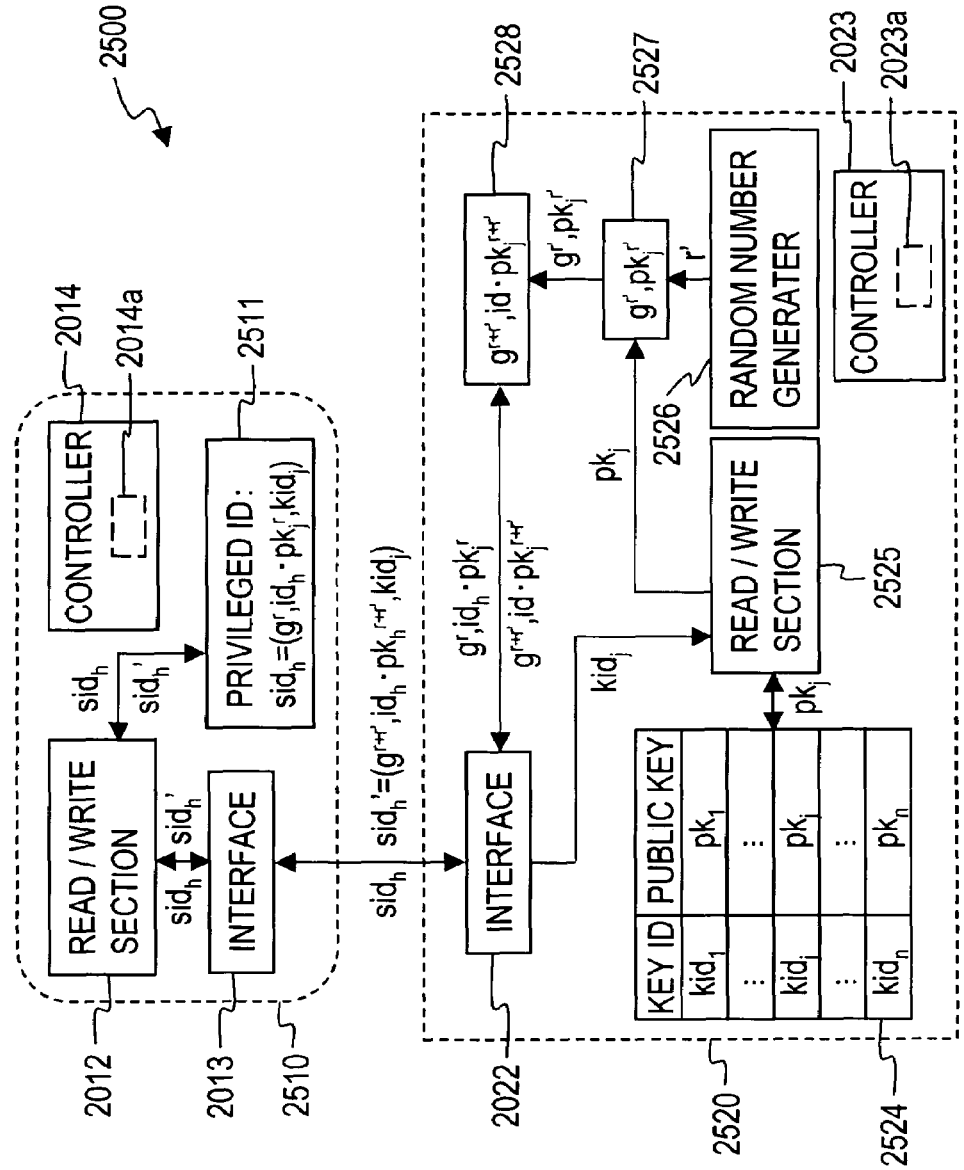
[FIG. 41] is a block diagram showing a functional arrangement of an updater system of an embodiment 19.
Figure 42:
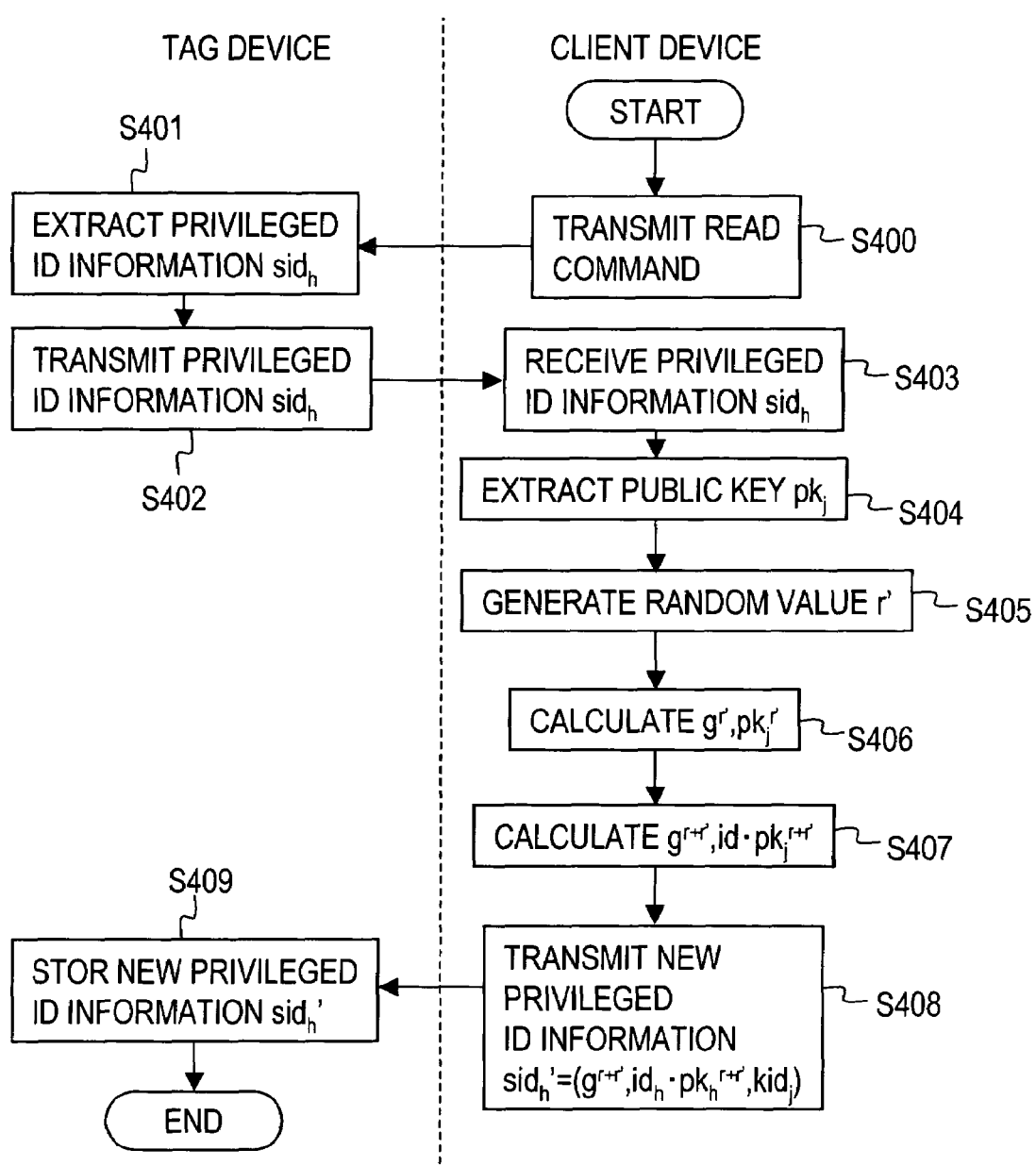
[FIG. 42] is a flow chart for describing a processing procedure of the embodiment 19.

FIG. 41 is a block diagram illustrating a functional arrangement of an updating system 2500 of the present embodiment and FIG. 42 is a flow chart for describing a processing procedure therefor. A functional arrangement and a processing according to the present embodiment will be described below with reference to these Figures. It should be noted that characters as used in the embodiment 14 are applied to arrangements in FIG. 41 which are common with the embodiment 14. A distinction over the embodiment 14 will be principally described below.

<Pre-Processing>

The privileged ID information of the present embodiment is an information including an encrypted text formed with an encryption algorithm (the public key encryption technique) having the property of re-encryption, and the key ID information which corresponds to the public key used in the encryption. In the present example, ElGamal encryption is used, and the privileged ID information in a tag device 2510 is defined as $sid_h=(g^r, id_h \cdot pk_j^r, kid_j)$.

This privileged ID information $(sid_h=(g^r, id_h \cdot pk_j^r, kid_j))$ is stored in the memory 2511 of the tag device 2510 of this example. Each key ID information ($kid_1, \ldots, kid_n$) and a public key ($pk_1, \ldots, pk_n$) are stored in the key memory 2524 of the client apparatus 2520 (equivalent to "updater") in a manner relating to each other. An element of generation g is stored in a memory of a remainder multiplication calculator 2527.

Also in this example, an identical key ID information is allotted to unrelated tag devices. This prevents the variety of goods or a particular one of goods from being identified on the basis of the key ID information.

<Privileged ID Updating Processing>

The client apparatus 2520 executes processings indicated below under the control of a controller 2023.

In the similar manner as in the embodiment 14, initially the client apparatus 2520 transmits a read command to the tag device 2510 (step S400). The tag device 2510 extracts the privileged ID information $(sid_h=(g^r, id_h \cdot pk_j^r, kid_j))$ from the memory 2511 (step S401), and transmits it to the client apparatus 2520 (step S402).

This privileged ID information $sid_h$ is received by the interface 2022 of the client apparatus 2520 (step S403), and an encrypted text $(g^r, id_h \cdot pk_j^r)$ which constitute the privileged ID information $sid_h$ is sent to the remainder multiplication calculator 2528 (which constitutes an "encryptor") while $kid_j$ is sent to a read/write section 2525. $kid_j$ is also recorded in a memory 2023a.

Upon receiving the key ID information $kid_j$, the read/write section 2525 extracts the public key $pk_j$ which corresponds to this key ID information $kid_j$ from the key memory 2524, and sends it to a remainder power calculator 2527 (which constitutes an "encryptor") (step S404). This triggers the random number generator 2526 to generate a random number r' which is equal to or greater than 0 or equal to or less than p−1, which is then sent to the remainder power calculator 2527 (step S405). The remainder power calculator 2527 calculates $(g^{r'}, pk_j^{r'})$ using the element of generation g within its own memory, the received public key ($pk_j$) and the random number r', and sends its result to the remainder multiplication calculator 2528 (step S406). The remainder multiplication calculator 2528 calculates $(g^{r+r'}, id_h \cdot pk_j^{r+r'})$ using received $(g^r, pk_j^r)$ and $(g^{r'}, id_h \cdot pk_j^{r'})$, and sends a result of calculation as a new encrypted text to the interface 2022 (step S407). The interface 2022 transmits (delivers) the encrypted text $(g^{r+r'}, id_h \cdot pk_j^{r+r'})$ which is sent thereto and key ID information $kid_j$ in the memory of the interface 2022 as new privileged ID information $(sid'_h=(g^{r+r'}, id_h \cdot pk_j^{r+r'}, kid_j))$ (step S408).

The transmitted new privileged ID information $sid_h'$ is received by the interface 2013 of the tag device 2510, and is stored in the memory 2511 through the read/write section 2012 (step S409). Subsequently, in response to a read demand, the tag device 2510 responds with this new privileged ID information $sid_h'$.

<Features of Embodiment 19>

In the embodiment 19, the client apparatus 2520 re-privileges the privileged ID information within the tag device 2510. The client apparatus 2520 applies the re-privileging processing only to the privileged ID information which is directly read out by the interface 2022. This suppresses a leakage of information to a third party, securing a higher level of safety.

While the public key ($pk_1, \ldots, pk_n$) is stored in the key memory 2524 of the security server 2520 in the present embodiment, an arrangement may be used in which the security server 2520 does not carry the public key ($pk_1, \ldots, pk_n$), but acquires the public key ($pk_1, \ldots, pk_n$) from a given public key server for use.

The arrangement of the security server shown in either mode from the embodiment 14 to the embodiment 16 may be applied to the client apparatus 2520 to execute processings of the present embodiment.

Embodiment 20

An embodiment 20 will now be described.

In this embodiment, a client apparatus (equivalent to "update solicitor") previously acquires a plurality of privileged ID information, and selects one therefrom to be used in updating the privileged ID information within the tag device.

Figure 43:
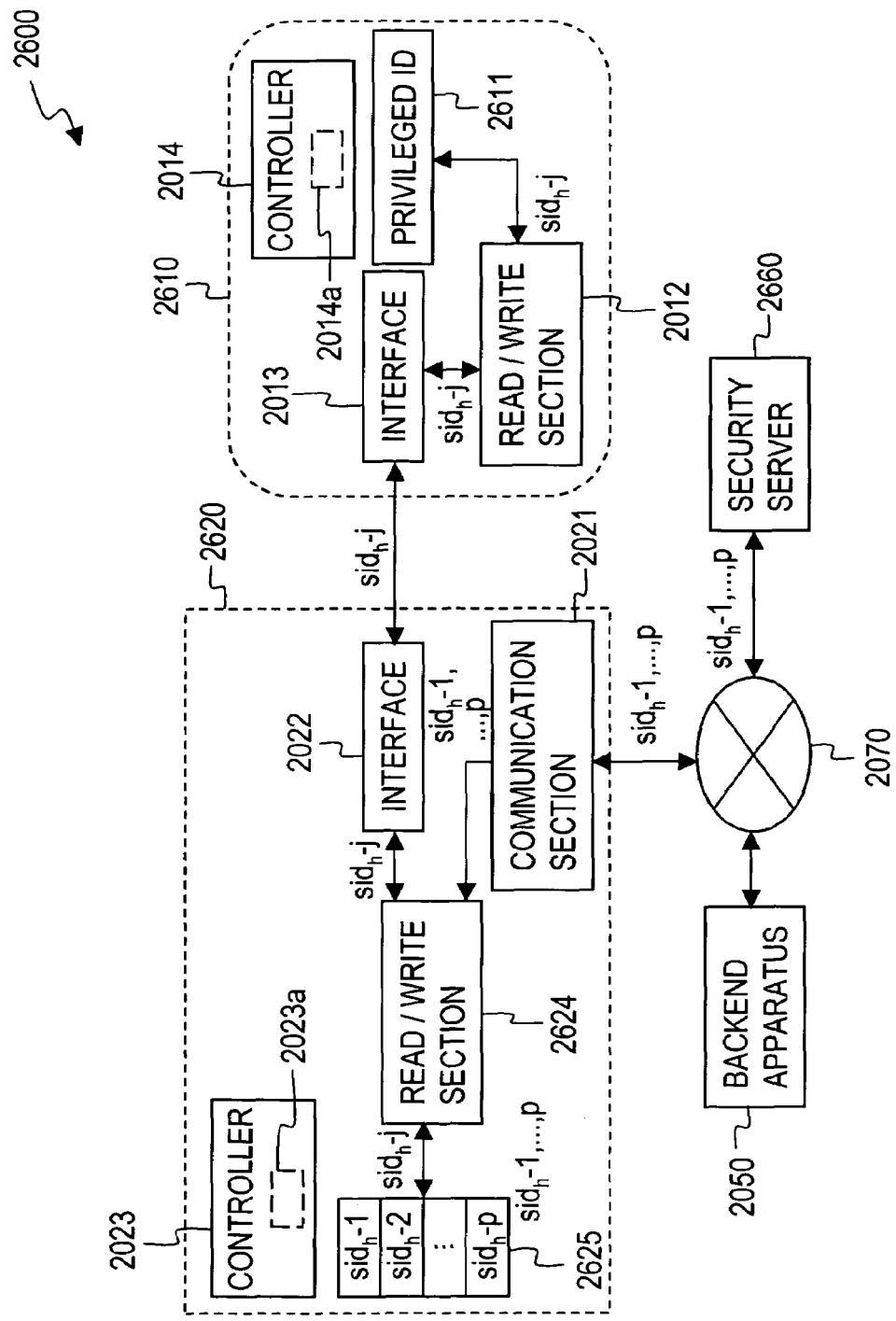
[FIG. 43] is a block diagram showing a functional arrangement of an updater system of an embodiment 20.
Figure 44:
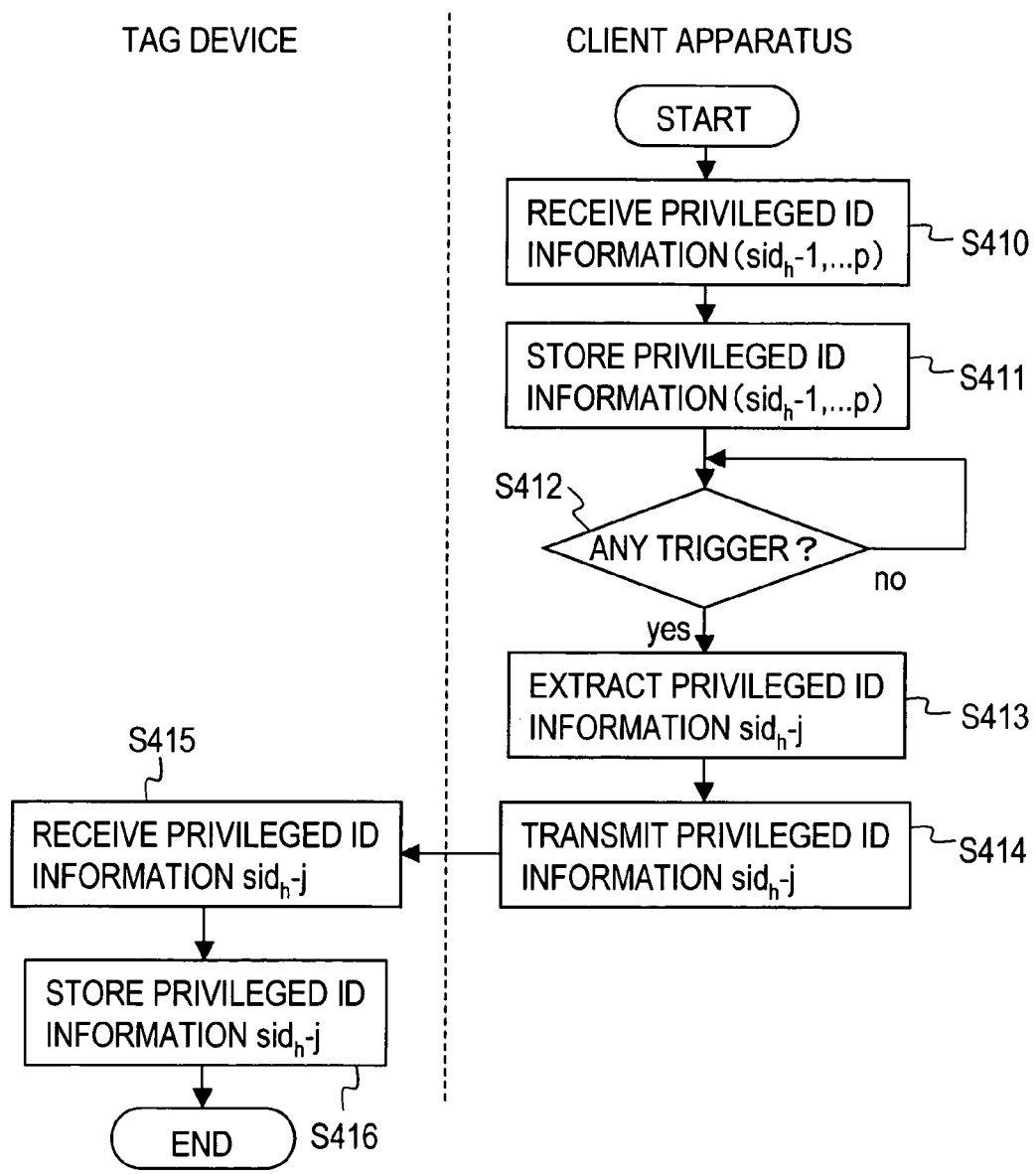
[FIG. 44] is a flow chart for describing a processing procedure of the embodiment 20.

FIG. 43 is a block diagram illustrating a functional arrangement of an updating system 2600 of the present embodiment, and FIG. 44 is a flow chart for describing a processing procedure therefor. A functional arrangement and a processing of the present embodiment will be described below with reference to these Figures. It is to be noted that in FIG. 43, arrangements which are common with the embodiment 14 are designated by like characters as used in the embodiment 14. A distinction over the embodiment 14 will be principally described below.

<Pre-Processing>

Initially, the communication section 2021 (equivalent to "privileged ID input section") of the client apparatus 2620 receives (accepts as input) a plurality of kinds of privileged ID information ($sid_h$-1, . . . , p) which are sent through the network 2070 (step S410). The plurality of kinds of privileged ID information ($sid_h$-1, . . . , p) are those which are obtained by repeating the method described in either one of the embodiment 14 to the embodiment 17 or by transmitting a plurality of kinds of privileged ID information in one operation from the security server 2660. When utilizing the method of the embodiment 14, it is necessary that a plurality of privileged ID information ($sid_h$-1, ..., p) be stored in the privileged ID memory of the security server 2660 for one tag ID information. By contrast, when utilizing the method in either one of the embodiment 15 to embodiment 17, information which is stored in the security server 2660 may be similar to one of the embodiment 15 to the embodiment 17.

The communication section 2021 sends these privileged ID information ($sid_h$-1, ..., p) to the read/write section 2624, which then store them in the privileged ID memory 2625 (step S411).

<Privileged ID Updating Processing>

The client apparatus 2620 executes the processings described below under the control of the controller 2023.

Initially, the controller 2023 determines whether or not there existed a given trigger (opportunity) to update the privileged ID information (step S412). What can be cited as such a trigger are that the privileged ID information has been read from the tag device 2610, that a count indicating a number of times the privileged ID information within the tag device 2610 has been used has reached a given value or the like. In the absence of a given trigger, a determination rendered at step S412 is continued, and in the presence of a given trigger, the read/write section 2624 (equivalent to "privileged ID extractor") extracts one privileged II) information $sid_h$-j from the privileged II) memory 2625 (step S413). The selection of this one privileged ID information $sid_h$-j may take place at random, or may be in the sequence of an array in the manner of $sid_h$-1, $sid_h$-2, ... and returning to $sid_h$-1 again after $sid_h$-p. The extracted one privileged ID information $sid_h$-j is sent from the read/write section 2624 to the interface 2022 (equivalent to "privileged ID output section"), and thence transmitted (delivered) to the tag device 2610 (step S414).

The tag device 2610 receives this privileged ID information $sid_h$-j at its interface 2013 (step S415), and stores it in a confidential value memory 2611 through the read/write section 2012 (step S416). Subsequently, the tag device 2610 responds with this new privileged ID information $sid_h'$ in response to a read command from the reader.

<Features of Embodiment 20>

In the present embodiment, a plurality of kinds of privileged ID information are previously stored in the client apparatus 2620, and the privileged ID information in the tag device 2610 is updated by the privileged ID information which is selected from the stored ones. The selection of the privileged ID information which is used in updating takes place within the client apparatus 2620, and its transmission takes place locally between the client apparatus 2620 and the tag device 2610. Accordingly, a leakage of information to a third party can be suppressed, securing a higher level of safety. If the transmission of the plurality of kinds of privileged ID information takes place in one operation from the security server 2660 to the client apparatus 2620, a number of times the security server 2660 is accessed can be reduced, thus alleviating a degradation in the performance of the system which is associated with the updating processing of the privileged ID information.

It should be noted that the opportunity for selecting/storing the privileged ID information is not limited to the one mentioned above, and an arrangement may be used in which after the privileged ID information stored in the client apparatus 2620 have been exhausted, a plurality of kinds of privileged ID information may be acquired again from the security server 2660 to be stored in the client apparatus 2620.

Embodiment 21

An embodiment 21 will now be described.

This embodiment is a modification of the embodiment 20, and differs from the embodiment 20 in that the client apparatus acquires the privileged ID information delivered from a plurality of security servers ("updaters").

Figure 45:
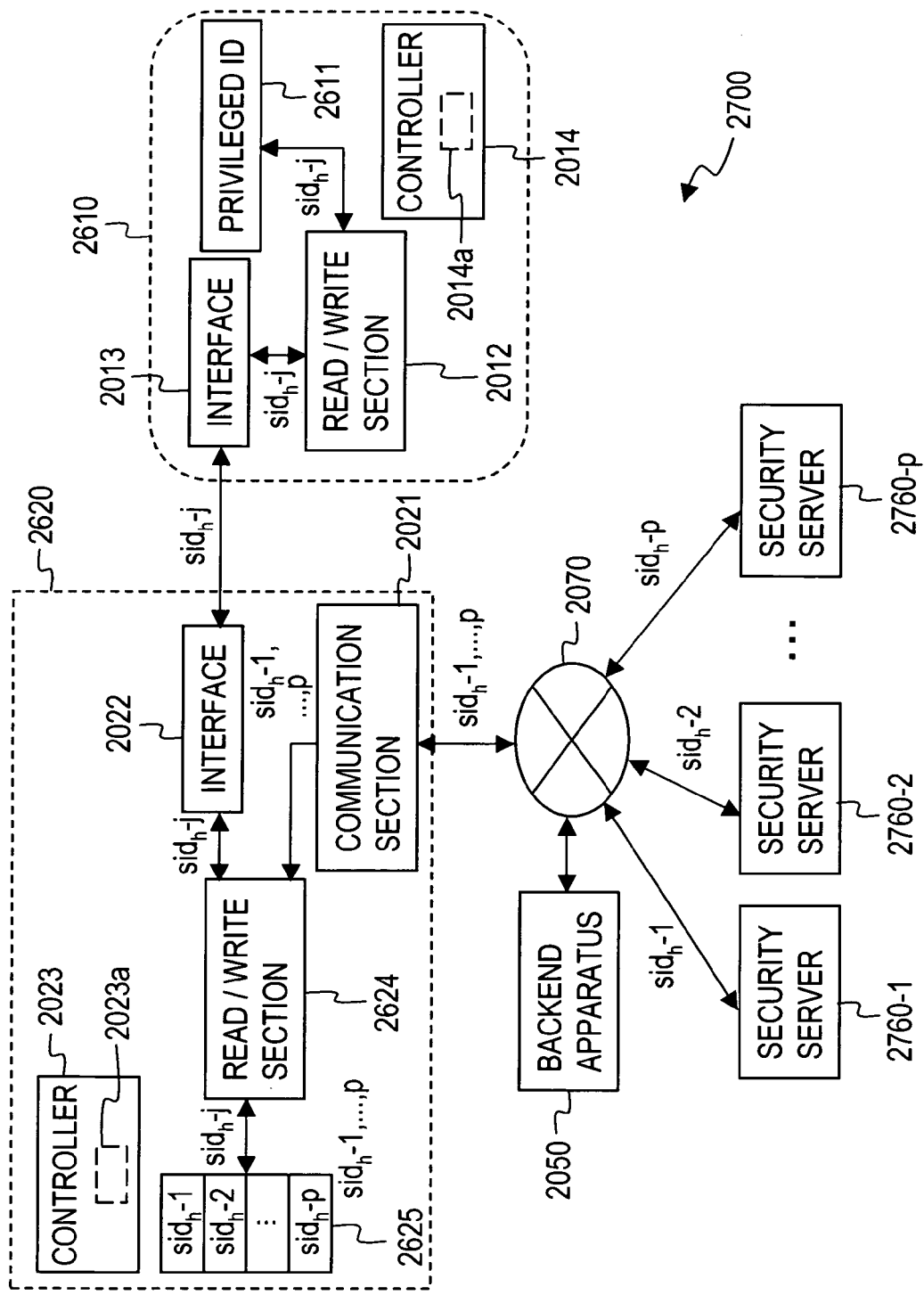
[FIG. 45] is a block diagram showing a functional arrangement of an updater system of an embodiment 21.

FIG. 45 is a block diagram illustrating a functional arrangement of an updating system 2770 of the present embodiment. A functional arrangement and a processing of the present embodiment will be described below with reference to this Figure. It is to be noted that in FIG. 45, arrangements which are common with the embodiment 14 or the embodiment 20 are designated by like character as used in the embodiment 14 or the embodiment 20. Only a distinction over the embodiment 20 will be described below.

<Pre-Processing>

The only difference over the embodiment 20 resides in that a client apparatus 2620 receives a plurality of kinds of privileged ID information ($sid_h$-1, ..., p) which are sent from a plurality of security servers 2760-1, 2760-2, ..., 2760-$p$. Privileging of ID in the plurality of security servers 2760-1, 2760-2, ..., 2760-$p$ takes place according to the method of the embodiment 18, for example.

<Privileged ID Updating Processing>

This remains to be similar to the embodiment 20.

<Features of Embodiment 21>

In the present embodiment, the client apparatus 2620 acquires the privileged ID information which is generated by the plurality of security servers 2760-1, 2760-2, ..., 2760-$p$. Accordingly, a concentration of the history of updating the privileged ID information in one security server can be prevented, realizing a higher level of safety.

As mentioned above, when the method of the embodiment 14 is utilized to generate privileged ID information in the embodiment 20, there has been a need to hold a plurality of privileged ID information ($sid_h$-1, ..., p) for one key ID information in the privileged ID memory of the security server. However, in the present embodiment, even though the method of the embodiment 14 is utilized to generate privileged ID information, the privileged ID information which is controlled by each security server may be only one privileged ID information for one key ID information. In this respect, a control of the privileged ID information can be simplified.

Embodiment 22

An embodiment 22 will now be described.

This embodiment is a modification of the embodiment 20 and the embodiment 21, and in this modification, a plurality of privileged ID information which are acquired is stored in a tag device rather than in a client apparatus.

Figure 46:
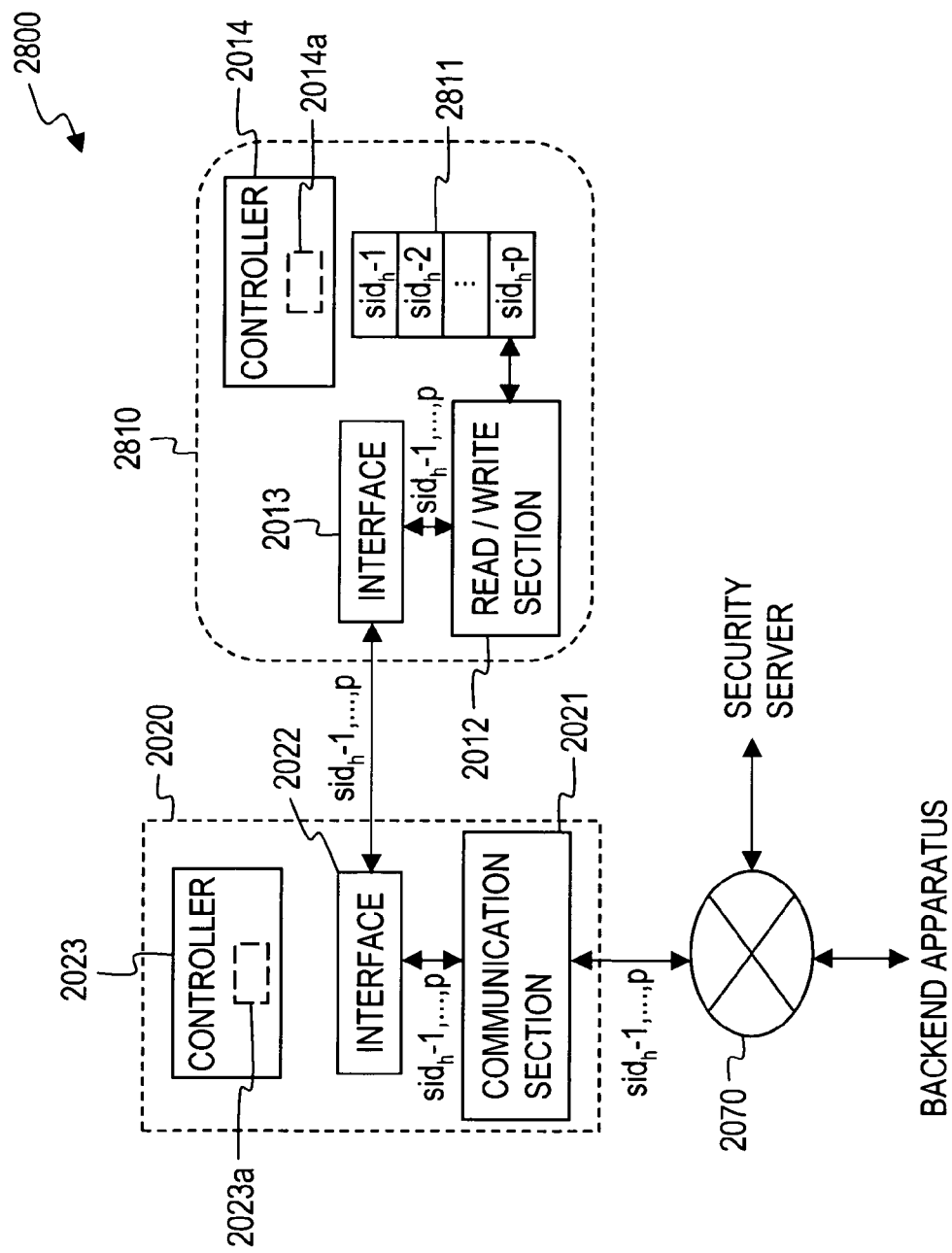
[FIG. 46] is a block diagram showing a functional arrangement of an updater system of an embodiment 22.

FIG. 46 is a block diagram illustrating a functional arrangement of an updating system 2800 of the present embodiment. A functional arrangement and a processing of the present embodiment will be described below with reference to this Figure. It is to be noted that in FIG. 46, arrangements which are common with the embodiment 14 are designated by like characters as used in the embodiment 14. A distinction over the embodiment 14, the embodiment 20 and the embodiment 21 will be principally described below.

<Pre-Processing>

Initially, a communication section 2021 of a client apparatus 2020 receives a plurality of kinds of privileged ID information ($sid_h$-1, ..., p) which are sent through the network 2070. The plurality of kinds of privileged ID information ($sid_h$-1, ..., p) which are received are sent to an interface 2022, and thence transmitted to a tag device 2810.

The tag device 2810 receives (accepts as input) the plurality of kinds of privileged ID information ($sid_h$-1, ..., p) at its interface 2013 (equivalent to "privileged ID input section"), and sends them to a read/write section 2012, which then stores them in a privileged ID memory 2811. It is to be noted that the privileged ID information ($sid_h$-1, ..., p) may be ones which are sent from a single security server or ones which are delivered from a plurality of security servers.

<Privileged ID Updating Processing>

The read/write section 2012 of the tag device 2810 (equivalent to "privileged ID extractor") extracts one privileged ID information ($sid_h$-j) arbitrarily (for example, at random) from the privileged ID memory 2811 under the control of a controller 2014 in response to a trigger (opportunity) which may be a read command from a reader, for example, and transmits it from an interface 2013. The transmitted privileged ID information ($sid_h$-j) is used in a processing by the backend apparatus as described above in connection with the embodiment 14.

<Features of Embodiment 22>

In the present embodiment, a plurality of kinds of privileged ID information ($sid_h$-1, ..., p) are stored in the tag device 2810, and one privileged ID information ($sid_h$-j) which is selected therefrom is used. This avoids that the privileged ID information which is used in the acquisition of information relating to ID be identical with each other during each run, thus allowing a tracing of the tag device 2810 to be suppressed. Since the plurality of kinds of privileged ID information ($sid_h$-1, ..., p) are stored in the tag device 2810 itself, the privileged ID information which is used can be updated if an access to the client apparatus 2020 cannot be made (as when a reading processing is performed in a tag reader which does not have the function of a client apparatus 2020, for example).

Embodiment 23

In this embodiment, a tag device is provided with a confidential value memory having a read-only region in which key ID information is stored and a rewritable region in which a first privileged ID information is stored. When re-privileging processing of the privileged ID information is made, key ID information and the first privileged ID information are extracted from the privileged ID memory to be delivered.

An updater accepts the key ID information and the first privileged ID information as inputs, and extracts a key which corresponds to the key ID information. Using the extracted key and the first privileged ID information, it generates a second privileged ID information, the association with the first privileged ID information of which is difficult to follow, and this second privileged ID information is delivered.

A tag device accepts the second privileged ID information as an input and stores the second privileged ID information which is input in the rewriteable region of the privileged ID memory.

What is updated by the updater is only the privileged ID information. And what is rewritten in the tag device is only the privileged ID information in the rewritable region, and there is no change in the key ID information in the read-only region. Accordingly, if the privileged ID information in the rewritable region is rewritten to a privileged ID information which corresponds to a different tag device, the key ID information which is used in a decrypting processing of the privileged ID information remains unchanged from the original key ID information. For this reason, a decrypting server which is selected when decrypting the rewritten privileged ID information is a decrypting server which is selected on the basis of the original key ID information, for example, and it is possible that a decrypting processing of the rewritten privileged ID information may not be appropriately achieved. If the decrypting server were in common, the key which is used in the decrypting processing of the rewritten privileged ID information is the key which corresponds to the original key ID information, and accordingly, a decrypted result may become extraordinary.

This embodiment will be described below with reference to the drawings.

Figure 47:
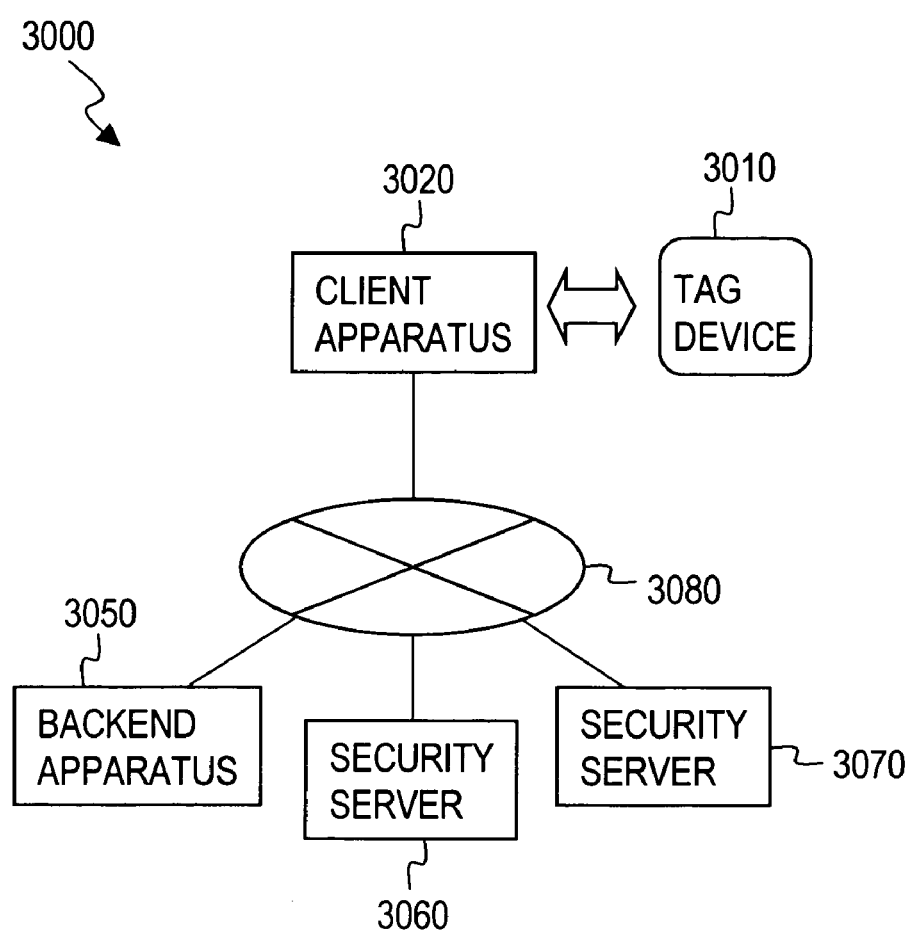
[FIG. 47] is a conceptual view illustrating an overall arrangement of an updater system of an embodiment 23.

FIG. 47 is a conceptual view illustrating an overall arrangement of an updating system 3000 of this embodiment.

As illustrated in this Figure, an updating system 3000 comprises a tag device 3010 such as a radio tag or the like which is applied to goods, a client apparatus 3020, a backend apparatus 3050 which controls products distribution information or the like which relates to ID in plain text, a security server 3060 which performs a re-privileging processing of privileged ID information, and a security server 3070 which performs a restoration processing of ID. The client apparatus 3020, the backend apparatus 3050 and the security servers 3060 and 3070 are connected together to enable a communication therebetween through a network 3080 such as internet or the like. For brevity of description, in this Figure, the tag device 3010, the client apparatus 3020, the backend apparatus 3050 and the security servers 3060 and 3070 are each shown for only one, but it is to be noted that a plurality of tag devices are normally provided and that more than one client apparatus, backend apparatus and security servers may also be provided. In addition, the security servers 3060 and 3070 may be replaced by a security server which has the both functions of the security servers 3060 and 3070.

In the client apparatus 3020 of this example, it reads privileged ID information from the tag device 10 and sends it to the security server 3070. The security server 3070 restores ID from the privileged ID information, and returns this ID to the client apparatus 3020. Upon receiving ID, the client apparatus 3020 accesses the backend apparatus 3050 to demand an entry of information including ID, a date and time of reading, a location of reading, a temperature or the like and an acquisition of information relating to ID. Also, a mode of utilizing a proxy model may be contemplated in which the client apparatus 3020 transmits the privileged ID information to the security server 3070, which then directly accesses the backend apparatus 3050.

At a given opportunity, the privileged ID information within the tag device 3010 is subjected to re-privileging processing in the security server 3060 (namely, updating the privileged ID information into a separate privileged ID information), whereby the privileged ID information within the tag device 3010 is updated. In order to secure an opportunity to update the privileged ID information in a positive manner, the client apparatus 3020 may be located at the porch of a house. In this instance, each time a user who carries the tag device passes through the porch, the client apparatus 3020 reads the privileged ID information within tag device 3010, which is re-privileged by the security server 3060 to be written into the tag device again.

The present embodiment is characterized in that the tag device 3010 is provided with privileged ID memory including a read-only region in which key ID information is stored and a rewritable region in which privileged ID information is stored, and that while the re-privileged privileged ID information is written into the rewritable region, the read-only region in which the key ID information is stored is not updated. It is to be noted that the privileged ID information which is stored in the rewritable region does not contain key ID information.

<Functional Arrangement/Processing>

Figure 48:
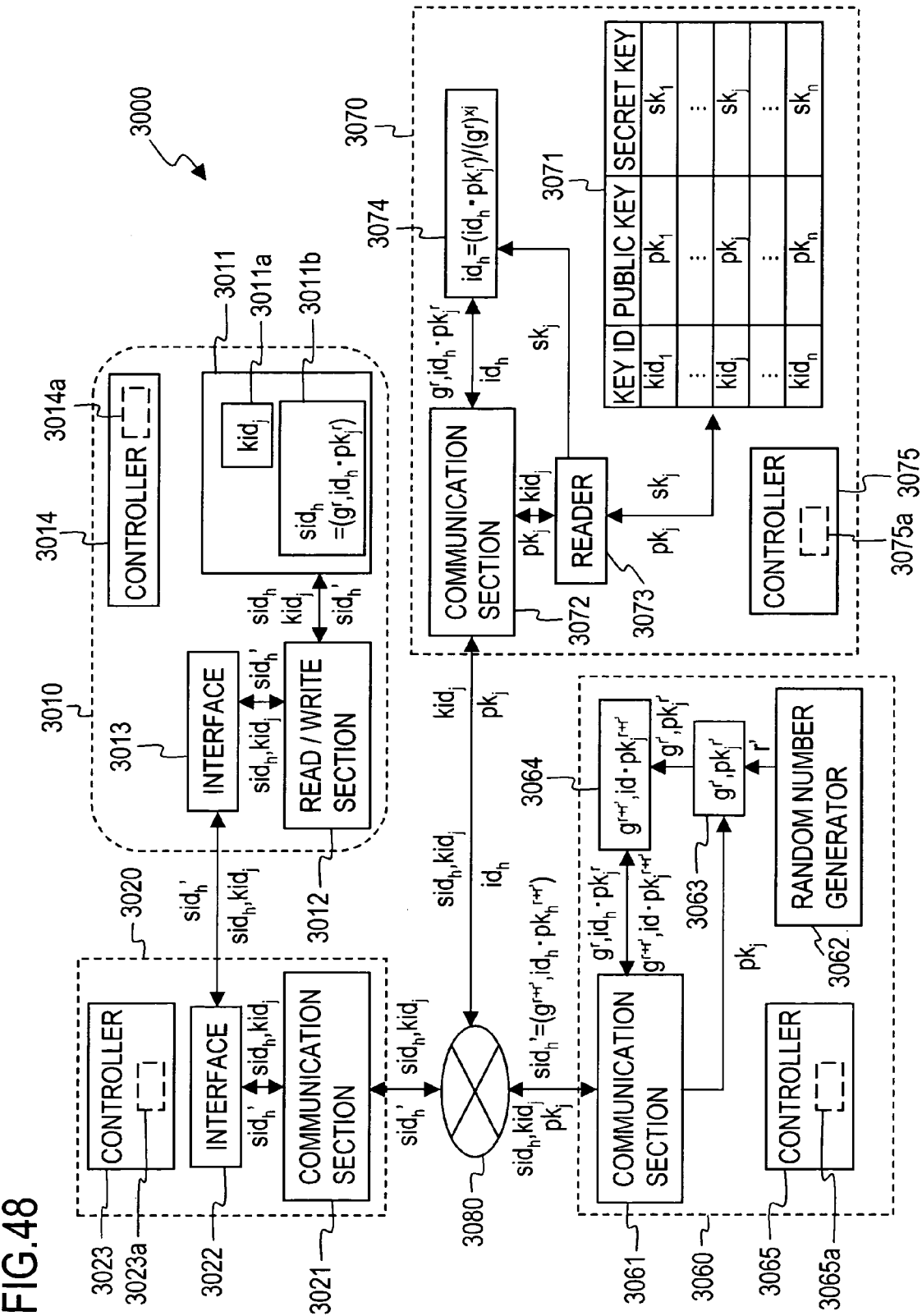
[FIG. 48] is an illustration of a functional arrangement of the updater system of the embodiment 23.
Figure 49:
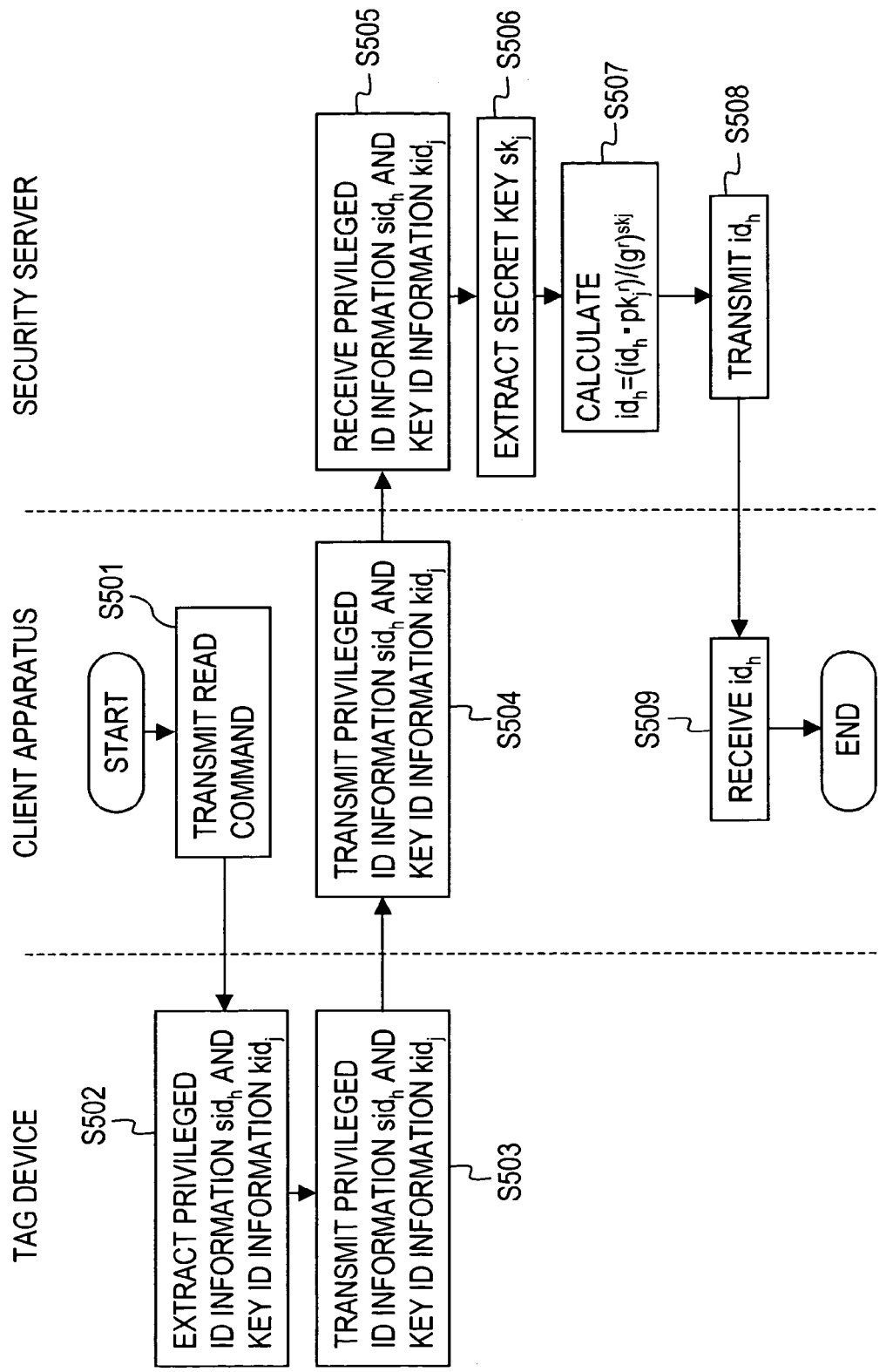
[FIG. 49] is a flow chart for describing a processing procedure of the embodiment 23.
Figure 50:
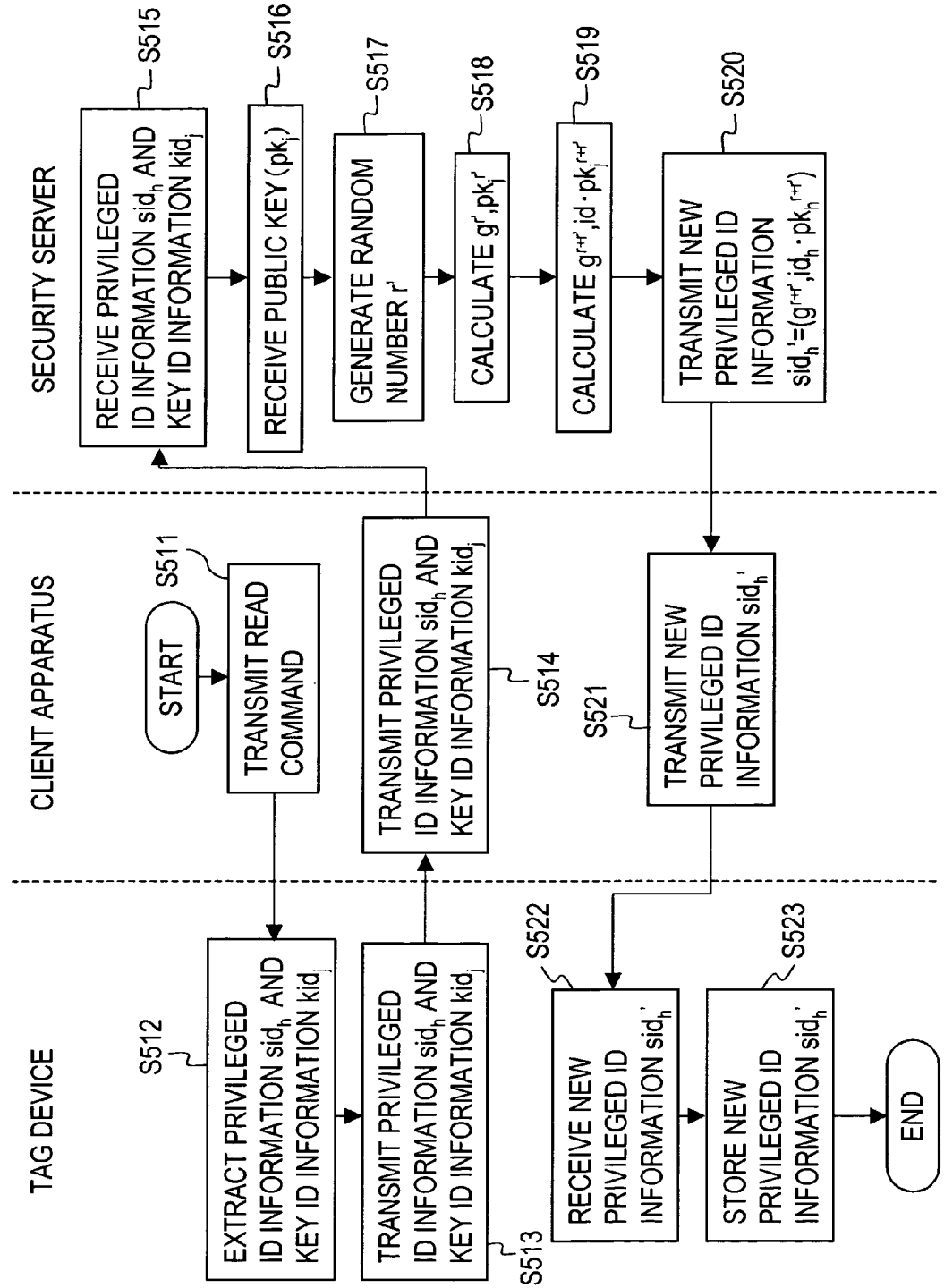
[FIG. 50] is a flow chart for describing a processing procedure of the embodiment 23.

FIG. 48 is an illustration of a functional arrangement of an updating system 3000 of the present embodiment, and FIGS. 49 and 50 are flow charts for describing a processing procedure therefore. A functional arrangement and a processing of the present embodiment will be described below with reference to these Figures. A description of the backend apparatus will be omitted in connection FIG. 48 and subsequent Figures. The tag device 3010, the client apparatus 3020 and the security servers 3060 and 3070 execute respective processings under the control of controllers 3014, 3023, 3065 and 3075, respectively. Data which are processed are sequentially stored in memories 3014a, 3023a, 3065a or 3075a, and is accessed when a processing such as a calculation is performed, but will be omitted from the description to follow.

<Pre-Processing>

In this mode, an encrypted text formed according to an encryption algorithm having the property of re-encryption (public key encryption technique) is used as privileged ID information. In this example, elliptical ElGamal encryption is used.

As shown in FIG. 48, the tag device 3010 of this example has a confidential value memory 3011 including a read-only region 3011a and a rewritable region 3011b. As a confidential value memory 3011, a rewritable memory such as rewritable ROM (Read Only Memory) such as EEPROM may be used, and given regions thereof may be allotted to the read-only memory 3011a and the rewritable region 3011b. Alternatively, a memory such as ROM which cannot be rewritten may be used to construct the read-only region 3011a while a rewritable memory such as EEPROM may be used to construct the rewritable region 3011b. Key ID information $kid_j$ which specifies a secret key $sk_j$ and a public key $pk_j$ is stored (recorded) in the read-only region 3011a, and privileged ID information $sid_h = (g^r, id_h \cdot pk_j^r)$ is stored in the rewritable region 3011b.

An element of generation g is stored in the memory 3065a of the security server 3060 ("updater"), and each key ID information $(kid_1, \ldots, kid_n)$, a secret key $(sk_1, \ldots, sk_n)$ and a public key $(pk_1, \ldots, pk_n)$ are stored in the key memory 3071 of the security server 3070 (equivalent to "decryptor") in a manner relating to each other.

In this example, it is assumed that a total number m of tag devices is sufficiently greater than a total number n of keys (m>>n), and an identical key ID information is allotted to unrelated tag devices. Specifically, rather than allotting an identical key ID information to tag devices which are applied to goods of the same variety, for example, an identical key ID information is allotted to tag devices which are applied to unrelated goods. This allows preventing tag devices, the variety of goods or a particular one of goods from being uniquely identified on the basis of the key ID information.

<Privileged ID Decrypting Processing>

Initially, a decrypting processing of privileged ID information which is performed when demanding a backend apparatus 3050 to acquire information relating to ID will be described.

Initially, utilizing some sort of authentication technology, a mutual authentication is performed between the client apparatus 3020 and the security server 3070. It is to be noted that a communication between the client apparatus 3020 and the security server 3070 takes place by using an encryption according to some encryption technique.

The client apparatus 3020 then transmits a read command to the tag device 3010 from its interface 3022 (step S501). This read command is received by an interface 3013 of the tag device 3010, and this triggers a read/write section 3012 to extract key ID information $kid_j$ from the read-only region 3011a of the confidential value memory 3011 and to extract privileged ID information $sid_h$ from the rewritable region 3011b (step S502). The extracted privileged ID information $sid_h$ and the key ID information $kid_j$ are transmitted to the client apparatus 3020 through the interface 3013 (step S503), and are received by the interface 3022 of the client apparatus 3020. The client apparatus 3020 identifies an address of the security server 3070 from the received key ID information $kid_j$, for example, and transmits the privileged ID information $sid_h$ and key ID information $kid_j$ to the security server 3070 from its communication section 3021 through a network 3080 (step 504).

The transmitted privileged ID information $sid_h$ and key ID information $kid_j$ are received by a communication section 3072 (equivalent to "privileged ID input section") of the security server 3070 (accepted as inputs) (step S505), and the privileged ID information $sid_h$ is fed to a decryptor 3074 (equivalent to "ID calculator") while the key ID information $kid_j$ is fed to a read/write section 3073. The read/write section 3073 (equivalent to "key extractor") extracts a secret key $sk_j$ which corresponds to the key ID information $kid_j$ which is sent thereto from a key memory 3071, and sends it to the decryptor 3074 (step S506). The decryptor 3074 calculates a tag ID information $id_h$ which is decrypted from the privileged ID information $sid_h$ using the privileged ID information $sid_h$ and the secret key $sk_j$ which are sent thereto. In this example, the tag ID information $id_h$ is calculated by a calculation of $id_h = (id_h \cdot pk_j^r)/(g^r)^{skj}$. It is to be noted that the index "skj" in this calculation formula means "$sk_j$". The calculated tag ID information $id_h$ is sent to the communication section 3072, which then transmits it toward the client apparatus 3020 through the network 3080 (step S508). The client apparatus 3020 receives the transmitted tag ID information $id_h$ at its communication section 3021 (step S509), and utilizes this tag ID information $id_h$ for a subsequent inquiry to the backend apparatus 3050.

<Privileged ID Updating Processing>

Privileged ID information updating processing in the present embodiment will now be described.

Initially, using some sort of authentication technology, a mutual authentication is made between the client apparatus 3020 and the security server 3060. It is to be noted that a communication between the client apparatus 3020 and the security server 3060 takes place in an encrypted form according to some encryption technique.

Privileged ID information updating processing in this example is initiated at an arbitrary opportunity such as a passage of a user through a location such as a front porch which he never fails to pass when leaving the house or at a number of uses of privileged ID information stored in the tag device 3010 (such as a count reaching a given value), which acts as a trigger. In response to this trigger, the client apparatus 3020 transmits a read command to the tag device 3010 from its interface 3022 (step S511). This read command is received by the interface 3013 of the tag device 3010, and this triggers the read/write section 3012 (equivalent to "privileged ID extractor") to extract key ID information $kid_j$ from the read-only region 3011a of the confidential value memory 3011 and to extract privileged ID information $sid_h$ from the rewritable region 3011b (step S512). The extracted privileged ID information $sid_h$ and key ID information $kid_j$ are transmitted (delivered) through the interface 3013 (equivalent to "privileged ID extractor") to the client apparatus 3020 (step S513), and are received by the interface 3022 of the client apparatus 3020, which then transmits the received privileged ID information $sid_h$ and key ID information $kid_j$ to the security server 3060 through the communication section 3021 and the network 3080 (step 514).

The security server 3060 receives (accepts as inputs) the privileged ID information $sid_h$ and the key ID information $kid_j$ at its communication section 3061 (equivalent to "privileged ID input section") (step S515), and sends the privileged ID information $(sid_h=(g^r, id_h \cdot pk_j^r))$ to the remainder multiplication calculator 3064 (which constitutes "privileged ID updating section"). The communication section 3061 (equivalent to "key extractor") transmits this key ID information $kid_j$ together with a demand to acquire a public key to the security server 3070 through the network 3080.

The security server 3070 receives them at its communication section 3072, and sends the key ID information kidj to the reader 3073. The reader 3073 extracts a public key $pk_j$ which corresponds to this key ID information $kid_j$ from the key memory 3071, and returns the extracted public key $pk_j$ to the security server 3060 through the communication section 3072 and the network 3080.

The security server 3060 receives (extracts) this public key $pk_j$ at its communication section 3061, and sends it to the remainder power calculator 3063 (which constitutes "privileged ID updating section") (step S516). This triggers, for example, a random number generator 3062 to generate a random number r' which is equal to or greater than 0 and equal to or less than p−1 and to send it to the remainder power calculator 3063 (step S517). The remainder power calculator 3063 calculates $(g^{r'}, pk_j^{r'})$ using the element of generation g within the memory 3065a, the received public key $pk_j$ and the random number r', and sends a result of the calculation to the remainder multiplication calculator 3064 (step S518). The remainder multiplication calculator 3064 calculates $(g^{r+r'}, id_h \cdot pk_j^{r+r'})$ using received $(g^{r'}, pk_j^{r'})$ and $(g^r, id_h \cdot pk_j^r)$, and sends a result of this calculation (an encrypted text) as new privileged ID information to the communication section 3061 (step S519). The communication section 3061 (equivalent to "privileged ID output section") transmits (delivers) the privileged ID information $(sid_h'=(g^{r+r'}, id_h \cdot pk_j^{r+r'}))$ (privileged ID information sid', the association of which with the privileged ID information $(sid_h)$ before updating is difficult to follow) to the client apparatus 3020 through the network 3080 (step S520).

The transmitted new privileged ID information $sid_h'$ is received by the communication section 3021 of the client apparatus 3020, and is transmitted from its interface 3022 to the tag device 3010 (step S521). The tag device 3010 receives (accepts as input) this new privileged ID information $sid_h'$ at its interface 3013 (equivalent to "privileged ID input section") (step S522), and its read/write section 3012 (equivalent to "privileged ID storage") stores this new privileged ID information $sid_h'$ in the rewritable region 3011b of the memory 3011 (step S523). The tag device 3010 responds with this new privileged ID information $sid_h'$ in response to a subsequent read demand.

<Features of Embodiment 23>

In the present embodiment, there is provided the confidential value memory 3011 having the read-only region 3011a in which key ID information is stored and the rewritable region 3011b in which the privileged ID information is stored, and only the privileged ID information stored in the rewritable region 3011b is re-privileged to be updated. Accordingly, if privileged ID information of a separate tag device were written into the rewritable region 3011b when re-privileging the privileged ID information, it is possible to detect such an irregularity/mistake.

By way of example, referring to FIG. 48, an instance is considered in which privileged ID information $(g^r, ID_2 \cdot pk_1^r)$ of a separate tag device which corresponds to key ID information $kid_1$ is stored in the rewritable region 3011b of the confidential value memory 3011 of the tag device 3010. Even in this instance, key ID information which is stored in the read-only region 3011a remains to be $kid_j$, and the secret key which is extracted from the key memory 3071 by the reader 3073 during the decrypting processing of the security server 3070 is $sk_j$ which corresponds to $kid_j$. Accordingly, a result of decryption from the decryptor 3074 is $(id_2 \cdot pk_1^r)/(g^r)^{skj}=(id_2 \cdot (g^{sk1})^r)/(g^r)^{skj}=ID_2 \cdot g^{sk1}/g^{skj}$, whereby a result of calculation indicates an extraordinary data. Accordingly, a decrypted result represented by extraordinary data allows a detection of the fact that the privileged ID information of a separate tag device has been written into.

Since a wrong rewriting of privileged ID information can be prevented without a control as by password of an access to the rewritable region 3011b, the cost for the control circuit can be suppressed while dispensing with a complex password control for purpose of an access control.

Specifically, this enables an updating of privileged ID information at an arbitrary timing to be executed in a more reliable and safe manner and at a reduced cost, permitting a protection of the privacy of the tag device 3010.

It is added that while privileged ID information is generated and updated using elliptical ElGamal encryption in the present embodiment, an encryption having the property of re-encryption or re-privileging technique disclosed in Patent Application No. 2003-359157 may also be used. In addition, the security servers 3060 and 3070 may be unified, and in addition, the security server 3060 may be provided with a memory for the public key.

Embodiment 24

The present embodiment is a modification of the embodiment 23, in which a confirmation is made to see whether or not a result of decrypting privileged ID information has any contradiction with the format of ID, thereby confirming whether or not privileged ID information which is delivered from the tag device is wrong. A distinction over the embodiment 23 will be principally described below while omitting a description of matters which are common with the embodiment 23.

Figure 51:
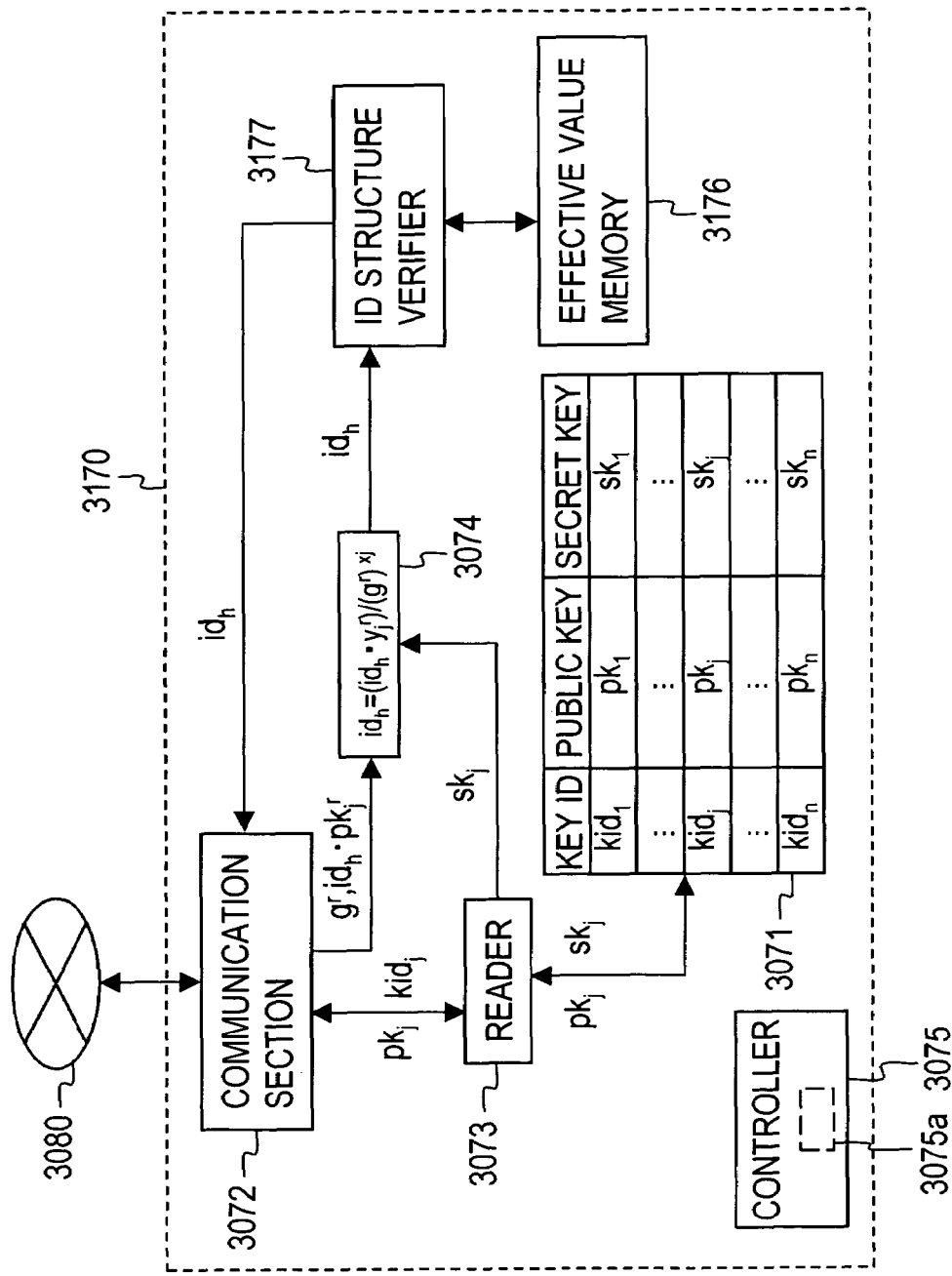
[FIG. 51] is an illustration of a functional arrangement of a security server apparatus of an embodiment 24.
Figure 53:
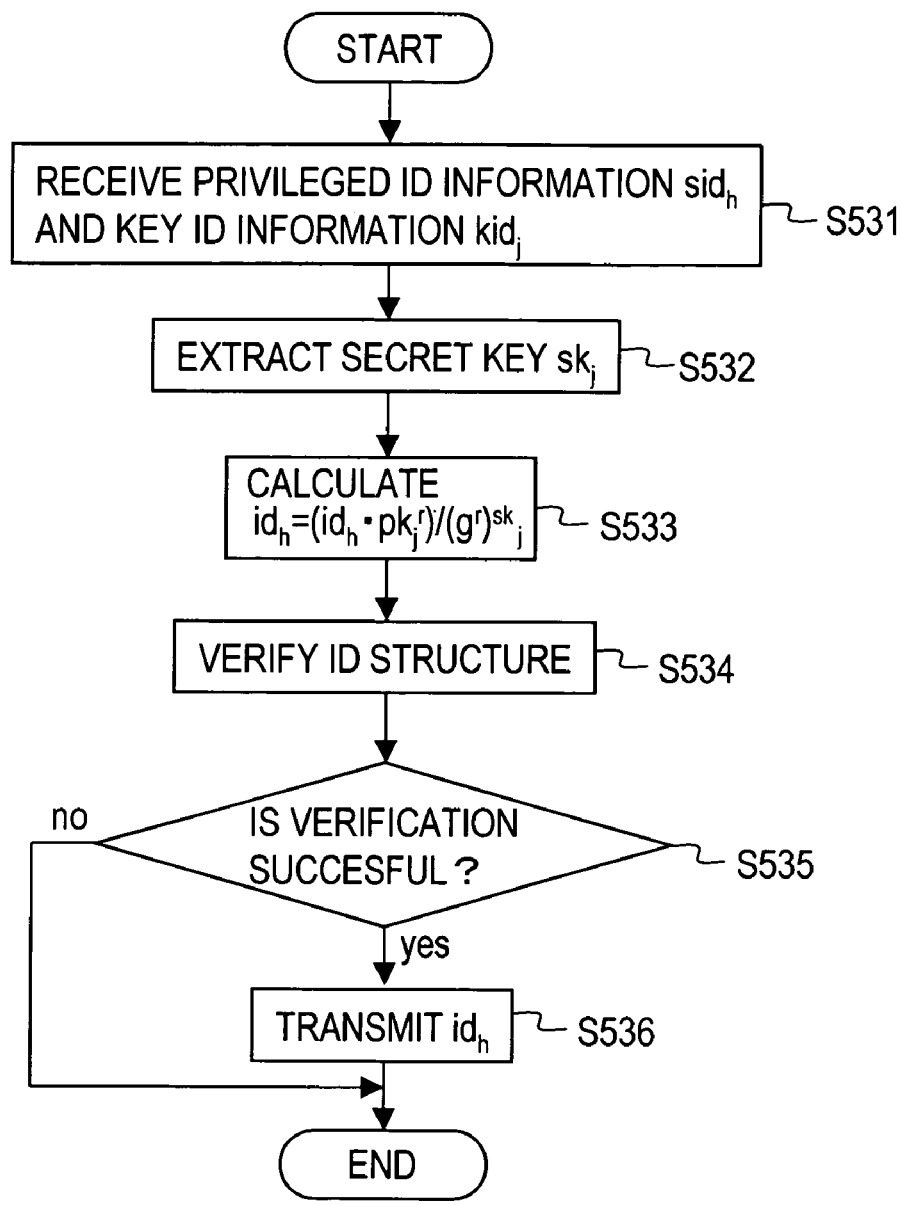
[FIG. 53] is a flow chart for describing a processing procedure of the security server apparatus of the embodiment 24.

FIG. 51 is an illustration of a functional arrangement of a security server 3170 (equivalent to "decryptor") of the present embodiment, and FIG. 52 illustrates a format of tag ID information 3200 used in the present embodiment. FIG. 53 is a flow chart for describing a processing procedure by the security server 3170. It is to be noted that functional arrangements which are common with the embodiment 23 are designated in FIG. 51 by like characters as used in the embodiment 23.

<An Overall Arrangement/Hardware Arrangement>

The arrangement is similar to the embodiment 23 except that the security server 3070 is replaced by the security server 3170.

<Pre-Processing>

A distinction over the embodiment 23 lies in that an effective value of each field of ID is stored in an effective value memory 3176 of the security server 3170. In other respects, the process is similar as in the embodiment 23.

<Privileged ID Decrypting Processing>

A distinction over the embodiment 23 resides in substituting a processing illustrated in FIG. 53 by the security server 3170 for the processing by the security server 3070 mentioned above (FIG. 49: steps S505~S508). Only the processing by the security server 3170 will be described below while omitting a description for other processing.

In the similar manner as in the embodiment 23, privileged ID information $sid_h$ and key ID information $kid_j$ transmitted from a client apparatus 3020 are received by a communication section 3072 (equivalent to "privileged ID input section") of the security server 3170 (accepted as inputs) (step S531) and the privileged ID information $sid_h$ is sent to a decrypting section 3074 (equivalent to "ID calculator") while key ID information $kid_j$ is sent to a reader section 3073. The reader section 3073 (equivalent to "key extractor") extracts a secret key $sk_j$ which corresponds to the key ID information $kid_j$ which is sent thereto, and sends it to the decrypting section 3074 (step S532). The decrypting section 3074 calculates the tag ID information $id_h$ which is decrypted from privileged ID information $sid_h$ using privileged ID information $sid_h$ which is sent thereto and the secret key $sk_j$.

The calculated tag ID information $id_h$ is sent to an ID structure verifier 3177 where the structure of the tag ID information $id_h$ is verified (step S534). As illustrated in FIG. 52, ID3200 of this example has fields including a header (h) 3210, a version code (vc) 3202, a manufacturer code (mc) 3203, a products code (pc) 3204 and a serial code (sc) 3205. An effective value which each field can assume is stored in an effective value memory 3176, and the ID structure verifier 3177 compares a value of each field in the received tag ID information $id_h$ against an effective value which is extracted from the effective value memory 3176 to verify whether or not the value of each field in the received tag ID information $id_h$ is within a range for the effective value. Upon a successful verification (step S535), the ID structure verifier 3177 sends the tag ID information $id_h$ to the communication section 3072, which then transmits the tag ID information $id_h$ to the client apparatus 3020 (step S536). On the other hand, when the verification is unsuccessful (step S535), the ID structure verifier 3177 destroys the tag ID information $id_h$, terminating the processing operation.

<Features of Embodiment 24>

In the present embodiment, an arrangement is made for the ID structure verifier 3177 of the security server 3170 to verify whether or not the decrypted tag ID information $id_h$ has no contradiction with a given ID format. This allows extraordinary which may result from decrypting a privileged ID information which is attributable to a writing of privileged ID information of a different tag device into the rewritable region of the tag device to be discovered in a reliable manner.

Embodiment 25

The present embodiment is a modification of the embodiment 23, and a distinction over the embodiment 23 resides in that during a re-privileging processing of privileged ID information, a secret key is applied to the key ID information and re-privileged privileged ID information to attach authentication information such as a digital signature, MAC or the like. A distinction over the embodiment 23 will be principally described below while omitting a description for other matters which are common with the embodiment 23.

Figure 54:
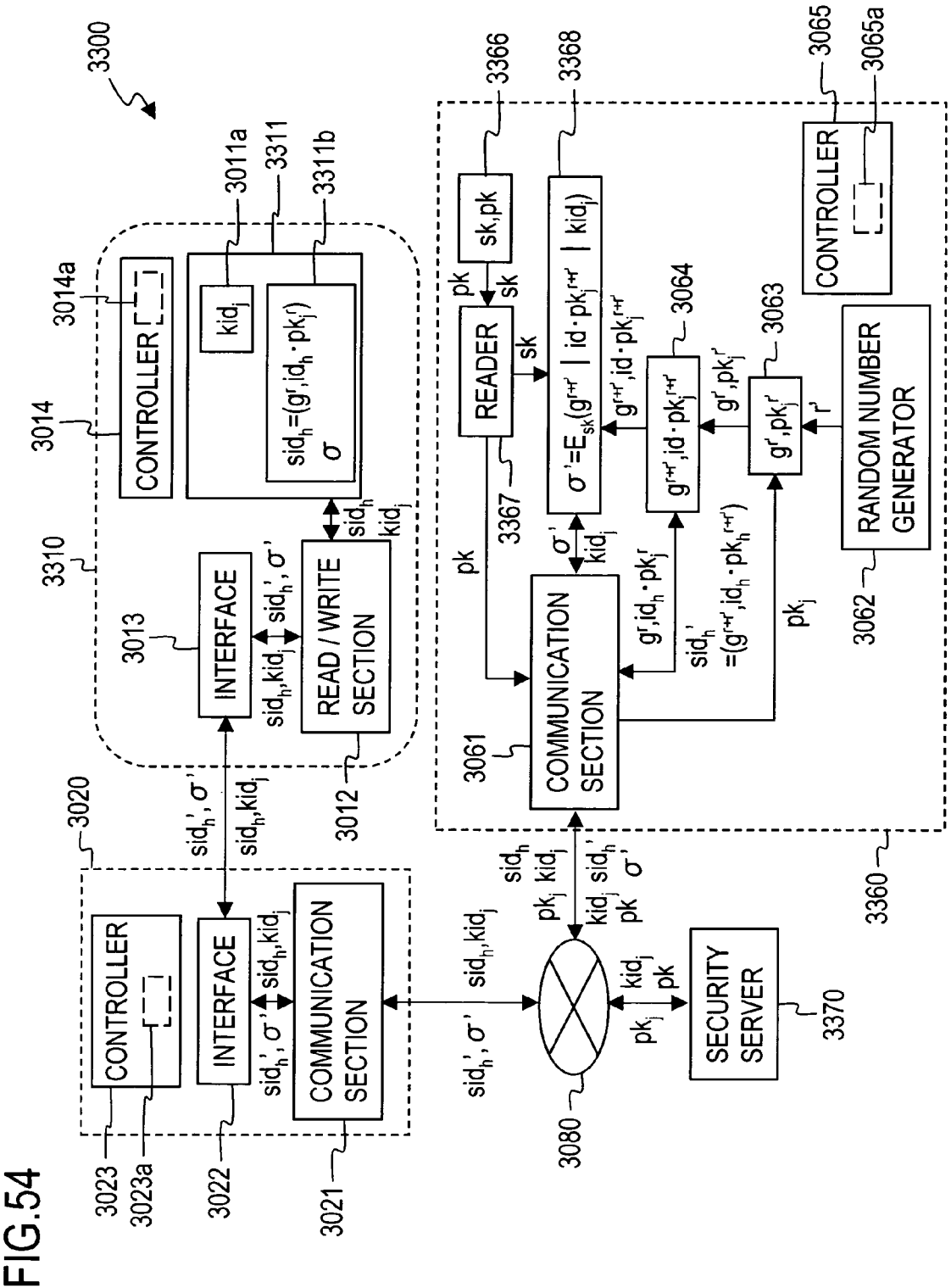
[FIG. 54] is an illustration of a functional arrangement of an updater system of an embodiment 25.
Figure 55:
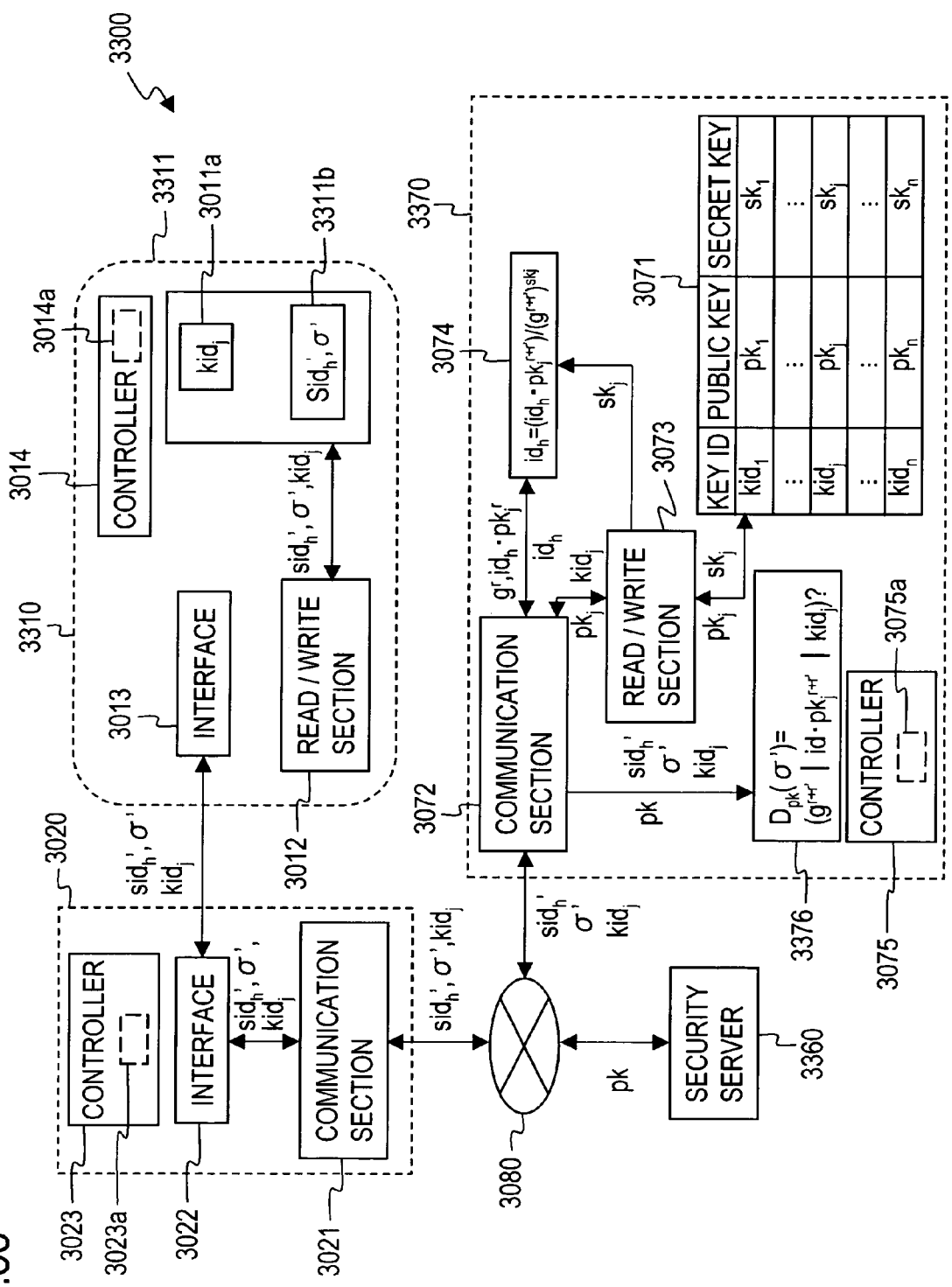
[FIG. 55] is an illustration of a functional arrangement of an updater system of the embodiment 25.
Figure 56:
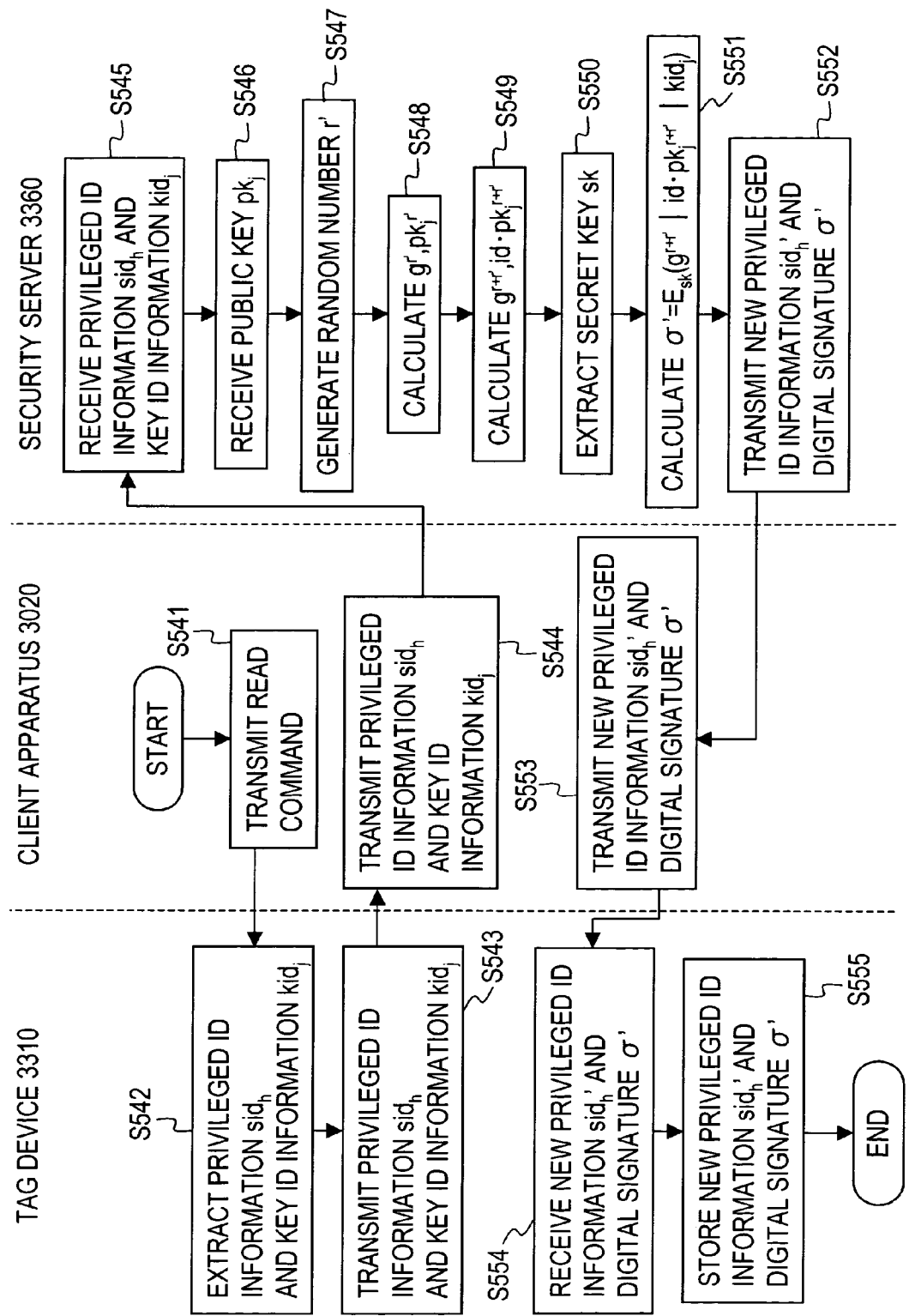
[FIG. 56] is a flow chart for describing a processing procedure of the embodiment 25.
Figure 57:
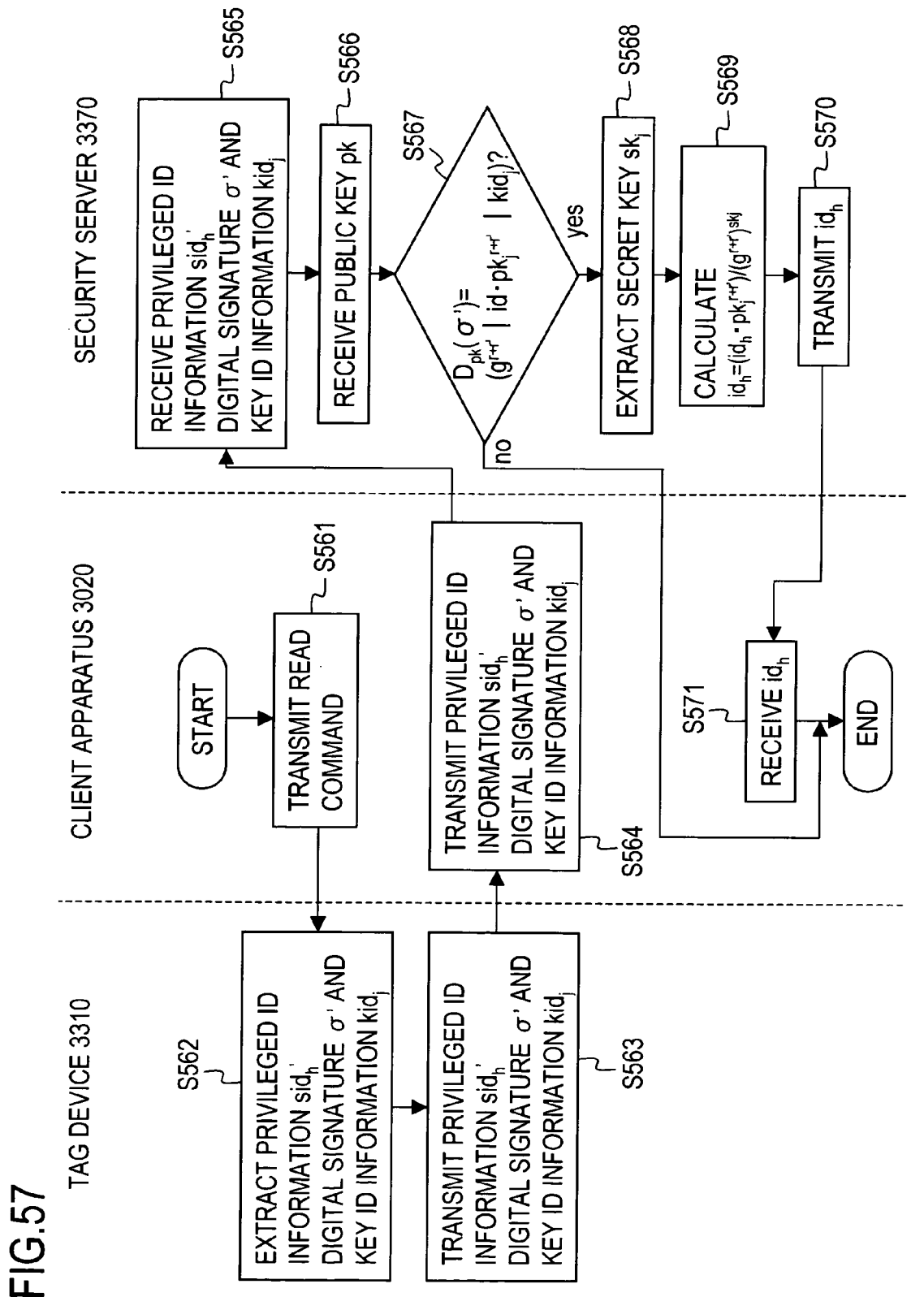
[FIG. 57] is a flow chart for describing a processing procedure of the embodiment 25.

FIGS. 54 and 55 illustrate functional arrangements of an updating system 3300 of the present embodiment, and FIGS. 56 and 57 are flow charts for describing a processing procedure. It is to be noted that in FIGS. 54 and 55, functional arrangements which are common with the embodiment 23 are designated by like characters as used in the embodiment 23.

<An Overall Arrangement/Hardware Arrangement>

The arrangement is similar to the embodiment 23 except that a tag device 3310 is substituted for the tag device 3010, a security server 3360 (equivalent to "updater") is substituted for the security server 3060, and a security server 3370 (equivalent to "decryptor") is substituted for the security server 3070.

<Pre-Processing>

Distinctions over the embodiment 23 reside in that privileged ID information $sid_h$ and a digital signature (equivalent to "verification information") are stored in a rewritable region 3311b of a confidential value memory 3311 of the tag device 3310 and that the secret key $sk_j$ and the public key $pk_j$ used in the digital signature are stored in a key memory 3366 of the security server 3360. In other respects, the arrangement is similar to the embodiment 23.

<Privileged ID Updating Processing>

Privileged ID information updating processing of the present embodiment will now be described.

Initially, a client apparatus 3020 transmits a read command to the tag device 3310 from its interface 3022 (step S541). The read command is received by an interface 3013 of the tag device 3310, and this triggers a read/write section 3012 to extract key ID information $kid_j$ from a read-only region 3011a of the confidential value memory 3311 and to extract privileged ID information $sid_h$ from the rewritable region 3311b (step S542). The extracted privileged ID information $sid_h$ and key ID information $kid_j$ are transmitted to the client apparatus 3020 through the interface 3013 (step S543), and are received by the interface 3022 of the client apparatus 3020. The client apparatus 3020 transmits the received privileged ID information $sid_h$ and key ID information $kid_j$ to the security server 3360 through a communication section 3021 and a network 3080 (step 544).

The security server 3360 receives the privileged ID information $sid_h$ and the key ID information $kid_j$ at its communication section 3061 (step S545), and sends the privileged ID information $(sid_h=(g^r, id_h \cdot pk_j^r))$ to a remainder multiplication calculator 3064. In the similar as in the embodiment 23, the communication section 3061 transmits the key ID information $kid_j$ to the security server 3370 where the extracted public key $pk_j$ is acquired (received) (step S546). This public key $pk_j$ is sent to a remainder power calculator 3063, and a random number $r'$ which is generated in a random number generator 3062 (step S547) is also sent to the remainder power calculator 3063. The remainder power calculator 3063 calculates $(g^{r'}, pk_j^{r'})$, and sends a result of calculation to the remainder multiplication calculator 3064 (step S548), which then calculates $(g^{r+r'}, id_h \cdot pk_j^{r+r'})$, and sends this result of calculation as new privileged ID information to the communication section 3061 and a signature generator 3368 (step S549). This triggers a reader 3367 to extract a secret key sk from the key memory 3366 and to send it to the signature generator 3368 (step S550). The signature generator 3368 (equivalent to "verification information generator") also receives the key ID information $kid_j$ from the communication section 3061 to generate a bit combination data $(g^{r+r'}|id_h \cdot pk_j^{r+r'}|kid_j)$ of $g^{r+r'}$, $id_h \cdot pk_j^{r+r'}$ and $kid_j$, for example, and generates a digital signature (equivalent to "verification information") $\sigma' = E_{sk}(g^{r+r'}|id_h \cdot pk_j^{r+r'}|kid_j)$ which is formed by encrypting the bit combination data with the secret key sk (step S551). The generated new digital signature $\sigma'$ is sent to the communication section 3061 (equivalent to "privileged ID output section"), which transmits (delivers) the new privileged ID information $(sid_h'=(g^{r+r'}, id_h \cdot pk_j^{r+r'}))$ which is previously sent thereto and the new digital signature σ' to the client apparatus 3020 through the network 3080 (step S552).

The new privileged ID information $sid_h$' and the digital signature σ' which have been transmitted are received by the communication section 3021 of the client apparatus 3020 and are transmitted from the interface 3022 to the tag device 3310 (step S553). The tag device 3310 receives (accepts as inputs) the new privileged ID information $sid_h$' and the digital signature σ' at its interface 3013 (equivalent to "privileged ID input section") (step S554), and the read/write section 3012 (equivalent to "privileged ID storing section") stores the new privileged ID information $sid_h$' and the digital signature σ' in the rewritable region 3311b of the confidential value memory 3311 (step S555). Subsequently, the tag device 3310 responds with the new privileged ID information $sid_h$' and the digital signature σ' in response to a read demand.

<Privileged ID Decrypting Processing>

Privileged ID information decrypting processing according to the present embodiment will now be described.

Initially, the client apparatus 3020 transmits a read command to the tag device 3310 from its interface 3022 (step S561). This read command is received by the interface 3013 of the tag device 3310, and this triggers the read/write section 3012 to extract key ID information $kid_j$ from the read-only region 3011a of the confidential value memory 3311 and to extract privileged ID information $sid_h$' and digital signature σ' from the rewritable region 3311b (step S562). The extracted privileged ID information $sid_h$', digital signature a' and key ID information $kid_j$ are transmitted to the client apparatus 3020 from the interface 3013 (step S563), and are received by the interface 3022 of the client apparatus 3020. The client apparatus 3020 transmits such information from the communication section 3021 to the security server 3370 through the network 3080 (step 564).

The transmitted privileged ID information $sid_h$', digital signature σ' and key ID information $kid_j$ are received by the communication section 3072 (equivalent to "privileged ID input section") of the security server 3370 (accepted as inputs) (step S565), the digital signature σ' is fed to a signature verifier 3376, the privileged ID information $sid_h$ is fed to a decryptor 3074 (equivalent to "ID calculator") and the signature verifier 3376, and the key ID information $kid_j$ is fed to a reader 3073 and the signature verifier 3376.

The communication section 3072 also sends a public key acquisition demand to the security server 3360 through the network 3380, and the security server 3360 receives it at its communication section 3061 and causes its reader 3367 to extract the public key pk from the key memory 3363 and returns the public key pk through the communication section 3061 and the network 3080. The public key pk is received by the communication section 3072 of the security server 3370 (step S566) and is then sent to the signature verifier 3376.

The signature verifier 3376 decrypts the received digital signature a' using the public key pk ($D_{pk}$(σ')), and generates a bit combination data ($g^{r+r'}|id_h \cdot pk_j^{r+r'}|kid_j$) of $g^{r+r'}$, $id_h \cdot pk_j^{r+r'}$ and $kid_j$. It then verifies the digital signature σ' by seeing whether or not $D_{pk}$(σ') is equal to ($g^{r+r'}|id_h \cdot pk_j^{r+r'|kid}_j$) (step S567). In the event $D_{pk}$(σ')=($g^{r+r'}|id_h \cdot pk_j^{r+r'}|kid_j$) does not apply, the processing is terminated as a failure of verification. On the other hand, if $D_{pk}$(σ')=($g^{r+r'}|id_h \cdot pk_j^{r+r'}|kid_j$) does apply, a read/write section 3073 (equivalent to "key extractor") extracts a secret key $sk_j$ which corresponds to the key ID information $kid_j$ which is sent thereto from a key memory 3071, and sends it to the decryptor 3074 (step S568). Using the privileged ID information $sid_h$) and the secret key $sk_j$ which are sent thereto, the decryptor 3074 calculates tag ID information $id_h$ which is decrypted from the privileged ID information $sid_h$' ($id_h=(id_h \cdot pk_j^{r+r'})/(g^{r+r'})^{skj}$)) (step S569). It is to be noted that the index "skj" appearing in this calculation formula refers to "$sk_j$". The calculated tag ID information $id_h$ is sent to the communication section 3072, which then transmits it to the client apparatus 3020 through the network 3080 (step S570). The client apparatus 3020 receives the transmitted tag ID information $id_h$ at its communication section 3021 (step S571), and utilizes this tag ID information $id_h$ in its subsequent inquiry to the backend apparatus 3050.

<Features of Embodiment 25>

In this embodiment, an arrangement is made that during re-privileging processing, a digital signature σ'=$E_{sk}$ ($g^{r+r'}|id_h \cdot pk_j^{r+r'}|kid_j$) is generated in the security server 3360, and this digital signature σ' is verified by the security server 3370 during the decrypting processing. Accordingly, during the decrypting processing, the authenticity of privileged ID information which is re-privileged can be verified by the digital signature, allowing a storage of a wrong privileged ID information in the tag device 3310 to be detected in a more reliable manner.

While the digital signature σ' is generated in the security server 3360 in this mode, it is to be noted that the security server 3370 or a server of an authentication organization or the like may act for the generation of the digital signature σ'.

Embodiment 26

This embodiment is a modification of the embodiment 23, and differs from the embodiment 23 in that of a variety of information which constitute a tag ID information, only that information which is inherent to each tag device is privileged to provide privileged ID information. A distinction over the embodiment 23 will be principally described below while omitting a description for matters which are common with the embodiment 23.

Figure 58:
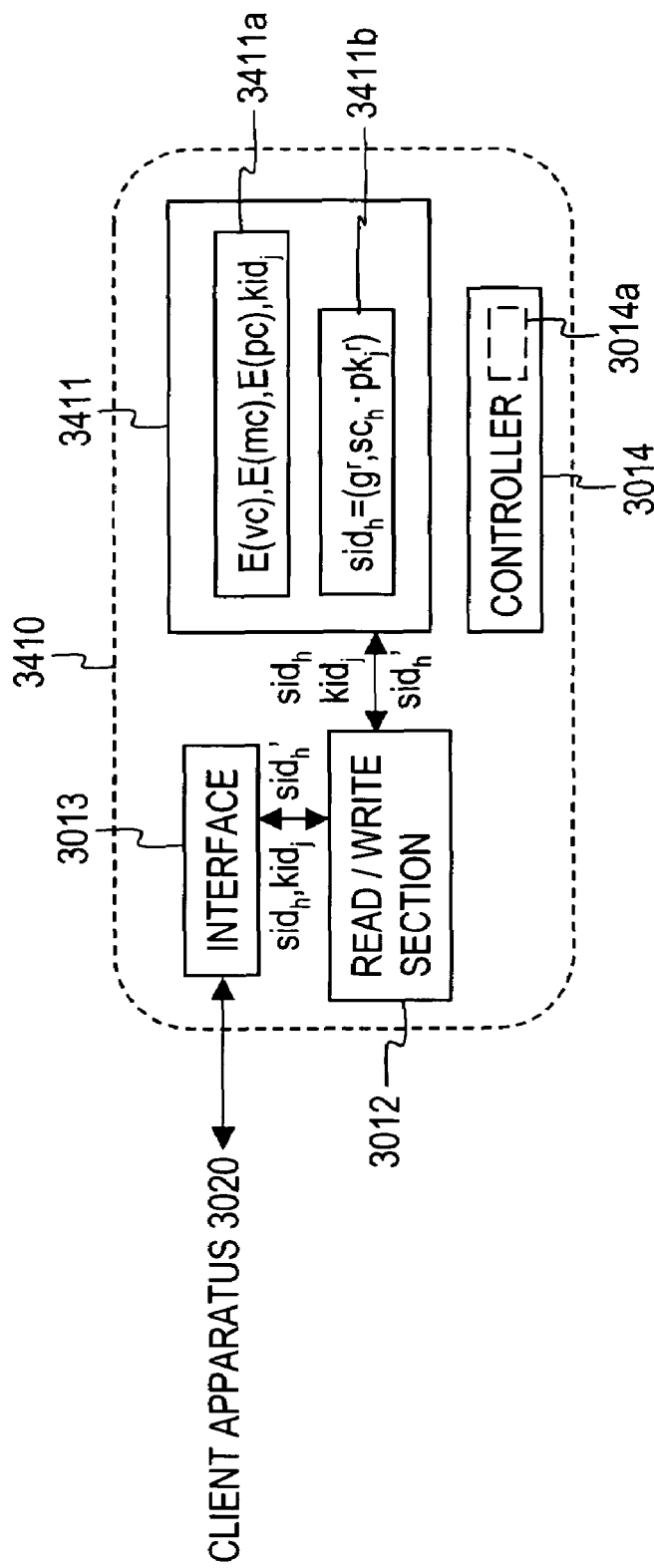
[FIG. 58] is an illustration of a functional arrangement of a tag device in an embodiment 26.

FIG. 58 is an illustration of a functional arrangement of a tag device 3410 of the present embodiment. It is to be noted that in FIG. 58, functional arrangements which are common with the embodiment 23 are designated by like characters as used in the embodiment 23.

<An Overall Arrangement/Hardware Arrangement>

This remains to be similar to the embodiment 23 except that the tag device 3010 is replaced by a tag device 3410.

<Pre-Processing>

A distinction over the embodiment 23 resides in that of a variety of information which constitute tag ID information, only that information which is inherent to each tag device is privileged to provide privileged ID information $sid_h$. When using tag ID information having a data construction as illustrated in FIG. 52, the serial code (sc) 3205 represents information which is inherent to each tag device, and privileged ID information will be $sid_h=(g^r, sc_h \cdot pk_j^r)$. This privileged ID information ($sid_h=(g^r, sc_h \cdot pk_j^r$)) is stored in a rewritable region 3411b of a confidential value memory 3411 of the tag device 3410. It is also a distinction over the embodiment 23 that information which is common to products such as the version code (vc) 3202, manufacturer code (mc) 3203 and products code (pc) 3204 are encrypted (E(vc), E(mc), E(pc)) and stored in a read-only region 3411a of the confidential value memory 3411. It is to be noted that a probability encryption or the like is used for encrypting information such as version code (vc) 3206 or the like which is common to every kind of products so that a different encrypted text may be obtained for the same products.

<Processing>

Privileged ID decrypting processing and privileged ID updating processing of this example remain similar to the embodiment 23 except that the privileged ID information is represented by $sid_h=(g^r, sc_h \cdot pk_j^r)$. It is also another difference from the first mode that a read/write section 3012 extracts E(vc), E(mc), E(pc) or the like from the read-only region 3411a of the confidential value memory 3411 to be transmitted to a backend apparatus 3050 though its interface 3013 and client apparatus 3020 or the like as required for an inquiry to the backend apparatus 3050.

<Features of Embodiment 26>

In the present embodiment, since only information which is inherent to each tag device is privileged to provide privileged ID information, an amount of data which is subject to the privileging processing can be reduced to reduce the amount of calculation and amount of communication in comparison to an arrangement in which information which is common to each kind of products is also privileged to provide privileged ID information.

It should be understood that the present embodiment is not limited to the described modes or embodiments mentioned above. By way of example, the present invention can be carried out in a mode which comprises a combination of embodiments, and in addition, a variety of processings mentioned above are not limited to those which are executed in a time sequence as described, but may be executed concurrently or individually depending on the processing capacity of the apparatus which executes a processing or as required. In addition, it should be understood that modifications can be suitably made without departing from the spirit of the present invention.

When the described arrangements are implemented using a computer, a processing content of a function which is to be performed by each apparatus is described in terms of a program. By executing the program on a computer, the processing function is implemented by the computer.

The program which describes such processing content can be recorded in a record medium which is readable by the computer. A record medium which is readable by the computer may comprise a magnetic recorder, an optical disc, a magneto-optical record medium, a semiconductor memory or the like, for example. Specifically, by way of example, the magnetic recorder may comprise a hard disc unit, a flexible disc, a magnetic tape or the like; an optical disc may comprise DVD (Digital Versatile Disc), DVD-RAM (Random Access Memory), CD-ROM (Compact Disc Read Only Memory), CD-R (Recordable)/RW (ReWritable); the magneto-optical record medium may comprise MO (Magneto-Optical disc) or the like; and the semiconductor memory may comprise EEPROM (Electronically Erasable and Programmable-Read Only Memory) or the like.

The distribution of the program may take place through a sale, a transfer or a lease or the like of a portable record medium such as DVD, CD-ROM or the like in which the program is recorded. Alternatively, the program may be stored in a memory of a server computer, and may be transferred from the server computer to another computer for purpose of distribution.

A computer which is used to execute the program may have the program which is recorded in the portable record medium or the program which is transferred from the server computer once stored in its own memory. When the processings are to be executed, this computer can read the program stored in its own record medium and executes processings in accordance with the program which is read out. In another mode of executing the program, the computer may directly read the program from the portable record medium, and then execute processings in accordance with the program. In addition, each time a program is transferred from the server computer to this computer, the computer may execute processings in accordance with the program received in a sequential manner. As a further alternative, rather than transferring the program from the server computer to this computer, the described processings can be executed by a so-called ASP (Application Service Provider) service in which the processing functions are realized by merely commanding execution and acquiring results. It is to be understood that a program in this mode is intended to include information which is used in a processing by an electronic computer and which conforms to a program (such as data which does not directly command a computer, but which has the property to rule the processing by the computer).

AVAILABILITY OF USE IN INDUSTRY

In accordance with the present invention, a likelihood that a distribution process of tag devices may be traced from information delivered from tag devices in RFID, for example, can be suppressed.

What is claimed is:

1. A tag privacy protection method for preventing privacy information of a user from being acquired from information which is delivered from a tag device, comprising:

delivering tag output information from an output section of the tag device, the tag output information corresponding to a confidential value stored in a confidential value memory of the tag device, the confidential value being a mapping of tag ID information;

and reading out the confidential value or elements thereof from the confidential value memory, applying a first function to the confidential value or the elements thereof to generate a new confidential value, an inverse image of the first function being difficult to obtain, and updating the confidential value in the confidential value memory with the new confidential value by overwriting in a first calculator of the tag device, the new confidential value differing from the confidential value, and both the new confidential value and the confidential value corresponding to the identical tag ID information.

2. A tag privacy protection method according to claim 1, further comprising:

reading out the confidential value from the confidential value memory, and applying a second function F2 which disturbs a relationship between elements of a definition domain and a mapping thereof to the confidential value read out in a second calculator of the tag device; wherein the tag output information is a result of such calculation.

3. A tag privacy protection method according to claim 2 in which at least one of the first function F1 and the second function F2 is a hash function.

4. A tag privacy protection method according to claim 2 in which the first function F1 is a hash function $H(x)=hash(p|x)$ where hash represents a hash function for $\{0, 1\}^* \rightarrow \{0, 1\}^r$, $p \in \{0, 1\}^s$ and r and s are natural numbers and in which the second function F2 is a hash function $G(x)=hash(q|x)$ where $q \in \{0, 1\}^s$ for p.

5. A tag privacy protection method according to claim 2 in which the first function F1 is a hash function $H(x)=hash(pad(x, p))$ where hash represents a hash function for $\{0, 1\}^* \rightarrow \{0, 1\}^s$, $p \in \{0, 1\}^s$, pad(x, p) represents a padding of p to x and r and s are natural numbers and in which the second function F2 is a hash function $G(x)=hash(pad(x, q))$ where pad(x, q) represents a padding of q to x and $q \in \{0, 1\}^s$ for $p \neq q$.

6. A tag privacy protection method according to claim 2 where the first function F1 is a hash function H(x) for $\{0,$ $1\}^* \to \{0, 1\}^r$ and r is a natural number and in which the second function F2 is a hash function $G(x)=F(rx)$ where rx represents a bit inversion of x.

7. A tag privacy protection method according to claim 2 in which at least one of the first function F1 and the second function F2 is a common key encryption function.

8. A tag privacy protection method according to claim 2 in which the first function F1 and the second function F2 are an identical common key encryption function, to which different common keys are applied.

9. A tag privacy protection method for preventing privacy information of a user from being acquired from information which is delivered from a tag device, in which a first confidential value $s_{k, i}$, corresponding to each tag ID information $id_k$ is stored in a confidential value memory of each tag device k where $k \in \{1, \ldots, m\}$ and m represents a total number of tag devices, and in which each tag ID information $id_n$ ($n \in \{1, \ldots, m\}$) and a corresponding second confidential value $s_{n, 1}$ are stored in a database memory of a backend apparatus in a manner relating to each other; comprising:

reading out the first confidential value $s_{k, i}$ from the confidential value memory, and applying a second function F2 which disturbs a relationship between elements of a definition domain and a mapping thereof to generate tag output information $F2(s_{k, i})$ in a second calculator of the tag device;

delivering the tag output information $F2(s_{k, i})$ from an output section of the tag device;

and reading out the first confidential value $s_{k, i}$ from the confidential value memory, applying thereto a first function F1, an inverse image of which is difficult to obtain, and saving a result of such calculation $F1(s_{k, i})$ as new first confidential value $s_{k, i+1}$ in the confidential value memory by overwriting in a first calculator of the tag device;

accepting an input of the tag output information $F2(s_{k, i})$ at an input section of the backend apparatus;

reading out the second confidential value $s_{n, 1}$ from the database memory, applying to each second confidential value $s_{n, 1}$ read out j times where $j \in \{0, \ldots, j_{max}\}$, the first function F1 and subsequently applying the second function F2 thereto in a third calculator of the backend apparatus;

comparing the tag output information $F2(s_{k, i})$ against the result of calculation $F2(F^j(s_{n, 1}))$ in a comparator of the backend apparatus;

in the event the tag output information $F2(s_{k, i})$ does not match the result of calculation $F2(F^j(s_{n, 1}))$, the processings in the third calculator and the comparator being executed again by changing the value of at least one of n and j;

and extracting by a reader of the backend apparatus the tag ID information $id_n$ which is related to the second confidential value $s_{n, 1}$ corresponding to the matched result of calculation $F2(F^j(s_{n, 1}))$ from the database memory when the tag output information $F2(s_{k, i})$ matches the result of calculation $F2(F^j(s_{n, 1}))$.

10. A tag privacy protection method for preventing privacy information of a user from being acquired from information which is delivered from a tag device, in which a first confidential value $s_{k, i}$ and a first proper value $w_k$ corresponding to each tag ID information $id_k$ are sored in a confidential value memory of each tag device k where $k \in \{1, \ldots, m\}$ and m represents a total number of tag devices, in a manner relating to each other and in which each tag ID information $id_n$ ($n \in \{1, \ldots, m\}$) and a corresponding second confidential value $s_n$, and a second proper value $w_n$ are stored in a database memory of a backend apparatus in a manner relating to each other; comprising:

reading out the first confidential value $s_{k, i}$ from the confidential value memory and applying thereto a second function F2 which disturbs a relationship between elements of a definition domain and a mapping thereof to generate tag output information $F2(s_{k, i})$ in a second calculator of the tag device;

delivering the tag output information $F2(s_{k, i})$ from an output section of the tag device;

reading out the first confidential value $s_{k, i}$ and the first proper value $w_k$ from the confidential value memory, applying a first function F1, an inverse image of which is difficult to obtain, to a bit combination value of the first confidential value and the first proper value, and saving a result of such calculation $F1(s_{k, i}|w_k)$ as a new confidential value $s_{k, i+1}$ in the confidential value memory by overwriting in a first calculator of the tag device;

accepting an input of the tag output information $F2(s_{k, i})$ by an input section of the backend apparatus;

reading out the second confidential value $s_{n, 1}$ and the second proper value $w_k$ from the database memory of the backend apparatus, and applying the second function F2 to $F^j(n)$ where $F^j(n)=s_{n, 1}$ ($j=0$) and $F^j(n)=F1(F^{j-1}(n)|id_n)$ ($j \geq 1$) to calculate $F2(F^j(n))$ in a third calculator of the backend apparatus;

comparing the tag ID information $F2(s_{k, i})$ and a result of calculation $F2(F^j(n))$ in the third calculator in a comparator of the backend apparatus;

in the event the tag output information $F2(s_{k, i})$ does not match the result of calculation $F2(F^j(n))$, the processings in the third calculator and the comparator being executed again by changing the value of at least one of n and j;

and in the event the tag output information $F2(s_{k, i})$ matches the result of calculation $F2(F^j(n))$, extracting the tag ID information $id_n$ which is related to the second confidential value $s_{n, 1}$ and the second proper value $w_n$ corresponding to the matching result of calculation $F2(F^j(n))$ from the database memory by a reader.

11. A tag privacy protection method for preventing privacy information of a user from being acquiring from information which is delivered from a tag device, in which a first confidential value $s_{k, i}$ and a first proper value $w_k$ which correspond to each tag ID information $id_k$ are stored in a confidential value memory of each tag device k where $k \in \{1, \ldots, m\}$, and m represents a total number of tag devices and in which a tag ID information $id_n$ ($n \in \{1, \ldots, m\}$) and a second confidential value $S_{n, 1}$ and a second proper value $w_n$ which correspond thereto are stored in a database memory of a backend apparatus in a manner relating to each other; comprising:

reading out the first confidential value $s_{k, i}$ and the first proper value $w_k$ from the confidential value memory and applying to a bit combination value thereof a second function F2 which disturbs a relationship between elements of a definition domain and a mapping thereof to generate tag output information $F2(s_{k, i}|w_k)$ in a second calculator of the tag device;

delivering the tag output information $F2(s_{k, i}|w_k)$ from an output section of the tag device;

reading out the first confidential value $s_{k, i}$ from the confidential value memory, applying a first function F1, an inverse image of which is difficult to obtain, to the first confidential value $s_{k, i}$ which is read out, and saving a result of such calculation $F1(s_{k, i})$ as a new first confidential value $s_{k, i}$ in the confidential value memory by overwriting in a first calculator of the tag device;

accepting the tag output information $F2(s_{k,i}|w_k)$ as an input at an input section of the backend apparatus;

reading out the second confidential value $s_{n,1}$ and the second proper value $w_n$ from the database memory, of the backend apparatus, applying j times ($j \in \{0, \ldots, j_{max}\}$) the first function F1 to the second confidential value $s_{n,1}$ to determine a bit combination value $F1^j(s_{n,i})|w_n$ of a resulting $F1^j(s_{n,i})$ and the second proper value $w_n$, and applying the second function F2 to the bit combination value $F1^j(s_{n,i})|w_n$ in a third calculator of the backend apparatus; and comparing the tag output information $F2(s_{k,i}|w_k)$ against a result of calculation in the third calculator $F2(F1^j(S_{n,i})|w_n)$ in a comparator of the backend apparatus;

in the event the tag output information $F2(s_{k,i}|w_k)$ does not match the result of calculation $F2(F1^j(s_{n,i})|w_n)$, executing the processings in the third calculator and the comparator again by changing the value of at least one of n and j;

and in the event the tag output information $F2(s_{k,i}|w_k)$ matches the result of calculation $F2(F1^j(s_{n,i})|w_n)$, extracting the tag ID information $id_n$ which is related to the second confidential value $s_{n,1}$ and the second proper value $w_n$ corresponding to the matching result of calculation $F2(F1^j(s_{n,i})|w_n)$ from the database memory by a reader of the backend apparatus.

12. A tag privacy protection method for preventing privacy information of a user from being acquired from information which is delivered from a tag device, in which a first proper value $w_k$ corresponding to each tag ID information $id_k$ and a first confidential value $s_i$ which assumes an identical initial value $s_i$ for a plurality of tag ID information are stored in a confidential value memory of each tag device k where $k \in \{1, \ldots, m\}$ and m represents a total number of tag devices, each tag ID information $id_n (n \in \{1, \ldots, m\})$ and a corresponding second proper value $w_n$ are stored in a database memory of a backend apparatus in a manner relating to each other, and a first result of calculation $s_{j+1}$ obtained by applying j times ($j \in \{0, \ldots, j_{max}\}$) a first function F1 to the second confidential value $s_1$ which is used in common by the plurality of tag ID information is stored in a calculated value memory of the backend apparatus; comprising:

reading out the first confidential value $s_i$ and the first proper value $w_k$ from the confidential value memory and applying to a bit combination value thereof a second function F2 which disturbs a relationship between elements of a definition domain and a mapping thereof to generate tag output information $F2(s_i|w_k)$ in a second calculator of the tag device;

delivering the tag output information $F2(s_i|w_k)$ from an output section of the tag device;

reading out the first confidential value $s_i$ from the confidential value memory, applying the first function F1, an inverse image of which is difficult to obtain, to the first confidential value $s_i$ which is read out, and saves a result of such calculation F1 ($s_i$) as a new first confidential value $s_{i+1}$ in the confidential value memory by overwriting in a first calculator of the tag device;

accepting the tag output information $F2(s_i|w_k)$ as an input at an input section of the backend apparatus;

reading out a result of the first calculation $s_{j+1}$ and the second proper value $w_n$ from the database memory to obtain a bit combination value $s_{j+1}|w_n$ thereof, and applying the second function F2 thereto in a third calculator of the backend apparatus; and comparing the tag output information $F2(s_i|w_k)$ against a result of the calculation by the third calculator $F2(s_{j+1}|w_n)$ in a comparator of the backend apparatus;

in the event the tag output information $F2(s_i|w_k)$ does not match the result of the calculation $F2(s_{j+1}|w_n)$, executing the processings in the third calculator and the comparator again by changing the value of at least one of n and j;

and in the event the tag output information $F2(s_i|w_k)$ matches the result of the calculation $F2(s_{j+1}|w_n)$, extracting the tag ID information $id_n$ which is related to the second proper value $w_n$ corresponding to the matching result of calculation $F2(s_{j+1}|w_n)$ from the database memory by a reader of the backend apparatus.

13. A tag privacy protection method for preventing privacy information of a user from being acquired from information which is delivered from a tag device, in which a combination of d ($d \geq 2$) elements $e_{u,vu} (u \in \{1, \ldots, d\})$ corresponding to each tag ID information $id_k$ is stored in a confidential value memory of each tag device k $k \in \{1, \ldots, m\}$ and m represents a total number of tag devices), and in which a combination of d initial elements $f_{u,0}$ comprising one selected from each of d kinds ($d \geq 2$) of subgroups $\alpha_u (u \in \{1, \ldots, d\})$ and the tag ID information $id_n$ of each tag device n ($n \in \{1, \ldots, m\}$) are stored in a database memory of a backend apparatus in a manner relating to each other; comprising:

reading out the d elements $e_{u,vu}$ from the confidential value memory to form a bit combination value thereof which represents a confidential value $s_{k,i}$ and applying a second function F2 which disturbs a relationship between elements of a definition domain and a mapping thereof to the confidential value $s_{k,i}$ to generate tag output information $a_{k,i} = F2(s_{k,i})$ in a second calculator of the tag device;

delivering the tag output information $a_{k,i}$ from an output section of the tag device;

extracting at least part of elements $e_{u',vu'} (u' \in \{1, \ldots, d\})$ from the confidential value memory, applying a first function F1, an inverse image of which is difficult to obtain, to the extracted elements $e_{u',vu'}$, and saving a result of such calculation F1 ($e_{u',vu'}$) as new elements $e_{u',vu'+1}$ in the confidential value memory by overwriting in a first calculator of the tag device;

accepting the tag output information $a_{k,i}$ as an input at an input section of the tag device;

applying the first function F1 $w_u$ times ($w_u \in \{1, 2, \ldots, max\}$) to d initial elements $f_{u,0} (u \in \{1, \ldots, d\})$ corresponding to the tag ID information $id_n$, and applying the second function F2 to a bit combination value of these values $F1^{wu}(f_{u,0})$ to determine a calculated value c in a third calculator of the backend apparatus; and comparing the tag output information $a_{k,i}$ against the calculated value c in a comparator of the backend apparatus;

in the event the tag output information $a_{k,i}$ does not match the calculated value c, executing the processings in the third calculator and the comparator again by changing the value of at least part of n and $w_u$;

and in the event the tag output information $a_{k,i}$ matches the calculated value c, extracting tag ID information $id_n$ which is related to the combination of d initial elements $f_{u,0}$ corresponding to the calculated value c from the database memory by a reader of the backend apparatus.

14. A tag privacy protection method for preventing privacy information of a user from being acquired from information which is delivered from a tag device, in which a combination of d ($d \geq 2$) elements $e_{u,vu} (u \in \{1, \ldots, d\})$ which corresponds to each tag ID information $id_k$ and a proper value $\gamma_k$ which is inherent to each tag ID information $id_k$ are stored in a confidential value memory of each tag device k where $k \in \{1, \ldots, m\}$ and where m represents a total number of tag devices and in which a combination of d ($d \geq 2$) elements $e_{u, vu}$ where $u \in \{1, \ldots, d\}$ which corresponds to each tag ID information $id_k$ and a proper value $\gamma_k$ which is inherent to each tag ID information $id_k$ are stored in a database memory of a backend apparatus in a manner relating to each other; comprising:

reading out the d elements $e_{u, vu}$ and the proper value $\gamma_k$ from the confidential value memory, and applying a second function F2 which disturbs a relationship between elements of a definition domain and a mapping thereof to a confidential value $s_{k, i}$ which is a bit combination value of the d elements and the proper value to generate tag output information $a_{k, i} = F2(s_{k, i})$ in a second calculator of the tag device;

delivering the tag output information $a_{k, 1}$ from an output section of the tag device;

extracting at least part of elements $e_{u', vu'}$ ($u' \in \{1, \ldots, d\}$) from the confidential value memory, applying a first function F1, an inverse image of which is difficult to obtain, to the extracted elements $e_{u', vu'}$, and saving a result of such calculation F1($e_{u', vu'}$) as new elements $e_{u', vu'+1}$ in the confidential value memory by overwriting in a first calculator of the tag device;

accepting the tag output information $a_{k, i}$ as an input at an input section of the backend apparatus;

applying the first function F1 $w_u$ times ($w_u \in \{1, 2, \ldots, max\}$) to the d initial elements $f_{u, 0}$ ($u \in \{1, \ldots, d\}$) corresponding to the tag ID information $id_n$ and applying the second function F2 to a bit combination value of the function values $F1^{wu}(f_{u, 0})$ and the proper value $\gamma_n$ to determine a calculated value c in a third calculator of the backend apparatus; and comparing the tag output information $a_{k, i}$ against the calculated value c in a comparator of the backend apparatus;

in the event the tag output information $a_{k, i}$ does not match the calculated value c, executing the processings in the third calculator and the comparator again by changing the value of at least part of n and $w_u$;

and in the event the tag output information $a_{k, i}$ matches the calculated value c, extracting the tag ID information $id_n$ which is related to the combination the plurality of initial elements $f_{u, 0}$ corresponding to the calculated value c from the database memory by a reader of the backend apparatus.

15. A tag privacy protection method for preventing privacy information of a user from being acquired from information which is delivered from a tag device, in which d ($d \geq 1$) elements $e_{u, vu}$ ($u \in \{1, \ldots, d\}$) are stored in a confidential value memory of each tag device k where $k \in \{1, \ldots, m\}$ and m represents a total number of tag devices, a manifold value z having t kinds ($t \geq 2$) of values is stored in a first manifold value memory of each tag device k, a combination of d initial elements $f_{u, 0}$ comprising one selected from each of d kinds ($d \geq 1$) of subgroups $\alpha_u$ ($u \in \{1, \ldots, d\}$) and tag ID information $id_n$ ($n \in \{1, \ldots, m\}$) of each tag device are stored in a database memory of a backend apparatus in a manner relating to each other, and the manifold value z is stored in a second manifold value memory of the backend apparatus; comprising:

reading out each element $e_{u, vu}$ from the confidential value memory and reading out either manifold value z from the first manifold value memory and applying a second function F2 which disturbs a relationship between elements of a definition domain and a mapping thereof to a confidential value $s_{k, i}$ which is a bit combination value of the elements and the manifold value to generate tag output information $a_{k, i} = F2(s_{k, i})$ in a second calculator of the tag device;

delivering the tag output information $a_{k, i}$ from an output section of the tag device;

extracting at least part of elements $e_{u', vu'}$ ($u' \in \{1, \ldots, d\}$) from the confidential value memory each time the output section delivers the tag output information $a_{k, i}$ t times, applying a first function F1, an inverse image of which is difficult to obtain, to the extracted elements $e_{u', vu'}$, and saving a result of such calculation F1($e_{u', vu'}$) as new elements $e_{u', vu'+1}$ in the confidential value memory by overwriting in a first calculator of the tag device;

accepting the tag output information $a_{k, i}$ as an input at an input section of the backend apparatus;

applying the first function F1 $w_u$ times ($w_u \in \{1, 2, \ldots, max\}$) to the d initial elements $f_{u, 0}$ ($u \in \{1, \ldots, d\}$) corresponding to the tag ID information $id_n$ and applying the second function F2 to a bit combination value of these values $F1^{wu}(f_{u, 0})$ and the manifold value z to determine a calculated value c in a third calculator of the backend apparatus; and comparing the tag output information $a_{k, i}$ against the calculated value c in a comparator of the backend apparatus;

in the event the tag output information $a_{k, i}$ does not match the calculated value c, executing the processings in the third calculator and the comparator again by changing the value of at least part of n, $w_u$ and z;

and in the event the tag output information $a_{k, i}$ matches the calculated value c, extracting the tag ID information $id_n$ which is related to the combination of the d initial elements $f_{u, 0}$ corresponding to the calculated value c from the database memory by a reader of the backend apparatus.

16. A tag privacy protection method for preventing privacy information of a user from being acquired from information which is delivered from a tag device, in which d ($d \geq 2$) elements $e_{u, vu}$ ($u \in \{1, \ldots, d\}$) are stored in a confidential value memory of each tag device k ($k \in \{1, \ldots, m\}$, where m represents a total number of tag devices), a manifold value $z_u$ which assumes $t_u$ kinds ($t_u \geq 2$) of values for each u is stored in a first manifold value memory of each tag device k, a combination of d initial elements $f_{u, 0}$ comprising one selected from each of d kinds ($d \geq 2$) of subgroups $\alpha_u$ ($u \in \{1, \ldots, d\}$) and tag ID information $id_n$ ($n \in \{1, \ldots, m\}$) of each tag device are stored in a database memory of a backend apparatus in a manner relating to each other, and the manifold value $z_u$ is stored in a second manifold value memory of the backend apparatus; comprising:

reading out each element $e_{u, vu}$ from the confidential value memory and reading out either manifold value $z_u$ for each u from the first manifold value memory and applying a second function F2 which disturbs a relationship between elements of a definition domain and a mapping thereof to a confidential value $s_{k, i}$ which is a bit combination value of $e_{u, vu}$ and $z_u$ to generate tag output information $a_{k, i} = F2(s_{k, i})$ in a second calculator of the tag device;

delivering the tag output information $a_{k, i}$ from an output section of the tag device;

extracting at least part of elements $e_{u, vu}$ ($u' \in \{1, \ldots, d\}$) from the confidential value memory each time the output section delivers the tag output information $a_{k, i}$ some number of times, applying a first function F1, an inverse image of which is difficult to obtain, to the extracted elements $e_{u', vu'}$, and saving a result of such calculation $F1(e_{u', vu'})$ as new elements $e_{u', vu'+1}$ in the confidential value memory by overwriting in a first calculator of the tag device;

accepting the tag output information $a_{k, i}$ as an input at an input section of the backend apparatus;

applying $w_u$ times ($w_u \in \{1, 2, \ldots, \max\}$) the first function F1 to the d initial elements $f_{u, 0}$ ($u \in \{1, \ldots, d\}$) corresponding to the tag ID information $id_n$ and applying the second function F2 to a bit combination value of these values $F1^{wu}(f_{u, 0})$ and the manifold value $z_u$ to determine a calculated value c in a third calculator of the backend apparatus; and comparing the tag output information $a_{k, i}$ against the calculated value c in a comparator of the backend apparatus;

in the event the tag output information $a_{k, i}$ does not match the calculated value c, executing the processings in the third calculator and the comparator again by changing the value of at least part of n, $w_u$ and $z_u$;

and in the event the tag output information $a_{k, i}$ matches the calculated value c, extracting tag ID information $id_n$ which is related to the combination of a plurality of initial elements $f_{u, 0}$ corresponding to the calculated value c from the database memory by a reader of the backend apparatus.

17. A tag device for use in an automatic tag identification system comprising:

a confidential value memory in which a confidential value corresponding to tag ID information is stored;

a second calculator connected to the confidential value memory for reading out the confidential value from the confidential value memory and for applying a second function F2 which disturbs a relationship between elements of a definition domain and a mapping thereof to the confidential value which is read out to generate tag output information;

an output section for delivering the tag output information;

and a first calculator for reading out at least part of elements of the confidential value from the confidential value memory and for applying a first function F1, an inverse image of which is difficult to obtain, to the elements which are read out, with a result of such calculation being used to update the confidential value in the confidential value memory by overwriting.

18. A backend apparatus for use in an automatic tag identification system comprising a database memory in which each tag ID information and a corresponding confidential value are related to each other;

an input section which accepts tag output information as an input;

a calculator for applying a first function F1 which is used in a tag device some number of times to at least part of elements of the confidential value in the database memory and which then applies a second function which is used in the tag device thereto;

a comparator for sequentially comparing a result of the calculation in the calculator against the tag output information;

and a reader for extracting the tag ID information which is related to the confidential value corresponding to the matching result of calculation when a matching between the result of calculation and the tag output information is found from the database memory, wherein an inverse image of the first function F1 is difficult to obtain, the second function F2 disturbs a relationship between elements of a definition domain and mapping thereof.

19. A computer readable record medium storing a tag program which enables a computer to function as a backend apparatus according to claim 18.

20. A tag device for use in an automatic tag identification system comprising a confidential value memory in which a first confidential value $s_{k, i}$ corresponding to tag ID information $id_k$ is stored;

a second calculator connected to the confidential value memory for reading out the first confidential value $s_{k, i}$ from the confidential value memory and for applying a second function F2 which disturbs a relationship between elements of a definition domain and a mapping thereof to the first confidential value $s_{k, i}$ to generate tag output information $F2(s_{k, i})$;

an output section for delivering the tag output information $F2(s_{k, i})$;

and a first calculator connected to the confidential value memory for reading out the first confidential value $s_{k, i}$ from the confidential value memory, for applying a first function F1, an inverse image of which is difficult to obtain, to the first confidential value and for saving a result of such calculation $F1(s_{k, i})$ as a new first confidential value $s_{k, i+1}$ in the confidential value memory by overwriting.

21. A tag device according to claim 20, further comprising a counter for counting a number of times m the first confidential value is updated, the output section also delivering information which specifies the number of updating times rn.

22. A tag device for use in an automatic tag identification system comprising a confidential value memory in which a first confidential value $s_{k, i}$ and a first proper value $w_k$ which correspond to a tag ID information $id_k$ are stored;

a second calculator connected to the confidential value memory for reading out the first confidential value $s_{k, i}$ from the confidential value memory and for applying a second function F2 which disturbs a relationship between elements of a definition domain and a mapping thereof to the first confidential value to generate tag output information $F2(s_{k, i})$;

an output section for delivering the tag output information $F2(s_{k, i})$;

and a first calculator connected to the confidential value memory for reading out the first confidential value $s_{k, i}$ and the first proper value $w_k$ from the confidential value memory, for applying a first function F1, an inverse image of which is difficult to obtain, to a bit combination value of the first confidential value and the first proper value and for saving a result of such calculation $F1(s_{k, i}|w_k)$ as a new first confidential value $s_{k, i+1}$ in the confidential value memory by overwriting.

23. A backend apparatus for use in an automatic tag identification system comprising a database memory in which each tag ID information $id_n$ ($n \in \{1, \ldots, m\}$, where m represents a total number of tag devices) and a second confidential value $s_{n, 1}$ corresponding thereto are related to each other;

an input section which accepts tag output information $F2(s_{k, i})$ as an input;

a third calculator connected to the database memory for reading out the second confidential value $s_{n, 1}$ from the database memory, applying j times (j∈{0, ..., $j_{max}$}) a first function F1 which is used in a tag device to each of the second confidential values $s_{n,1}$ which are read out, and for subsequently applying a second function F2 which is used in the tag device;

a comparator for comparing the tag output information $F2(s_{k,i})$ against a result of calculation in the third calculator $F2(F1^j(s_{n,1}))$;

a controller for causing the processings in the third calculator and the comparator to be executed again by changing the value of at least one of n and j in the event the tag output information $F2(s_{k,i})$ and the result of calculation $F2(F1^j(s_{n,1}))$ do not match;

and a reader connected to the database memory and operative when the tag output information $F2(s_{k,i})$ matches the result of the calculation $F2(F1^j(s_{n,1}))$ to extract the tag ID information $id_n$ which is related to the second confidential value $s_{n,1}$ corresponding to the matching result of the calculation $F2(F1^j(s_{n,1}))$ from the database memory, wherein an inverse image of the first function F1 is difficult to obtain, the second function F2 disturbs a relationship between elements of a definition and a mapping thereof.

24. A backend apparatus according to claim 23 in which the input section accepts an input of information which specifies a number of times rn the first confidential value is updated in the tag device, the third calculator applies the first function F1 j=rn times to each of the confidential values $s_{n,1}$ which are read out and then applies the second function F2 thereto, and the controller causes the processings in the third calculator and the comparator to be executed again by changing the value of n when the tag output information $F2(s_{k,j})$ does not match the result of the calculation $F2(F1^j(s_{n,1}))$.

25. A backend apparatus according to claim 23 in which the database memory stores the result of the calculation $F2(F1^j(s_{n,1}))$ in the third calculator in a manner relating it to the second confidential value $s_{n,1}$, and the comparator performs a comparing processing by using the result of the calculation $F2(F1^j(s_{n,1}))$ stored in the database memory.

26. A backend apparatus for use in an automatic tag identification system comprising a database memory in which each tag ID information $id_n$ (n∈{1, ..., m}), a corresponding second confidential value $s_{n,1}$ and second proper value $w_n$ are stored in a manner relating to each other;

a input section which accepts an input of tag output information $F2(s_{k,i})$;

a third calculator connected to the database memory for reading out the second confidential value $s_{n,1}$ and the second proper value $w_n$ from the database memory and for applying a second function F2 to $I^j(n)$ where $I^j(n) = s_{n,1}$ (j=0), and $I^j(n) = F1(I^{j-1}(n)|id_n)$ (j≧1) to calculate $F2(I^j(n))$ where F1 represents a first function;

a comparator for comparing the tag output information $F2(s_{k,i})$ against the result of the calculation in the third calculator $F2(I^j(n))$;

a controller for causing the processings in the third calculator and the comparator to be executed again by changing the value of at least one of n and j when the tag output information $F2(s_{k,i})$ does not match the result of the calculation $F2(I^j(n))$;

and a reader for extracting tag ID information $id_n$ which is related to the second confidential value $s_{n,1}$ and the second proper value $w_n$ corresponding to the matched result of calculation $F2(I^j(n))$ from the database memory when a matching between the tag output information $F2(s_{k,i})$ and the result of the calculation $F2(I^j(n))$ is found wherein an inverse image of the first function F1 is difficult to obtain, the second function F2 disturbs a relationship between elements of a definition domain and a mapping thereof.

27. A tag device for use in an automatic tag identification system comprising a confidential value memory in which a first confidential value $s_{k,i}$ and a first proper value $w_k$ corresponding to tag ID information $id_k$ are stored;

a second calculator connected to the confidential value memory for reading out the first confidential value $s_{k,i}$ and the first proper value $w_k$ from the confidential value memory and for applying a second function F2 which disturbs a relationship between elements of a definition domain and a mapping thereof to a bit combination value of the first confidential value and the first proper value to generate tag output information $F2(s_{k,i}|w_k)$;

an output section for delivering the tag output information $F2(s_{k,i}|w_k)$ and a first calculator connected to the confidential value memory for reading the first confidential value $s_{k,i}$ from the confidential value memory, applying a first function F1, an inverse image of which is difficult to obtain, to the first confidential value $s_{k,i}$ which is read out and saving a result of such calculation $F1(s_{k,i})$ as a new first confidential value $s_{k,i+1}$ in the confidential value memory by overwriting.

28. A backend apparatus for use in an automatic tag identification system comprising a database memory in which each tag ID information $id_n$ (n∈{1, ..., m}) and a corresponding second confidential value $s_{n,1}$ and second proper value $w_n$ are stored in a manner relating to each other;

an input section which accepts an input of tag output information $F2(s_{k,i}|w_k)$;

a third calculator connected to the database memory for reading out the second confidential value $s_{n,1}$ and the second proper value $w_n$ from the database memory, applying j times (j∈{0, ..., $j_{max}$}) a first function F1 which is used in a tag device to the second confidential value $s_{n,1}$, determining a bit combination value $F1^j(s_{n,i})|w_n$ of a result of application $F1^j(s_{n,i})$ and the second proper value $w_n$, and applying a second function F2 which is used in the tag device to the bit combination value $F1(s_{n,i}|w_n)$;

a comparator for comparing the tag output information $F2(s_{k,i}|w_k)$ against a result of calculation in the third calculator $F2(F1^j(s_{n,i})|w_n)$;

a controller for causing the processings in the third calculator and the comparator to be executed again by changing the value of at least one of n and j when the tag output information $F2(s_{k,i}|w_k)$ does not match the result of the calculation $F2(F1^j(s_{n,i})|w_n)$;

and a reader connected to the database memory for extracting the tag ID information $id_n$ which is related to the second confidential value $s_{n,1}$ and the second proper value $w_n$ corresponding to the matched result of calculation $F2(F1^j(s_{n,i})|w_n)$ when a matching between the tag output information $F2(s_{k,i}|w_k)$ and the result of the calculation $F2(F1^j(s_{n,i})|w_n)$ is found wherein an inverse image of the first function F1 ia difficult to obtain, the second function F2 disturbs a relationship between elements of a definition domain and mapping thereof.

29. A tag device for use in an automatic tag identification system comprising
   a confidential value memory in which a first proper value $w_k$ corresponding to each tag ID information $id_k$ and a first confidential value $s_i$ which assumes an equal initial value $s_i$ for a plurality of tag ID information are stored;
   a second calculator connected to the confidential value memory for reading out the first confidential value $s_i$ and the first proper value $w_k$ from the confidential value memory and for applying a second function F2 which disturbs a relationship between elements of a definition domain and a mapping thereof to a bit combination value of the first confidential value and the first proper value to generate tag output information $F2(s_1 \mid w_k)$;
   an output section for delivering the tag output information $F2(s_i \mid w_k)$;
   and a first calculator connected to the confidential value memory for reading out the first confidential value $s_i$ from the confidential value memory, applying a first function F1, an inverse image of which is difficult obtain, to the first confidential value $s_i$ which is read out and saving a result of such calculation $F1(s_i)$ as a new first confidential value $s_{i+1}$ in the confidential value memory by overwriting.

30. A backend apparatus for use in an automatic tag identification system comprising
   a database memory in which each tag ID information $id_n$ ($n \in \{1, \ldots, m\}$) and a corresponding second proper value $w_n$ are stored in a manner relating to each other;
   a calculated value memory in which first results of calculation $s_{j+1}$ are stored which are obtained by applying j times ($j \in \{0, \ldots, j_{max}\}$) a first function which is used in a tag device to a second confidential value $s_1$ which is used in common for a plurality of tag ID information;
   an input section which accepts an input of tag output information $F2(s_i \mid w_k)$;
   a third calculator connected to the database memory for reading out the first result of calculation $s_{j+1}$ and the second proper value $w_n$ from the database memory to obtain a bit combination value thereof $s_{j+1} \mid w_n$ and for applying a second function F2 which is used in the tag device thereto;
   a comparator for comparing the tag output information $F2(s_i \mid w_k)$ and the result of calculation in the third calculator $F2(s_{j+1} \mid w_n)$;
   a controller for causing the processings in the third calculator and the comparator to be executed again by changing the value of at least one of n and j when the tag output information $F2(s_i \mid w_k)$ does not match the result of calculation $F2(s_{j+1} \mid w_n)$;
   and a reader connected to the database memory for extracting the tag ID information $id_n$ which is related to the second proper value $w_n$ corresponding to the matched result of calculation $F2(s_{j+1} \mid w_n)$ when a matching between the tag output information $F2(s_i \mid w_k)$ and the result of calculation $F2(s_{j+1} \mid w_n)$ is found wherein
   an inverse image of the first function F1 ia difficult to obtain, the second function F2 disturbs a relationship between elements of a definition domain and mapping thereof.

31. A tag device for use in an automatic tag identification system comprising
   a confidential value memory in which a combination of d ($d \geq 2$) elements $e_{u, vu}$ ($u \in \{1, \ldots, d\}$) which corresponds to each tag ID information $id_k$ is stored;
   a second calculator connected to the confidential value memory for reading out the d elements $e_{u, vu}$ from the confidential value memory and for applying a second function F2 which disturbs a relationship between elements of a definition domain and a mapping thereof to a confidential value $s_{k, i}$ which is a bit combination value of the d elements to generate tag output information $a_{k, i} = F2(s_{k, i})$;
   an output section for delivering the tag output information $a_{k, i}$;
   and a first calculator connected to the confidential value memory for extracting at least part of elements $e_{u', vu'}$ ($u' \in \{1, \ldots, d\}$) from the confidential value memory, for applying a first function F1, an inverse image of which is difficult to obtain, to the extracted elements $e_{u', vu'}$ and for saving a result of such calculation $F1(e_{u', vu'})$ as new elements $e_{u', vu'+1}$ in the confidential value memory by overwriting.

32. A backend apparatus for use in an automatic tag identification system comprising
   a database memory in which a combination of d initial elements $f_{u, 0}$ comprising one selected from each of d kinds ($d \geq 2$) of subgroups $\alpha_u$ ($u \in \{1, \ldots, d\}$), and tag ID information $id_n$ of each tag device n ($n \in \{1, \ldots, m\}$, where m represents a total number of tag devices) are stored in a manner relating to each other;
   an input section for accepting an input of tag output information $a_{k, i}$;
   a third calculator for applying $w_u$ times ($w_u \in \{1, 2, \ldots, max\}$) a first function F1 to the d initial elements $f_{u, 0}$ ($u \in \{1, \ldots, d\}$) which correspond to the tag ID information $id_n$ and for applying a second function F2 to a bit combination value of these values $F1^{wu}(f_{u, 0})$ to determine a calculated value c;
   a comparator for comparing the tag output information $a_{k, i}$ against the calculated value c;
   a controller for causing the processings in the third calculator and the comparator to be executed again by changing the value of at least part of n and $w_u$ when the tag output information $a_{k, i}$ does not match the calculated value c;
   and a reader connected to the database memory for extracting tag ID information $id_n$ which is related to the combination of d initial elements $f_{u, 0}$ corresponding to the calculated value c when the tag output information $a_{k, i}$ matches the calculated value c, wherein
   an inverse image of the first function F1 is difficult to obtain, the second function F2 disturbs a relationship between elements of a definition domain and a mapping thereof.

33. A tag device for use in an automatic tag identification system comprising
   a confidential value memory in which a combination of d ($d \geq 2$) elements $e_{u, vu}$ ($u \in \{1, \ldots, d\}$) which correspond to each tag ID information $id_k$ and a proper value $\gamma_k$ which is inherent to each tag ID information $id_k$ are stored;
   a second calculator connected to the confidential value memory for reading out the d elements $e_{u, vu}$ and the proper value $\gamma_k$ from the confidential value memory and for applying a second function F2 which disturbs a relationship between elements of a definition domain and a mapping thereof to a confidential value $s_{k, i}$ which is a bit combination value of the d elements and the proper value to generate tag output information $a_{k, i} = F2(s_{k, i})$;
   an output section for delivering the tag output information $a_{k, i}$;
   and a first calculator connected to the confidential value memory for extracting at least part of the elements $e_{u', vu'}$ ($u' \in \{1, \ldots, d\}$) from the confidential value memory, applying a first function F1, an inverse image of which is difficult to obtain, to the extracted elements $e_{u', vu'}$ and for saving a result of such calculation F1 ($e_{u', vu'}$) as new elements $e_{u', vu'+1}$ in the confidential value memory by overwriting.

34. A backend apparatus for use in an automatic tag identification system comprising a database memory in which a combination of d initial elements $f_{u, 0}$ comprising one selected from each of d kinds ($d \geq 2$) of subgroups $\alpha_u$ ($u \in \{1, \ldots, d\}$), a proper value $\gamma_n$ which is inherent to each tag ID information $id_n$ ($n \in \{1, \ldots, m\}$) and each tag ID information $id_n$ are stored in a manner relating to each other;

an input section for accepting an input of tag output information $a_{k, i}$;

a third calculator for applying $w_u$ times ($w_u \in \{1, 2, \ldots, \max\}$) a first function F1 to the d initial elements $f_{u, 0}$ ($u \in \{1, \ldots, d\}$) corresponding to the tag ID information $id_n$ and for applying a second function F2 to a bit combination value of these values $F1^{wu}(f_{u, 0})$ and the proper value $\gamma_n$ to determine a calculated value c;

a comparator for comparing the tag output information $a_{k, i}$ against the calculated value c;

a controller for causing the processings in the third calculator and the comparator to be executed again by changing the value of at least part of n and $w_u$ when the tag output information $a_{k, i}$ does not match the calculated value c;

and a reader connected to the database memory for extracting tag ID information $id_n$ which is related to the combination of a plurality of initial elements $f_{u, 0}$ corresponding to the calculated value c from the database memory when a matching between the tag output information $a_{k, i}$ and the calculated value c is found, wherein an inverse image of the first function F1 is difficult to obtain, the second function F2 disturbs a relationship between elements of a definition domain and a mapping thereof.

35. A tag device for use in an automatic tag identification system comprising a confidential value memory in which d ($d \geq 1$) elements $e_{u, vu}$ ($u \in \{1, \ldots, d\}$) are stored;

a first manifold value memory in which a manifold value z which assumes t kinds ($t \geq 2$) of values is stored;

a second calculator connected to the confidential value memory and the first manifold value memory for reading out the elements $e_{u, vu}$ from the confidential value memory and for reading out either manifold value z from the first manifold value memory and for applying a second function F2 which disturbs a relationship between elements of a definition domain and a mapping thereof to a confidential value $s_{k, i}$ which is a bit combination value of the elements and the manifold value to generate tag output information $a_{k, i} = F2(s_{k, i})$;

an output section for delivering the tag output information $a_{k, i}$;

and a first calculator connected to the confidential value memory for extracting at least part of elements $e_{u', vu'}$ ($u' \in \{1, \ldots, d\}$) from the confidential value memory each time the output section delivers the tag output information $a_{k, i}$ t times, for applying a first function F1, an inverse image of which is difficult to obtain, to the extracted elements $e_{u', vu'}$ and for saving a result of such calculation F1 ($e_{u', vu'}$) as new elements $e_{u', vu'+1}$ in the confidential value memory by overwriting.

36. A tag device according to claim 35 in which as long as the first calculator does not update elements in the confidential value memory, the manifold value z used by the second calculator in generating the tag output information $a_{k, i}$ changes each time the tag output information $a_{k, i}$ is generated.

37. A backend apparatus for use in an automatic tag identification system comprising a database memory in which a combination of d initial elements $f_{u, 0}$ comprising one selected from each of d kinds ($d \geq 1$) of subgroup $\alpha_u$ ($u \in \{1, \ldots, d\}$) and a tag ID information $id_n$ ($n \in \{1, \ldots, m\}$) of each tag device are stored in a manner relating to each other;

a second manifold value memory in which a manifold value z which assumes t kinds ($t \geq 2$) of values is stored;

an input section for accepting an input of tag output information $a_{k, i}$;

a third calculator for applying $w_u$ times ($w_u \in \{1, 2, \ldots, \max\}$) a first function F1 to the d initial elements $f_{u, 0}$ ($u \in \{1, \ldots, d\}$) in the database memory which correspond to the tag ID information $id_n$ and for applying a second function F2 to a bit combination value of these values $F1^{wu}(f_{u, 0})$ and the manifold value z in the second manifold value memory to determine a calculated value c;

a comparator for comparing the tag output information $a_{k, i}$ against the calculated value c;

a controller for causing the processings in the third calculator and the comparator to be executed again by changing the value at least part of n, $w_u$ and z when the tag output information $a_{k, i}$ does not match the calculated value c;

and a reader connected to the database memory for extracting the tag ID information $id_n$ which is related to the combination of d initial elements $f_{u, 0}$ corresponding to the calculated value c from the database memory when a matching between the tag output information $a_{k, i}$ and the calculated value c is found, wherein an inverse image of the first function F1 is difficult to obtain, the second function F2 disturbs a relationship between elements of a definition domain and a mapping thereof.

38. A tag device for use in an automatic tag identification system comprising a confidential value memory in which d ($d \geq 2$) elements $e_{u, vu}$ ($u \in \{1, \ldots, d\}$) are stored;

a first manifold value memory in which a manifold value $z_u$ which assumes $t_u$ kinds ($t_u \geq 2$) of values for each u is stored;

a second calculator connected to the confidential value memory and the first manifold value memory for reading out the elements $e_{u, vu}$ from the confidential value memory and for reading out either manifold value $z_u$ for each u from the first manifold value memory and for applying a second function F2 which disturbs a relationship between elements of a definition domain and a mapping thereof to a confidential value $s_{k, i}$ which is a bit combination value of these $e_{v, vu}$ and $z_u$ to generate tag output information $a_{k, i} = F2(s_{k, i})$;

an output section for delivering the tag output information $a_{k, i}$;

and a first calculator connected to the confidential value memory for extracting at least part of the elements $e_{u', vu'}$ ($u' \in \{1, \ldots, d\}$) from the confidential value memory each time the output section delivers the tag output information $a_{k, i}$ some number of times, for applying a first function F1, an inverse image of which is difficult to obtain, to the extracted elements $e_{u', vu'}$ and for saving a result of such calculation $F1(e_{u', vu'})$ as new elements $e_{u', vu'+1}$ in the confidential value memory by overwriting.

39. A tag device according to claim 38 in which each time the output section delivers the tag output information $a_{k, i}$, the first calculator extracts at least part of the elements $e_{u', vu'}$ from the confidential value memory, applies the first function F1 to the extracted elements $e_{u', vu'}$ and saves a result of such calculation $F1(e_{u', vu'})$ as new elements $e_{u', vu'+1}$ in the confidential value memory by overwriting.

40. A tag device according to claim 38 in which each time the output section delivers the tag output information $$a_{k,i} \sum_{u=1}^{d} t_u$$

times, the first calculator extracts at least part of the elements $e_{u', vu'}$ from the confidential value memory, applies the first function F1 to the extracted elements $e_{u', vu'}$, and saves a result of such calculation $F1(e_{u', vu'})$ as new elements $e_{u', vu'+1}$ in the confidential value memory by overwriting.

41. A tag device according claim 40 in which as long as the first calculator does not update the elements in the confidential value memory, a combination of manifold values $z_u$ ($u \in \{1, \ldots, d\}$) which are used by the second calculator in generating the tag output information $a_{k, i}$ changes each time the tag output information $a_{k, i}$ is generated.

42. A backend apparatus for use in an automatic tag identification system comprising
  a database memory in which a combination of d initial elements $f_{u, 0}$ which comprises one selected from each of d kinds ($d \geq 1$) of subgroups $\alpha_u$ ($u \in \{1, \ldots, d\}$) and tag ID information $id_n$ ($n \in \{1, \ldots, m\}$) of each tag device are stored in a manner relating to each other;
  a second manifold value memory in which a manifold value $z_u$ which assumes $t_u$ kinds ($t_u \geq 2$) of values for each u is stored;
  an input section for accepting an input of tag output information $a_{k, i}$;
  a third calculator for applying $w_u$ times ($w_u \in \{1, 2, \ldots, max\}$) a first function F1 which is used in a tag device to the d initial elements $f_{u, 0}$ ($u \in \{1, \ldots, d\}$) corresponding to the tag ID information $id_n$ and for applying a second function F2 which is used in the tag device to a bit combination value of these values $F1^{wu}(f_{u, 0})$ and the manifold value $z_u$ to determine a calculated value c;
  a comparator for comparing the tag output information $a_{k, i}$ against the calculated value c;
  a controller for causing the processings in the third calculator and the comparator to be executed again by changing the value of at least part of n, $w_u$ and z;
  and a reader connected to the database memory for extracting tag ID information $id_n$ which is related to the combination of the d initial elements $f_{u, 0}$ corresponding to the calculated value c from the database memory when a matching between the tag output information $a_{k, i}$ and the calculated value c is found, wherein
  an inverse image of the first function F1 is difficult to obtain, the second function F2 disturbs a relationship between elements of a definition domain and a mapping thereof.

43. A tag privacy protection method for preventing privacy information of a user from being acquired from information which is delivered from a tag device, in which privileged ID information $sid_h$ which is formed by privileging respective tag ID information $id_h$ is stored in a confidential value memory of each tag device; comprising
  reading out the privileged ID information $sid_h$ stored in the confidential value memory in a read/write section of the tag device;
  delivering the privileged ID information $sid_h$ to an updater which is provided externally of each tag device from a first output section of the tag device;
  accepting an input of the privileged ID information $sid_h$ at a first input section of the updater;
  updating the privileged $sid_h$ to new privileged ID information $sid_h'$, both the privileged ID information $sid_h$ and the new privileged ID information $sid_h'$ corresponding to the tag ID information $sid_h$, in an updating section of the updater;
  delivering the new privileged ID information $sid_h'$ to the tag device from a second output section of the updater;
  accepting an input of the new privileged ID information $sid_h'$ at a second input section of the tag device; and
  storing the new privileged ID information $sid_h'$ in the confidential value memory.

44. A tag privacy protection method for preventing privacy information of a user from being acquired from information which is delivered from a tag device, in which the privileged ID information $sid_h$ which is a random value $r_h$ related to each tag ID information $id_h$ is stored in a confidential value memory of each tag device h ($h \in \{1, \ldots, m\}$, where m represents a total number of tag devices), and each tag ID information $id_h$ and privileged ID information $sid_h$ which is the random value $r_h$ related to the tag ID information $id_h$ are stored in a privileged ID memory of an updater which is provided externally of each tag device h in a manner relating to each other; comprising:
  reading out the privileged ID information $sid_h$ stored in the confidential value memory thereof in a first read/write section of the tag device h;
  delivering the privileged ID information $sid_h$ to the updater from a first output section of the tag device h;
  accepting an input of the privileged ID information $sid_h$ at a first input section of the updater;
  generating a new random value $r_h'$ in a random value generator of the updater;
  selecting tag ID information $id_h$ corresponding to the privileged ID information $sid_h$ which is accepted as the input from the privileged ID memory and storing the new random value $r_h'$ in the privileged ID memory in a manner relating to new privileged ID information $sid_h'$ in a second read/write section of the updater;
  delivering the new privileged ID information $sid_h'$ to the tag device h from a second output section of the updater;
  accepting an input of the new privileged ID information $sid_h'$ at a second input section of the updater device h; and
  storing the new privileged ID information $sid_h'$ in the confidential value memory.

45. A tag privacy protection method for preventing privacy information of a user from being acquired from information which is delivered from a tag device, in which privileged ID information $sid_h$ is stored in a confidential value memory of each tag device h ($h \in \{1, \ldots, m\}$, where m represents a total number of tag devices), the privileged ID information $sid_h$ including a first encrypted text according to a common key encryption technique which corresponds to each tag ID information $id_h$ and key ID information $kid_j$ of a common key $k_j$ used in the encryption ($j \in \{1, \ldots, n\}$, where n represents a total number of tag devices), and each key ID information $kid_j$ are stored and each common key $k_j$ in a key memory of an updater which is provided externally of each tag device h in a manner relating to each other; comprising:

reading out the privileged ID information $sid_h$ stored in the confidential value memory thereof in a first read/write section of the tag device h;

delivering the privileged ID information $sid_h$ to an updater from a first output section of the tag device h;

accepting an input of the privileged ID information $sid_h$ at a first input section of the;

extracting the common key $k_j$ corresponding to the key ID information $kid_j$ included in the privileged ID information $sid_h$ from the key memory by a second read/write section of the updater;

decrypting the first encrypted text using the common key $k_j$ extracted by the second read/write section to extract tag ID information $id_h$ by an ID extractor of the updater;

generating a second encrypted text, using the tag ID information $id_h$ extracted by the ID extractor and the common key $k_j$ which is used in the extraction in an encryptor of the updater;

delivering new privileged ID information $sid_h'$ including the second encrypted text and the key ID information $kid_j$ of the common key $k_j$ to the tag device h from a second output section of the updater;

accepting an input of the new privileged ID information $sid_h'$ at a second input section of the tag device h;

storing the new privileged ID information $sid_h'$ in the confidential value memory.

46. A tag privacy protection method for preventing privacy information of a user from being acquired from information which is delivered from a tag device, in which privileged ID information $sid_h$ is stored in a confidential value memory of each tag device h ($h \in \{1, \ldots, m\}$, where m represents a total number of tag devices), the privileged ID information $sid_h$ including a first encrypted text according to a pubic key encryption technique which corresponds to each tag ID information $id_h$ and key ID information $kid_j$ for a key pair $(sk_j, pk_j)$ (where $sk_j$ represents a secret key and $pk_j$ represents a public key, $j \in \{1, \ldots, n\}$, where n represents a total number of tag devices), and each key ID information $kid_j$ and each key pair $(sk_j, pk_j)$ in a key memory of an updater which is provided externally of each tag device h in a manner relating to each other; comprising:

reading out the privileged ID information $sid_h$ stored in the confidential value memory in a first read/write section of the tag device h;

delivering the privileged ID information $sid_h$ to an updater from a first output section of the tag device h;

accepting an input of the privileged ID information $sid_h$ at a first input section of the updater;

extracting the key pair $(sk_j, pk_j)$ which corresponds to the key ID information $kid_j$ which is included in the privileged ID information $sid_h$ accepted as the input to the first input section by a second read/write section of the updater;

decrypting the first encrypted text using the secret key $sk_j$ extracted by the second read/write section to extract the tag ID information $id_h$ by an ID extractor of the updater;

generating a second encrypted text, using the tag ID information $id_h$ extracted by the ID extractor and the public $pk_j$ which is extracted by the second read/write section by an encryptor of the updater;

delivering new privileged ID information $sid_h'$ including the second encrypted text and the key ID information $kid_j$ of the key pair $(sk_j, pk_j)$ to the tag device h from a second output section of the updater;

accepting an input of the new privileged ID information $sid_h'$ at a second input section of the tag device h; and storing the new privileged ID information $sid_h'$ in the confidential value memory.

47. A tag privacy protection method for preventing privacy information of a user from being acquired from information which is delivered from a tag device, in which privileged ID information $sid_h$ is stored in a confidential value memory of each tag device h ($h \in \{1, \ldots, m\}$, where m represents a total number of tag devices), the privileged ID information $sid_h$ including a first encrypted text according to re-encryptable public key encryption technique which corresponds to each tag ID information $id_h$ and key ID information $kid_j$ of the public key $pk_j$ ($j \in \{1, \ldots, n\}$, where n represents a total number of keys), each key ID information $kid_j$ and each public key $pk_j$ are stored in a key memory of an updater which is provided externally of each tag device h in a manner relating to each other; comprising:

readings out the privileged ID information $sid_h$ stored in the confidential value memory in a first read/write section of the device h;

delivers the privileged ID information $sid_h$ to an updater from a first output section of the device h;

accepting an input of the privileged ID information $sid_h$ at a first input section of the updater;

extracting the public key $pk_j$ which corresponds to the key ID information $kid_j$ included in the privileged ID information $sid_h$ which is accepted as the input to the first input section from the key memory by a second read/write section;

re-encrypting the first encrypted text in the privileged ID information $sid_h$ using the public key $pk_j$ extracted by the second read/write section to generate a second encrypted text, by an encryptor of the updater;

delivering new privileged ID information $sid_h'$ including the second encrypted text and the key ID information $kid_j$ of the public key $pk_j$ to the tag device h from a second output section of the updater;

accepting an input of the new privileged ID information $sid_h'$ at a second input section of the tag device h; and storing the new privileged ID information $sid_h'$ in the confidential value memory.

48. A tag privacy protection method for preventing privacy information of a user from being acquired from information which is delivered from a tag device, in which privileged ID information $sid_h$ which has privileged each tag ID information $id_h$ is stored in a confidential value memory of each tag device h ($h \in \{1, \ldots, m\}$, where m represents a total number of tag devices); comprising:

reading out the privileged ID information $sid_h$ stored in the confidential value memory by a first read/write section of the tag device h;

delivering the privileged ID information $sid_h$ to a first updater which is provided externally of the tag device h from a first output section of the tag device h;

accepting an input of the privileged ID information $sid_h$ at a first input section of the first updater;

determining tag ID information $id_h$ from the privileged ID information $sid_h$ by an ID extractor of the first updater;

delivering the tag ID information $id_h$ to a second updater which is provided externally of the tag device h from a second output section of the first updater;

accepting an input of the tag ID information $id_h$ at a third input section of the second updater;

generating new privileged ID information $sid_h'$ which has privileged the tag ID information $id_h$ by an encryptor of the second updater;

delivering the new privileged ID information $sid_h'$ to the tag device h from a third output section of the second updater;

accepting an input of the new privileged ID information $sid_h'$ at a second input section of the tag device h; and storing the new privileged ID information $sid_h'$ in the confidential value memory.

49. An updater for updating privileged ID information in a tag device, the updater being provided externally of the tag device and comprising a privileged ID memory for storing each tag ID information $id_h$ and privileged ID information $sid_h$ which is a random value $r_h$ which corresponds to the tag ID information $id_h$ in a manner relating to each other;

a first input section which accepts an input of the privileged ID information $sid_h$ which is delivered from the tag device;

a random value generator for generating a new random value $r_h'$;

a second read/write section connected to the privileged ID memory for selecting tag ID information $id_h$ which corresponds to the privileged ID information $sid_h$ which is accepted by the first input section as the input from the privileged ID memory and for relating this with the new random value $r_h'$ as new privileged ID information $sid_h'$ to be stored in the privileged ID memory;

and a second output section for delivering the new privileged ID information $sid_h'$ to the tag device h.

50. An updater for updating privileged ID information in a tag device, the updater being provided externally of the tag device and comprising a key memory for storing each key ID information $kid_j$ ($j \in \{1, \ldots, n\}$, where n represents a total number of keys) and each common key $k_j$ of a common key encryption technique in a manner relating to each other;

a first input section for accepting an input of privileged ID information $sid_h$ which includes a first encrypted text according to the common key encryption technique which corresponds to the tag ID information $id_h$ and key ID information $kid_j$ of the common key $k_j$ which is used in the encryption;

a second read/write section connected to the key memory for extracting the common key $k_j$ which corresponds to the key ID information $kid_j$ which is included in the privileged ID information $sid_h$ from the key memory;

an ID extractor for decrypting the first encrypted text using the common key $k_j$ which is extracted by the second read/write section to extract tag ID information $id_h$;

an encryptor for generating a second encrypted text, using the tag ID information $id_h$ extracted by the ID extractor and the common key $k_j$ which is used in the extraction;

and a second output section for delivering new privileged ID information $sid_h'$ which includes the second encrypted text and the key ID information $kid_j$ for the common key $k_j$ to the tag device h.

51. An updater for updating privileged ID information in a tag device, the updater being provided externally of the tag device and comprising a key memory for storing each key ID information $kid_j$ ($j \in \{1, \ldots, n\}$, where n represents a total number of keys) and each key pair ($sk_j$, $pk_j$) ($sk_j$ represents a secret key and $pk_j$ a public key) in a manner relating to each other;

a first input section for accepting an input of privileged ID information $sid_h$ which includes a first encrypted text according to a public key encryption technique which corresponds to tag ID information $id_h$ and key ID information $kid_j$ for the public key $pk_j$ which is used in the encryption;

a second read/write section connected to the key memory for extracting the key pair ($sk_j$, $pk_j$) which corresponds to the key ID information $kid_j$ which is included in the privileged ID information $sid_h$ accepted by the first input section as the input from the key memory;

an ID extractor for decrypting the first encrypted text using the secret key $sk_j$ extracted by the second read/write section to extract tag ID information $id_h$;

an encryptor for generating a second encrypted text, using the tag ID information $id_h$ extracted by the ID extractor and the public key $pk_j$ extracted by the second read/write section;

and a second output section for delivering new privileged ID information $sid_h'$ which includes the second encrypted text and the key ID information $kid_j$ for the key pair ($sk_j$, $pk_j$) to the tag device h.

52. An updater for updating privileged ID information in a tag device, the updater being provided externally of the tag device and comprising a key memory for storing each key ID information $kid_j$ ($j \in \{1, \ldots, n\}$, where n represents a total number of keys) and each public key $pk_j$ in a manner relating to each other;

a first input section for accepting an input of privileged ID information $sid_h$ which includes a first encrypted text according to re-encryptable public key encryption technique which corresponds to tag ID information $id_h$ and key ID information $kid_j$ for the public key $pk_j$;

a second read/write section connected to the key memory for extracting the public key $pk_j$ which corresponds to the key ID information $kid_j$ which is included in the privileged ID information $sid_h$ which is accepted by the first input section as the input from the key memory;

an encryptor for re-encrypting the first encrypted text which is included in the privileged ID information $sid_h$ using the public key $pk_j$ extracted by second read/write section to generate a second encrypted text;

and a second output section for delivering new privileged ID information $sid_h'$ which includes the second encrypted text and the key ID information $kid_j$ for the public key $pk_j$ to the tag device h.

53. An updater according to one of claims 50 to 52 in which the key ID information $kid_j$ is information which is shared by a plurality unrelated tag devices.

54. A computer readable record medium storing an update program which enables a computer to function as an updater according to one of claims 49 to 52.

55. An update solicitor for soliciting an updater to update privileged ID information in a tag device, the update solicitor being provided externally of the tag device and comprising a privileged ID input section to which a plurality of kinds of privileged ID's, which are two or more kinds of re-encryptable encrypted texts corresponding to an identical tag ID information $id_h$, are input;

a privileged ID memory for storing a plurality of kinds of privileged ID's which are input thereto;

a privileged ID extractor connected to the privileged ID memory for extracting one of privileged ID's from the privileged ID memory at a given opportunity;

and a privileged ID output section for delivering the extracted privileged ID to the tag device.

56. A computer readable record medium storing an update soliciting program which enables a computer to function as an update solicitor according to claim 55.

57. A tag device for use in an automatic tag identification system comprising
- a privileged ID input section to which a plurality of kinds of privileged ID's, which are two or more kinds of re-encryptable encrypted texts corresponding to an identical tag ID information $id_h$, are input;
- a privileged ID memory for storing the plurality of kinds of privileged ID's which are input thereto;
- a privileged ID extractor connected to the privileged ID memory for extracting one of the privileged ID's from the privileged ID memory at a given opportunity;
- and a privileged ID output section for delivering the extracted privileged ID.

58. A tag privacy protection method for preventing privacy information of a user from being acquired from information which is delivered from a tag device, comprising:
- extracting a key ID from a read only region of a privileged ID memory of a tag device and extracting a first privileged ID from a rewritable region of the privileged ID memory of the tag device by a read/write section of the tag device, the first privileged ID being an encrytpted text tag of ID information, the encrypted text encrypted with a key specified by the key ID;
- delivering the extracted key ID and the first privileged ID to an updater from a first output section of the tag device, the updater apparatus having a key memory storing a key ID and a key in a manner relating to each other;
- accepting the key ID and the first privileged ID as inputs at a first input section of the updater;
- extracting a key which corresponds to the key ID which is input to the first input section from the key memory by a first key extractor of the updater;
- updating the first privileged ID to a second privileged ID, the second privileged ID being a new encrypted text of the tag ID information corresponding to first privileged ID, the new encrypted text encrypted with the key extracted by the first key extractor, in a privileged ID updating section of the updater;
- delivering the second privileged ID from a second output section;
- accepting an input of the second privileged ID at a second input section of the tag device; and
- storing the second privileged ID in the rewritable region of the privileged ID memory.

59. A tag privacy protection method according to claim 58, further comprising:
- generating a verification information for the second privileged ID in a verification information generator of the updater apparatus;
- delivering the second privileged ID and the verification information from the second output section of the updater;
- accepting the second privileged ID and the verification information as inputs at the second input section of the tag device;
- storing the second privileged ID and the verification information in the rewritable region the of privileged ID memory.

60. A tag privacy protection method according to claim 58, further comprising:
- extracting the key ID from the read-only region of the privileged ID memory and extracting the first or second privileged ID from the rewritable region, by the read/write section of the tag device;
- delivering the extracted key ID and the first or second privileged ID to a decrypt or from the first output section of the tag device;
- accepting the key ID and the first or second privileged ID as inputs at a third input section of the decryptor;
- extracting a key which corresponds to the key ID which is accepted by the third input section as an input from the key memory by a second key extractor of the decryptor;
- decrypting the first or second privileged ID with the key extracted by the second key extractor of the decryptor to calculate the tag ID information in an ID calculator;
- and verifying the structure of the calculated tag ID information by an ID structure verifier of the decryptor.

61. A tag device for use in an automatic tag identification system comprising
- a privileged ID memory including a read-only region in which a key ID is stored and a rewritable region in which a first privileged ID is stored, the first privileged ID being an encrypted text of tag ID information, the encrypted text encrypted with a key specified by the key ID;
- a read/write section for extracting the key ID and the first privileged ID from the privileged ID memory;
- a first output section for delivering the key ID and the first privileged ID which are extracted; and
- a second input section for accepting an input of a second privileged ID, the second privileged ID being a new encrypted text of the tag ID information corresponding to the first privileged ID, the new encrypted text encrypted with the key specified by the key ID, the first privileged ID differing from the second privileged ID;
- wherein the read/write section storing the second privileged ID which is input in the rewritable region of the privileged ID memory.

62. A tag device according to claim 61 in which the second input section additionally accepts an input of verification information for the second privileged ID and the read/write section additionally stores the verification information which is input in the rewritable region of the privileged ID memory.

63. A tag device according to claim 62 in which each of the first and second privileged ID is encrypted text of part of to the tag ID information, the part of the tag ID being inherent to each tag device.

64. A tag device according to claim 62 in which an identical key ID is allocated to unrelated tag devices.

65. A computer readable record medium storing a tag program which enables a computer to function as a tag device according to one of claims 17, 57 and 61.

* * * * *

UNITED STATES PATENT AND TRADEMARK OFFICE
CERTIFICATE OF CORRECTION

PATENT NO.            : 7,661,132 B2                                              Page 1 of 1
APPLICATION NO.  : 10/537915
DATED                    : February 9, 2010
INVENTOR(S)         : Ohkubo et al.

It is certified that error appears in the above-identified patent and that said Letters Patent is hereby corrected as shown below:

On the title page, Item (87), the PCT Publication information is incorrect. Item (87) should read:

-- (87)   PCT Pub. No.: WO 2005/031579

PCT Pub. Date: Apr. 7, 2005 --

Signed and Sealed this

Eleventh Day of May, 2010

David J. Kappos
*Director of the United States Patent and Trademark Office*